US012784572B2

(12) United States Patent
Wright et al.

(10) Patent No.: US 12,784,572 B2
(45) Date of Patent: Nov. 3, 2026

(54) DEVICES, SYSTEMS, AND METHODS FOR MONITORING CONTROLLED SPACES FOR TRANSITORY USES

(71) Applicant: TeamOfDefenders LLC, Crossroads, TX (US)

(72) Inventors: Nathan W. Wright, Oak Point, TX (US); Mark A. Cieri, Flower Mound, TX (US)

(73) Assignee: Team OfDefenders LLC, Crossroads, TX (US)

(*) Notice: Subject to any disclaimer, the term of this patent is extended or adjusted under 35 U.S.C. 154(b) by 94 days.

(21) Appl. No.: 18/627,426

(22) Filed: Apr. 4, 2024

(65) Prior Publication Data

US 2024/0346914 A1 Oct. 17, 2024

Related U.S. Application Data

(63) Continuation-in-part of application No. 18/214,152, filed on Jun. 26, 2023, now Pat. No. 12,586,455, and (Continued)

(51) Int. Cl.

| | |
|---|---|
| ***G08B 1/08*** | (2006.01) |
| ***G08B 25/01*** | (2006.01) |
| ***G08B 25/10*** | (2006.01) |

(52) U.S. Cl.

CPC ........... *G08B 25/016* (2013.01); *G08B 25/10* (2013.01)

(58) Field of Classification Search

CPC ...... G08B 25/016; G08B 25/10; G08B 19/00; G08B 25/009; G08B 29/181;

(Continued)

(56) References Cited

U.S. PATENT DOCUMENTS

| | | | |
|---|---|---|---|
| 5,777,551 | A | 7/1998 | Hess |
| 5,805,063 | A | 9/1998 | Kackman |

(Continued)

OTHER PUBLICATIONS

Found at https://sky-hawk.com/self-storage-unit-security/ (last visited on Nov. 15, 2019).

(Continued)

*Primary Examiner* — Anh V La

(74) *Attorney, Agent, or Firm* — Eric Kelly

(57) ABSTRACT

The invention includes electronic monitoring-device for monitoring controlled spaces, as well as systems and methods for such monitoring. The monitoring-devices may be battery powered devices, with various sensors and capable of wireless communications. Installation and/or use of the monitoring-device may not require any external wiring nor device pairing. These monitoring-devices may be installed at a given controlled space to monitor that given controlled space and to electronically communicate occurrences of that given controlled space to various interested stakeholders, such as, but not limited to, a tenant of the given controlled space, facility operators of the given controlled space, the provider of the electronic monitoring-device, and/or third-parties (e.g., insurance companies, first responders, and/or law enforcement). The monitoring-device may provide details, information, alerts, reminders, notices, notifications, alarms, and/or the like to various authorized stakeholders of the occurrences within that given controlled space. One example of a controlled space is a self-storage unit.

26 Claims, 64 Drawing Sheets

Related U.S. Application Data a continuation-in-part of application No. 18/332,720, filed on Jun. 10, 2023, now Pat. No. 12,424,081, and a continuation-in-part of application No. 17/969,116, filed on Oct. 19, 2022, now Pat. No. 12,651,523, and a continuation-in-part of application No. 18/606,774, filed on Mar. 15, 2024.

(60) Provisional application No. 63/457,953, filed on Apr. 7, 2023, provisional application No. 63/457,380, filed on Apr. 5, 2023.

(58) Field of Classification Search
CPC ............ G08B 29/188; G08B 13/19613; H04L 12/2803; H04N 7/181
USPC ................. 340/539.11, 539.1, 506, 540, 541
See application file for complete search history.

(56) References Cited

U.S. PATENT DOCUMENTS

| | | | | |
|---|---|---|---|---|
| 6,310,549 | B1 | 10/2001 | Loftin | |
| 6,762,686 | B1 | 7/2004 | Tabe | |
| 6,831,557 | B1 | 12/2004 | Hess | |
| 6,864,789 | B2 | 3/2005 | Wolfe | |
| 6,961,707 | B2 | 11/2005 | Jenkins | |
| 7,312,704 | B1 | 12/2007 | Powell | |
| 7,315,246 | B2 | 1/2008 | Rajapakse | |
| 7,394,359 | B2 | 7/2008 | Eskildsen | |
| 7,800,496 | B2 | 9/2010 | Albert | |
| 7,961,088 | B2 | 6/2011 | Watts | |
| 8,855,311 | B1 | 10/2014 | Clement | |
| 9,576,448 | B2 | 2/2017 | Liu | |
| 9,589,441 | B2 | 3/2017 | Shapiro | |
| 9,972,146 | B1 | 5/2018 | Beard | |
| 9,984,555 | B2 | 5/2018 | Bieser | |
| 10,276,013 | B2 | 4/2019 | Lundy | |
| 10,453,149 | B1 | 10/2019 | Gaudin | |
| 11,055,797 | B1 | 7/2021 | Carone | |
| 11,222,522 | B2 * | 1/2022 | Wright | G08B 7/06 |
| 2003/0098791 | A1 | 5/2003 | Carlson | |
| 2004/0119590 | A1 | 6/2004 | Wang | |
| 2004/0196182 | A1 | 10/2004 | Unnold | |
| 2004/0233055 | A1 | 11/2004 | Canich | |
| 2005/0253706 | A1 | 11/2005 | Spoltore | |
| 2006/0250235 | A1 | 11/2006 | Astrin | |
| 2007/0182543 | A1 | 8/2007 | Luo | |
| 2009/0231121 | A1 | 9/2009 | Daniel-Wayman | |
| 2009/0231334 | A1 | 9/2009 | Fitzgibon | |
| 2009/0231427 | A1 | 9/2009 | Fitzgibbon | |
| 2014/0195965 | A1 * | 7/2014 | Brunet | G06F 3/04817 715/784 |
| 2016/0072891 | A1 | 3/2016 | Joshi | |
| 2017/0076562 | A1 | 3/2017 | Hicks | |
| 2017/0124853 | A1 | 5/2017 | Mehta | |
| 2018/0218593 | A1 * | 8/2018 | Eskildsen | G08B 25/016 |
| 2018/0268673 | A1 | 9/2018 | Amir | |
| 2019/0066483 | A1 | 2/2019 | Darling | |
| 2019/0171934 | A1 | 6/2019 | Sites | |
| 2021/0142650 | A1 | 5/2021 | Darling | |

OTHER PUBLICATIONS

Found at https://www.monnit.com/solutions/storage-unit-monitoring (last visited on Nov. 15, 2019).

Found at https://store.google.com/us/product/nest_secure_alarm_system (last visited on Nov. 15, 2019).

Found at https://simplisafe.com/build-my-system (last visited on Nov. 15, 2019).

* cited by examiner

DEVICES, SYSTEMS, AND METHODS FOR MONITORING CONTROLLED SPACES FOR TRANSITORY USES

PRIORITY NOTICE

The present application claims priority under 35 U.S.C. § 119 (e) to U.S. Provisional Patent Application Ser. No. 63/457,380 filed on Apr. 5, 2023, the disclosure of which is incorporated herein by reference in its entirety.

The present application claims priority under 35 U.S.C. § 119 (e) to U.S. Provisional Patent Application Ser. No. 63/457,953 filed on Apr. 7, 2023, the disclosure of which is incorporated herein by reference in its entirety.

The present application claims priority under 35 U.S.C. § 120 to U.S. Nonprovisional patent application Ser. No. 18/606,774 filed on Mar. 15, 2024, the disclosure of which is incorporated herein by reference in its entirety. The present application is a continuation-in-part (CIP) of U.S. Nonprovisional patent application Ser. No. 18/606,774 filed on Mar. 15, 2024.

The present application claims priority under 35 U.S.C. § 120 to U.S. Nonprovisional patent application Ser. No. 18/214,152 filed on Jun. 26, 2023, the disclosure of which is incorporated herein by reference in its entirety. The present application is a continuation-in-part (CIP) of U.S. Nonprovisional patent application Ser. No. 18/214,152 filed on Jun. 26, 2023.

The present application claims priority under 35 U.S.C. § 120 to U.S. Nonprovisional patent application Ser. No. 18/332,720 filed on Jun. 10, 2023, the disclosure of which is incorporated herein by reference in its entirety. The present application is a continuation-in-part (CIP) of U.S. Nonprovisional patent application Ser. No. 18/332,720 filed on Jun. 10, 2023.

The present application claims priority under 35 U.S.C. § 120 to U.S. Nonprovisional patent application Ser. No. 17/969,116 filed on Oct. 19, 2022, the disclosure of which is incorporated herein by reference in its entirety. The present application is a continuation-in-part (CIP) of U.S. Nonprovisional patent application Ser. No. 17/969,116 filed on Oct. 19, 2022.

CROSS REFERENCE TO RELATED PATENTS

The following U.S. utility patents share at least one inventor with the present patent application and are incorporated by reference in their entireties: U.S. utility U.S. Pat. No. 11,222,522; U.S. utility U.S. Pat. No. 11,288,946; U.S. utility U.S. Pat. No. 11,527,147; and U.S. utility U.S. Pat. No. 11,688,271.

TECHNICAL FIELD OF THE INVENTION

The present invention relates in general to the monitoring of controlled spaces for transitory uses and more specifically to individual monitoring of at least one controlled space for transitory uses with at least one monitoring hardware device.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Currently (circa 2022) theft, burglary, unauthorized access, and/or losses due to other perils within and/or at controlled spaces for transitory use(s) is and has been a serious problem. As an example, individual storage units and/or similar enclosures may be a type or a category of controlled spaces for transitory use(s). Users (e.g., the tenants/renters) of individual self-storage units rate security concerns as a major concern in selecting a given self-storage facility (with self-storage units) according to surveys conducted in 2019 among existing self-storage tenants and potential self-storage tenants alike. This concern remains prevalent and leaves tenants lacking true peace of mind regarding whatever it is they may be storing in their individual self-storage units. Currently there are only limited individual storage unit monitoring solutions available in the nearly 50,000 or so self-storage facilities in the United States. This problem is in part a result of privacy concerns, where for example the common regions around a given individual storage unit might be monitored by the operator of that given self-storage facility, but due to privacy concerns, the individual unit is not monitored by this same system. And this problem is in part a financial one, as the capital investment costs to purchase and use existing monitoring/security/surveillance tools and equipment may be too expensive and too time consuming to setup for a given single individual self-storage unit.

For example, existing monitoring/security/surveillance tools/facility access control systems may include that the overall self-storage facility is gated and with a network of security cameras monitoring some of the common areas. The gated access to the self-storage facility is easily defeated by tailgating. And the network of security cameras only tend to monitor some of the common areas (often with significant blind spots) and do not monitor the interiors of the given individual self-storage unit. In numerous field surveys of self-storage facilities, existing security camera were often non-operational, defeated, or visibly damaged. The newest cameras tout integral video analytics, but at the time of this writing this application, storage facility operation have expressed prevalence of false motion detection triggered by animals, wind, storms, and light level changing. Further, the network of security cameras often required specialized custom installation services (including wiring/cabling) as well as traditional monitoring systems and then may require continued subscription services for monitoring of the installed network of security cameras and monitoring devices. Such a solution may be too expensive and too time consuming to setup for a given individual storage unit.

Similarly, installing electronic access controls for a given individual storage unit presently often requires significant capital investment costs along with, in some cases, monthly or annual fees that ultimately may be too expensive, too time consuming to setup, and too inflexible for use pervasively across most individual storage units.

Further, people in general do not want to have to download, use, and learn yet another mobile app on their smartphones (or other personal electronic computing device) to setup, use, control, and/or benefit from a given electronic device, such as, but not limited to, a smart device (e.g., a smart sensor, a smart monitoring device, a smart lock, etc.). Often such mobile apps have high learning curves, are non-intuitive (awkward) to use, are faulting, are buggy, and/or the like. Requiring use of such mobile apps creates a further barrier to potential users in adopting the given electronic device. Requiring use of such mobile apps is unnecessary and undesired in many situations.

Similarly, people do not want to have to "pair" (e.g., with using Bluetooth) their smartphone (or other personal electronic computing device) with the given electronic device in order to setup, use, control, and/or benefit from that given electronic device. Direct device "pairing" generally involves wireless communications directly between the user's smartphone (or other personal electronic computing device) and the given electronic device, using an established wireless communication protocol, such as Bluetooth. Required use of mobile apps and/or required device pairing results in less people adopting and/or using the given electronic device; and/or results in people ceasing to use the given electronic device if there is a loss of pairing, difficulty with maintaining the pairing, and/or problems with the mobile app. In general, people would desire less friction with respect to setting up, using, controlling, and/or benefiting from a given electronic device as compared to using mobile apps and/or device pairing.

There is a need in the art for an electronic device, with monitoring sensors, that may be readily, easily, and quickly installed (e.g., retrofittable placement almost anywhere in and/or on the given controlled space) to offer on-demand monitoring services (e.g., service enabled/disabled only when needed) by the facility owner/operator (and/or by the tenant themselves) for use (e.g., by subscription but not necessarily with any capital investment requirements) by the controlled space tenant to monitor a given controlled unit's interior space(s) and/or asset(s); and wherein such a system and/or method may provide details, information, alerts, reminders, notices, notifications, alarms, and/or the like to various authorized stakeholders, such as the tenant/renter, the facility operator, the provider of the electronic device, the provider of the monitoring service/subscription, and/or third-parties (e.g., tenant's own back-up contacts, insurance companies, first responders, maintenance staff, and/or law enforcement).

It is to these ends that the present invention has been developed.

BRIEF SUMMARY OF THE INVENTION

To minimize the limitations in the prior art, and to minimize other limitations that will be apparent upon reading and understanding the present specification, the present invention describes various embodiments, of: monitoring-devices (with sensor(s) and with radio(s)), systems using such monitoring-devices, methods using such monitoring-devices, proprietary software (i.e., a set of instructions, that may be referred to herein as "NINCE" for "Network Intelligent Notification & Configuration Engine") that may be residing in memory of at least one server for interacting with the monitoring-devices and with computing-devices associated with the authorized stakeholders, combinations thereof, and/or the like. In some embodiments, the monitoring-devices may be electronic, battery powered devices, with various monitoring sensors and capable of wireless communications (e.g., low power wireless, cellular, NFC [near field communication], etc.). Installation and/or use of the monitoring-device(s) may not require any external wiring/cabling nor a need to pair with user computing-device (such as, a smartphone). These monitoring-devices may be installed in and/or on a given controlled space (e.g., a storage unit) to monitor that given controlled space and to communicate motion, activity, events, environmental conditions, occurrences, combinations thereof, and/or the like within that given controlled space to various authorized stakeholders, such as, but not limited to, the tenant/renter of the given controlled space, the facility operator (e.g., storage facility manager) of the given controlled space, the provider of the electronic monitoring-device, the provider of the monitoring service/subscription, third-parties (such as, but not limited to, insurance companies and/or first responders), combinations thereof, and/or the like. The monitoring-device may provide details, information, alerts, reminders, notices, notifications, alarms, and/or the like to various authorized stakeholders of the motion, activity, events, and/or occurrences within/at that given controlled space.

A novel use of the collective inventions and embodiments disclosed herein may apply to controlled use spaces (i.e., "controlled spaces"). In some embodiments, a given controlled space may be one or more of a space, a zone, an area, a room, an enclosure, a yard, a facility, and/or a property; wherein the one or more of the space, the zone, the area, the room, the enclosure, the yard, the facility, and/or the property may have a predetermined limit and/or boundary (e.g., by some physical structure [such as, but not limited, a wall, a door, a window, a floor, a ground, a ceiling, a roof, a substrate, combinations thereof, and/or the like]), such that the given controlled space may be a defined space. In some embodiments, a given controlled space may be notably transitory in how the controlled space may be used. In some embodiments, a given controlled space may be a temporarily utilized space for personal, business, and/or commercial use. In some embodiments, users of controlled spaces may generally use the controlled space for the storage of assets, operation of assets, and/or as a location for a tenant and/or a resident. In some embodiments, the controlled space for transitory use may be of either fixed, stationary, or moveable nature. In some embodiments, those controlled spaces which may most notably value the novel use of this invention and/or some of its embodiments, may most often be associated with higher turnover in "space occupiers" who may generally place, store, and/or operate assets of highly perceived personal and/or commercial value and/or reside in said defined location (controlled space) but are not generally the owners of the given controlled space. In some embodiments, the controlled spaces may generally be occupied "temporarily" by individuals and/or business clients, such as, but not limited to, tenants/renters (e.g., in self-storage units, apartment units, or the like), lessees (e.g., in warehouses), guests/patrons/campers (e.g., in hotels, vacation rentals, campgrounds, RV parks, or the like) for either a fixed term (e.g., an annual lease) or an indefinite term (e.g., day to day, week to week, month to month, or the like) but where the occupier (e.g., main user) may often not be the owner (nor the operator) of the given controlled space. In some embodiments, the controlled space with transitory use(s) may often be remotely located, moveable, or mobile; and often may lack ready access to electrical power for operating electronic equipment (such as monitoring equipment) and/or may lack ready access to a local network and/or the Internet. Some examples of such controlled spaces may include self-storage units, utility trailers, moveable storage containers, combinations thereof, and/or the like.

Some embodiments of the present invention may involve monitoring-devices (e.g., with at least one sensor, with at least one radio, and with at least one power source), systems, and/or methods for monitoring said controlled space(s) for transitory use(s) and/or asset(s). In some embodiments, one or more monitoring-devices may be used to monitor a given controlled space for transitory use and/or assets. In some embodiments, a given controlled space may be selected from one or more of the following: an interior space; an interior zone; enclosed spaces; a room of a building; rooms; marine vessels (e.g., vessels, boats, ships, house boats, and the like); RVs (e.g., recreational vehicles, campers, motor homes, fifth wheels, and the like); equipment used with camping (e.g., tents, campsites, and the like); equipment used in moving (e.g., moving boxes, moving trucks, moving vehicles, and the like); pods (e.g., storage pods); trailers; vacant homes; vacant buildings; locked buildings; hotel rooms; construction sites, construction yards; kennels; stables; animal stalls; rentals (e.g., residential, commercial, and the like); vacation rentals; cabins; warehouses; fleets; apartments, AirBNB rental properties; car rentals; vehicle rentals; schools; waste totes; cargo containers; aircraft; luggage; trash containers; fields; yards; lots; parking lots and/or parking spots; combinations thereof, portions thereof, and/or the like.

It should be noted, that in some embodiments, the controlled spaces for transitory uses may be nested. For example, and without limiting the scope of the present invention a self-storage facility may be itself a controlled space for transitory use which may be monitored, while its individual storage units inside the same self-storage facility may also be controlled spaces for transitory use, that may also be monitored.

When considering the above, conventional (preexisting) monitoring/security systems fall short in monitoring such controlled spaces for transitory uses as such conventional systems most often require the owner/operator of the controlled space to commit significant capital expenditures towards the installing of the conventional monitoring equipment in often a plurality of controlled spaces (e.g., which may require hiring professional/licensed installers/contractors, obtaining governmental permits, buying the installation materials, buying/renting the conventional monitoring equipment, combinations thereof, and/or the like). Such conventional monitoring equipment are most often installed permanently (i.e., rendering them immovable and a fixture of the given controlled space). Even with careful planning, consideration, and foreknowledge, the owner/operators face space utilization demand profiles that are often volatile (including but not limited to, demands that vary significantly with the seasons), thus leaving a given controlled space unutilized and/or leaving such installed monitoring equipment being unutilized. Further, a tenant/renter may damage and/or harm such installed conventional monitoring equipment. The above noted controlled spaces and their uses often lack access to: stable electrical power (e.g., no or limited local AC electrical power [i.e., no or limited grid supplied electrical power]), to network connections, and/or to the Internet. Thus, using conventional monitoring equipment may require yet additional infrastructure investment by the owner/operator for when the owner/operator installs such conventional monitoring equipment, as that installation may also require running electrical power to the conventional monitoring equipment, and/or setting up network connections with the conventional monitoring equipment. Any one of these costs attributes or additionally the combination of multiple of these cost attributes with respect to installing the conventional monitoring equipment in controlled spaces, applies negative pressure on the return on investment (ROI) for such capital expenditures; which may result in too little ROI or no ROI to justify the capital expenditures by the owner/operator. Equivalently, when the owner/operators do not offer controlled space monitoring services, a personal or business occupier (e.g., a tenant) still might desire or even require the added visibility, assurance, awareness, and/or peace-of-mind only made possible by monitoring the given controlled space(s). Clearly, the occupier (i.e., the tenant) may not desire to invest their own capital for the benefit of the facility not owned by said occupier, especially for shorter duration transitory occupiers. Or some occupiers may simply not have the funds necessary for installing conventional monitoring equipment.

Some embodiments of the present invention may provide an on-demand ad hoc monitoring service of a given controlled space for transitory use. In an analogous manner, enterprise owners and operators are increasingly choosing to avoid capital expenditures and operating expenses associated with purchasing and maintaining their own data centers. Instead, enterprise owners and operators are turning to using cloud services as they provide pay-on-demand, scalable, and flexible computing and storage resources. Such an on-demand computing and storage data service model efficiently matches real time (or near real time) demand with right-sized enterprise resources while avoiding needlessly tying up capital in under-utilized assets (i.e., servers, networking equipment, storage devices, etc.). In some embodiments, the controlled space monitoring systems and/or methods described herein provide novel, on-demand, flexible, and scalable monitoring of controlled spaces (as controlled spaces have been defined herein) architected in a similar manner and business model.

In some embodiments, the monitoring-devices shown and described herein may be setup, used, controlled, and/or benefitted from without the need for/use of a mobile app nor use of direct device "pairing" between the given monitoring-device and a user's smartphone (or other personal computing device). In some embodiments, the monitoring-devices may be setup, used, controlled, and/or benefitted from by the user sending and/or receiving text (SMS [short message service]) messages on their smartphone (or other personal computing device) from between their smartphone (or other personal computing device) and a computer-server, wherein the computer-server is in (indirect) communication with the given monitoring-device. In this way, use of a mobile app and/or direct device pairing may be entirely avoided with respect to use of the given monitoring-device; and by the user using text (SMS) messages to setup, use, control, and/or benefit from the given monitoring-device, the user has little barrier (friction) to adopting use of the given monitoring-device because users are generally already very comfortable with communicating by text (SMS) messaging.

It is an objective of the present invention to provide a monitoring-device, system for, and method for monitoring an individual controlled space for transient use (e.g., a self-storage unit) using at least one such monitoring-device.

It is another objective of the present invention to provide a monitoring-device, system for, and method for monitoring an individual controlled space for transient use (such as, but not limited to, a self-storage unit) using at least one such monitoring-device that does not require: a mobile app, smartphone (or other personal computing device), nor device pairing to setup, use, and/or control the at least one such monitoring-device.

It is another objective of the present invention to provide a monitoring-device, system for, and method for monitoring an individual controlled space for transient use (such as, but not limited to, a self-storage unit) using at least one such monitoring-device wherein two-way (bidirectional) user interface with that given at least one such monitoring-device is done through SMS/text messaging from a user computing-device (such as, but limited to, a smartphone).

It is another objective of the present invention to provide enhanced visibility, monitored space environmental awareness, monitored space operational awareness, and/or peace of mind to tenants/renters of controlled spaces (e.g., self-storage units) by use of electronic monitoring-devices (with sensor(s)) and a Human Interface System (HIS).

It is another objective of the present invention to provide a system for, and/or a method for monitoring an individual (at least one) controlled space (e.g., a storage unit) using at least one monitoring-device, that utilizes wireless communications (such as, but not limited to, WiFi, RFID (radio frequency ID and/or radio frequency identification), BT, 802.15, ZigBee, LP-WAN, LoRa, cellular, NFC (near field communication), combinations thereof, and/or the like) so as to avoid a wired/cabled installation.

It is another objective of the present invention to provide a system for, and/or a method for monitoring an individual (at least one) controlled space (e.g., a storage unit) using at least one monitoring-device that may be: simple, easy, fast, and inexpensive to setup, install, operate, maintain, remove and redeploy as compared to and unlike prior art conventional monitoring/security solutions.

It is another objective of the present invention to provide a system for, and/or a method for monitoring an individual (at least one) controlled space (e.g., a storage unit) using at least one monitoring-device that may generate minimal false alarms.

It is another objective of the present invention to provide a system for, and/or a method for monitoring an individual (at least one) controlled space (e.g., a storage unit) using at least one monitoring-device that may generate minimal false alarms by use of machine learning and/or algorithms.

It is another objective of the present invention to provide a system for, and/or a method for monitoring an individual (at least one) controlled space (e.g., a storage unit) using at least one monitoring-device that may be easy for a user to interface with.

It is another objective of the present invention to provide a system for, and/or a method for monitoring an individual (at least one) controlled space (e.g., a storage unit) using at least one monitoring-device that may use a variety of user interfaces, such as, but not limited to, web-based interfaces (i.e., browser-based interfaces), SMS messaging (or text messaging) interfaces, mobile app based interfaces, phone call based interfaces, combinations thereof, and/or the like.

It is another objective of the present invention to provide a system for, and/or a method for monitoring an individual (at least one) controlled space (e.g., a storage unit) using at least one monitoring-device that generates historical logs of activity, events, operational data, sensor data, environmental conditions, occurrences, combinations thereof, and/or the like of the controlled space being monitored with the at least one monitoring-device.

It is another objective of the present invention to provide a system for, and/or a method for monitoring an individual (at least one) controlled space (e.g., a storage unit) using at least one monitoring-device that maintains (e.g., as an accessible database) historical logs of activity, events, operational data, sensor data, environmental conditions, occurrences, combinations thereof, and/or the like of the controlled space being monitored with the at least one monitoring-device.

It is yet another objective of the present invention to provide a system for, and/or a method for monitoring an individual (at least one) controlled space (e.g., a storage unit) using at least one monitoring-device that further provides authorized interested parties/authorized stakeholders with either more efficient access to valuable information (or actionable insights) or first time visibility to previously unavailable information, such as automated/semi-automated access to historical logs of the controlled space activity, events, operational data, sensor data, environmental conditions, occurrences of the controlled space being monitored with the at least one monitoring-device.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 12A may show how aspects of pre-entry authorizations may look and function.

FIG. 12B may show how aspects of post-entry authorizations may look and function.

FIG. 27 may relate to provisioning of monitoring-devices and shows a block diagram of a monitoring-device, with its scannable-element and being interfaced with by an electronic-device, wherein that interfacing may be selected from being scanned, read, interrogated, heard, and/or the like.

REFERENCE NUMERAL SCHEDULE

Figure 1:
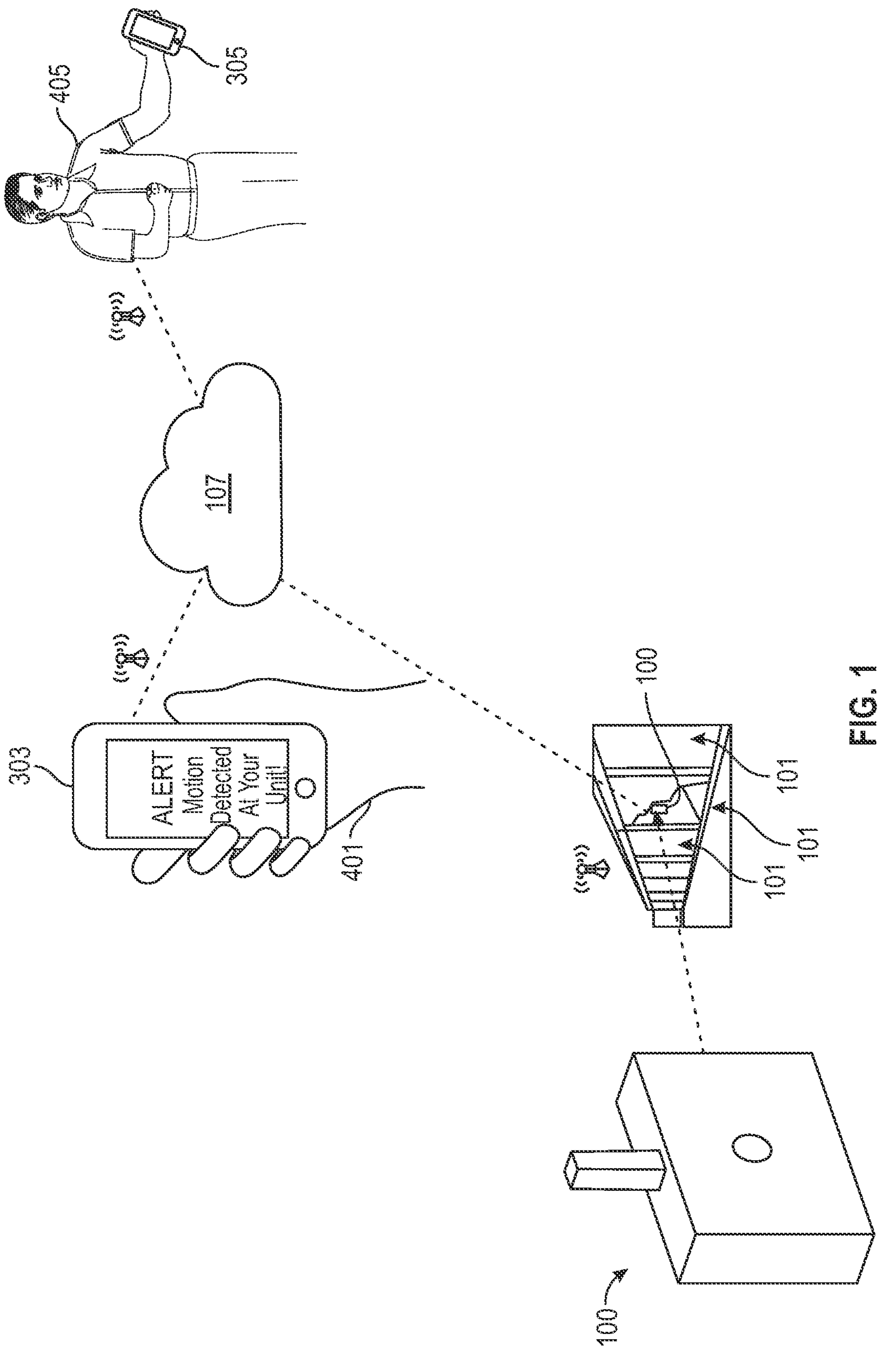
FIG. 1 may depict a system for remotely monitoring a given storage unit using at least one monitoring-device installed within that given storage unit.

100 monitoring-device 100
101 controlled space for transitory use (such as, but not limited, to a storage unit/space) 101
107 network/cloud 107
201 enclosure 201
203 mounting-hole 203
205 UX output 205
207 communication port 207
209 sensor port 209
211 external antenna 211
213 mounting magnet 213
215 adhesive layer 215
217 mechanical fastener 217
217*a* mechanical fastener 217*a*
217*b* mechanical fastener 217*b*
303 tenant device 303
305 facility operator device 305
307 cloud 307
309 provider device 309
311 third-party device 311
321 communication pathway 321
323 communication pathway 323
325 communication pathway 325
327 communication pathway 327
329 communication pathway 329
331 communication pathway 331
333 communication pathway 333
341 gateway (hub) 341
343 audible indicator 343
345 storage facility (grounds) 345
351 communication pathway 351
353 communication pathway 353
361 gateway 361
363 connection 363
365 internet 365
367 Network Intelligent Notification & Configuration Engine (NINCE) 367
371 cellular connection 371
373 computing-device 373
375 control transmission 375
377 control transmission 377
379 data transmission 379
381 data transmission 381
383 control transmission 383
385 data transmission 385
400 Human Interface System (HIS) 400
401 Tenant 401
403 Tenant N+1 403
405 Facility Operator (storage facility worker) 405
407 hierarchy relationship 407
409 hierarchy relationship 409
411 hierarchy relationship 411
415 interface to tenant device 415
417 interface to facility operator device 417
501 processor 501
503 memory 503 (storage 503)
505 sensors 505
505*a* primary sensor 505*a*
505*b* secondary sensor 505*b*
507 communications 507
507*a* primary radio 507*a*
507*b* secondary radio 507*b*
509 inputs/outputs (I/O) means 509
509*a* locking means 509*a*
511 power source 511
513 daughter board 513
515 integral mounting hardware 515
517 magnetic shielding 517

600 method for establishing messaging based storage unit monitoring 600
601 step of establishing ad hoc wireless network at storage facility 601
603 step of putting a storage unit into use 603
605 step of establishing subscription with end-user 605
607 step of NINCE establishing wireless connection with monitoring-device 607
609 step of mounting monitoring-device within storage unit 609
611 step of monitoring storage unit with monitoring-device 611
613 step of terminating subscription with end-user 613
615 step of restricting access of end-user with terminated subscription 615
617 step of removing monitoring-device from storage unit 617
620 method for establishing messaging based storage unit monitoring 620
700 method of establishing messaging based service insurance 700
705 step of establishing insurance policy 705
707 step of NINCE establishing connections 707
709 step of transmitting subscriber information 709
711 step of initiating insurance policy coverage period 711
713 step of determination of insurance claim 713
715 step of if claim approved, paying out 715
717 step of monitoring storage unit with monitoring-device 717
719 peril/loss occurs 719
721 step of detecting peril/loss 721
723 step of validating peril/loss occurred 723
725 step of gathering information 725
727 step of transmitting insurance claim 727
741 vehicle 741
751 equipment/tool 751
761 thief 761
771 insurance company 771
801 cellular network 801
803 low power wireless connection/communication 803
805 wireless connection/communication 805
809 GPS module 809
900 device 900
901 effective-radio-signal-coverage 901
903 effective-radio-signal-coverage 903
905 region-of-radio-signals-overlap 905
907 trigger-communication-to-NINCE 907
909 NINCE-communication-to-device 909
1000 method of reporting triggered event to tenant 1000
1001 step of event triggered 1001
1003 step of routing triggered event to NINCE 1003
1005 step of routing triggered event from NINCE to Facility/facility operator device 1005
1007 step of (physically) inspecting unit of triggered event 1007
1009 step of routing inspection report/outcome to NINCE 1009
1011 step of routing inspection report/outcome to Tenant/tenant device 1011
1013 step of NINCE receiving confirmation that inspection will be done 1013
1015 step of NINCE sending to Tenant/tenant device that inspection will be done 1015
1017 step of NINCE sending notice to Tenant/tenant device of triggered event 1017
1019 step of NINCE receiving feedback from Tenant/tenant device 1019
1021 step of NINCE sending Tenant feedback to Facility/facility operator device 1021
1101 facility perimeter (boundary) 1101
1103 (facility) gate 1103
1105 drive-up building 1105
1107 climate-controlled building 1107
1109 (building) door 1109
1111 building 1111
1201 user 1201
1203 user device 1203
1205 door 1205
1207 unit (space) identifier 1207
1209 sensing-path 1209
1211 presence identifier 1211
1213 communication-pathway 1213
1215 user 1215
1217 user device 1217
1219 (optional) off-site (remotely located) 1219
1300 method of determining user permission to access controlled space for transitory use 1300
1301 step of setting up user authorizations for accessing controlled space for transitory use 1301
1303 database of Network Intelligent Notification & Configuration Engine (NINCE) 1303
1305 database of end user device 1305
1307 database of presence identifier 1307
1309 step of determining if a pre-entry detection is authorized for entry 1309
1311 step of taking action pursuant to authorized access determination 1311
1313 step of determining if detected entry is authorized 1313
1315 step of taking action(s) pursuant to determination entry was not authorized 1315
1321 step of user and/or user device coming into proximity to presence identifier 1321
1323 step of communicating between user device and presence identifier (and/or between user and presence identifier) 1323
1325 list of possible communication technologies 1325
1327 step of passing information to NINCE or to monitoring-device 1327
1329 step of verifying associations between user, user device, controlled space, monitoring-device(s), and/or presence identifier 1329
1331 person enters controlled space 1331
1333 step of detecting entry and/or person 1333
1335 step of determining if detection satisfies onboard rule set 1335
1337 step of sending detection event to NINCE (server) 1337
1338 step of is detected entry and/or person authorized per rule in NINCE 1338
1339 step of sending request for verification to authorized end users and/or to end user devices 1339
1341 step of receiving feedback from authorized end users and/or from end user devices 1341
1343 (optional) step of sending request for verification to authorized "secondary" end users and/or to "secondary" end user devices 1343
1345 step of receiving feedback from authorized "secondary" end users and/or from "secondary" end user devices 1345
1400 user-interface-inventory-page 1400

1401 grouping of displayable and engageable page navigation buttons 1401
1402 facility identifier/name 1402
1403 Spaces navigation button 1403
1405 Subscribers navigation button 1405
1407 Inventory navigation button 1407
1409 view details column 1409
1410 Available Inventory 1410
1411 spaces ID column 1411
1413 spaces info column 1413
1415 devices ID column 1415
1417 devices health column 1417
1419 devices signal strength status column 1419
1421 devices outputs (readings) column 1421
1423 last motion column 1423
1425 last assigned location column 1425
1427 manage devices column 1427
1429 means for selecting space to be associated with monitoring-device 1429
1431 assignment-history-display 1431
1500 user-interface-monitored-spaces-page 1500
1501 view details column 1501
1503 spaces IDs column 1503
1505 spaces info column 1505
1507 spaces size column 1507
1509 subscriber name column 1509
1511 subscriber contact info column 1511
1513 assigned device column 1513
1515 devices health column 1515
1517 devices signal strength column 1517
1519 devices sensors outputs/readings column 1519
1521 last motion column 1521
1530 user-interface-monitored-space-details-page 1530
1531 monitored space ID 1531
1533 monitored space info 1533
1535 message-recipients 1535
1537 event history 1537
1539 assigned device(s) 1539
1541 manage device(s) 1541
1550 user-interface-manage-devices-page 1550
1600 user-interface-subscribers-page 1600
1601 view details column 1601
1603 subscriber info column(s) 1603
1605 subscriber contact info column(s) 1605
1607 assigned (associated) monitored space(s) ID(s) column 1607
1609 add new subscriber 1609
1620 user-interface-subscriber-details-page 1620
1621 subscriber info 1621
1623 disable subscriber 1623
1625 remove subscriber 1625
1627 subscriber account history 1627
1629 assigned monitored space(s) 1629
1631 manage device(s) 1631
1633 remove monitored space 1633
1640 user-interface-remove-monitored-space-page 1640
1650 user-interface-remove-monitored-subscriber-page 1650
1660 user-interface-monitored-space-inventory-page 1660
1661 assign monitored space 1661
1701 user-interface-means 1701
1703 personnel 1703
1705 mobile-app 1705
1707 web-page (web-portal) 1707
1709 call center 1709
1711 chatbot 1711
1713 wallet-pass, NFC, RFID, and/or QR-code type interaction 1713
1715 point-of-sale (POS) software 1715
1717 information 1717
1719 information 1719
1721 API (application program interface) communication pathway 1721
1723 fully directly integrated communication pathway 1723
**1800*a* method of automated tenant and/or subscriber setup with monitored space(s) 1800*a***
**1800*b* method of automated tenant and/or subscriber setup with monitored space(s) 1800*b***
1801 step of pre-provisioning monitoring-devices to facility network 1801
1803 step of no pre-provisioning monitoring-devices to facility network 1803
1805 step of monitoring-device transportation to facility 1805
1807 step of facility network/monitoring software recognizing delivered monitoring-devices 1807
1809 step of post-provisioning monitoring-devices to facility network 1809
1811 step of checking (determining) if pre-provisioning successful 1811
1813 step of designating delivered provisioned monitoring-devices as "in inventory" 1813
1815 step of local-provisioning of delivered monitoring-devices 1815
1817 step of physical install and/or assignment of monitoring-device to space 1817
1819 step of checking if locally/post-provisioned monitoring-devices successful 1819
1821 step of ready to accept future assignment and/or installment of monitoring-devices to spaces 1821
1823 step of ready to accept and integrate rentals of spaces 1823
1825 status of delivered monitoring-device not being ready for use 1825
1827 step of assigning and/or installing monitoring-device to space 1827
**1900*a* method of automated tenant and/or subscriber setup with monitored space(s) 1900*a***
**1900*b* method of automated tenant and/or subscriber setup with monitored space(s) 1900*b***
**2000*a* method of automated tenant and/or subscriber setup with monitored space(s) 2000*a***
**2000*b* method of automated tenant and/or subscriber setup with monitored space(s) 2000*b***
2100 system for setting up and/or activating monitoring services of space(s) for tenant and/or subscriber 2100
2101 interaction pathway 2101
2103 communication pathway 2103
2105 communication pathway 2105
2107 communication pathway/API 2107
2109 communication pathway/API 2109
2111 communication pathway/API 2111
2113 communication pathway/API 2113
2115 communication pathway 2115
2117 communication pathway 2117
**2200*a* method for setting up and/or activating space(s) monitoring for tenant and/or subscriber 2200*a***
**2200*b* method for setting up and/or activating space(s) monitoring for tenant and/or subscriber 2200*b***
2201 step of NINCE receiving inputs from POS software and/or from user interface means via API(s) 2201

2203 step of checking if received inputs satisfies a rule of NINCE 2203
2205 step of checking if a rule of NINCE is satisfied to initiate monitoring services 2205
2207 step of making in inventory monitoring-device(s) assignment(s) to space(s) 2207
2209 list of information for a check 2209
2211 list of information for a check 2211
2213 step of checking if monitoring-device(s) assigned to space(s) 2213
2215 step of checking if minimum spaces info is present 2215
2217 step of on demand monitoring-device(s) installment and assignment to space(s) 2217
2219 step of checking payment info and/or payment status 2219
2221 step of checking if monitoring-device(s) are assigned to space(s) 2221
2223 step of activating monitoring services for tenant subscriber with respect to certain space(s) 2223
2225 step of on demand monitoring-device(s) installment and assignment to space(s) 2225
2227 step of attempting to resolve unsatisfied check(s) 2227
2300 system for setting up and/or activating monitoring services of space(s) for tenant and/or subscriber 2300
2400 method for setting up and/or activating space(s) monitoring for tenant and/or subscriber 2400
2427 step of attempting to resolve unsatisfied check(s) 2427
2500 system for setting up and/or activating monitoring services of space(s) for tenant and/or subscriber 2500
**2523*a* fully directly integrated communication pathway 2523*a***
**2523*b* fully directly integrated communication pathway 2523*b***
**2600*a* method for setting up and/or activating space(s) monitoring for tenant and/or subscriber 2600*a***
**2400*b* method for setting up and/or activating space(s) monitoring for tenant and/or subscriber 2600*b***
2601 step of NINCE receiving inputs from user interface means 2601
2603 step of checking if received inputs satisfies a rule of NINCE 2603
2605 step of checking if a rule of NINCE is satisfied to initiate monitoring services 2605
2607 step of making in inventory monitoring-device(s) assignment(s) to space(s) 2607
2609 list of information for a check 2609
2611 list of information for a check 2611
2613 step of checking if monitoring-device(s) assigned to space(s) 2613
2615 step of checking if minimum spaces info is present 2615
2619 step of checking payment info and/or payment status 2619
2627 step of attempting to resolve unsatisfied check(s) 2627
2701 scannable-element 2701
2703 QR code 2703
2705 NFC tag 2705
2707 RFID tag 2707
2709 barcode (UPC) 2709
2711 machine readable code 2711
2713 sound prompt 2713
2715 scanning, reading, interrogation, hearing, and/or sound picking up interaction 2715
2721 (scanning) electronic device 2721
2800 facility-map 2800
2801 tenant-occupied-space 2801
2803 non-tenant-occupied-space(s) 2803

DETAILED DESCRIPTION OF THE INVENTION

In some embodiments, a given controlled space (for transitory use) may be one or more of a space, a zone, an area, a room, an enclosure, a yard, a facility, and/or a property; wherein the one or more of the space, the zone, the area, the room, the enclosure, the yard, the facility, and/or the property may have a predetermined limit and/or boundary (e.g., by some physical structure [such as, but not limited, a wall, a door, a window, a floor, a ground, a ceiling, a roof, a substrate, combinations thereof, and/or the like]), such that the given controlled space may be a defined space. In some embodiments, a given controlled space may be notably transitory in how the controlled space may be used. In some embodiments, a given controlled space may be a temporarily utilized space for personal, business, and/or commercial use. In some embodiments, users of controlled spaces may generally use the controlled space for the storage of assets, operation of assets, and/or as a location for a tenant and/or a resident. In some embodiments, the controlled space for transitory use may be of either fixed, stationary, or moveable nature. In some embodiments, those controlled spaces which may most notably value the novel use of this invention and/or some of its embodiments, may most often be associated with higher turnover in "space occupiers" who may generally place, store, and/or operate assets of highly perceived personal and/or commercial value and/or reside in said defined location (controlled space) but are not generally the owners of the given controlled space. In some embodiments, the controlled spaces may generally be occupied "temporarily" by individuals and/or business clients, such as, but not limited to, tenants/renters (e.g., in self-storage units, apartment units, or the like), lessees (e.g., in warehouses), guests/patrons/campers (e.g., in hotels, vacation rentals, campgrounds, RV parks, or the like) for either a fixed term (e.g., an annual lease) or an indefinite term (e.g., day to day, week to week, month to month, or the like) but where the occupier (e.g., main user) may often not be the owner (nor the operator) of the given controlled space. In some embodiments, the controlled space with transitory use(s) may often be remotely located, moveable, or mobile; and often may lack ready access to electrical power for operating electronic equipment (such as monitoring equipment) and/or may lack ready access to a local network and/or the Internet. Some examples of such controlled spaces may include self-storage units, utility trailers, moveable storage containers, combinations thereof, and/or the like.

In some embodiments, a given controlled space (for transitory use) may be a defined space (or spaces) where access to (electrical) power, to local internet connectivity, and/or to cloud connectivity is at least one of: (1) not readily available at all; (2) not physically practical to access; (3) not economical to access; (4) not economical to install access to; and/or (5) lacks quality/reliable coverage for local internet connectivity. Thus, monitoring such a controlled space (for transitory use) (e.g., with an electrically powered electronic internet enabled monitoring device/sensor) has historically been difficult, expensive to implement, and hard to get user adoption/compliance. For example, and without limiting the scope of the present invention, consider a given self-storage unit as controlled space (for transitory use), in that most self-storage units do not have any electrical outlets/receptacles installed within the given self-storage unit and do not have readily available access to electrical power. Some such self-storage units may have a light installed in the ceiling (or overhead); however, most users of that self-storage unit will not want to pay to have an electrical outlet installed in that self-storage unit by adding onto the branch circuit of that light installed in the ceiling (or overhead). Additionally, to add such an electrical outlet to the given self-storage unit by adding onto the existing branch circuit of that light installed in the ceiling would require turning off that given branch circuit (e.g., at its breaker) and doing that would disrupt electrical power service to all other self-storage units being serviced by that particular branch circuit, which may cause problems for other tenants and/or the other tenants may not agree to that power interruption. Further, tenants of that self-storage unit do not have the legal authority to even install such an electrical outlet within the given self-storage unit that they are renting/leasing. Additionally, such self-storage units generally do not have wired internet access, i.e., there is no ethernet, cable, and/or fiber optics configured for internet communications installed in such self-storage units. Further, the overall storage facility (with the plurality of self-storage units) rarely has any wireless (WiFi) internet at that storage facility with coverage extending into the plurality of self-storage units nor any wireless (WiFi) internet at that storage facility that is intended for tenant use. Further, many self-storage units, as commercial structures, are built from steel stud framing and/or concrete masonry units (CMUs or cinder blocks) and such construction may hinder residential strength wireless (WiFi) internet.

In some embodiments, a given controlled space (for transitory use) may be a defined space (or spaces) that has no preexisting electrical outlet/receptable installed within that given controlled space (for transitory use), wherein the electrical outlet/receptable is one that would be wired for typical/standard 120 volts AC (alternating current) service (or the like [e.g., older 110 volts AC service]) if it had been installed; or there is at least one such electrical outlet/receptable installed within that given controlled space (for transitory use), except that any such electrical outlets/receptables installed within that given controlled space (for transitory use) are without power (e.g., turned off by the electrical power utility [e.g., because the given controlled space (for transitory use) is currently vacant]). In some embodiments, a given controlled space (for transitory use) may be at least one: self-storage unit, boat in storage, RV in storage, vehicle in storage, and/or residence (dwelling)—any one of which may be without at least one installed electrical outlet/receptable wired for typical/standard 120 volts AC service (or the like [e.g., older 110 volts AC service]); or there is at least one such electrical outlet/receptable installed within that given controlled space (for transitory use), except that any such electrical outlets/receptables installed within that given controlled space (for transitory use) are without power.

In some embodiments, a given controlled space (for transitory use) may not be one or more of: a house, a condo (condominium), a townhome, a home, a dwelling, an apartment, a residence, and/or the like—that has at least one installed electrical outlet/receptable wired for typical/standard 120 volts AC service (or the like [e.g., older 110 volts AC service]) that is live/active (i.e., with electric power).

In some embodiments, a given controlled space (for transitory use) may not be one or more of (occupied): a house, a condo (condominium), a townhome, a home, a dwelling, an apartment, a residence, and/or the like—that lacks local internet connectivity within the given building structure. An example of this may be a vacant building structure, such as, but not limited to, bank-owned building (s). Self-storage facilities and/or warehouse often also lack internet connectivity as additional examples.

Some embodiments of the present invention may involve monitoring-devices (e.g., with at least one sensor, with at least one radio, and with at least one power source), systems, and/or methods for monitoring said controlled space(s) for transitory use(s) and/or asset(s). In some embodiments, one or more monitoring-devices may be used to monitor a given controlled space for transitory use and/or assets. In some embodiments, a given controlled space may be selected from one or more of the following: an interior space; an interior zone; enclosed spaces; a room of a building; rooms; marine vessels (e.g., vessels, boats, ships, house boats, and the like); RVs (e.g., recreational vehicles, campers, motor homes, fifth wheels, and the like); equipment used with camping (e.g., tents, campsites, and the like); equipment used in moving (e.g., moving boxes, moving trucks, moving vehicles, and the like); pods (e.g., storage pods); trailers; vacant homes; vacant buildings; locked buildings; hotel rooms; construction sites, construction yards; kennels; stables; animal stalls; rentals (e.g., residential, commercial, and the like); vacation rentals; cabins; warehouses; fleets; apartments, AirBNB rental properties; car rentals; vehicle rentals; schools; waste totes; cargo containers; aircraft; luggage; trash containers; fields; yards; lots; parking lots and/or parking spots; combinations thereof, portions thereof, and/or the like.

In at least some of the following descriptions and/or examples, monitoring of one particular type/category of controlled spaces (for transitory uses) may be shown, discussed and described, wherein the one type/category of controlled space may be at least one self-storage unit. However, it should be noted that such self-storage unit monitoring as shown, discussed and described herein, may readily be applied to the other noted types of controlled spaces.

The terms "storage," "storage space," "self-storage," "self-storage unit," "storage unit," "individual storage units," combinations thereof, and/or the like may be used interchangeably herein; and such terms may be a type/category of controlled space (for transitory use).

The term "tenant" as used herein may represent a tenant, a renter, a lessee, a client, a customer, a guest, a patron, or the like of a given controlled space (for transitory use). In some embodiments, the tenant may be the one who predominantly uses a given controlled space (for transitory use) but who does not own the given controlled space (for transitory use).

The term "owner" may be an entity that owns a given controlled space (for transitory use). The owner may not be an operator of the given controlled space (for transitory use).

The terms "operator," "facility operator," and/or the like may refer to a business and/or its staff, a business and/or its agents, a worker, personnel, staff, manager, property manager, warehouse managers, facility manager, landlord, site manager, facility worker, maintenance worker, or the like who may work to operate and/or maintain a given controlled space (for transitory use). The terms "operator," "facility operator," and/or the like may be used interchangeably herein.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1 may show a tenant 401 of a storage unit 101 monitoring that storage unit 101 while the tenant 401 may be located away from that storage unit 101 (i.e., tenant 401/may be remotely located with respect to storage unit 101). FIG. 1 may show a storage facility worker 405 (facility operator 405) monitoring that storage unit 101 while facility operator 405 may be located away from that storage unit 101. In FIG. 1, a monitoring-device 100 may be used to monitor storage unit 101. In some embodiments, monitoring-device 100 may be mounted/installed within storage unit 101. In some embodiments, monitoring-device 100 may be removably mounted within storage unit 101. In some embodiments, monitoring-device 100 may comprise one or more electronics. In some embodiments, monitoring-device 100 may comprise one or more electronic hardware elements/members. In some embodiments, monitoring-device 100 may comprise one or more sensors for monitoring storage unit 101. In some embodiments, monitoring-device 100 may comprise one or more means for wireless communications (e.g., radios and/or antennas). In some embodiments, monitoring-device 100 may comprise one or more means for low power wireless communications (e.g., specifically configured radios and/or antennas). In some embodiments, monitoring-device 100 may be in (wireless) communication with one or more computing-devices 373, such as, but not limited to, computing-devices 373 used by tenant 401 (e.g., a tenant device 303), facility operator 405 (e.g., a facility operator device 305), combinations thereof, and/or the like. In some embodiments, monitoring-device 100 may be in (wireless) communication with tenant 401 specified back-up contacts. In some embodiments, wireless communications between monitoring-device 100 and computing-devices 373 used by tenant 401/owner 401, worker 405, combinations thereof, and/or the like, may use and/or may communicate through at least a portion of a network/cloud 107.

In some embodiments, storage space 101 may have one or more monitoring-devices 100. In some embodiments, one or more monitoring-devices 100 may be located in, next to, adjacent to, and/or proximate to a given storage space 101 that is intended to be monitored. In some embodiments, one or more monitoring-devices 100 may be located on any internal facing surface of storage space 101, such as, but not limited to, walls, ceiling, windows, and/or doors of storage space 101. In some embodiments, one or more monitoring-devices 100 may be mounted on any internal facing surface of storage space 101, such as, but not limited to, walls, ceiling, windows, and/or doors of storage space 101. In some embodiments, one or more monitoring-devices 100 may be removably mounted on any internal facing surface of storage space 101, such as, but not limited to, walls, ceiling, windows, and/or doors of storage space 101.

In some embodiments, a given storage space 101 may be an individual storage unit and/or may be a self-storage unit. In some embodiments, a given storage space 101 may be a single room, typically with a single access door but in other cases, one or more doors may exist in multiple sides/walls of storage space 101. In some embodiments, such a room may have fixed and predetermined dimensions. For example, and without limiting the scope of the present invention, such a room have a footprint of: 5 feet by 5 feet; 5 feet by 10 feet; 5 feet by 15 feet; 5 by 20 feet; 7.5 feet by 10 feet; 10 feet by 10 feet; 10 feet by 15 feet; 10 feet by 20 feet; 10 feet by 25 feet; 10 feet by 30 feet; and the like. Other dimensions and space configurations are contemplated as well.

In some embodiments, a given storage space 101 may have environmental controls, such as, for controlling temperature, humidity, air pressure, combinations thereof, and/or the like within the given storage space 101.

A room with defined boundaries may be a storage space 101. A storage unit with defined boundaries may be a storage space 101. A room that may be substantially enclosed may be a storage space 101. A storage unit that may be substantially enclosed may be a storage space 101. In some embodiments, storage space 101 may be an interior space fully (or substantially) enclosed with walls and a ceiling. In some embodiments, storage space 101 may be open to an exterior, but may have floor space/ground/water space allocated with one or more open sides and an optional roof.

In some embodiments, a given storage space 101 may be selected from: an individual storage unit; a self-storage unit; a storage area of a moving truck; a storage area of a mobile moving pod; a (predetermined) section of warehouse; an interior of a room; an interior of a hotel room; an interior of an Airbnb room; an interior of a RV; an interior of a camper; an interior of a tent; an interior of box truck; an interior of a utility truck; an interior of a shipping cargo container; and/or the like.

In some embodiments, an exterior and/or an interior of a given storage space 101 may have warning signage denoting that the given storage space 101 may be under electronic monitoring and/or under electronic surveillance, and/or the like. In some embodiments, the given storage space 101 and/or the one or more monitoring-devices 100 that may be monitoring that given storage space 101, may be electrically powered by one or more energy harvesting sources, such as, but not limited to, solar power, wind power, and/or the like.

In some embodiments, a given monitoring-device 100 may successfully monitor a single ingress point of a given storage space 101 and/or an area of about 15 feet by 30 feet, plus or minus a foot. For a given storage space 101 that may be larger than this and/or with multiple ingress points, more than one monitoring-devices 100 may be required and/or desired.

Figure 2C:
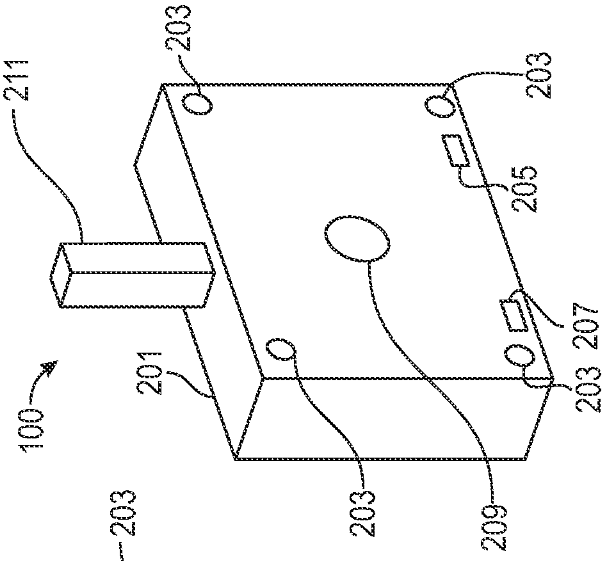
FIG. 2C may depict a perspective view of a monitoring-device with at least one partially extended or extendable antenna.
Figure 2B:
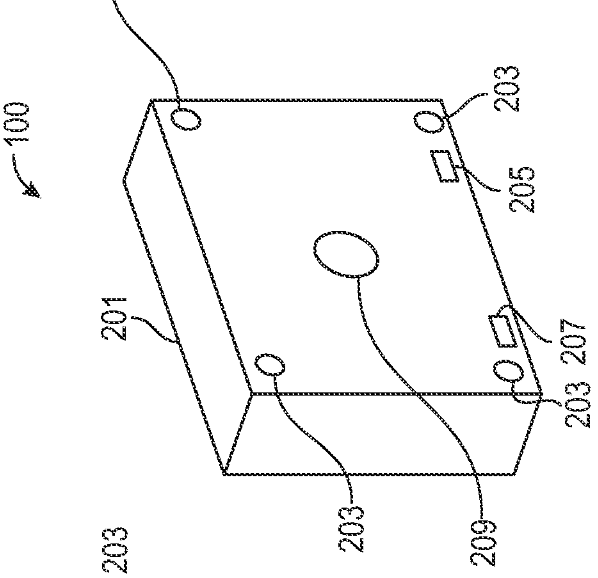
FIG. 2B may depict a perspective view of a monitoring-device with at least one sensor port.
Figure 2A:
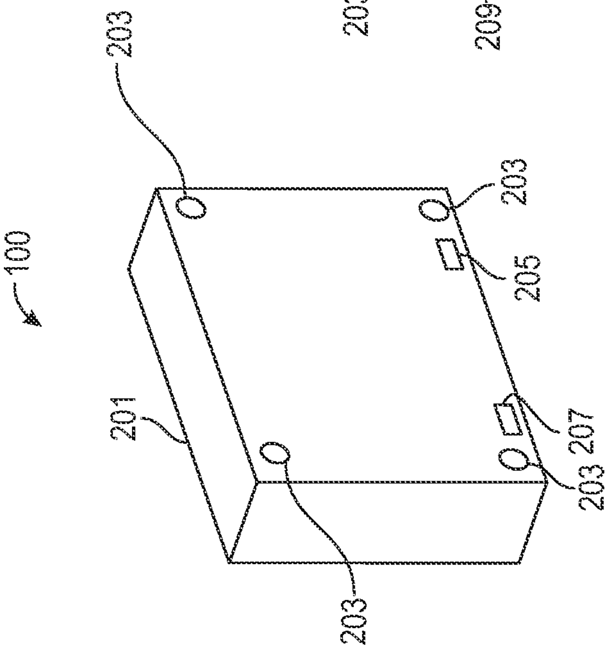
FIG. 2A may depict a perspective view of a monitoring-device.

FIG. 2A may show a perspective view of a monitoring-device 100. In some embodiments, monitoring-device 100 may comprise an enclosure 201. In some embodiments, at least one monitoring-device 100 may comprise enclosure 201 and electronics, wherein at least some of the electronics may be located within (or at least partially) enclosure 201. In some embodiments, at least one sensor 505 and the least one radio 507 may both be components of the electronics. In some embodiments, enclosure 201 may house at least some of the electronics of monitoring-device 100. In some embodiments, at least some of the electronics of monitoring-device 100 may be substantially enclosed within enclosure 201. In some embodiments, enclosure 201 may be rated (e.g., by NEMA, UL, combinations thereof, and/or the like) for use with electronics in outdoor environments, indoor environments, wet environments, humid environments, marine environments, cold environments, hot environments, dry environments, combinations thereof, and/or the like. In some embodiments, enclosure 201 may be rated to be substantially weatherproof, fire proof, leak proof, combinations thereof, and/or the like.

Continuing discussing FIG. 2A, in some embodiments, monitoring-device 100 may comprise one or more mounting-holes 203. In some embodiments, a given mounting-hole 203 may be located on an exterior surface of enclosure 201. In some embodiments, a given corner of enclosure 201 may have a mounting-hole 203. In some embodiments, a given mounting-hole 203 may be configured to receive at least a portion of a threaded screw and/or bolt. In some embodiments, a given mounting-hole 203 may be female threaded. In some embodiments, a given mounting-hole 203 may pass entirely through enclosure 201. In some embodiments, mounting-hole(s) 203, along with the screw/bolt, may be used to attach (mount) monitoring-device 100 to some substrate (such as, but not limited to, a floor, a wall, a ceiling, a door, a window, a frame, combinations thereof, and/or the like, of storage unit 101). Note, in some embodiments, monitoring-device 100 may have no mounting-holes 203; or mounting-holes 203 may not be used.

Continuing discussing FIG. 2A, in some embodiments, monitoring-device 100 may comprise one or more UX (user experience) outputs 205. In some embodiments, a given UX output 205 may be configured to convey information of that monitoring-device 100 to a person who is locally proximate (e.g., in visible range and/or in audible range) to that monitoring-device 100. In some embodiments, a given UX output 205 may be selected from a light source, a light emitter, a display, a light maker, an audible source, a sound maker, a speaker, a buzzer, an alarm, a bell, a whistle, combinations thereof, and/or the like. In some embodiments, the light source, the light emitter, and/or the light maker of a given UX output 205 may be one or more LEDs (light emitting diodes). In some embodiments, when the given UX output 205 may be the light source, the light emitter, and/or the light maker, then that given UX output 205 may be exteriorly visible from enclosure 201. In some embodiments, when the given UX output 205 may be the light source, the light emitter, and/or the light maker, then that given UX output 205 may be located on an exterior of enclosure 201. In some embodiments, when the given UX output 205 may be the audible source, the sound maker, the speaker, the buzzer, the alarm, the bell, and/or the whistle, then that given UX output 205 may be located within enclosure 201. Note, in some embodiments, UX output 205 may a sub-type (sub-category) of I/O (input-output) means 509, wherein I/O means 509 may be discussed below in the FIG. 5A discussion.

Continuing discussing FIG. 2A, in some embodiments, monitoring-device 100 may comprise one or more communications ports 207. In some embodiments, a given communication port 207 may be configured to receive a plug and/or a connector, which may in turn be wired to a power source and/or to a computing device. In some embodiments, a given communication port 207 may be used to receive electrical power (e.g., for recharging a battery of monitoring-device 100). In some embodiments, a given communication port 207 may be used to receive instructions/inputs from the computing device (e.g., for a firmware update and/or for diagnosis purposes). In some embodiments, a given communication port 207 may be used to transmit information back to the computing device (such as, but not limited to, data and/or status information). In some embodiments, the one or more communication ports 207 may be sized, shaped, and configured as an industry standard communication/power port, such as, but not limited to, USB, micro USB, lightning, combinations thereof, and/or the like. In some embodiments, a given communication port 207 may be of proprietary size and/or shape. In some embodiments, a given communication port 207 may be accessible from an exterior of enclosure 201. In some embodiments, a given communication port 207 may be located on an exterior of enclosure 201. Note, in some embodiments, monitoring-device 100 may not comprise a communication port 207. Note, in some embodiments, communication port 207 may a sub-type (sub-category) of communications 507, wherein communications 507 may be discussed below in the FIG. 5A discussion.

FIG. 2B may show a perspective view of a monitoring-device 100. Monitoring-device 100 of FIG. 2B may differ from monitoring-device 100 of FIG. 2A, by inclusion of at least one sensor port 209. That is, the monitoring-device 100 of FIG. 2A may be without any sensor ports 209; whereas, the monitoring-device 100 of FIG. 2B may be with at least one sensor port 209. Otherwise, the monitoring-device 100 of FIG. 2A and the monitoring-device 100 of FIG. 2B may be substantially the same.

Continuing discussing FIG. 2B, in some embodiments, monitoring-device 100 may comprise at least one sensor port 209. In some embodiments, monitoring-device 100 may comprise one or more sensor ports 209. In some embodiments, a given sensor port 209 may be an opening, a break, a window, a lens, combinations thereof, and/or the like, in enclosure 201, allowing a given sensor to sense/capture information outside of that monitoring-device 100. In some embodiments, a given sensor of monitoring-device 100 may be coupled to a given sensor port 209. Some sensor types (such as, but not limited to, PIR motion detectors, cameras, combinations thereof, and/or the like) may benefit or require views/information that are exterior to the given monitoring-device 100; whereas, other sensor types (such as, but not limited to, accelerometers, vibration detectors, inertia detectors, positional detectors, water, humidity, temperature, acoustic, combinations thereof, and/or the like) may not need any such sensor port 209 and may function properly while entirely located within enclosure 201.

FIG. 2C may show a perspective view of a monitoring-device 100. Monitoring-device 100 of FIG. 2C may differ from monitoring-device 100 of FIG. 2B, by inclusion of at least one external antenna 211. That is, the monitoring-device 100 of FIG. 2B may be without any external antennas 211; whereas, the monitoring-device 100 of FIG. 2C may be with at least one external antenna 211. Otherwise, the monitoring-device 100 of FIG. 2B and the monitoring-device 100 of FIG. 2C may be substantially the same.

Figure 2F:
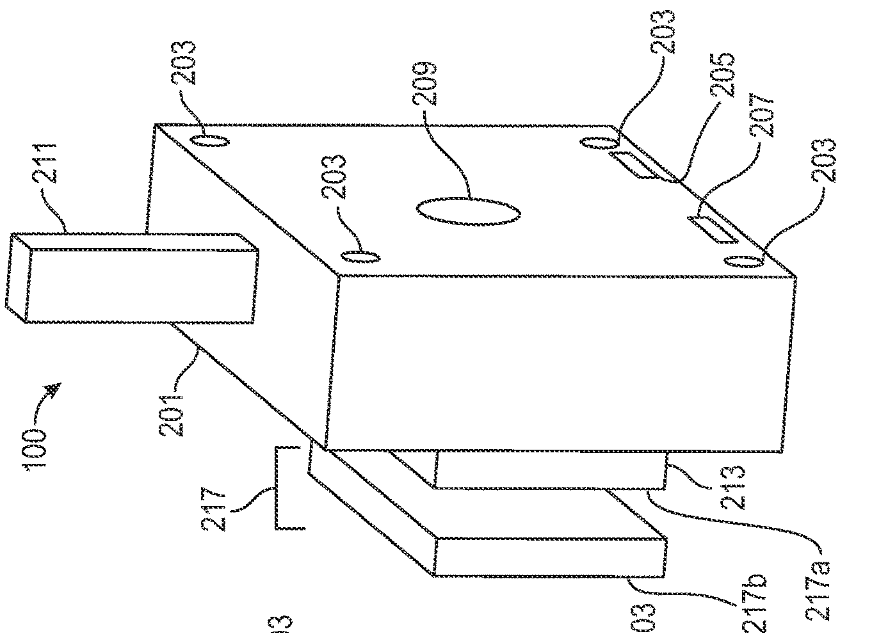
FIG. 2F may depict a perspective view of a monitoring-device with a specific type of integral mounting hardware (e.g., plurality of hooks and plurality of complimentary loops).

Note, monitoring-devices 100 of FIG. 1, FIG. 2A through and including FIG. 2F, may all comprise at least one internal antenna, that is located at least substantially (or totally) within enclosure 201.

Continuing discussing FIG. 2C, in some embodiments, monitoring-device 100 may comprise at least one external antenna 211. In some embodiments, monitoring-device 100 may comprise one or more external antennas 211. In some embodiments, a given external antenna 211 may be operatively linked to radio electronic hardware of that monitoring-device 100. In some embodiments, a given external antenna 211 may be configured for wireless communications. In some embodiments, a given external antenna 211 may be configured for radio frequency communication. In some embodiments, a given external antenna 211 may be configured to both receive and to transmit information. In some embodiments, a given external antenna 211 may be configured for cellular wireless communications.

Note, in some embodiments, external antenna 211 may a sub-type (sub-category) of communications 507, of primary radio 507*a* and/or of secondary radio 507*b*; wherein communications 507 may be discussed below in the FIG. 5A discussion; and wherein primary radio 507*a* and secondary radio 507*b* may discussed below in FIG. 5B.

Figure 2E:
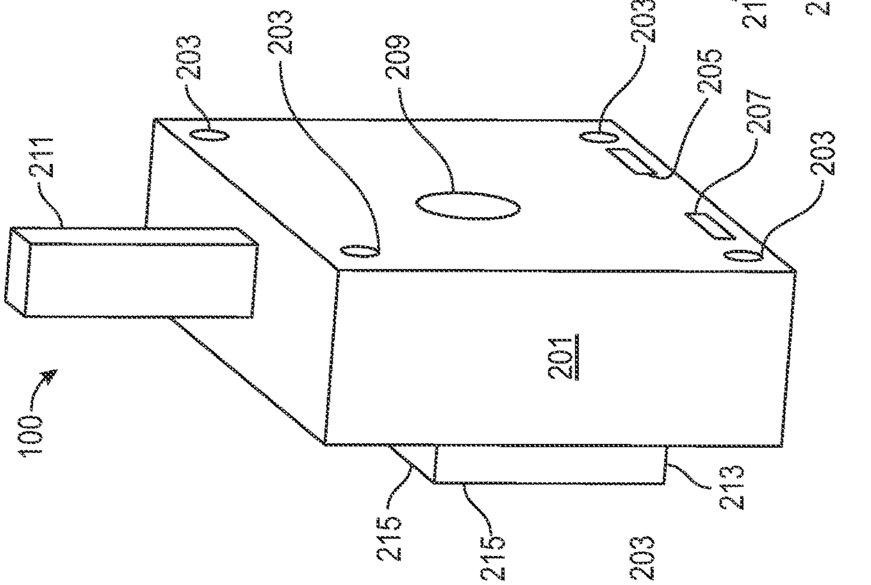
FIG. 2E may depict a perspective view of a monitoring-device with a specific type of integral mounting hardware (e.g., at least one adhesive layer).
Figure 2D:
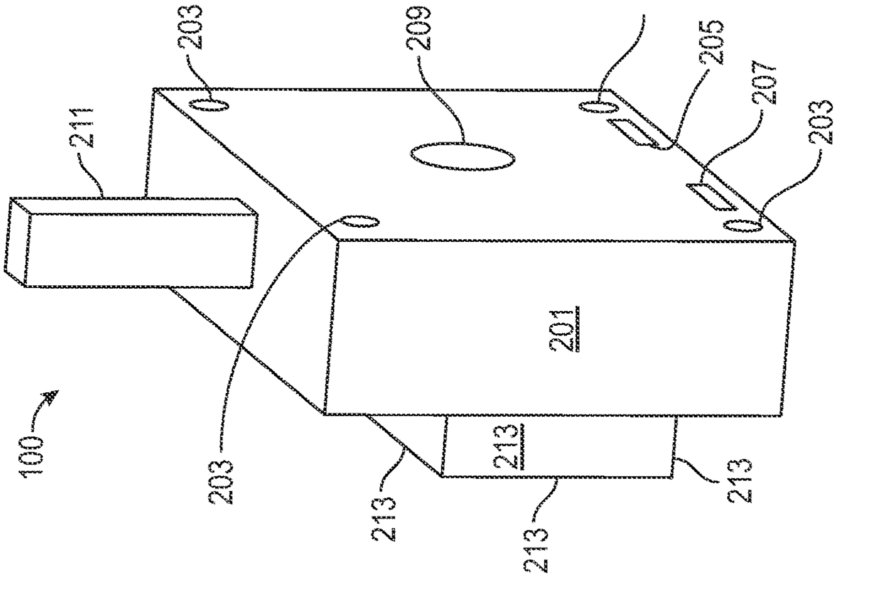
FIG. 2D may depict a perspective view of a monitoring-device with a specific type of integral mounting hardware (e.g., at least one magnet).

FIG. 2D may show a perspective view of a monitoring-device 100. In some embodiments, a given monitoring-device 100 may comprise at least one mounting magnet 213. In some embodiments, a given monitoring-device 100 may comprise one or more mounting magnets 213. In some embodiments, located on an exterior of enclosure 201 may be at least one mounting magnet 213. In some embodiments, located on an exterior of monitoring-device 100 may be at least one mounting magnet 213. In some embodiments, at least one magnet 213 may be located on or proximate (e.g., within a quarter inch) to an exterior surface of enclosure 201. In some embodiments, at least one magnet 213 may be located on or proximate (e.g., within a quarter inch) to an exterior surface of monitoring-device 100. In some embodiments, at least one magnet may be attached to exterior of enclosure 201 and/or to an exterior of monitoring-device 100. In some embodiments, mounting magnet 213 may be used to removably attach a given monitoring-device 100 easily, quickly, and without any tools, to a ferrous containing substrate (such as, but not limited to, a floor, a wall, a ceiling, a door, a window, a frame, combinations thereof, and/or the like), which are highly prevalent in storage units 101. In some embodiments, inside of enclosure 201 may be shielding to minimize mounting magnet 213 from interacting with electronics of that monitoring-device 100. In some embodiments, mounting magnet 213 may be spaced apart sufficiently on the exterior of enclosure 201 from electronics of that monitoring-device 100 to avoid mounting magnet 213 interacting with those electronics. In some embodiments, enclosure 201 may also be built of a molded magnetic composite material to reduce the need for distinct materials and reduce assembly costs.

FIG. 2E may show a perspective view of a monitoring-device 100. In some embodiments, a given monitoring-device 100 may comprise at least one adhesive layer 215. In some embodiments, a given monitoring-device 100 may comprise one or more adhesive layers 215. In some embodiments, located on an exterior of enclosure 201 may be at least one adhesive layer 215. In some embodiments, at least one adhesive layer 215 may be located on an exterior of at least one monitoring-device 100; at least one adhesive layer 215 may be located on an exterior of enclosure 201; at least one adhesive layer 215 may be located on an exterior of at least one magnet 213; and/or combinations thereof, and/or the like. In some embodiments, adhesive layer 215 may be used to attach a given monitoring-device 100 to a substrate (such as, but not limited to, a floor, a wall, a ceiling, a door, a window, a frame, combinations thereof, and/or the like) in storage unit 101. In some embodiments, before using adhesive layer 215, a protective backing may be peeled off of and away from adhesive layer 215, revealing a tacky surface of adhesive layer 215, and then adhesive layer 215 may be adhered to a substrate in storage unit 101.

Continuing discussing FIG. 2D, in some embodiments, adhesive layer 215 may at least partially cover over the exterior of mounting magnet 213. In such embodiments, if the storage unit 101 has a ferrous containing substrate (in a desired location), the protective backing may be left on adhesive layer 215 and the mounting magnet 213 may be used to removably attach that monitoring-device 100 to that ferrous containing substrate. Or in such embodiments, if that storage unit 101 has no such ferrous containing substrates (or are in undesired locations), then the protective backing may be peeled off of and away from adhesive layer 215, and then the revealed tacky adhesive layer 215 may be used to adhere (attach) that monitoring-device 100 to a substrate within that storage unit 101.

FIG. 2F may show a perspective view of a monitoring-device 100. In some embodiments, a given monitoring-device 100 may comprise at least one mechanical fastener 217. In some embodiments, a given monitoring-device 100 may comprise one or more mechanical fasteners 217. In some embodiments, mechanical fastener 217 may be a Velcro (or a Velcro like) fastener. In some embodiments, mechanical fastener 217 may be comprised of mechanical fastener **217*a* and mechanical fastener 217*b*. In some embodiments, located on an exterior of enclosure 201 may be at least one mechanical fastener 217*a*. In some embodiments, at least one layer of the plurality of loops 217*a* or the at least one layer of the plurality of hooks 217*b* may be located on an exterior of the at least one monitoring-device 100. In some embodiments, mechanical fastener 217*a* may be half of a Velcro (or of a Velcro like) fastener, i.e., mechanical fastener 217*a* may be a plurality of hooks or a plurality of loops. When mechanical fastener 217*a* may be plurality of hooks, then mechanical fastener 217*a* may be removably attached to a complimentary layer of mechanical fastener 217*b*, which may be plurality of loops. Or vice versa, i.e., when mechanical fastener 217*a* may be plurality of loops, then mechanical fastener 217*a* may be removably attached to a complimentary layer of mechanical fastener 217*b*, which may be plurality of hooks. In some embodiments, the complimentary layer of mechanical fastener 217*b* may be adhered (via an adhesive backing) to a surface of a substrate in storage unit 101**.

Figure 3A:
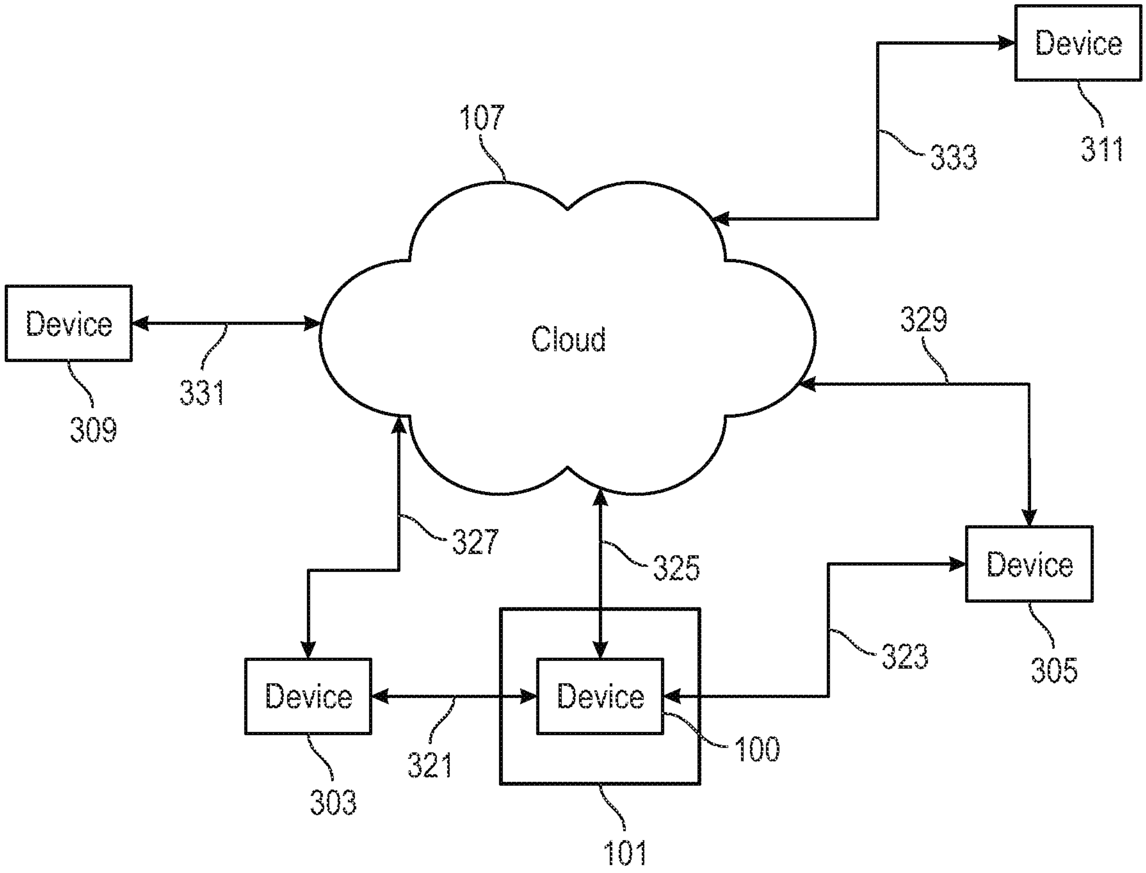
FIG. 3A may depict a block diagram of possible communication pathways of a given monitoring-device with various other electronic devices.
Figure 3B:
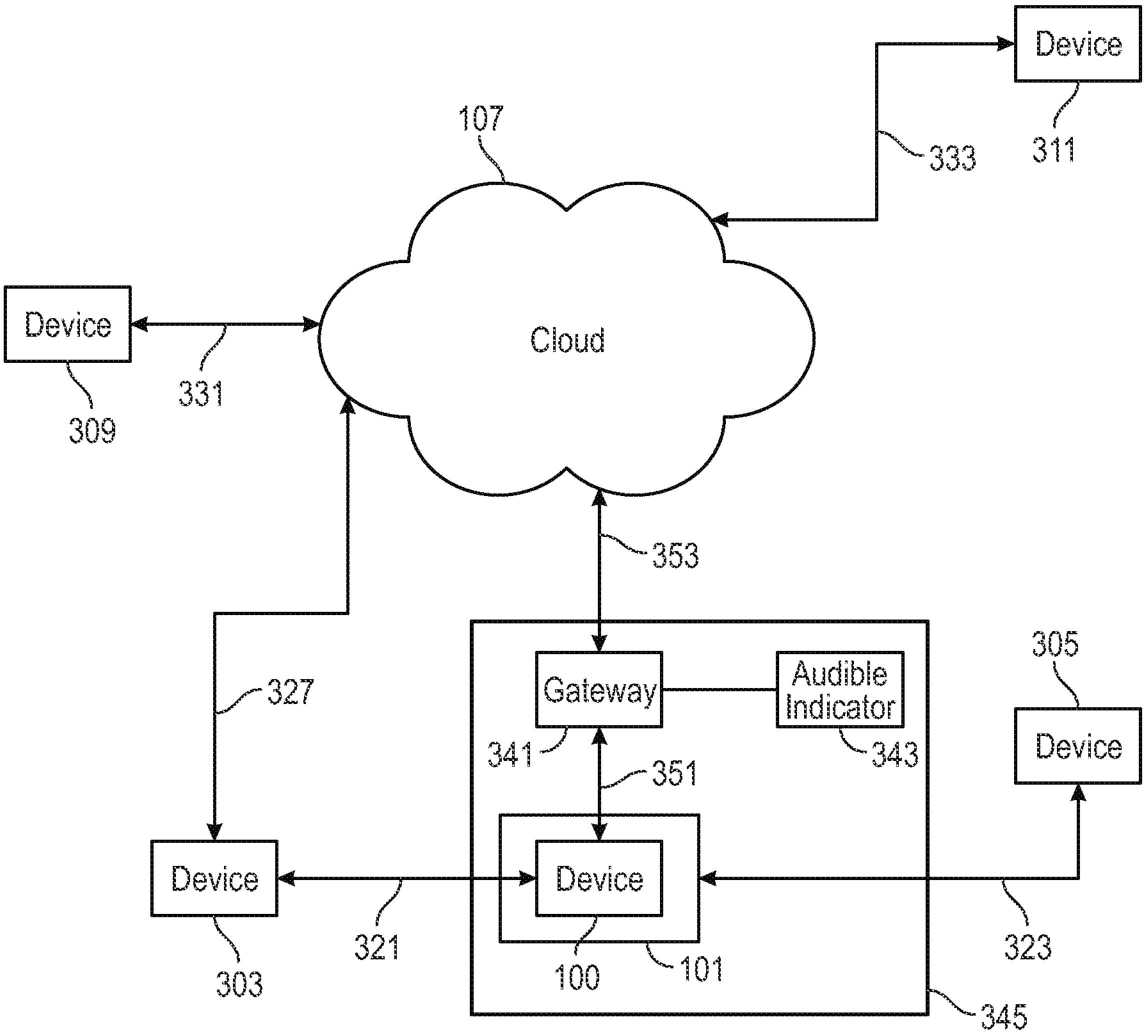
FIG. 3B may depict a block diagram of possible communication pathways of a given monitoring-device with various other electronic devices.

While FIG. 3A and FIG. 3B may only show one monitoring-device 100 per figure, note in some embodiments, a given storage space 101 may have one or more monitoring-devices 100. In some embodiments, a given storage unit 101 may have more than one monitoring-device 100 installed inside of that given storage unit 101.

While FIG. 3A and FIG. 3B may only show one storage space 101 per figure, note in some embodiments, a given facility 345 may have one or more storage spaces 101. In some embodiments, each such storage space 101 may have one or more monitoring-devices 100. In some embodiments, at least one storage space 101 may have one or more monitoring-devices 100.

FIG. 3A may depict a block diagram of possible communication pathways of the given monitoring-device 100 with various other electronic devices. In some embodiments, there be at least one monitoring-device 100 for a given storage space 101. In some embodiments, at least one storage space 101 may have one or more monitoring-devices 100.

In some embodiments, a given monitoring-device 100 may be in wireless communications via its communications 507 with one or more of: tenant device 303, facility operator device 305, provider device 309, third-party device 311, hub 341, and/or local audible indicator 343. In some embodiments, tenant device 303, facility operator device 305, provider device 309, third-party device 311, hub 341, and/or (local) audible indicator 343 may be selected from one or more of: a computer, a computing device, a smartphone, a tablet computing device, a laptop computer, a desktop computer, a tower computer, a server computer (server), a workstation computer (workstation), and/or the like.

In some embodiments, the given monitoring-device 100 may provide monitoring details and/or information of a given storage space 101 to one or more of: tenant device 303, facility operator device 305, provider device 309, third-party device 311, hub 341, and/or local audible indicator 343.

In some embodiments, one or more of tenant device 303, facility operator device 305, provider device 309, third-party device 311, hub 341, and/or local audible indicator 343 may communicate with the given monitoring-device 100. In some embodiments, one or more of tenant device 303, facility operator device 305, provider device 309, third-party device 311, hub 341, and/or local audible indicator 343 may provide information and/or instructions to the given monitoring-device 100. In some embodiments, one or more of tenant device 303, facility operator device 305, provider device 309, third-party device 311, hub 341, and/or local audible indicator 343 may control at least some aspects of the given monitoring-device 100.

Continuing discussing FIG. 3A, in some embodiments, a given tenant device 303 may be used by a tenant 401 (e.g., a renter) of a given storage space 101. For example, and without limiting the scope of the present invention, tenant device 303 may be a smartphone (but as noted above could be other types of computers or computing devices). In some embodiments, tenant 401, facility operator 405, and/or owner of a given storage space 101 may receive various details, information, alerts, reminders, notices, notifications, audible indicators and/or the like pertaining to activity, motion, events, occurrences, environmental conditions, and/or status of given storage space 101 being monitored by the one or more monitoring-devices 100. Such content may be displayed on/in tenant device 303 via one or more of: text message, SMS (short message service) message, internet browser, email, voice call, video call, voicemail, private message, mobile app, in app messaging, dedicated/proprietary software application (e.g., the space monitoring software or portion thereof), combinations thereof, and/or the like. In some embodiments, texting, text messaging, and SMS messaging may be used interchangeably herein. In some embodiments, tenant device 303 may be used to transmit, convey, and/or communicate various instructions, settings, information, and/or data to a given monitoring-device 100. In some embodiments, tenant device 303 may be used to arm and/or disarm a given monitoring-device 100. In some embodiments, tenant device 303 may be used to input, update, and/or change settings and/or preferences of a given monitoring-device 100. In some embodiments, changes made by tenant device 303 to a given monitoring-device 100 may also be communicated to the facility operator via their facility operator device 305 and/or to the provider via their provider device 309.

Continuing discussing FIG. 3A, in some embodiments, monitoring-device 100 may be in communication with tenant device 303. In some embodiments, this communication may be direct, from device to device, as denoted by communication pathway 321. In some embodiments, this communication may be indirect, from device to device, but routed through cloud 107, such as using communication pathway 325 between monitoring-device 100 and cloud 107; and then communication pathway 327 between cloud 107 and tenant device 303. In some embodiments, communication between monitoring-device 100 and tenant device 303 may be via wireless communications, such as but not limited to, communication pathways 321, 325, and 327. In some embodiments, communication between monitoring-device 100 and tenant device 303 may be wireless communications (or a portion of the communication may be wireless), such as, but limited to, low power wireless communications protocol(s), LoRa, NFC, Bluetooth (BT), Zigbee, 802.15, RFID, combinations thereof, and/or the like communications, such as communication pathway 321.

Continuing discussing FIG. 3A, in some embodiments, cloud 107 may comprise one or more of: LAN (local area network), WAN (wide area network), the internet, combinations thereof, and/or the like. In some embodiments, cloud 107 may comprise at least a portion of: a LAN, a WAN, the internet, combinations thereof, and/or the like. In some embodiments, cloud 107 may comprise one or more of: network hardware, network switching hardware, network routing hardware, routers, modems, switches, hubs, cabling, wiring, fiber optics, antennas, dishes, transmitters, receivers, buffers, memory, and/or the like.

Continuing discussing FIG. 3A, in some embodiments, a given facility operator device 305 may be used by one who operates and/or manages a given storage facility 345, which may be (or may not be) the owner of the given storage facility 345. In some embodiments, a given facility operator device 305 may be used by facility operator 405. In some embodiments, a given storage facility 345 may comprise one or more storage spaces 101, e.g., at one or more distinctive geographic locations. For example, and without limiting the scope of the present invention, facility operator device 305 may be a smartphone (but as noted above could be other types of computers or computing devices). In some embodiments, the facility operator 405 of a given storage space 101 may receive various details, information, alerts, reminders, notices, notifications, alarms and/or the like pertaining to events, occurrences, environmental conditions, operational information, sensor data, and/or status of given storage space 101 being monitored by the one or more monitoring-devices 100. Such content may be displayed on/in facility operator device 305 via one or more of: text message, SMS message, internet browser, email, voice call, video call, voicemail, private message, mobile app, dedicated/proprietary software application (e.g., the storage space monitoring software or portion thereof), combinations thereof, and/or the like. In some embodiments, facility operator device 305 may be used to transmit, convey, and/or communicate various instructions, settings, information, and/or data to a given monitoring-device 100. In some embodiments, facility operator device 305 may be used to arm and/or disarm a given monitoring-device 100. In some embodiments, facility operator device 305 may be used to input, update, and/or change settings and/or preferences of a given monitoring-device 100. In some embodiments, changes made by facility operator device 305 to a given monitoring-device 100 may also be communicated (reported) to the tenant via their tenant device 303 and/or to the provider via their provider device 309. In some situations, it may be necessary for the facility operator to override tenant settings and/or preferences, e.g., to effect emergency repairs or inspections of a given storage space 101.

Continuing discussing FIG. 3A, in some embodiments, monitoring-device 100 may be in communication with facility operator device 305. In some embodiments, this communication may be direct, from device to device, as denoted by communication pathway 323. In some embodiments, this communication may be indirect, from device to device, but routed through cloud 107, such as using communication pathway 325 between monitoring-device 100 and cloud 107; and then communication pathway 329 between cloud 107 and facility operator device 305. In some embodiments, communication between monitoring-device 100 and facility operator device 305 may be via wireless communications (or a portion may be wireless), such as but not limited to, communication pathways 323, 325, and 329. In some embodiments, communication between monitoring-device 100 and facility operator device 305 may be wireless communications, such as, but limited to, low power wireless communication protocol(s), LoRa, NFC, RFID, cellular, combinations thereof, and/or the like communications, such as communication pathway 323.

Continuing discussing FIG. 3A, in some embodiments, a given provider device 309 may be used by one who manages, implements, and/or services the overall space monitoring software (e.g., NINCE 367) and who may provision, implement, provide, maintain, and/or service the monitoring-devices 100. In some embodiments, the provider may be the company (and/or organization) that manages, implements, maintains, and/or services the overall space monitoring software and that may provision, implement, provide, maintain, and/or service the monitoring-devices 100. In some embodiments, the provider may provide various back end operations, customer services, technical support, and/or support for the space monitoring software and its hardware, such as, monitoring-devices 100, gateways (hubs) 341, and/or local audible indicator 343. In some embodiments, the provider may provide human responders for escalation purposes from sensor data, alerts, and/or alarms generated by a given monitoring-device 100.

For example, and without limiting the scope of the present invention, provider device 309 may be a smartphone, tablet computing device, and/or laptop (but as noted above could be other types of computers or computing devices), such as in situations where a provider technician may be sent onsite to a given storage facility 345 and/or to a given storage space 101.

For example, and without limiting the scope of the present invention, provider device 309 may be a server (computer server), a workstation, a desktop computer, a tower computer, a laptop computer, tablet computing device, (but as noted above could be other types of computers or computing devices). In some embodiments, provider devices 309 may be in communication with one or more databases. In some embodiments, provider device 309 may be at least one server 309 (computer-server 309) whose memory may non-transitorily store NINCE 367. In some embodiments, NINCE 367 shown in FIG. 3C may be running and/or operating at least one server 309 (provider device 309).

In some embodiments, the provider may receive various details, information, alerts, reminders, notices, notifications, alarms and/or the like pertaining to events, occurrences, environmental conditions, sensor data, and/or status of given storage space 101 being monitored by the one or more monitoring-devices 100. Such content may be displayed on/in provider devices 309 via one or more of: text message, SMS message, internet browser, email, voice call, video call, voicemail, private message, mobile app, dedicated/proprietary software application (e.g., the storage space monitoring software or portion thereof), combinations thereof, and/or the like. In some embodiments, provider devices 309 may be used to transmit, convey, and/or communicate various instructions, settings, information, software updates, firmware updates, overrides, and/or data to a given monitoring-device 100. In some embodiments, provider devices 309 may be used to arm and/or disarm a given monitoring-device 100. In some embodiments, provider devices 309 may be used to input, update, and/or change settings and/or preferences of a given monitoring-device 100. In some embodiments, changes made by provider devices 309 to a given monitoring-device 100 may also be communicated to the facility operator via their facility operator device 305 and/or to the tenant, renter, and/or owner via their tenant device 303.

Continuing discussing FIG. 3A, in some embodiments, monitoring-device 100 may be in communication with provider device 309. In some embodiments, this communication may be direct, from device to device. In some embodiments, this communication may be indirect, from device to device, but routed through cloud 107, such as using communication pathway 325 between monitoring-device 100 and cloud 107; and then communication pathway 331 between cloud 107 and provider device 309. In some embodiments, communication between monitoring-device 100 and provider device 309 may be wireless communications, such as communication pathways 325 and 331. In some embodiments, communication pathway 331 may be wireless, wired, or combinations thereof. For example, and without limiting the scope of the present invention, when provider device 309 may be a server, communication pathway 331 from this server to cloud 107 may be wired or substantially wired. In some embodiments, communication between monitoring-device 100 and tenant device 303 may be wireless communications, such as, but limited to, low power wireless communications, LoRa, WiFi, NFC, BT, RFID, cellular, combinations thereof, and/or the like communications. In some embodiments, communication between monitoring-device 100 and provider device 309 may be via wired communications when the two devices may be local to each other and removably wired to each other.

Continuing discussing FIG. 3A, in some embodiments, a given third-party device 311 may be used by one who may be providing some third-party service to one or more of: the tenant 401, the owner, the landlord, the storage facility operator 405, and/or the provider associated with provider devices 309. For example, and without limiting the scope of the present invention, the third-party provider may be an insurer (insurance company and/or insurance carrier), first responder, law enforcement, government entity, combinations thereof, and/or the like.

For example, and without limiting the scope of the present invention, third-party device 311 may be a smartphone, desk phone, tablet computing device, and/or laptop (but as noted above could be other types of computers or computing devices), such as in situations where first responders, law enforcement or an insurance claims adjuster may be sent onsite to a given storage facility 345 and/or to a given storage space 101.

For example, and without limiting the scope of the present invention, third-party device 311 may be a server, a workstation, a desktop computer, a tower computer, a laptop computer, tablet computing device, (but as noted above could be other types of computers or computing devices). In some embodiments, third-party devices 311 may be in communication with one or more databases.

In some embodiments, the third-party provider may receive various details, information, alerts, reminders, notices, notifications, alarms and/or the like pertaining to events, occurrences, environmental data, sensor data, and/or status of given storage space 101 being monitored by the one or more monitoring-devices 100. Such content may be displayed on/in third-party devices 311 via one or more of: text message, SMS message, internet browser, email, voice call, video call, voicemail, private message, mobile application, dedicated/proprietary software application (e.g., the storage space monitoring software or portion thereof), combinations thereof, and/or the like. In some embodiments, third-party devices 311 may be used to transmit, convey, and/or communicate various instructions, settings, information, overrides, and/or data to a given monitoring-device 100. In some embodiments, third-party devices 311 may be used to arm and/or disarm, enable and/or disable, a given monitoring-device 100. In some embodiments, third-party devices 311 may be used to input, update, and/or change settings and/or preferences of a given monitoring-device 100. In some embodiments, changes made by third-party devices 311 to a given monitoring-device 100 may also be communicated to the provider via provider devices 309; to the facility operator via their facility operator device 305; and/or to the tenant, renter, and/or owner via their tenant device 303.

In some embodiments, the third party device 311 may be running a software interface, such as, one or more APIs (Application Programmable Interfaces) for providing various services to one or more of: the tenant 401, the facility operator 405, and/or the provider.

Continuing discussing FIG. 3A, in some embodiments, monitoring-device 100 may be in communication with third-party device 311. In some embodiments, this communication may be direct, from device to device. In some embodiments, this communication may be indirect, from device to device, but routed through cloud 107, such as using communication pathway 325 between monitoring-device 100 and cloud 107; and then communication pathway 333 between cloud 107 and third-party device 311. In some embodiments, communication between monitoring-device 100 and third-party device 311 may be wireless communications such as communication pathways 325 and 333. In some embodiments, communication pathway 333 may be wireless, wired, or combinations thereof. In some embodiments, communication between monitoring-device 100 and facility operator device 305 may be wireless communications, such as, but limited to, WiFi, low power wireless communications, cellular, NFC, Bluetooth, ZigBee, 802.15, RFID, combinations thereof, and/or the like communications.

FIG. 3B may depict a block diagram of possible communication pathways of the given monitoring device 100 with various other electronic devices. FIG. 3B may differ from FIG. 3A, in that in FIG. 3B, one or more of gateway (hub) 341, audible indicator 343, and/or storage facility 345 may be shown in FIG. 3B.

In FIG. 3B, communications between cloud 107 and a given monitoring-device 100 may include an intermediary network device, such as, but not limited to, hub 341. In some embodiments, hub 341 may be one or more of: a modem, a router, a network switch, combinations thereof, and/or the like. In some embodiments, hub 341 may have its own processors, memory, wireless communication means (e.g., one or more antennas), and/or power supply; wherein, in some embodiments, this memory may increase the storage capacity of memory 503 of monitoring-devices 100 and/or act as a buffer. In some embodiments, hub 341 may have a backup power supply. In some embodiments, at least one monitoring-device 100 may be in direct wireless communication with hub 341 via communication pathway 351. In some embodiments, hub 341 may be in communication with cloud 107 via communication pathway 353. In some embodiments, communication pathway 353 may be wireless, wired, and/or combinations thereof. In some embodiments, one or more hubs 341 may be located within a given storage facility 345. In some embodiments, hub 341 may be used to enhance wireless communication coverage of the one or more monitoring-devices 100 (e.g., in locations where cellular coverage may be weak).

Continuing discussing FIG. 3B, in some embodiments, a given storage facility 345 may comprise one or more audible indicators 343. In some embodiments, the one or more local audible indicators 343 may be in communication with the one or more monitoring-devices 100 of that given storage facility 345. In some embodiments, the one or more local audible indicators 343 may be in communication with the one or more monitoring-devices 100 of that given storage facility 345, via one or more hubs 341. In some embodiments, a given local audible indicators 343 may be in direct communication with a given hub 341. In some embodiments, this communication may be wired, wireless, and/or combinations thereof. In some embodiments, a given hub 341 may comprise one or more local audible indicators 343. In some embodiments, a trigger above some setting, threshold, and/or preference (which may be predetermined in some embodiments), detected by at least one monitoring-device 100, may result in activating and/or engaging the one or more local audible indicators 343 such that the one or more local audible indicators 343 may be producing a visual (via lights) and/or auditory (via speakers) alarm.

In some embodiments, a given storage facility 345 may comprise one or more: storage spaces 101, monitoring-devices 100, hubs 341, and/or local audible indicators 343.

In some embodiments, at least some of the wireless communication in FIG. 3A and/or FIG. 3B, may be cellular, such as, but not limited, wireless communications between monitoring-devices 100 and other devices shown therein.

In some embodiments, gateway/hub 341 may be configured to provide an ad hoc wireless network coverage to one or more controlled spaces (for transitory use) 101 (self-storage units 101) located within storage facility 345. In some embodiments, gateway/hub 341 may comprise one or more antennas configured to broadcasting/transmitting wireless communication and/or for receiving wireless communications. In some embodiments, gateway/hub 341 may be configured to provide ad hoc wireless internet connectivity to one or more monitoring-devices 100 located within the controlled spaces (for transitory use) 101 (such as, but not limited to, self-storage unit(s) 101), wherein the controlled spaces (for transitory use) 101 (self-storage units 101) are located within storage facility 345. In some embodiments, communication-pathway 351 may be wireless. In some embodiments, wireless communications (e.g., communication-pathway 351) of this wireless network between gateway/hub 341 and the one or more monitoring-devices 100, may extent into and/or through at least most of the given storage facility 345 that has the controlled spaces (for transitory use) 101 (such as, but not limited to, self-storage unit(s) 101) with the one or more monitoring-devices 100 located within those controlled spaces (for transitory use) 101 (such as, but not limited to, self-storage unit(s) 101). In some embodiments, wireless communications (e.g., communication-pathway 351) of this wireless network between gateway/hub 341 and the one or more monitoring-devices 100, may extent into and/or through the controlled spaces (for transitory use) 101 (such as, but not limited to, self-storage unit(s) 101) with the one or more monitoring-devices 100 and into at least portions of the surrounding storage facility 345. See e.g., FIG. 3B.

Figure 3C:
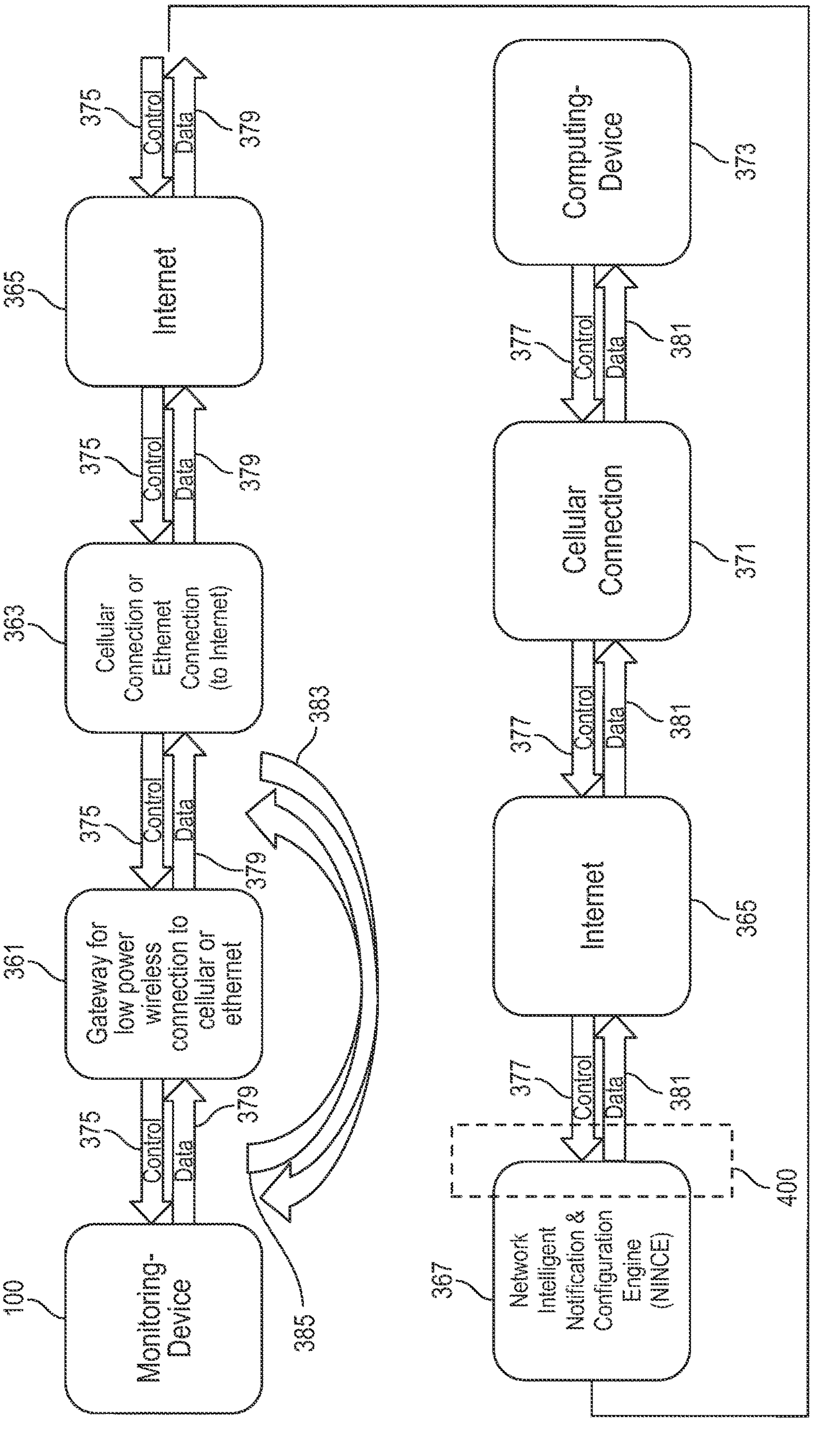
FIG. 3C may depict a block diagram of possible communication pathways and types between a given monitoring-device and a given end-user computing-device.

In some embodiments, FIG. 3C may show a schematic block flow diagram of information/data/control commands/instruction commands flow between a given monitoring-device 100 and a given computing-device 373. In some embodiments, the monitoring-device 100 may be mounted inside of the given storage unit 101. In some embodiments, the computing-device 373 may be located outside of the given storage unit 101. In some embodiments, the computing-device 373 may be the tenant device 303; the facility operator device 305; the provider device 309; and/or the third-party device 311.

Continuing discussing FIG. 3C, in some embodiments, the given monitoring-device 100 may be in communication with "Network Intelligent Notification & Configuration Engine 367" or NINCE 367. In some embodiments, NINCE 367 may be software (set of instructions) running on servers 309 (non-transitorily stored in memory of such servers 309) of the service/subscription provider. In some embodiments, NINCE 367 may control/govern communications to and/or from a given monitoring-device 100. In some embodiments, NINCE 367 may control/govern at least some portions of "Human Interface System" (HIS) 400. In some embodiments, NINCE 367 may correlate sensor 505 data in real time (or near real time), from one or more monitoring-devices 100, optionally with additional input of one or more authorized users and interested parties (from their respective computing-devices 373 that are in communication with NINCE 367), in order to collect actionable insights to make real time (or near real time) decisions based on a real time (or near real time) continuous stream of data from monitoring-devices 100 and authorized users. In some embodiments, NINCE 367 may deploy in real time (or near real time) a decision making and communication algorithm to automatically or semi-automatically provide authorized users/stakeholders two-way communication of content that is proper, highly relevant, useful, and/or time sensitive such as, but not limited to: data, sensor 505 data, details, information, alerts, reminders, notices, notifications, alarms, events, occurrences, escalation events, de-escalation events, and/or the like with respect to the given controlled space (e.g., storage unit 101) being monitored, the assets being monitored, and/or the authorized stakeholders interfacing with NINCE 367 through HIS 400. In some embodiments, communication between the given monitoring-device 100 and NINCE 367 may not be direct, but rather may be indirect.

Continuing discussing FIG. 3C, in some embodiments, the given monitoring-device 100 may be in wireless communication with at least one gateway 361 (via radio(s) and/or antenna(s) of the given monitoring-device 100). In some embodiments, gateway 361 may provide a bridge to connection 363. In some embodiments, gateway 361 may be in communication with connection 363. In some embodiments, gateway 361 may be in wired and/or wireless communication with connection 363. In some embodiments, gateway 361 may be a low power wireless communication protocol for connecting to connection 363. In some embodiments, gateway 361 may be a low power wireless communication protocol (e.g., LP WAN) for connecting to connection 363. In some embodiments, gateway 361 may utilize a low power wireless communication protocol for connecting to connection 363. In some embodiments, gateway 361 may utilize a low power wireless communication protocol (e.g., LP WAN) for connecting to connection 363. While in some embodiments, a configuration of gateway 361 may include a wireless communication protocol (which may be low power in some embodiments), there are some embodiments of gateway 361, which may also be in wired LAN ethernet and/or wireless communication with connection 363.

In some embodiments, there may be at least one gateway 361 installed on and at a given storage facility 345. In some embodiments, there may be an ad hoc wireless network established on and at the given storage facility 345. In some embodiments, the ad hoc wireless network may comprise at least one gateway 361. In some embodiments, the at least one gateway 361 may be configured for low power wireless communications with the monitoring-devices 100 used at that storage facility 345 in the various storage units 101; and the ad hoc wireless network may be in communication (wired and/or wireless) with connection 363, cellular connection 371, and/or internet 365. Thus, some portions of the ad hoc wireless network may be configured for low power wireless communications with the monitoring-devices 100; and other portions of the ad hoc wireless network may have wired and/or wireless communications that may ultimately connect internet 365. In some embodiments, the ad hoc wireless network may comprise one or more of: gateway 361, a radio, an antenna, a modem, a router, a switch, a processor, memory, a solar power array/panel, a battery, an AC/DC converter/adapter, combinations thereof, and/or the like. In some embodiments, at least one gateway 361 may be solar powered, battery powered, wired to a local electrical power source, combinations thereof, and/or the like. In some embodiments, at least some portion of the ad hoc wireless network may be solar powered, battery powered, wired to a local electrical power source, combinations thereof, and/or the like.

In some embodiments, there need not be a requirement of any gateway 361 installed at the given storage facility 345 as there may already be a LP WAN (low power WAN) and/or low power cellular wireless communications services available by some other network providers accessible in the area (such as, but not limited to, NB-IoT, LTE Cat-M1, SigFox, or the like). In some embodiments, such existing LP WAN and/or low power cellular wireless communications services available may achieve the benefits of the ad hoc wireless network when at least one of the monitoring-devices 100 includes a matching low power wireless communication radio, antenna and matching wireless communication protocol such that the monitoring-devices 100 used at that storage facility 345 in the various storage units 101 is offered access to this existing LP WAN and/or low power cellular wireless communications services available; and thus provided communication to Internet 365 given its own integral direct wireless communication connection 363.

Continuing discussing FIG. 3C, in some embodiments, connection 363 may be a cellular connection or a wired connection to internet 365. In some embodiments, connection 363 may in communication with internet 365. In some embodiments, NINCE 367 may be in communication with internet 365. In some embodiments, NINCE 367 may be in wired and/or wireless communication with internet 365.

Continuing discussing FIG. 3C, in some embodiments, internet 365 may be in communication with connection 363 and NINCE 367. in some embodiments, internet 365 may be in communication with NINCE 367 and cellular connection 371.

Continuing discussing FIG. 3C, in some embodiments, cellular connection 371 may be a cellular connection between internet 365 and a given computing-device 373. In some embodiments, cellular connection 371 may be provided by a third-party provider, such as, but not limited to, Verizon, AT&T, T-Mobile, combinations thereof, and/or the like.

Continuing discussing FIG. 3C, in some embodiments, commands, instructions, firmware updates, and/or software updates from NINCE 367 to a given monitoring-device 100 may be deemed a control transmission 375. In some embodiments, control transmission 375 may comprise at least one: command, instruction, firmware update, software update, combinations thereof, and/or the like, from NINCE 367 to monitoring-device 100. In some embodiments, control transmission(s) 375 received at a given monitoring-device 100 may require that monitoring-device 100 to behave in a particular and/or predetermined manner (such as, but not limited to, activating a sensor 505/505*a*/505*b*; deactivating a sensor 505/505*a*/505*b*; cause a sensor 505/505*a*/505*b* to take a reading; change a parameter value; change a threshold value; change wireless communication protocol; change radios and/or antennas of monitoring-device 100 being used; cause a data transmission from that monitoring-device 100 [e.g., a sensor reading, status, status change, etc.]; cause monitoring-device 100 to delete data; cause monitoring-device 100 to update its firmware and/or software; generate an output to UX output 205; stop an output of UX output 205; combinations thereof, and/or the like). In some embodiments, control transmission(s) 375 may be automatically generated by NINCE 367 and/or may originate from end-users via a computing-device 373.

Continuing discussing FIG. 3C, in some embodiments, commands, and/or instructions from the computing-device 373 to the given monitoring-device 100 (and/or to NINCE 367) may be deemed a control transmission 377. In some embodiments, control transmission 377 may comprise at least one: command, instruction, combinations thereof, and/or the like, from computing-device 373 to monitoring-device 100 and/or to NINCE 367. In some embodiments, when control transmission 377 may reach (may be received at) NINCE 367, NINCE 367 may reformat that control transmission 377 into a control transmission 375 from the NINCE 367. In some embodiments, a command and/or instruction originating at a given computing-device 373 (such as, but not limited to, tenant device 303) may comprise natural language in the body of a text message, SMS message, email, in app messenger, instant messenger, robo-voice message, web notifications, combinations thereof, and/or the like, wherein that natural language command and/or instruction may be encoded in control transmission 377. In some embodiments, control transmission 375 and control transmission 377 may be formatted differently. In some embodiments, control transmission 375 and control transmission 377 may comprise different elements.

Continuing discussing FIG. 3C, in some embodiments, data transmission 379 may be data, information, confirmation(s), combinations thereof, and/or the like originating at a given monitoring-device 100 and received at NINCE 367. In some embodiments, data transmission 379 may comprise any data and/or information generated by a given monitoring-device 100 and/or any data/or information non-transitorily stored in memory 503 (storage 503) of the given monitoring-device 100. (See the discussion of FIG. 5A below for a discussion of memory/storage 503). In some embodiments, data transmission 379 may comprise one or more of: monitoring-device 100 status; monitoring-device 100 change in status; a setting of monitoring-device 100, metadata of monitoring-device 100; serial number of monitoring-device 100; model number of monitoring-device 100; address of monitoring-device 100; IP address of monitoring-device 100; MAC address of monitoring-device 100; sensor 505/505*a*/505*b* reading of monitoring-device 100; data captured by sensor(s) 505/505*a*/505*b* of monitoring-device 100; image(s) captured by camera(s) of monitoring-device 100; type of reporting sensor 505/505*a*/505*b*; a date of a sensor reading, occurrence, event, and/or alert; a date/time of a sensor reading, occurrence, event, and/or alert; firmware version; software version; battery (power source 511) status; memory 503 capacity status; log data; received confirmation(s); combinations thereof, and/or the like.

Continuing discussing FIG. 3C, in some embodiments, data transmission 381 may be data, information, confirmation(s), combinations thereof, and/or from NINCE 367 and ultimately received at the computing-device 381. In some embodiments, a data transmission 379 originating from monitoring-device 100 but wherein at least a portion of that data transmission 379 may be intended to be received at the computing-device 373, may be reformatted by NINCE 367 from a data transmission 379 into a data transmission 381. In some embodiments, data transmission 379 and data transmission 381 may be formatted differently. In some embodiments, data transmission 379 and data transmission 381 may comprise different information. In some embodiments, data transmission 379 may comprise raw data, information, and/or the like from the given monitoring-device 100. In some embodiments, NINCE 367 may interpret received data transmission 379 into data transmission 381 which may include event and/or alert information/notifications.

Continuing discussing FIG. 3C, in some embodiments, the given monitoring-device 100 may utilize control transmission 383 and data transmission 385 to wirelessly connect to connection 363 when gateway 361 may not be available. In some embodiments, informational content of control transmission 383 may be substantially similar to control data transmission 375. In some embodiments, informational content of data transmission 385 may be substantially similar to data transmission 379.

In some embodiments, users of: monitoring-device(s) 100; NINCE 367; systems utilizing monitoring-device(s) 100 and/or utilizing NINCE 367; and/or methods utilizing monitoring-device(s) 100 and/or utilizing NINCE 367—may interact/interface with such monitoring-device(s) 100, NINCE 367, systems, and/or methods via a "Human Interface System" (HIS) 400. In some embodiments, the HIS 400 must be accessed through a given computing-device 373, such as, but not limited to, tenant device 303, facility operator device 305, provider device 309, third-party device 311, combinations thereof, and/or the like. In some embodiments, the HIS 400 may comprise one or more of: SMS messaging, text messaging, voice, web portal (e.g., through a web browser), mobile app, in app messaging, instant messaging, combinations thereof, and/or the like-any one of which accessed/used through a given computing-device 373. In some embodiments, the HIS 400 may employ/utilize one or more of: SMS messaging, text messaging, voice, web portal (e.g., through a web browser), mobile app, in app messaging, instant messaging, combinations thereof, and/or the like-any one of which accessed/used through a given computing-device 373.

In some embodiments, the users of: the HIS 400; monitoring-device(s) 100; NINCE 367; systems utilizing monitoring-device(s) 100 and/or utilizing NINCE 367; and/or methods utilizing monitoring-device(s) 100 and/or utilizing NINCE 367—may comprise one or more authorized interested party/stakeholder(s) (referred to as "authorized stakeholders"). In some embodiments, the one or more authorized stakeholders may comprise one or more of: tenants 401 of a given storage unit 101; tenant specified back-up contact(s) for storage unit 101; facility operator 405 of storage facility 345 with one or more storage units 101; on-site or off-site maintenance staff, workers/management of the provider of the HIS 400, monitoring-device(s) 100, NINCE 367, systems, and/or methods; workers/management of insurance companies; governmental employees (such as, but not limited to, first responders, law enforcement personnel, fire department personnel, etc.); combinations thereof, and/or the like.

In some embodiments, the interaction between HIS 400 and NINCE 367 may involve distributed decision making methodologies (e.g., with multiple stakeholders interacting with NINCE 367). In some embodiments, "two-way enhanced electronic text and/or audible messaging communication" (that may be defined to include the use of simplified two way text messaging [such as SMS] at the heart of the communication protocol, but may also include one or more of the following: two way instant messaging; two way web alerts; two way mobile phone notifications; two way mobile app alerts, combinations thereof), and/or the like may be a means for interacting with monitoring-device(s) 100; NINCE 367; systems utilizing monitoring-device(s) 100 and/or utilizing NINCE 367; and/or methods utilizing monitoring-device(s) 100 and/or utilizing NINCE 367. In some embodiments, the two-way enhanced electronic text and/or audible messaging communication, combinations thereof, and/or the like may be a means for controlling monitoring-device(s) 100; NINCE 367; systems utilizing monitoring-device(s) 100 and/or utilizing NINCE 367; and/or methods utilizing monitoring-device(s) 100 and/or utilizing NINCE 367, and/or portions thereof. In some embodiments, the two-way enhanced electronic text and/or audible messaging communication, combinations thereof, and/or the like may be between a given stakeholder and NINCE 367, according to the informational flows shown and described in FIG. 3C.

In some embodiments, the two-way enhanced electronic text and/or audible messaging communication, combinations thereof, and/or the like may be between two or more different authorized stakeholders. In some embodiments, the two-way enhanced electronic text and/or audible messaging communication, combinations thereof, and/or the like that may be between the two or more different authorized stakeholders, that may be indirect communications that are routed and controlled through NINCE 367, according to the informational flows shown and described in FIG. 3C, with each different stakeholder utilizing the HIS 400 through their own computing-device 373.

In some embodiments, there may be multiple computing-devices 373, each associated with a given authorized stakeholder, wherein each such authorized stakeholder may be interacting with and/or controlling the same monitoring-device 100 of a same storage unit 101 through stakeholder communications with NINCE 367 according to the flows of FIG. 3C.

In some embodiments, the two-way enhanced electronic text and/or audible messaging communication, combinations thereof, may be a control mechanism for authorized stakeholders interacting/controlling monitoring-devices 100 and/or NINCE 367. In this context, "two-way NINCE 367 communications" may be defined as utilization of the HIS 400 interfacing, such as, but not limited to, two-way text/SMS messages, as well as optionally including instant messaging; web alerts; mobile phone notifications; mobile app alerts, text-to-voice/voice-to-text communication from the given authorized stakeholder to NINCE 367; and the two-way NINCE 367 communications from NINCE 367 to the given authorized stakeholder. That is, the given authorized stakeholder may be in two-way NINCE 367 communications messaging NINCE 367; and NINCE 367 may be in two-way NINCE 367 communications messaging the given authorized stakeholder. In some scenarios, the given authorized stakeholder may be the one initiating the two-way NINCE 367 communications, such as a text-SMS messaging, to NINCE 367. In some scenarios, NINCE 367 may be initiating the two-way NINCE 367 communications, such as but not limited to text-SMS messaging, to the given authorized stakeholder.

In some embodiments, the two-way NINCE 367 communications from the given authorized stakeholder may include various predetermined and increasingly smarter AI-learning contextual commands/instructions, in textual form; that when received by NINCE 367, NINCE 367 may recognize and act on, including when appropriate, converting the received textual command/instruction into a command/instruction recognized and communicated to the given monitoring-device 100. In some embodiments, the format/form of commands/instructions received at a given monitoring-device 100 from NINCE 367 may not be in SMS/text message form/format.

In some embodiments, the predetermined and/or deterministic commands/instructions that a given authorized stakeholder are, via the HIS 400 (such as, but not limited to, SMS/text message, instant messaging, web alerts, mobile phone notifications, mobile app alerts), directly or indirectly transmitting to NINCE 367 may include one or more of the following: for the given monitoring-device 100 to report back its current status; for the given monitoring-device 100 to report back its metadata/specifications (such as, but not limited to, model type, model number, serial number, chip set, lot number, IP address, MAC address, firmware version, software version, etc.); for the given monitoring-device 100 to change its operating mode; for the given monitoring-device 100 to activate a given sensor 505 type; for the given monitoring-device 100 to deactivate a given sensor 505 type; for the given monitoring-device 100 to change a parameter and/or threshold; for the given monitoring-device 100 to take sensor 505 readings at an increased frequency; for the given monitoring-device 100 to take sensor 505 readings at a decreased frequency; for the given monitoring-device 100 to begin image and/or audio capture; for the given monitoring-device 100 to transmit captured image and/or audio data; for the given monitoring-device 100 to delete data, information, and/or files from its memory 503; to schedule an event/activity at the given monitoring-device 100; to end an event/activity at the given monitoring-device 100; to initiate an audible and/or visual output (e.g., at UX output 205) locally at the given monitoring-device 100; to mute an audible output of the given monitoring-device 100; for the given monitoring-device 100 to perform/execute a self-calibration process; for the given monitoring-device 100 to switch from low power wireless communications 803 to higher power wireless communications 805; for the given monitoring-device 100 to switch from higher power wireless communications 805 to low power wireless communications 803; for the given monitoring-device 100 to receive a firmware and/or software update; for the given monitoring-device 100 to power down and turn off; for NINCE 367 to escalate an event detected a given monitoring-device 100; for NINCE 367 to de-escalate an event detected a given monitoring-device 100; for NINCE 367 to contact or attempt to contact another authorized interested party/stakeholder; for NINCE 367 to report back given a report, a log, a notice, statistics, data, information, sensor 505 reading(s), interpretations thereof, combinations thereof; combinations thereof, and/or the like.

In some embodiments, the two-way NINCE 367 communications content, such as, but not limited to, SMS/text message content, directly or indirectly from NINCE 367, may include data and/or information from a given monitoring-device 100. In some embodiments, the two-way NINCE 367 communications content from NINCE 367 may include interpretations of data and/or information from a given monitoring-device 100. In some embodiments, the two-way NINCE 367 communications content from NINCE 367 may include notices, reports, alerts, alarms, logs, log information, sensor data/readings, combinations thereof, and/or the like. In some embodiments, the two-way NINCE 367 communications content from NINCE 367 may be formatted to include one or more of: text, images, still image captures, video captures, links to web or mobile app pages, spreadsheets, documents, files, as well as other presentation outputs, combinations thereof, and/or the like.

In some embodiments, the two-way NINCE 367 communications content from NINCE 367 may be initiated by one or more of the following: sensor 505 state change; sensor 505 readings exceeding a predetermined parameter/threshold; sensor 505 health/status polling/inquiry; power source 511 change; change in wireless communication protocol/hardware (e.g., switch from low power to higher power or vice versa); authorized interested party/stakeholder (authorized end-user) prompted; timed based (e.g., scheduled and/or programmed); based an outcome/output from a predictive anomaly detection algorithm/AI/machine learning portion of NINCE 367; combinations thereof, and/or like.

In some embodiments, the two-way NINCE 367 communications messaging from NINCE 367 may include a request/demand for a responsive the two-way NINCE 367 communications message from the (authorized) interested party/stakeholder recipient. In some embodiments, the request/demand in the two-way NINCE 367 communications message from NINCE 367 may be requiring/requesting: a Yes/No or equivalent response; an acknowledgment response; an action cueing word response; an escalation response; a de-escalation response; an approval response; a denied response; combinations thereof, and/or the like—from the (authorized) interested party/stakeholder recipient.

In some embodiments, the two-way NINCE 367 communications (such as SMS/text messaging) control architecture may also be used to automatically or semi-automatically onboard a new end-user (e.g., new interested party/stakeholder, such as, but not limited to, a new tenant 401 or expanding services of an existing tenant 401), including, but not limited to: setting up a new account; providing information for populating the new account; setting up/initializing a given monitoring-device 100 with a given storage-unit 101; assenting to/agreeing to legally binding agreements/contracts (e.g., end-user subscription agreement, privacy policy, terms and conditions, information sharing, combinations thereof, and/or the like); end-user authentication; who may be authorized stakeholders; combinations thereof; and/or the like. In some embodiments, the two-way NINCE 367 communications control architecture may also be used to update an already existing account. In some embodiments, the two-way NINCE 367 communications control architecture may also be used to terminate an end-user (tenant 401) subscription.

In some embodiments, the two-way NINCE 367 communications control architecture may also be executed by voice calls, wherein one or more APIs may convert the given voice call into a the two-way NINCE 367 communications, such as a SMS/text message, or vice versa; such that NINCE 367 may transmit voice calls to authorized stakeholders; and/or the authorized stakeholders may transmit voice calls with commands/instructions to NINCE 367.

In some embodiments, network/cloud 107 may be comprised of at least portions of gateway 361, connection 363, internet 365, and connection 371. In some embodiments, network/cloud 107 may be comprised of at least portions of gateway 361, connection 363, internet 365, connection 371, and servers hosting NINCE 367. In some embodiments, the network/cloud 107 shown in FIG. 1, FIG. 3A, FIG. 3B, FIG. 7B, and FIG. 7C, may be a simplification of at least some of the elements (e.g., gateway 361, connection 363, internet 365, NINCE 367, and connection 371) shown in FIG. 3C. In some embodiments, connections/interfaces in FIG. 3C may be facilitated by one or more predetermined APIs (application program interfaces).

In some embodiments, FIG. 3C may depict a system for controlling communication between at least one monitoring-device 100 and at least one computing-device 373. In some embodiments, such a system may comprise the at least one monitoring-device 100 and a set of instructions (e.g., NINCE 367) non-transitorily stored in memory of at least one server 309. In some embodiments, the at least one monitoring-device 100 may comprise at least one sensor 505 and two radios configured for wireless communications, a primary radio 507*a* and a secondary radio 507*b*, respectively. In some embodiments, the at least one sensor 505 and the two radios may be operatively linked. In some embodiments, the set of instructions (e.g., NINCE 367), through the at least one server 309, may be in communication with both the at least one monitoring-device 100 and the at least one computing-device 373. In some embodiments, the at least one server 309, through control by the set of instructions (e.g., NINCE 367), may be in communication with the Internet 365. In some embodiments, the Internet 365 may be in communication with a connection 363. In some embodiments, the connection 363 may be in communication with gateway 361. In some embodiments, the connection 363 is in communication with cellular connection 383/385. In some embodiments, gateway 361 may be in wireless communication with primary radio 507*a* under certain predetermined conditions. In some embodiments, cellular connection 383/385 may be in wireless communication with secondary radio 507*b* under certain different predetermined conditions. In some embodiments, the set of instructions (e.g., NINCE 367) may cause communications from the set of instructions (e.g., NINCE 367) to the at least one monitoring-device 100 to flow from the at least one server 309 through at least a portion of the Internet 365, then through the connection 363, then through either the gateway 361 or the cellular connection 383/385, and then to the at least one monitoring-device 100. In some embodiments, the at least one monitoring-device 100 may cause communications from the at least one monitoring-device 100 to the set of instructions (e.g., NINCE 367) to flow from the at least one monitoring-device 100 to either the gateway 361 or the cellular connection 383/385, then to the connection 363, then through at least some portion of the Internet 365, and then to the set of instructions (e.g., NINCE 367).

Note, in some embodiments, connection 383/385 may not be a cellular connection, but may be a type of predetermined wireless communication. In some embodiments, connection 383/385 may be wireless communications of one or more of: low power, short range, low bandwidth, higher power, long range, higher bandwidth, combinations thereof, and/or the like.

In some embodiments, the Internet 365 may also in communication with a different cellular connection 371. In some embodiments, this different cellular connection 371 may be in communication with the at least one computing-device 373. In some embodiments, the set of instructions (e.g., NINCE 367) may cause communications from the set of instructions (e.g., NINCE 367) to the at least one computing-device 373 to flow from the at least one server 309 through at least a different portion of the Internet 365, then to the different cellular connection 371, and then to the at least one computing-device 373. In some embodiments, communications from at least one computing-device 373 to the set of instructions (e.g., NINCE 367) may flow from the at least one computing-device 373 to the different cellular connection 371, to at least some different portion of the Internet 365, and then to the at least one server 309 for interaction with the set of instructions (e.g., NINCE 367).

In some embodiments, the certain predetermined conditions may be when the primary radio 507*a* is able to establish a wireless connection with the gateway 361 and the at least one monitoring-device 100 has not received a command to switch over to using the secondary radio 507*b*, wherein the wireless connection between the primary radio 507*a* and the gateway 361 may be a low power wireless connection using a low power wireless communication protocol. In some embodiments, the low power wireless connection/communications between primary radio 507*a* and gateway 361 may be lower power than the connection 383/385. See also FIG. 8A and FIG. 8B.

In some embodiments, the certain different predetermined conditions may be when primary radio 507*a* is either unable to establish a wireless connection with gateway 361 or the at least one monitoring-device 100 has received a command to switch over to using the secondary radio 507*b*. See also FIG. 8A and FIG. 8B.

In some embodiments, such a radio switch over command may come from the set of instructions (e.g., NINCE 367). In some embodiments, such a radio switch over command may originate from the set of instruction (e.g., NINCE 367) and/or from (an authorized) computing-device 373.

In some embodiments, the system may comprise gateway 361. In some embodiments, gateway 361 may be solar powered. In some embodiments, gateway 361 may part of an ad hoc wireless network. In some embodiments, at least some portion of the ad hoc wireless network may be solar powered. In some embodiments, gateway 361 may be located on storage facility 345, wherein storage facility 345 may include the at least one storage unit 101.

In some embodiments, the set of instructions (e.g., NINCE 367) may be configured to perform one or more of the following: (a) instruct the at least one monitoring-device 100 in how to function; (b) receive information (such as, but not limited to, sensor 505 data) from the at least one monitoring-device 100; (c) interpret at least some of the information received from the at least one monitoring-device 100; (d) convert at least some of the information received from the at least one-monitoring-device 100; (e) transmit at least some of the information from the at least one-monitoring-device 100 that has been received, interpreted, and/or converted by the set of instructions (e.g., NINCE 367) to the at least computing-device 373 (according to the flows of FIG. 3C); (f) receive commands from at least one computing-device 373; (g) execute at least some of the commands received from the at least one computing-device 373 on the at least one server 309; (h) interpret at least some of the commands received from the at least one computing-device 373; (i) convert at least some of the commands received from the at least one computing-device 373; and (j) transmit at least some of the commands from the at least one computing-device 373 that have been received, interpreted, and/or converted by the set of instructions (e.g., NINCE 367) to the at least one monitoring-device 100.

Figure 4:
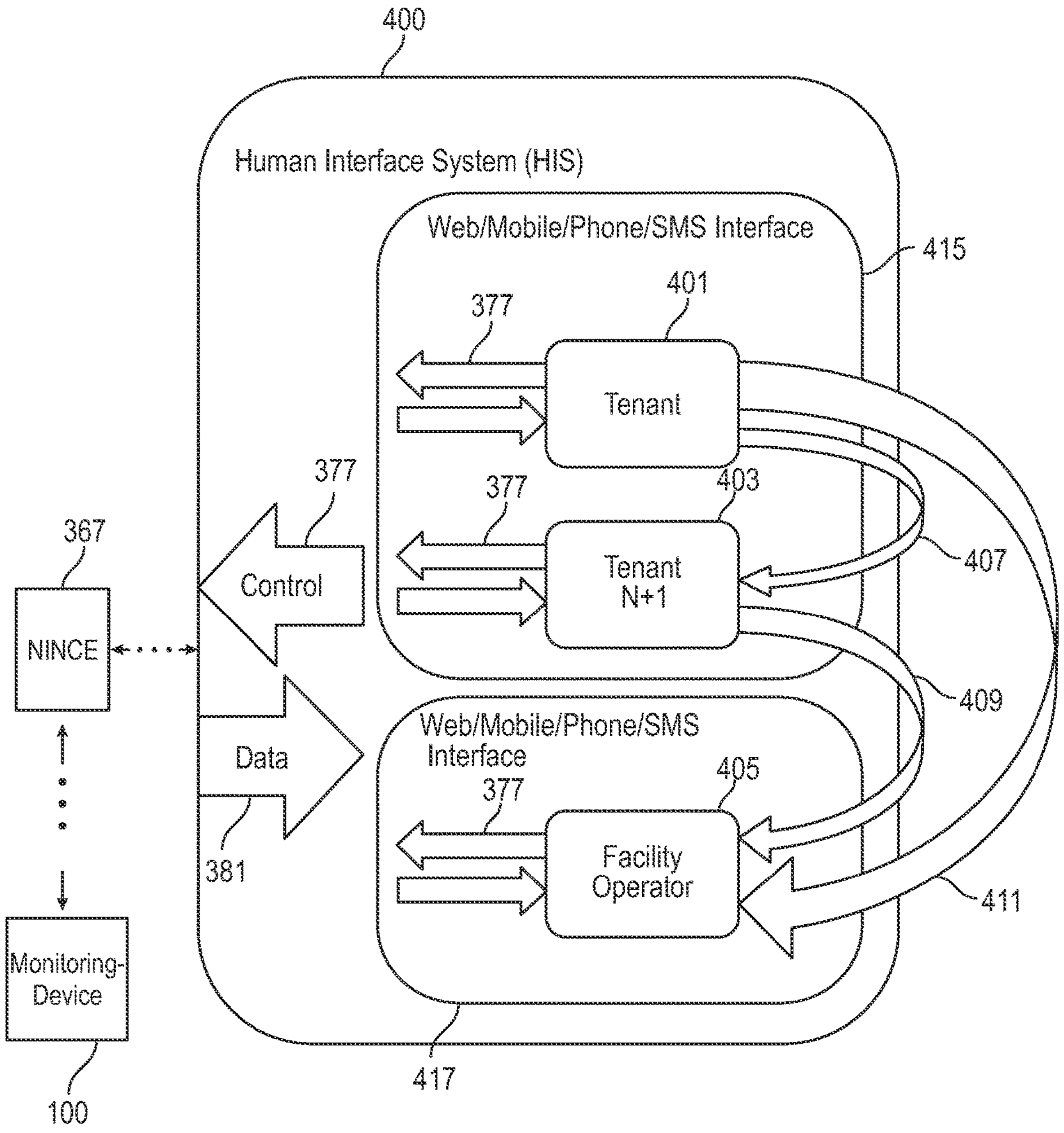
FIG. 4 may be schematic block flow diagram showing application of a decision logic tree where communications between an initial tenant/owner of a given storage unit 101 with a "Network Intelligent Notification & Configuration Engine" ("NINCE") (i.e., proprietary software) may impact communications between the NINCE and other authorized stakeholders (such as, but not limited to, other tenants/owners and/or a facility operator).

FIG. 4 may be schematic block flow diagram showing application of a decision logic tree where communications between an initial tenant (Tenant 401) of a given storage unit 101 with NINCE 367 may impact communications between NINCE 367 and one or more other authorized tenant 401 contacts (which may include trusted escalation contacts, back-up contacts, support personnel, combinations thereof, and/or the like-all specified by tenant 401) (referred to herein as "Tenant N+1" 403); how communications between the tenant 401 authorized contact(s) (Tenant N+1 403) of the given storage unit 101 with NINCE 367 may impact communications between NINCE 367 and the storage unit facility operator 405; and/or how communications between the initial tenant (Tenant 401) of the given storage unit 101 with NINCE 367 may impact communications between NINCE 367 and the storage unit facility operator 405. In FIG. 4, HIS 400 may be shown divided into two of its sub-portions, that of interface to tenant device 415 (e.g., for interfacing with tenant device 303) and that of interface to facility operator device 417 (e.g., for interfacing with facility operator device 305). While other interfaces are not shown in FIG. 4, HIS 400 may have at least one such interface for each computing-device 373 that may be in communication with NINCE 367; or HIS 400 may have at least one such interface for each category of authorized stakeholder that may be in communication with NINCE 367 through their respective computing-devices 373.

For example, and without limiting the scope of the present invention, NINCE 367 may communicate some event/alert/incident/status change/information updates to Tenant 401 pertaining to that Tenant's 401 storage unit 101 from information generated by a monitoring-device 100 installed in that storage unit 101; then depending upon how (or even if) that Tenant 401 responds to the event/alert/incident/status change/information update communication from NINCE 367, NINCE 367 may contact/communicate with Tenant N+1 403 and/or with the Facility Operator 405 for that given storage unit 101. For example, and without limiting the scope of the present invention, the event/alert/incident/status change/information update may be of a possible fire, flooding, break-in, natural disaster, intrusion, device malfunction, sensor 505 data (e.g., motion, temperature, humidity, water, etc.) that exceeds established real-time sensor data thresholds, combinations thereof, and/or the like. In some embodiments, Tenant N+1 403 may be a tenant of the storage unit 101 along with the Tenant 401, i.e., Tenant 401 and Tenant N+1 403 may be joint or co-tenants together of the same storage unit 101. In some embodiments, Tenant N+1 may be a tenant of a different storage unit 101 from that of Tenant 401's storage unit 101. In some embodiments, the storage unit 101 of Tenant 401 and the storage unit 101 of Tenant N+1 may be adjacent or proximate storage units, physically close together. For example, and without limiting the scope of the present invention, after NINCE 367 communicates the event/alert/incident/status change to Tenant 401, NINCE 367 may be expecting some communication back from Tenant 401 (such as, but not limited to, an escalation command, a de-escalation command, an ignore command, etc.). Depending on how (or if) Tenant 401 responds to the NINCE 367 communication of the event/alert/incident, NINCE 367 may then contact/communicate with Tenant N+1 403 and/or with the Facility Operator 405. In some embodiments, in these above examples, the decision logic may be deterministic, based on: response communications from Tenant 401, from Tenant N+1 403, from Facility Operator 403, and/or from some other authorized stakeholder; lack of response communications from Tenant 401, from Tenant N+1 403, from Facility Operator 403, and/or from some other authorized stakeholder; timing of a response communication from Tenant 401, from Tenant N+1 403, from Facility Operator 403, and/or from some other authorized stakeholder; combinations thereof, and/or the like.

Continuing discussing FIG. 4, in some embodiments, hierarchy relationship 407, hierarchy relationship 409, and hierarchy relationship 411 (shown as arrows in the right side of FIG. 4) may not be communications pathways, but rather may illustrate the hierarchal relationships, based on deterministic logic as noted above. For example, and without limiting the scope of the present invention, hierarchy relationship 407 may indicate whether and how NINCE 367 communicates with Tenant N+1 403 may depend upon how, what, if, and/or when Tenant 401 responds/communicates with NINCE 367. For example, and without limiting the scope of the present invention, hierarchy relationship 409 may indicate whether and how NINCE 367 communicates with Facility Operator 405 may depend upon how, what, if, and/or when Tenant N+1 403 responds/communicates with NINCE 367. For example, and without limiting the scope of the present invention, hierarchy relationship 411 may indicate whether and how NINCE 367 communicates with Facility Operator 405 may depend upon how, what, if, and/or when Tenant 401 responds/communicates with NINCE 367.

Also note as an example in FIG. 4, and without limiting the scope of the present invention, the HIS of Tenant 401 and/or of Tenant N+1 403, of communications between that Tenant 401 and/or that Tenant N+1 403 and NINCE 367, may be via SMS messaging (and/or text messaging) via their associated tenant device 303; and communications from NINCE 367 to that Tenant 401 and/or that Tenant N+1 403, received at the given tenant device 303, may also be via SMS messaging (and/or text messaging). However note, in some embodiments, communications between Tenant 401 (and/or Tenant N+1 403) with NINCE 367, may not be limited to just SMS messaging (and/or text messaging); that is, web portals via a web browser, mobile app, instant messaging, voice commands with phone calls, combinations thereof, and/or the like may also be interface means of the HIS 400.

Also note as an example in FIG. 4, and without limiting the scope of the present invention, the HIS of Facility Operator 405 of communications between Facility Operator 405 and NINCE 367, may be via web portal (via web browser), mobile app, voice command with phone calls, SMS messaging (and/or text messaging), combinations thereof, and/or the like via their associated facility operator device 305; and communications from NINCE 367 to that Facility Operator 405, received at the given facility operator device 305, may also be via web portal (via web browser), mobile app, voice command with phone calls, SMS messaging (and/or text messaging), combinations thereof, and/or the like.

Note, in some embodiments, in FIG. 4 the hierarchy relationship 407 between Tenant 401 and Tenant N+1 403 may not be direct communications; rather, any communications between Tenant 401 and Tenant N+1 403 may be routed through and controlled by NINCE 367, according to the flows shown in FIG. 3C.

Similarly, in some embodiments, in FIG. 4 the hierarchy relationship 409 between Tenant N+1 403 and Facility Operator 405 may not be direct communications; rather, any communications between Tenant N+1 403 and Facility Operator 405 may be routed through and controlled by NINCE 367, according to the flows shown in FIG. 3C.

Similarly, in some embodiments, in FIG. 4 the hierarchy relationship 411 between Tenant 401 and Facility Operator 405 may not be direct communications; rather, any communications between Tenant 401 and Facility Operator 405 may be routed through and controlled by NINCE 367, according to the flows shown in FIG. 3C.

In some embodiments, depending on the interaction (such as, but not limited to, a positive response, a "yes" response, a negative response, a "no" response, an acknowledgment, and/or a specific [and predetermined] action cue word) of one authorized person (such as, but not limited to, Tenant 401, Tenant N+1 403, Facility Operator, maintenance staff, insurance personnel, law enforcement personnel, fire department personnel, first responder personnel, etc.), the system and/or the method (e.g., NINCE 367) may respond and provide interaction/communications (such as, but not limited to, notices, messaging, alerts, responses) to other authorized persons (such as, but not limited to, other: Tenant 401, Tenant N+1 403, Facility Operator, insurance personnel, law enforcement personnel, fire department personnel, first responder personnel, etc.), with optional escalation or de-escalation, for increased real-time (or near real-time) responsiveness and/or intelligence. Further in FIG. 4, communications from NINCE 367 to the other authorized persons, may occur sequentially or may occur concurrently.

Figure 5A:
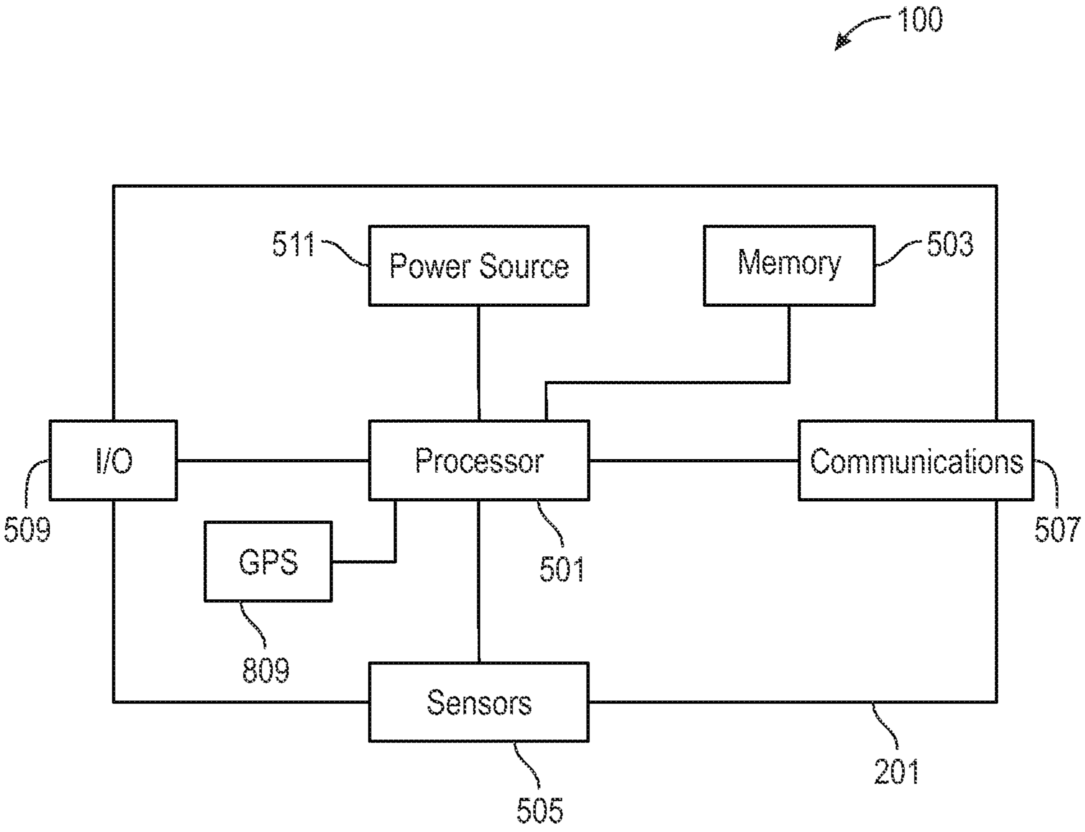
FIG. 5A may depict a block diagram of hardware/electronic/circuit elements of a given monitoring-device.

FIG. 5A may depict a block diagram showing at least some electronics of a given monitoring-device 100. In some embodiments, monitoring-device 100 may be a computer. In some embodiments, monitoring-device 100 may be a computing device. In some embodiments, one or more monitoring-devices 100 may be used to monitor its given storage space 101.

Continuing discussing FIG. 5A, in some embodiments, monitoring-device 100 may comprise one or more circuits. In some embodiments, monitoring-device 100 may comprise a printed circuit board (PCB) or may comprise one or more such PCBs. In some embodiments, the electronics and/or electronic hardware of monitoring-device 100 may be implemented via one or more PCBs. In some embodiments, monitoring-device 100 may comprise one or more of the following sub-hardware elements (components): one or more processors 501, one or more memory 503, one or more sensors 505, one or more communications 507 (for external communications), I/O means 509, and power source 511. "I/O" herein may refer to "inputs/outputs" as is commonly known in the computing and electronics industries. In some embodiments, the one or more processors 501 may be electrically and/or optically coupled (e.g., via wiring, cabling, bus, and/or the like) with the one or more memory 503, one or more sensors 505, one or more communications 507, I/O means 509, and power source 511. In some embodiments, at least some of processors 501, one or more memory 503, one or more sensors 505, one or more communications 507, I/O means 509, and/or power source 511 may be operationally linked with one another, such as via electrical wired connections. In some embodiments, processor(s) 501, memory 503, sensor(s) 505, primary sensor 505*a*, secondary sensor 505*b*, communications 507, primary radio 507*a*, secondary radio 507*b*, I/O means 509, power source 511, daughter board 513, GPS module 809, portions thereof, combinations thereof, and/or the like of monitoring-device 100 may be implemented via one or more PCBs.

In FIG. 5A, processor 501 may be one or more processors, including one or more central processors and/or one or more processors for graphics. In some embodiments, processor 501 may be in communication with one or more memory 503. In some embodiments, processor 501 may be in communication with one or more sensors 505. In some embodiments, processor 501 may be in communication with communications 507. In some embodiments, processor 501 may be in communication with I/O Means 509. In some embodiments, processor 501 may be in communication with power source 511. In some embodiments, such communications may be facilitated via wired connections for electrical (and/or optical) communications. In some embodiments, processor 501 may receive electrical power necessary for operations from power source 511.

In some embodiments, the one or more sensors 505 may be used to monitor the given storage space 101. In some embodiments, the one or more sensors 505 may be one or more of: motion detection sensors; PIR (passive infrared) sensor (e.g., for detecting motion); acceleration sensor (e.g., accelerometer); inertial sensor; positional sensor; orientation sensor; gyroscope; vibration sensor; storage unit 101 door movement sensor; storage unit 101 door open or closed sensor; storage unit 101 window movement sensor; storage unit 101 window open or closed sensor; storage unit 101 window break sensor; rodent intrusion sensor; touch sensor; change in resistance sensor; change in capacitance sensor; change in magnetic field sensor; temperature sensor; humidity sensor; sound sensor (e.g., one or more microphones); chemical sensor (e.g., to detect odors and/or chemicals); particulate sensor (e.g., to detect smoke or dust); water detection sensor; light sensor (darkness sensor); light level sensor; light of storage unit 101 on or off; location sensor (e.g., GPS module 809 and/or chip); camera(s) coupled to at least one sensor, combinations thereof, and/or the like. In some embodiments, the sound/acoustic sensors (e.g., microphones) may be used for detecting environmental abnormalities/occurrences, such as entry; but also, may be used for voice recognition features and/or functions. In some embodiments, a field of view of the one or more sensors 505 of a given monitoring-device 100 may be directed at a door and/or at a window of the given storage space 101. In some embodiments, the one or more sensors 505 may be used to monitor door and/or window open/closed status, temperature, humidity of the given storage space 101. In some embodiments, the one or more sensors 505 may be used to monitor motion of a door and/or of a window of the given storage space 101. In some embodiments, sensor 505 reading(s) may include time and date information (i.e., a timestamp) of when each given sensor 505 reading(s) was taken/generated. In some embodiments, this timestamp data may be communicated along with the sensor 505 readings data itself.

In some embodiments, the one or more sensors 505 may be used to measure, read, determine, generate, and/or capture sensor data within a controlled space and/or detect an event and/or an occurrence within or in at least some portion of the given storage space 101 being monitored. In some embodiments, that detected event, occurrence, sensor 505 data/reading, timestamp, combinations thereof, and/or the like may be communicated (wirelessly in some embodiments) to one or more of: NINCE 367, computing-device 373, tenant device 303, facility operator device 305, provider device 309, third party device 311, a mobile app, a webpage of a website, wherein this communication may utilize communications 507 of the monitoring-device 100 whose sensors 505 detected the event and/or occurrence.

In some embodiments, the inputs of I/O means 509 of a given monitoring-device 100 may be one or more inputs selected from: inputs from fingerprint-scanner or detector; inputs from a keypad; a touchscreen of monitoring-device 100; buttons of monitoring-device 100; switches of monitoring-device 100; keyboard of monitoring-device 100; stylus of monitoring-device 100; mouse of monitoring-device 100; trackball of monitoring-device 100; touchpad of monitoring-device 100; lever of monitoring-device 100; slide of monitoring-device 100; dials of monitoring-device 100; camera(s) of monitoring-device 100; proximity detectors of monitoring-device 100 (e.g., RFID/NFC/BT reader/receiver/scanner); hardwired electrical power ports (e.g., a USB port or the like) of monitoring-device 100; hardwired data ports (e.g., a USB port or the like) of monitoring-device 100; incoming communications received via communications 507 of monitoring-device 100; microphones of monitoring-device 100; and/or the like. In some embodiments, I/O means 509 may comprise a GPS chip set or GPS-module and/or the like for determining a position (or a location) of monitoring-device 100. In some embodiments, the camera may be have its own microphones.

In some embodiments, the inputs of I/O means 509 of a given monitoring-device 100 may comprise at least one camera configured to capture external images, video, and/or audio from outside of monitoring-device 100. In some embodiments, such camera(s) may be digital. In some embodiments, such data generated and/or captured from such camera(s) may be non-transitorily store in memory 503. In some embodiments, such camera(s) may have infrared capability and/or low visible light image capturing capability.

In some embodiments, the outputs of I/O means 509 may be one or more outputs selected from: monitoring-device 100 external facing light(s); information/content displayed on a monitor, screen (including a touchscreen), or display of monitoring-device 100; readouts of monitoring-device 100; speakers of monitoring-device 100; buzzers, sirens, horns, of monitoring-device 100; bells of monitoring-device 100; whistles of monitoring-device 100; lights (LEDs) of monitoring-device 100 (such as, but not limited to, indicator lighting, alarm lighting, strobe lighting); alarms of monitoring-device 100; scanners of and/or in communication with monitoring-device 100; printers of and/or in communication with monitoring-device 100; outgoing information transmitted via the hardwired port (e.g., a USB port or the like) of monitoring-device 100; outgoing information transmitted via communications 507; at least one locking-means; and/or the like.

Continuing discussing FIG. 5A, in some embodiments, when I/O means 509 may comprise and/or include at least one locking-means, then the at least one locking-means may be configured to lock (and unlock) an object external to monitoring-device 100. In some embodiments, the at least one locking-means 509 may be configured to operate/act on the object external to monitoring-device 100, for example, by locking or unlocking an ability of the object to move. In some embodiments, this object external to monitoring-device 100 may be selected from one or more of: a door, a window, an access panel, a knob, a handle, portions thereof, combinations thereof, and/or the like. In some embodiments, the door, the window, the access panel and/or the like may be hinged (for swing mechanics) and/or sliding. In some embodiments, the at least one locking-means 509 may removably attach to the object (or a portion thereof, such as, but not limited to, a latch, a hasp, a bolt receiver, and/or the like). Thus, when I/O means 509 may comprise and/or include the at least one locking-means 509, then monitoring-device 100 may be an electronic-lock 100 and/or a smart-lock 100. Note, with respect to terminology used herein, when reference numeral "100" is associated with "electronic-lock" and/or "smart-lock," then monitoring-device 100 may comprise the at least one locking-means 509 (and/or 509*a*). In some embodiments, when the at least one locking-means 509 may be electronically actuated, at least some portion of the at least one locking-means 509 may move (such as, but not limited to, a bolt moving). In some embodiments, electronic-lock 100/smart-lock 100 may comprise at least one processor 501, at least one memory/storage 503, at least one sensor 505, at least one antenna/radio 507, at least one locking-means 509, a power source 511, and an enclosure 201. In some embodiments, at least one of the sensor(s) 505 may be configured to monitor a status of the at least one locking-means 509. In some embodiments, electronic-lock 100/smart-lock 100 may be configured to report to users the status of the at least one locking-means 509; thus, electronic-lock/smart-lock 100 is still a monitoring-device as electronic-lock 100/smart-lock 100 may at least monitor the status of the at least one locking-means 509. In some embodiments, the status of the at least one locking-means 509 may comprise locked or unlocked. In some embodiments, electronic-lock 100/smart-lock 100 may (also) be configured to monitor (e.g., via sensor(s) 505) and report (e.g., via antenna(s)/radio(s) 507) on the status of the external object (such as, but not limited to, the door, the window, or the like) that the at least one locking-means 509 may lock or unlock, such as, but not limited to, a status of open or closed. In some embodiments, electronic-lock 100/smart-lock 100 may (also) be configured to monitor (e.g., via sensor(s) 505 and/or included circuit monitoring hardware/software) and report (e.g., via antenna(s)/radio(s) 507) on the status of power source 511 (battery 511) and/or of signal strength for wireless/radio communication via at least one antenna/radio 507.

Continuing discussing FIG. 5A, in some embodiments, processor 501 may execute a computer program known as an operating system (e.g., a Microsoft Windows operating system, a Linux operation system, an Apple and/or Macintosh operating system, a mobile computing device operating system, any other suitable operating system, and/or combinations thereof) which may control the execution of other computer programs (e.g., application programs); and may provide for scheduling, input/output (I/O) and other hardware device control, accounting, compilation, storage assignment, data management, memory management, communication; and/or dataflow control. Collectively, processor 501 and its operating system may define a computer platform for which the application programs and other computer program languages may be written in. In some embodiments, processor 501 may also execute one or more computer programs to implement various functions and/or methods of the present invention, such as storage space monitoring software. These computer programs may be written in any type of computer program language, including, but not limited to, a procedural programming language, object-oriented programming language, macro language, script language, and/or combinations thereof.

These computer programs, including the operating system and/or application programs, may be stored (e.g., non-transitorily stored) in memory 503. Note, memory 503 and/or storage 503 may be used interchangeably herein. Memory 503 may store (hold) information on a volatile or non-volatile medium, and may be fixed and/or removable. Memory 503 may include a tangible computer readable and computer writable non-volatile recording medium, on which signals are stored that define a computer program or information to be used by the computer program. The recording medium may, for example, be disk memory, flash memory, flash memory card, micro-SD card, SD card storage, and/or any other article(s) of manufacture usable to record and store information (in a non-transitory fashion). In some embodiments, in operation, processor 501 may cause(s) data (such as, but not limited to, user account data, user profile data, user preference data, event occurrence logs, usage logs, access logs, keystroke logs, camera captures [e.g., photos and/or video], microphone captures [e.g., audio captures], GPS/positional information, movement/translation information, fingerprint scans, fingerprint reference files, usernames, passwords, passcodes, environmental data logs, etc.) to be read from the nonvolatile recording medium into a volatile memory (e.g., a random access memory, or RAM) that may allow for more efficient (i.e., faster) access to the information by the processor 501 as compared against the nonvolatile recording medium. Such RAM memory may be located in/on the memory 503 and/or in/on processor 501. See e.g., FIG. 5A. The processor 501 may manipulate(s) the data within integrated circuit memory and may then copy the data to the nonvolatile recording medium after processing may be completed. A variety of mechanisms are known for managing data movement between the nonvolatile recording medium and the integrated circuit memory element, and the invention is not limited to any mechanism, whether now known or later developed. The invention is also not limited to a particular processing unit (e.g., processor 501) or storage unit (e.g., memory 503).

Note, each and every method and/or step discussed herein and as depicted in the figures may be implemented as non-transitory computer-readable medium including software code executable by a processor, such as processor 501. That is, such non-transitory computer-readable medium may be the one or more memory 503 storage units. That is, such a processor may be processor 501; or alternatively, processor 501 may comprise such a processor.

The space monitoring software may be non-transitorily stored in memory 503. In some embodiments, the storage space monitoring software may be distributed across several and different memory 503's of a single monitoring-device 100. In some embodiments, the storage space monitoring software may be distributed across several and different memory 503*s* of several and different monitoring-devices 100. In some embodiments, some portions of the storage space monitoring software (e.g., a user GUI or user cookie, user's data or portion thereof) may be non-transitorily stored in memory 503 of computing-device(s), such as, tenant device 303; wherein other portions of the storage space monitoring software (e.g., user account data, user profile data, user preference data, event occurrence logs, usage logs, access logs, keystroke logs, camera captures [e.g., photos and/or video], microphone captures [e.g., audio captures], GPS/positional information, movement/translation information, fingerprint scans, fingerprint reference files, usernames, passwords, passcodes, environmental data logs, etc.) may be non-transitorily stored in memory 503 of a computing-device, such as, but not limited to, tenant device 303, facility operator device 305, provider device 309, third-party device 311, hub 341, and/or local audible indicator 343. Wherein yet further other portions the storage space monitoring software (e.g., admin's GUI or admin's cookie) may be non-transitorily stored in memory 503 of a computing-device that may be facility operator device 305 and/or provider device 309.

New and/or updates to code, program, software applications, operating system, firmware, and/or the storage space monitoring software may be saved non-transitorily onto memory 503 using I/O means 509 (e.g., communication port 207) and/or using communications 507 (e.g., primary radio 507*a* and/or secondary radio 507*b*).

Continuing discussing FIG. 5A, in some embodiments, processor 501 may also be in communication with communications 507. In some embodiments, processor 501 may control communications 507, depending upon the instructions that processor 501 may be processing/executing. In some embodiments, communications 507 may permit external communications between a given monitoring-device 100 and other computing-devices 373, such as, but not limited to, tenant device 303, facility operator device 305, provider device 309, third-party device 311, hub 341, local audible indicator 343, gateway 361, connection 363, NINCE 367, and/or cellular network 801 (see e.g., FIG. 3A, FIG. 3B, FIG. 3C, and FIG. 8B). In some embodiments, wireless communications from a given monitoring-device 100 that may be utilizing communications 507 may include battery level information and/or signal strength level information. In some embodiments, communications 507 may permit communication between a given monitoring-device 100 and other computing-devices that are not part of that given monitoring-device 100 (e.g., computing-devices 373, tenant device 303, facility operator device 305, provider device 309, third-party device 311, hub 341, local audible indicator 343, gateway 361, connection 363, NINCE 367, and/or cellular network 801); and/or that may not be under the control of a given monitoring-device 100. In some embodiments, communications 507 may permit communication between a given monitoring-device 100 and another different monitoring-device 100. In some embodiments, use of and/or inclusion of communications 507 may facilitate ease of installation for a given monitoring-device 100 as no wiring and/or cabling may be necessary for installation.

In some embodiments, communications 507 may comprise one or more radios and/or one or more antennas to facilitate wireless communications, such as, low power wireless communications, short range wireless communications, LP WAN, LoRa, SigFox, WiFi (Wi-Fi), BT, 802.15, BLE Mesh, ISM radio, Bluetooth, ZigBee, cellular, RFID, NFC, a predetermined wireless communication protocol, a higher power wireless communication protocol, a longer range wireless communication protocol, combinations thereof, and/or the like. In some embodiments, communications 507 may comprise at least one Bluetooth chipset and/or the like. In some embodiments, communications 507 may comprise a network card and/or a network adapter. In some embodiments, communications 507 may be a network card and/or a network adapter. In some embodiments, communications 507 may be in wired and/or wireless communications with the Internet, WAN (wide area network), LAN (local area network) (see e.g., cloud 107 in FIG. 3A). In some embodiments, communications between a given monitoring-device 100 that may rely upon and/or utilize communications 507 and one or more of: another different monitoring-device 100, tenant device 303, facility operator device 305, provider device 309, third-party device 311, hub 341, and/or local audible indicator 343—may be routed through such a network (see e.g., cloud 107 in FIG. 3A). In some embodiments, communications between a given monitoring-device 100 that may rely upon and/or utilize communications 507 and one or more of: another different monitoring-device 100, tenant device 303, facility operator device 305, provider device 309, third-party device 311, hub 341, and/or local audible indicator 343 may be direct and not utilize cloud 107. In some embodiments, communications 507 may provide for non-wired communications to and from a given monitoring-device 100.

In some embodiments, communications 507 may comprise one or more radios and/or antennas to facilitate reading, interrogating, and/or scanning of RFID tags (and/or NFC tags or BT); wherein "RFID" may refer to radio frequency identification and "NFC" may refer to near field communication. In some embodiments, RFID and/or NFC communication may include Bluetooth tags. In some embodiments, such RFID tags and/or NFC tags and/or emitters may emanate from one or more of tenant device 303, facility operator device 305, provider device 309, third-party device 311, hub 341, and/or audible indicator 343.

In some embodiments, communications 507 may comprise one or more radios and/or antennas that function as RFID tags (and/or NFC tags) of monitoring-device 100. In some embodiments, such RFID tags and/or NFC tags may be read, scanned, and/or interrogated by one or more of tenant device 303, facility operator device 305, provider device 309, third-party device 311, hub 341, and/or audible indicator 343.

In some embodiments, power source 511 may provide electrical power to the main sub-hardware elements and/or electronics of monitoring-device 100. In some embodiments, power source 511 may be one or more batteries, fuel cells, combinations thereof, and/or the like. In some embodiments, power source 511 may be one or more rechargeable batteries. In some embodiments, power source 511 may be one or more backup batteries. In some embodiments, power source 511 may be in electrical communication with one more renewable or energy harvesting sources, such as, but not limited to solar power generators, wind power generator, and/or the like. In some embodiments, the integral portable power source 511 (e.g., such as batteries) may provide sufficient electrical power to a given monitoring-device 100 for normal operations. For example, and without limiting the scope of the present invention, fully charged power source 511 may provide sufficient electrical power for operating monitoring-device 100 for at least three to five times longer than the average expected use duration of the transitory self-storage tenants 401. For example, and without limiting the scope of the present invention, fully charged power source 511 may provide sufficient electrical power for operating monitoring-device 100 for three to eight years, in some embodiments and/or in some use scenarios. In some embodiments, use of and/or inclusion of power source 511 (e.g., when power source 511 may be one or more batteries) may facilitate ease of installation for a given monitoring-device 100 as no wiring and/or cabling may be necessary for installation to provide electrical power to the monitoring-device 100.

In some embodiments, power source 511 may be one or more AC/DC adapters or electrical power conditioners allowing monitoring-device 100 to received standardized AC electrical power from wired power source.

The main sub-hardware elements of a given monitoring-device 100, including their workings and configurations, are well known in the relevant computing and electronics industries and such information is incorporated herein by reference.

In some embodiments, monitoring-device 100 may further comprise enclosure 201. In some embodiments, enclosure 201 may house the circuits, PCBs, electronics, hardware, sub-hardware elements (components) of monitoring-device 100. In some embodiments, enclosure 201 may house one or more of: processors 501, memory 503, sensors 505, communications 507, I/O means 509, and/or power source 511. In some embodiments, at least some portions of processors 501, memory 503, sensors 505, communications 507, I/O means 509, and/or power source 511 may be located on an exterior of enclosure 201. In some embodiments, at least some portions of processors 501, memory 503, sensors 505, communications 507, I/O means 509, and/or power source 511 may be at least partially extend from the exterior of enclosure 201. In some embodiments, at least some portions of processors 501, memory 503, sensors 505, communications 507, I/O means 509, and/or power source 511 may be accessible from the exterior of enclosure 201. In some embodiments, a given enclosure 201 may be rated to handle environmental conditions of −40 degrees Fahrenheit to +140 Fahrenheit. In some embodiments, a given enclosure 201 may be rated to handle environmental conditions of dust and/or high humidity. In some embodiments, a given enclosure 201 may be waterproof to substantially waterproof. In some embodiments, a given enclosure 201 may be IP67 rated and/or the like. In some embodiments, a given enclosure 201 may be about four inches, by four inches, by one inch, plus or minus a quarter of an inch. In some embodiments, a given enclosure 201 may be other predetermined, fixed, and non-variable dimensions. In some embodiments, enclosure 201 may be mounted (removably so in some embodiments) to a surface of storage space 101. In some embodiments, mounting of enclosure 201 to a surface of storage space 101 may be via integral mounting hardware 515. In some embodiments, integral mounting hardware 515 may comprise one or more of: mounting-hole 203, mounting magnet 213, adhesive layer 215, mechanical fastener 217, mechanical fastener 217*a*, mechanical fastener 217*b*, nails, screws, bolts, pins, posts, clips, buttons, snaps, tongue and groove, zippers, plurality of loops and complimentary plurality of loops (e.g., Velcro or Velcro like), magnets, tape, adhesive tape, chemical adhesives (such as, but not limited to, epoxy, glue, and/or the like), combinations thereof, and/or the like. In some embodiments, mounting of enclosure 201 to a surface in storage space 101 may be without the need of any tools. Within storage space 101, its structures are often constructed from ferrous (i.e., steel and/or iron) materials, such as, but not limited to studs, walls, doors, casings, door jambs, window frames, ceilings, beams, strapping, combinations thereof, and/or the like, wherein such structures may serve as the surface of storage space 101 that may be removably attached to mounting magnet 213 of monitoring-device 100. The ability to simply attach the monitoring-devices 100 by hand across a plurality of storage units 101, without any tools, directly in place and equivalent remove, and/or redeploy into other storage space 101 is novel.

In some embodiments, enclosure 201 may be substantially constructed of one or more thermoplastics suitable for injection molding. For example, and without limiting the scope of the present invention, some embodiments of enclosure 201 may be substantially constructed of one or more materials of acrylonitrile-butadiene styrene (ABS), polyvinyl chloride (PVC), polycarbonate, nylon, polypropylene, polyethylene (e.g., HDPE), with or without fillers, with or without colorants, combinations thereof, and/or the like.

Note with respect to the materials of construction, it is not desired nor intended to thereby unnecessarily limit the present invention by reason of such disclosure.

Figure 5B:
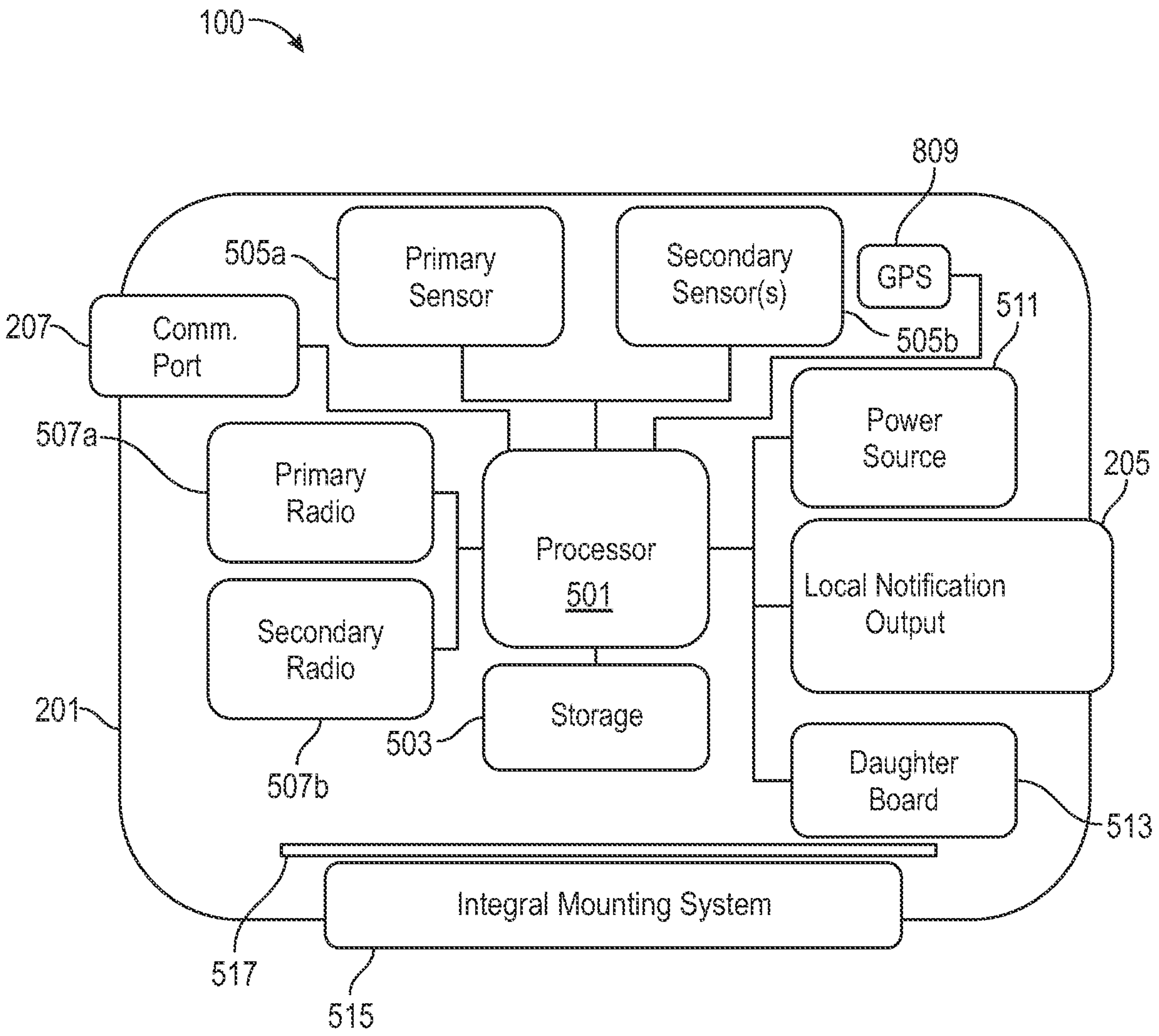
FIG. 5B may depict a block diagram of hardware/electronic/circuit elements of a given monitoring-device.

FIG. 5B may depict a block diagram showing at least some electronics of a given monitoring-device 100. In FIG. 5B, the sensors 505 of the given monitoring-device 100 may comprise at least one primary sensor 505*a* and at least one secondary sensor 505*b*. In some embodiments, primary sensor 505*a* may of a different sensor type as compared to secondary sensor 505*b*. For example, and without limiting the scope of the present invention, in some embodiments, primary sensor 505*a* may be PIR motion detection sensor; and secondary sensor 505*b* may be an accelerometer, a temperature sensor, a humidity sensor, an acoustic sensor, and/or other sensor type. In some embodiments, primary sensor 505*a* and secondary sensor 505*b* may be of a same sensor type.

In some embodiments, at least one of primary sensor 505*a* or secondary sensor 505*b* may be coupled with sensor port 209 in enclosure 201 so that sensor may capture information outside of that given monitoring-device 100.

In some embodiments, primary sensor 505*a* may be coupled with sensor port 209 in enclosure 201 so that primary sensor 505*a* may capture information outside of that given monitoring-device 100; and secondary sensor 505*b* may be located substantially or completely within enclosure 201.

In some embodiments, secondary sensor 505*b* may be coupled with sensor port 209 in enclosure 201 so that secondary sensor 505*b* may capture information outside of that given monitoring-device 100; and primary sensor 505*a* may be located substantially or completely within enclosure 201.

In some embodiments, activation of the at least one secondary sensor 505*b* may depend upon the at least one primary sensor 505*a* obtaining a sensor reading above a predetermined threshold. In some embodiments, activation of the at least one secondary sensor 505*b* may depend upon an escalation event (at the given monitoring-device 100).

Continuing discussing FIG. 5B, in some embodiments, communications 507 of the given monitoring-device 100 may comprise at least one primary radio 507*a* and at least one secondary radio 507*b*. In some embodiments, primary radio 507*a* and secondary radio 507*b* may each comprise its own separate and unique/different antenna configured for wireless communications. In some embodiments, primary radio 507*a* and secondary radio 507*b* may each be configured for a different type of wireless communication.

For example, and without limiting the scope of the present invention, primary radio 507*a* may be configured for low power shorter range wireless communications (such as, but not limited to, LoRa, SigFox, ZigBee, 802.15, BlueTooth, BT-Mesh, BLE, combinations thereof, and/or the like); whereas, secondary radio 507*b* may be configured for higher power longer range communications (comparative to primary radio 507*a*, in some embodiments) (such as but not limited to, cellular, 4G, LTE, 5G, NB-IOT, LTE Cat-M1 as well as LoRa, SigFox, combinations thereof, and/or the like).

For example, and without limiting the scope of the present invention, secondary radio 507*b* may be configured for low power shorter range wireless area network communications (such as, but not limited to, LoRa, SigFox, ZigBee, 802.15, BlueTooth, BT-Mesh, BLE, combinations thereof, and/or the like); whereas, primary radio 507*a* may be configured higher power longer range communications (comparative to secondary radio 507*b* in some embodiments) (such as but not limited to cellular, 4G, LTE, 5G, NB-IOT, LTE Cat-M1, LoRa, SigFox, combinations thereof, and/or the like).

In some embodiments, the low power wireless radio may be preferred over use of a higher power, longer-range wireless radio due to ability to sustain longer battery life; however, if the low power wireless radio is non-functional perhaps due to lack coverage availability, then the higher power wireless radio may be utilized until such time as sufficient satisfactory coverage threshold for the low power wireless radio is sustained. In some embodiments, the low power wireless radio may be preferred over use of a higher power wireless radio which has higher bandwidth; however, if a communication command signal is received to switch over from low power wireless radio to communicate for a short but defined period of duration to communicate and/or stream larger data files (such as video stream or camera images), then the higher power wireless radio may be utilized for an interim period of time but not continuously as to preserve longer battery life. In some embodiments, primary radio 507*a* may comprise an internal antenna that may be completely or mostly located within enclosure 201. In some embodiments, primary radio 507*a* may comprise external antenna 211 that may be at least partially located outside of enclosure 201. In some embodiments, secondary radio 507*b* may comprise an internal antenna that may be completely or mostly located within enclosure 201. In some embodiments, secondary radio 507*b* may comprise external antenna 211 that may be at least partially located outside of enclosure 201.

Continuing discussing FIG. 5B, in some embodiments, the electronics of the given monitoring-device 100 may comprise a daughter board 513. In some embodiments, an additional plug-in board referred to as a daughter board 513 may be operatively linked to processor(s) 501 and/or to PCBs of monitoring-device 100. Provisions for a plug-in daughter board 513 may be optionally included, in some embodiments, to expand functionality of a baseline monitoring-device 100 without: (1) necessarily requiring a newly sized enclosure 201; (2) including a new baseline PCB design or a different PCB design; (3) triggering increased manufacturing costs for having different tooling for different PCBs and/or different sized enclosures 201; and/or (4) increasing the X-Y dimensions (namely the area/footprint) of the baseline PCB in exchange for decreased/smaller Z-axis dimensions of the baseline PCB.

Continuing discussing FIG. 5B, in some embodiments, the given enclosure 201 may comprise an integral mounting hardware 515. In some embodiments, attached to an exterior of enclosure 201 may be integral mounting hardware 515. In some embodiments, part of an exterior of enclosure 201 may be integral mounting hardware 515. In some embodiments, mounting hardware 515 may the means or at least part of the means as to how a given monitoring-device 100 may be mounted/attached to a substrate of the given storage unit 101. In some embodiments, integral mounting hardware 515 may be selected from one or more of: mounting-hole(s) 203, mounting magnet(s) 213, adhesive layer 215, mechanical fastener 217, mechanical fastener 217*a*, mechanical fastener 217*b*, combinations thereof, and/or the like.

Continuing discussing FIG. 5B, in some embodiments, integral mounting hardware 515 may be separated (segregated) from the electronics of the given monitoring-device 100 by magnetic shielding 517. In some embodiments, magnetic shielding 517 may be disposed of between integral mounting hardware 515 and the electronics of the given monitoring-device 100.

Figure 5C:
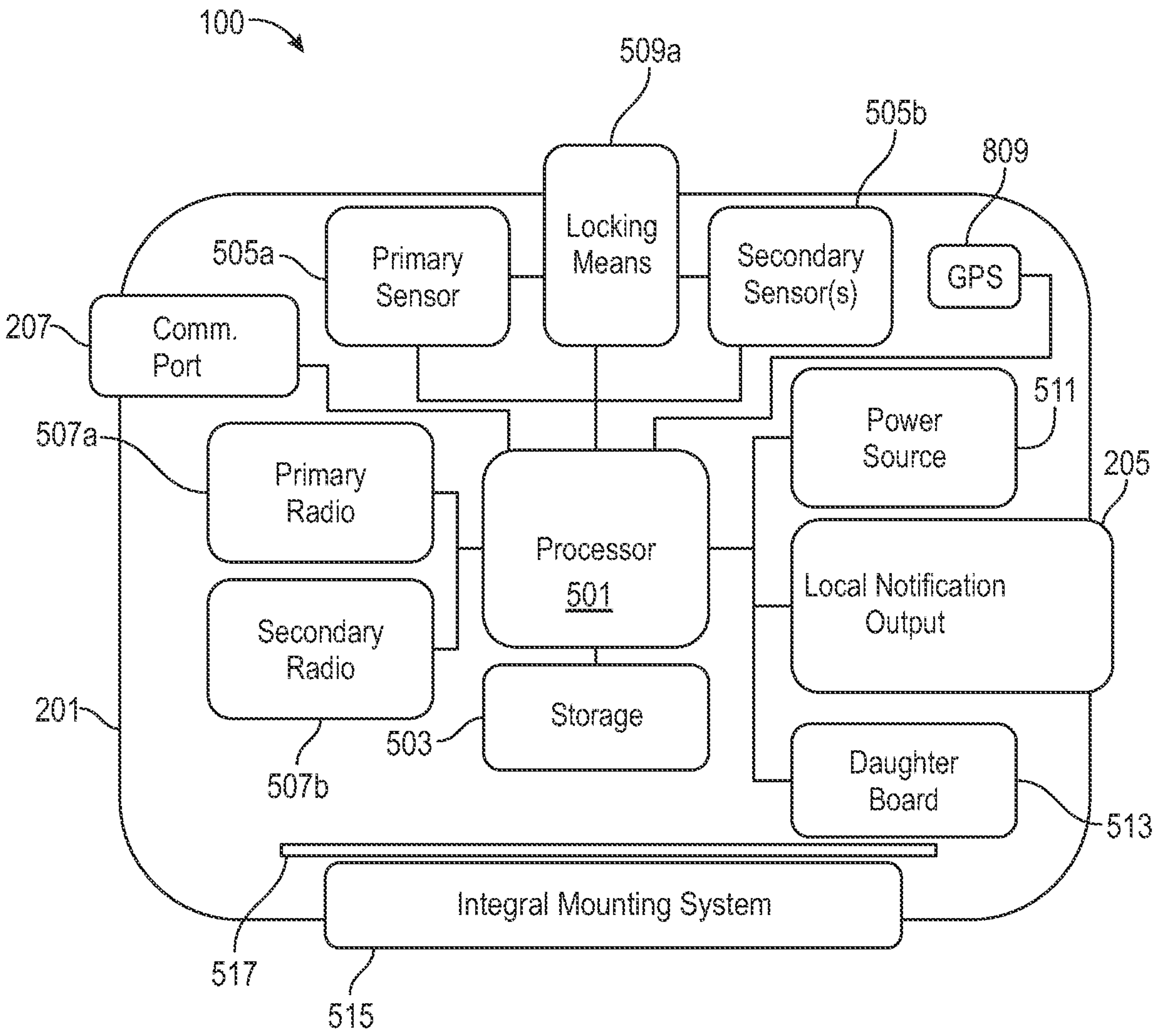
FIG. 5C may depict a block diagram of hardware/electronic/circuit elements of a given locking-device.

FIG. 5C may show a block diagram of electronic-lock 100 and/or smart-lock 100. In some embodiments, electronic-lock 100/smart-lock 100 may comprise at least one processor 501, at least one memory/storage 503, at least one sensor 505*a*/505*b*, at least one antenna/radio 507*a*/507*b*, at least one locking-means 509*a*, a power source 511, and an enclosure 201. In some embodiments, the at least one locking-means 509*a* may be configured to lock (and unlock) an object external to electronic-lock 100 and/or smart-lock 100. In some embodiments, the at least one locking-means 509*a* may be configured to operate/act on the object external to electronic-lock 100 and/or smart-lock 100, for example, by locking or unlocking an ability of the object to move. In some embodiments, this object external to electronic-lock 100 and/or smart-lock 100 may be selected from one or more of: a door, a window, an access panel, a knob, a handle, portions thereof, combinations thereof, and/or the like. In some embodiments, the door, the window, the access panel and/or the like may be hinged (for swing mechanics) and/or sliding. In some embodiments, when the at least one locking-means 509*a* may be electronically actuated, at least some portion of the at least one locking-means 509*a* may move (such as, but not limited to, a bolt moving). In some embodiments, the at least one locking-means 509*a* may removably attach to the object (or a portion thereof, such as, but not limited to, a latch, a hasp, a bolt receiver, and/or the like). In some embodiments, at least one of the sensor(s) 505*a*/505*b* may be configured to monitor a status of the at least one locking-means 509*a*. In some embodiments, electronic-lock 100/smart-lock 100 may be configured to report to users the status of the at least one locking-means 509*a*; thus, electronic-lock 100/smart-lock 100 is still a monitoring-device as electronic-lock 100/smart-lock 100 may at least monitor the status of the at least one locking-means 509*a*. In some embodiments, the status of the at least one locking-means 509*a* may comprise locked or unlocked. In some embodiments, electronic-lock 100/smart-lock 100 may (also) be configured to monitor (e.g., via sensor(s) 505*a*/505*b*) and report (e.g., via antenna(s)/radio(s) 507*a*/507*b*) on the status of the external object (such as, but not limited to, the door, the window, or the like) that the at least one locking-means 509*a* may lock or unlock, such as, but not limited to, a status of open or closed. In some embodiments, electronic-lock 100/smart-lock 100 may (also) be configured to monitor (e.g., via sensor(s) 505*a*/505*b* and/or included circuit monitoring hardware/software) and report (e.g., via antenna(s)/radio(s) 507*a*/057*b*) on the status of power source 511 (battery 511) and/or of signal strength for wireless/radio communications at the at least one antenna/radio 507*a*/507*b*.

In some embodiments of electronic-lock 100/smart-lock 100, the integral mounting system 515 may be also be included, omitted, or optional. In some embodiments, because the at least one locking-means 509*a* may removably attach to the object (or a portion thereof), there may be no need for the integral mounting system 515.

As noted above, in some embodiments, monitoring-device 100 may be an electronic-lock 100 and/or a smart-lock 100. In some embodiments, monitoring-device 100, as an electronic-lock 100 and/or as a smart-lock 100, may comprise a mechanical lock 509/509*a* (e.g., a mechanical locking-means 509/509*a*) whose mechanical unlocking may be controlled with electronics of the given monitoring-device 100. In some embodiments, the mechanical lock 509/509*a* (e.g., the mechanical locking-means 509/509*a*) of monitoring-device 100, as an electronic lock and/or as a smart lock, may comprise and/or may be one or more of: a padlock, a disc lock, a cylinder lock, a latch/hasp lock, a door lock, a vending/T-handle lock, a bike lock, a motorcycle lock, a RV lock, a dead bolt, a knob lock, a door handle lock, a lever handle lock, a cam lock, a wall mounted lock, a rim latch lock, a cabinet lock, a container lock, a locker lock, a lockout lock, portions thereof, combinations thereof, and/or the like. In some embodiments, such an electronic-lock 100 and/or smart-lock 100 may be configured to be used in one or more of the following use cases: where multi-party access is needed/desired (e.g., for locking package drops, key returns, and/or the like); for locking access doors/windows to self-storage units; for locking access doors/windows to warehouses; for locking lockers; for locking storage lockers; for locking Amazon drop-off/pick-up lockers; for locking trunks; for locking containers; for locking access doors/windows to vacant buildings; for locking access doors/windows of Air BNB rentals; for locking access doors/windows to hotel/motel rooms; for locking access doors/windows to moving trucks; for locking access doors/windows to moving storage PODs; for locking access doors/windows to cargo containers; for locking access doors/windows to shared warehousing space; for locking doors; for locking gates; for locking cabinets; for locking drawers; for locking windows; for locking valves; for locking up containers within any such controlled space (for transitory use) 101; portions thereof; combinations thereof; and/or the like.

In some embodiments, the electronics of the monitoring-device 100 (electronic-lock 100/smart-lock 100) may comprise at least one locking-means 509/509*a* that may be configured for remotely locking or unlocking an access-means of the controlled space 201. In some embodiments, the access-means is selected from: a door to the controlled space 201, a window to the controlled space 201, an access-panel to the controlled space 201, a door-knob to the controlled space 201, a handle to the controlled space 201, or a container within the controlled space 201. In some embodiments, the monitoring-device 100 (electronic-lock 100/smart-lock 100) may provide controlled access to the access-means of the controlled space 201.

Note, unless otherwise explicitly stated, discussions of monitoring-device 100, systems that may comprise at least one monitoring-device 100, methods that may use at least one monitoring-device 100, NINCE 367, text/SMS messaging user interfaces, non-pairing needed, no mobile app needed, no NFC needed, and/or the like, may each and all be applicable to use, control, functionality, and/or operation of electronic-lock 100 and/or smart-lock 100.

Figure 6A:
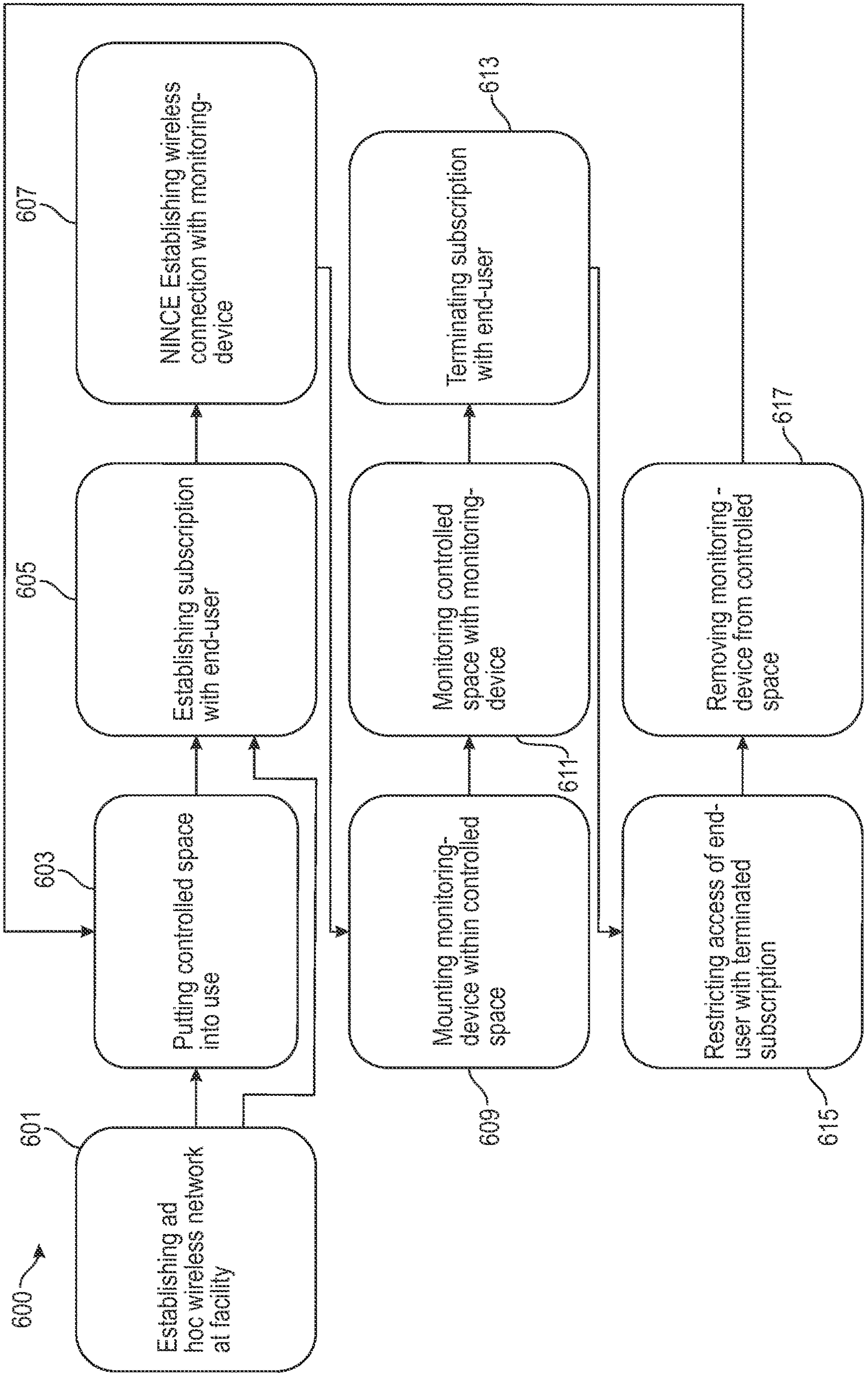
FIG. 6A may depict at least some steps in a flow diagram of a method for establishing messaging based storage unit monitoring (e.g., SMS messaging or other two-way communication mechanisms such as, but not limited to, web alerts/notifications, mobile app notification, and/or voice phone).

FIG. 6A may depict a flow diagram of at least some steps for a method 600. In some embodiments, method 600 may be a method for establishing messaging based self-storage unit monitoring. In some embodiments, method 600 may be a method for establishing messaging based storage unit monitoring by just-in-time installing monitoring-device(s) 100 at a time of end-user (tenant 401) demand (need). In some embodiments, method 600 may utilize at least one monitoring-device 100 (mounted inside a given storage unit 101) and NINCE 367. In some embodiments, user interface with method 600 may be via that user's computing-device 373. In some embodiments, method 600 may comprise: step 601, step 605, step 607, step 609, and step 611. In some embodiments, method 600 may comprise: step 601, step 603, step 605, step 607, step 609, step 611, step 613, step, 615, and optionally in some embodiments, step 617. In some embodiments, method 600 may comprise one or more of: step 601, step 603, step 605, step 607, step 609, step 611, step 613, step, 615, or step 617. In some embodiments, steps of method 600 need not occur in sequential order of their respective reference numerals.

In some embodiments, method 600 may not comprise step 603, as step 603 may occur outside of method 600.

Continuing discussing FIG. 6A, in some embodiments, step 601 may be a step of setting up an ad hoc wireless network at storage facility 345 that has at least one storage unit 101, wherein that at least one storage unit 101 is intended to be monitored by at least one monitoring-device 100. In some embodiments, the ad hoc wireless network may include gateway 361. In some embodiments, the ad hoc wireless network (with gateway 361) may already exist at storage facility 345. In some embodiments, completion of step 601 may transition method 600 into step 603. In some embodiments, completion of step 601 may transition method 600 into step 605, e.g., when step 603 may already be completed.

Continuing discussing FIG. 6A, in some embodiments, step 603 may be a step of a given storage unit 101 at that storage facility 345 with the now setup ad hoc wireless network, being put into use (e.g., being rented/leased by a given tenant 401). The tenant may desire to remotely monitor that rented/leased storage unit 101 using one or more monitoring-devices 100. In some embodiments, completion of step 603 may transition method 600 into step 605. Also note, in some embodiments, step 603 may have occurred before step 601.

Continuing discussing FIG. 6A, in some embodiments, step 605 may be a step of establishing a subscription with a given end-user, such as, but not limited to, tenant 401 of the rented storage unit 101. In some embodiments, step 605 of establishing a subscription agreement with a tenant 401 of the at least one storage unit 101 may be with respect to using at least one monitoring-device 100 for monitoring of that at least one storage unit 101. In some embodiments, step 605 may be carried out by NINCE 367 receiving required information via HIS 400 (which may be in the form of SMS message, text message, voice call, inputs into a web browser, inputs in a mobile app, instant messaging, combinations thereof, and/or the like) from the prospective end-user (e.g., tenant 401) of that prospective end-user's contact information. In some embodiments, step 605 may occur by the set of instructions (e.g., NINCE 367) receiving tenant information and a tenant affirmation from a computing-device 373 (e.g., tenant device 303) that may be in indirect communication with the at least one server 309, wherein that computing-device 373 may be used by tenant 401. In some embodiments, tenant 401 may use computing-device 373 (e.g., tenant device 303) to provide the required information via HIS 400 to NINCE 367 for establishing the subscription service/agreement. In some embodiments, tenant 401 may be onsite with storage unit 101 and/or with storage facility 345; or tenant 401 may be located remotely from storage unit 101 and/or with storage facility 345—when using HIS 400 to provide the required information to NINCE 367 for establishing the subscription agreement/service. In some embodiments, NINCE 367 may respond by confirming establishment of the subscription with that end-user; and/or NINCE 367 may communicate by requesting further information from the prospective end-user; and/or NINCE 367 may communicate by requesting an acknowledgment of the subscription service from tenant 401. In some embodiments, successful completion of step 605 may be establishment of a subscription service agreement between the end-user (e.g., the tenant) and the provider. In some embodiments, successful completion of step 605 may result in creation of an account for that end-user. In some embodiments, one or more: monitoring-devices 100; storage units 101; and storage facilities may be associated with that account of that end-user. In some embodiments, completion of step 605 may transition method 600 into step 607.

Continuing discussing FIG. 6A, in some embodiments, step 607 may be a step of NINCE 367 establishing a wireless connection with at least one monitoring-device 100, to be associated with that end-user and that end-user account. In some embodiments, step 607 may also be a step of associating that wirelessly connected at least one monitoring-device 100 with a given storage unit 101 and with a given storage facility. In some embodiments, step 607 may be a step of establishing a connection between the set of instructions (e.g., NINCE 367), that non-transitorily resides in memory of at least one server 309 and the at least one monitoring-device 100, using in part either primary radio 507*a* or secondary radio 507*b* of the at least one monitoring-device 100. In some embodiments, step 607 may be a step of linking the subscription agreement with the at least one monitoring-device 100 within NINCE 367. In some embodiments, successful completion of step 607 may result in at least one monitoring-device 100 being wirelessly connected with NINCE 367; and in some embodiments, with that monitoring-device 100 being associated with a given storage unit 101 and with a given storage facility. In some embodiments, completion of step 607 may transition method 600 into step 609.

Continuing discussing FIG. 6A, in some embodiments, step 609 may be a step of mounting/attaching/installing the at least one monitoring-device 100 within the given storage unit 101 associated with that subscribed end-user. In some embodiments, step 609 may be a step of installing at least one monitoring-device 100 into the at least one storage unit 101, wherein the at least one monitoring-device 100 may comprise primary radio 507*a* configured to wirelessly connect to an ad hoc wireless network (and/or gateway 361) using a low power wireless communication protocol, wherein the at least one monitoring-device 100 may comprise secondary radio 507*b* configured to wirelessly connect to connection 383/385, wherein the at least one monitoring-device 100 may comprise at least one sensor 505, wherein primary radio 507*a*, the secondary radio 507*b*, and the at least one sensor 505 may be operatively linked. In some embodiments, step 609 may require that the given at least one monitoring-device 100 has been successfully transported to and within the given storage unit 101. Such transport may be accomplished by the facility operator bringing the given at least one monitoring-device 100 to the given storage unit 101; or by the end-user (or agent thereof) bringing the given at least one monitoring-device 100 to the given storage unit 101. In some embodiments, step 609 may not need any additional tools beyond integral mounting hardware 515. In some embodiments, step 609 may not involve making any wiring connections for electrical power to the given at least one monitoring-device 100; i.e., the given at least one monitoring-device 100 may have its own internal and/or integral power source 511. In some embodiments, step 609 may not involve making any wiring connections for internet/network connectivity for that given at least one monitoring-device 100; i.e., the given at least one monitoring-device 100 may have its own wireless radio(s)/antenna(s) for low power wireless communications (such as, but not limited to, LP WAN, LoRa, BT, ZigBee, etc.) and/or for cellular wireless communications. In some embodiments, successful completion of step 609 may involve the given at least one monitoring-device 100 being mounted/attached/installed within the given storage unit 101. In some embodiments, successful completion of step 609 may involve NINCE 367 receiving an acknowledgment from tenant 401 and/or from facility operator 405, depending upon whether 401 or 405 installed the given at least one monitoring-device 100 in the given storage unit 101, that the given at least one monitoring-device 100 has been properly mounted within the given storage unit 101. In some embodiments, when facility operator 405 may be installing the given at least one monitoring-device 100 in the given storage unit 101, tenant 401 may, through HIS 400 and NINCE 367, request that a communication be transmitted to facility operator 405 asking whether step 609 has been completed; and facility operator 405 via, HIS 400 and NINCE 367, may respond accordingly back to tenant 401. In some embodiments, completion of step 609 may transition method 600 into step 611.

Note, in some embodiments, step 607 and step 609 may be switched, wherein step 605 may transition into step 609, step 609 may transition into step 607, and step 607 may transition into step 611. In some embodiments, step 611 may require successful completion of both step 607 and step 609. In some embodiments, step 611 may require successful completion of step 605, step 607, and step 609.

Continuing discussing FIG. 6A, in some embodiments, step 611 may be a step of the given at least one monitoring-device 100 monitoring that given storage unit 101. In some embodiments, step 611 may be a step of monitoring the at least one storage-unit 101 using the at least one monitoring-device 100, by primary radio 507*a* or secondary radio 507*b* conveying sensor 505 readings from the at least one sensor 505 to the set of instructions (e.g., NINCE 367) operating on the at least one server 309. In some embodiments, during such monitoring, an authorized person (i.e., an authorized stakeholder, such as, but not limited to, tenant 401, facility operator 405, insurance personnel, law enforcement personnel, fire department personnel, first responder personnel, etc.) may interact/communicate both with that given at least one monitoring-device 100 and with NINCE 367 via the HIS 400. In some embodiments, completion of step 611 may transition method 600 into step 613.

Continuing discussing FIG. 6A, in some embodiments, step 613 may be a step of terminating (or suspension) of the subscription with the end-user (e.g., tenant 401). In some embodiments, termination of the subscription may be caused by the end-user, by a facility operator, and/or by the provider of the subscription. In some embodiments, termination may be triggered by a rental/lease period ending, rental/lease not being timely and/or properly paid, subscription not being timely and/or properly paid, a subscription period ending, agreement/contract clause, operation of law, authorized stakeholder conduct, combinations thereof, and/or the like. In some embodiments, completion of step 613 may transition method 600 into step 615.

Continuing discussing FIG. 6A, in some embodiments, step 615 may be a step of restricting access from that end-user with the terminated subscription from interacting with any formerly assigned monitoring-devices 100. In some embodiments, an end-user with a terminated subscription may still have an account and via HIS may still have some limited access to NINCE 367. In some embodiments of method 600, step 615 does not exist, is not part of method 600, or is not necessary for method 600. In some embodiments, completion of step 615 may transition method 600 into step 617.

Continuing discussing FIG. 6A, in some embodiments, step 617 may be a step of (physically) removing any monitoring-devices 100 from the storage unit 101 that has a terminated subscription. In some embodiments, step 617 may result in removed monitoring-devices 100 being made ready for re-deployment (e.g., step 609 and step 607) into use with a new subscription (e.g., step 605) or into use with an existing subscription. In some embodiments, step 617 may be optional. In some embodiments, successful completion of step 617 may transition back into step 603, step 605, step 607, and/or step 609.

Figure 6B:
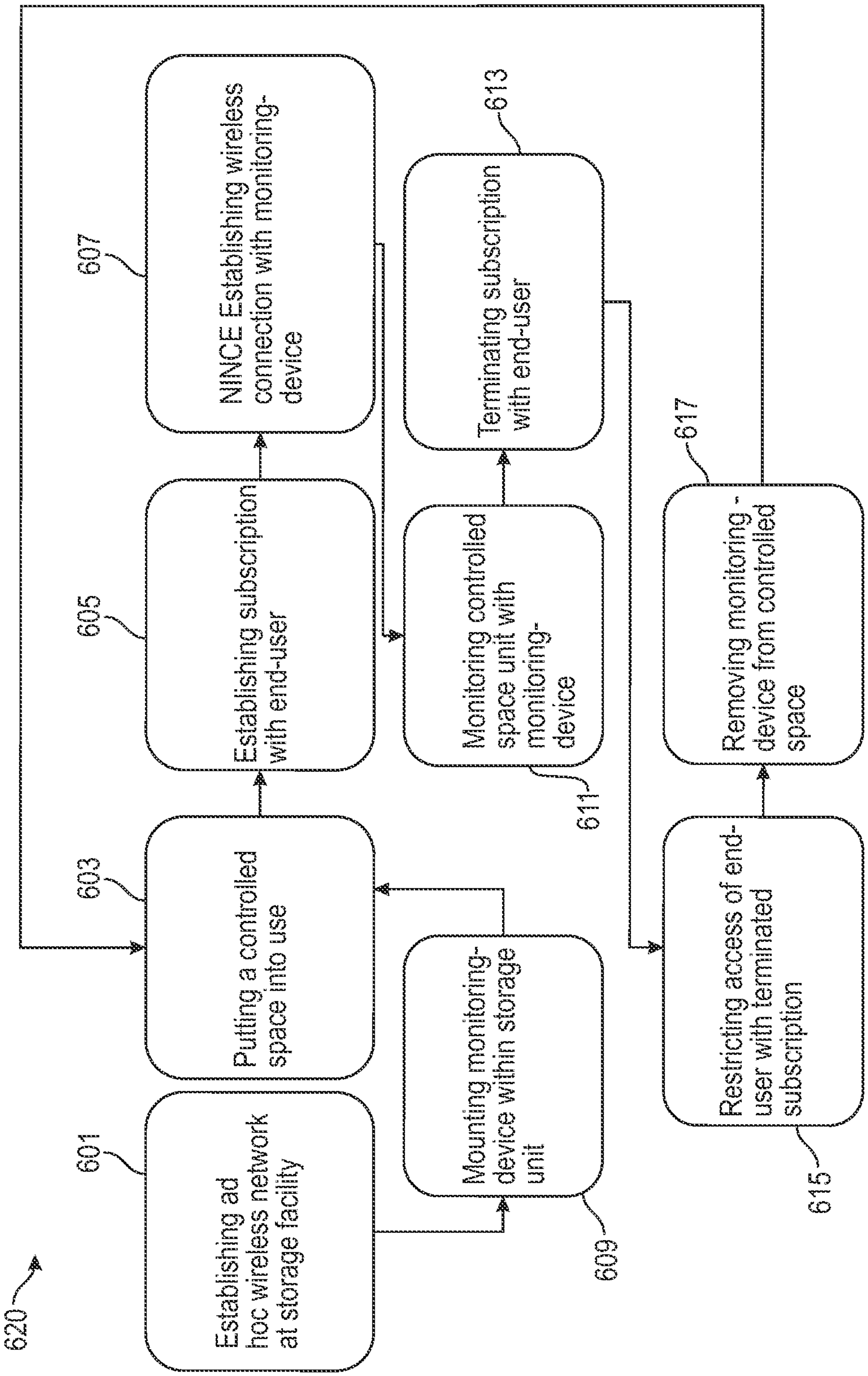
FIG. 6B may depict at least some steps in a flow diagram of a method for establishing messaging based storage unit monitoring (e.g., SMS messaging or other two-way communication mechanisms such as, but not limited to, web alerts/notifications, mobile app notification, and/or voice phone).

FIG. 6B may depict a flow diagram of at least some steps for a method 600. In some embodiments, method 620 may be a method for establishing messaging based storage unit monitoring. In some embodiments, method 620 may be a method for establishing messaging based storage unit monitoring by pre-installing monitoring-device(s) 100 before end-user (tenant 401) demand. In some embodiments, method 620 may utilize at least one monitoring-device 100 (mounted inside a given storage unit 101) and NINCE 367. In some embodiments, user interface with method 620 may be via that user's computing-device 373 via HIS 400. In some embodiments, method 620 may comprise: step 601, step 609, step 605, step 607, and step 611. In some embodiments, method 620 may comprise: step 601, step 609, step 603, step 605, step 607, step 611, step 613, step, 615, and optionally in some embodiments, step 617. In some embodiments, method 620 may comprise one or more of: step 601, step 603, step 605, step 607, step 609, step 611, step 613, step, 615, or step 617. In some embodiments, steps of method 620 need not occur in sequential order of their respective reference numerals. In some embodiments, method 620 may not comprise step 603, as step 603 may occur outside of method 620.

Continuing discussing FIG. 6B, in some embodiments, step 601 may transition into step 609. In some embodiments, the facility operator (that operates that given storage unit facility) may determine which of its storage units 101 are to receive monitoring-devices 100 and may cause those storage units 101 to receive such monitoring-devices 100. In some embodiments, step 609 may transition into step 603 if step 603 has not yet already occurred; or if step 603 has occurred, then step 609 may transition into step 605. In some embodiments, step 603 may transition into step 605. In some embodiments, step 605 may transition into step 607. In some embodiments, step 607 may transition into step 611. In some embodiments, step 611 may transition into step 613. In some embodiments, step 613 may transition into step 615. In some embodiments, successful completion of step 617 may transition back into step 603, step 605, step 607, and/or step 609.

Note, in some embodiments method 600 may differ from method 620. In some embodiments, method 620 may be applicable when a given facility operator of a given storage unit facility wants to utilize monitoring-devices 100 in at least some of its storage units 101, in which case the facility operator may determine which storage units 101 have monitoring-devices 100 and may cause those storage units 101 to have such monitoring-devices 100 mounted/attached/installed within those storage units 101. Whereas, in some applications of method 600, the tenant (end-user) may decide at any time to utilize at least one monitoring-device 100 in their rented storage unit(s) 101.

In some embodiments, in method 600 and/or in method 620 the monitoring-device(s) 100 may be instantly mount-able/unmount-able for deployment/redeployment to other storage units 101; and the monitoring service(s) may be quickly turned on or turned off to end-users (e.g., tenants 401) thereby offering a true pay-as-grow subscription-based scalable service that permits facility operators 405 (or owners of the storage facility 345) to avoid the sunk cost of stranded/under-utilized capital assets.

Furthermore, in some embodiments, the subscription-based methods 600 and/or 620 may also charge a fee to the facility operators 405 (or owners of the storage facility 345) when tenant 401 subscriptions are active and/or collect subscription fees from the tenants 401 directly and/or share a commission with the facility operators 405 (or owners of the storage facility 345) thereby eliminating CAPEX, reducing/eliminating OPEX, and/or practically speaking creating a revenue opportunity for the facility operators 405 (or owners of the storage facility 345) (without the need for capital investments).

Figure 7A:
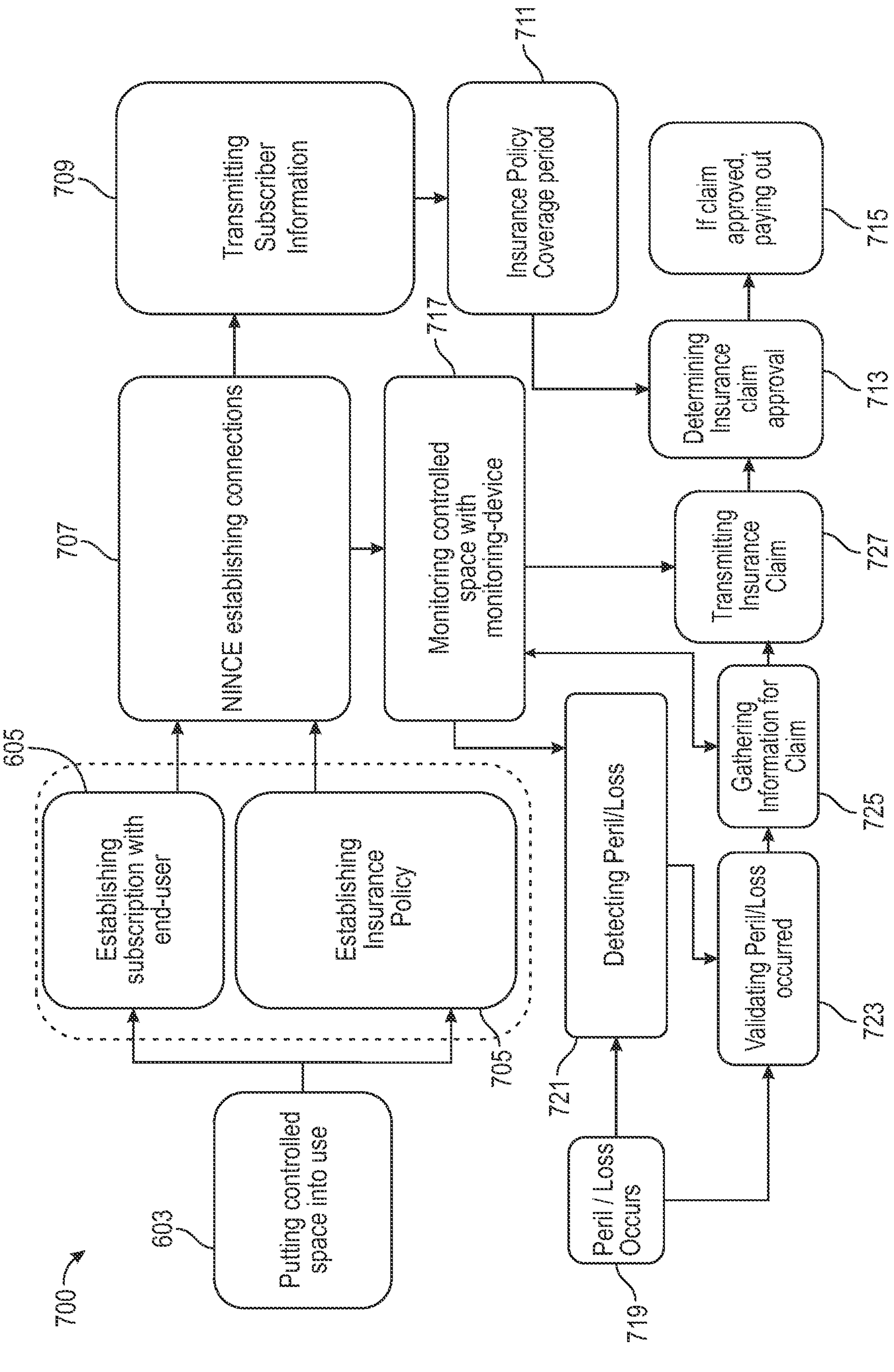
FIG. 7A may depict may depict at least some steps in a flow diagram of a method of processing insurance claim (related to a loss/peril at a monitored storage unit).

FIG. 7A may depict a flow diagram of at least some steps for a method 700. In some embodiments, method 700 may be a method of processing an insurance claim related to a loss or peril that occurred at or within a given storage unit 101 being monitored by at least one monitoring-device 100. In some embodiments, method 700 may utilize at least one monitoring-device 100 (mounted inside a given storage unit 101) and NINCE 367. In some embodiments, method 700 may utilize at least one monitoring-device 100 (mounted inside a given storage unit 101), NINCE 367, and software running on an insurance company's server(s). In some embodiments, the insurance company's server(s) may be a type of computing-device 373 in FIG. 3C; and the insurance company's server(s) that may be a type of computing-device 373 may also be further categorized as a third-party device 311. In some embodiments, communications between NINCE 367 and the insurance company's server(s) may be facilitated by HIS 400 and/or another predetermined software interface of one or more APIs (application program interfaces). In some embodiments, user interface with method 700 may be via that user's computing-device 373 via HIS 400. In some embodiments, computing-device 373 for the tenant may be tenant device 303; computing-device 373 for the facility operator may be facility operator device 305; computing-device 373 for the insurance company personnel may be third-party device 311; and computing-device 373 for the provider of the subscription and monitoring service may be provider device 309.

Continuing discussing FIG. 7A, in some embodiments, method 700 may comprise: step 603, step 605, step 707, step 709, step 609, step 717, step 721, step 723, step 725, and step 727. In some embodiments, step 705, step 711, step 713, and/or step 715 may be outside of (not part of) method 700. In some embodiments, method 700 may comprise: step 603, step 605, step 705, step 707, step 709, step 711, step 713, step 715, step 609, step 717, step 721, step 723, step 725, and step 727. In some embodiments, method 700 may comprise one or more steps of: step 603, step 605, step 705, step 707, step 709, step 711, step 713, step 715, step 609, step 717, step 721, step 723, step 725, or step 727. In some embodiments, at least some steps of method 700 may occur out of numerical order of the steps given assigned reference numerals. In some embodiments, an occurrence of peril/loss at or within the storage unit 101 being monitored with one or more monitoring-devices 100 may be designated "peril/loss occurs 719" and may be a prerequisite for some steps of method 700.

Continuing discussing FIG. 7A, in some embodiments, step 603, step 605, and step 609 in method 700 may be as substantially described above in method 600; except that successful completion of step 603 may transition into both step 605 and into step 705. In some embodiments, step 609 may be prerequisite to step 717 in method 700.

Continuing discussing FIG. 7A, in some embodiments, step 705 may be a step of establishing an insurance policy against loss/peril at or within a given storage unit 101 that is being monitored with one or more monitoring-devices 100. In some embodiments, step 705 may be a step of establishing the insurance policy of the tenant 401 with respect to the at least one storage unit 101 to be monitored or being monitored with at least one monitoring-device 100.

In some embodiments, successful completion of step 705 may require communications between the tenant of the storage unit 101 and the insurance company. Note, in some embodiments, step 705 may occur before, concurrently with, or after step 603 and/or step 605. In some embodiments, successful completion of step 603, step 605, and step 705, may then have method 700 transition into step 707. In some embodiments, step 705 may be outside of method 700, but may be a prerequisite to method 700.

Continuing discussing FIG. 7A, in some embodiments, step 707 may be a step of NINCE 367 establishing relevant connections. In some embodiments, step 707 may comprise NINCE 367 establishing a wireless connection between NINCE 367 and the at least one monitoring-devices 100 that are installed in the given storage unit 101. In some embodiments, step 707 may comprise NINCE 367 establishing a communication connection between NINCE 367 and at least one server of the insurance company 771 (e.g., via APIs). In some embodiments, step 707 may be a step of establishing a connection between the set of instructions (e.g., NINCE 367), that non-transitorily resides in memory of at least one server 309 and the at least one monitoring-device 100, using in part either primary radio 507*a* or the secondary radio 507*b* of the at least one monitoring-device 100. In some embodiments, step 707 may be a step of linking the subscription agreement, the at least one monitoring-device 100, and the insurance policy of tenant 401 with respect to the at least one storage unit 101 being monitored with the at least one monitoring-device 100. In some embodiments, step 707 may comprise NINCE 367 establishing a communication connection between NINCE 367 and at least one computing-device 373 of the facility operator (e.g., at least one facility operator device 305). In some embodiments, upon successful completion of step 707 any of the authorized persons (e.g., the tenant/subscriber, insurance company personnel, facility operator personnel, subscription/monitoring service personnel, etc.) may access/interact (e.g., through HIS) with NINCE 367 and/or any monitoring-devices 100 installed in that given storage unit 101 being monitored with the at least one monitoring-device 100. In some embodiments, successful completion of step 707 may transition method 700 in step 709 and into step 717.

Continuing discussing FIG. 7A, in some embodiments, step 709 may be a step of NINCE 367 electronically transmitting various tenant 401/subscriber information to at least one server of the insurance company 771. In some embodiments, step 709 may be a step of transmitting information of tenant 401, the at least one monitoring-device 100, the at least one storage-unit 101, and a storage facility 345 where the at least one storage unit 101 is located, from the at least one server 309 (from NINCE 367) to at least one server of the insurance company 771 (insurance carrier) of the insurance policy covering at least some of the contents of that storage unit 101. In some embodiments, the tenant 401/subscriber information transmitted may comprise one or more of: name of tenant 401/subscriber; identifying information for that tenant 401/subscriber; biometric information for that tenant 401/subscriber; contact information for that tenant 401/subscriber; storage unit 101 being monitored information (e.g., designation, size, location, characteristics, access information, etc.); storage unit 101 contents information (e.g., the items being insured against loss, the monetary value of loss coverage desired, value of items being insured against loss, etc.); storage facility information (e.g., address, contact information, map); monitoring-devices 100 information (e.g., quantity, designation(s)/name (s), models, model numbers, serial numbers, IP/MAC addresses, etc.) being used in that storage unit 101; combinations thereof, and/or the like. In some embodiments, the insurance company may already have some of this tenant/subscriber information, and for such information the insurance company may use such information for validation and/or cross-referencing purposes. In some embodiments, successful completion of step 709 may result in method 700 transitioning into step 711.

Continuing discussing FIG. 7A, in some embodiments, step 711 may be a step of initiating the insurance policy coverage period for the given storage unit 101 being monitored with at least one monitoring-device 100. In some embodiments, step 711 may be outside of method 700. In some embodiments, step 711 may transition into step 713.

Continuing discussing FIG. 7A, in some embodiments, step 717 may be a step of monitoring the given storage unit 101 with the at least one monitoring-device 100. In some embodiments, step 717 may be a step of monitoring the at least one storage-unit 101 using the at least one monitoring-device 100, by the primary radio 507*a* or the secondary radio 507*b* conveying sensor 505 readings from the at least one sensor 505 to the set of instructions (e.g., NINCE 367) operating on the at least one server 309. Thus, step 717 may be similar to step 611 in method 600; however, in some embodiments, step 717 may also entail (automatically) sharing data from the at least one monitoring-device 100 with the insurance company; and/or insurance company personnel being able to interact/access, through HIS, with NINCE 367 and the at least one monitoring-device 100. In some embodiments, flows occurring in step 717 may follow the flows shown in FIG. 3C and in FIG. 4. In some embodiments, step 717 may yield step 721, step 725, and/or step 727.

Continuing discussing FIG. 7A, in some embodiments, some form of peril/loss may occur 719 at or within the given storage unit 101 being monitored with the at least one monitoring-device 100. In some embodiments, perils maybe loss and/or harm from one or more of burglary, theft, leak, water, flood, storm, rain, snow, sleet, hail, mold, fire, smoke, contamination, wind, tornado, lighting, heat, earthquake, freeze, rodents, combinations thereof, and/or the like. In some embodiments, peril/loss occurring 719, may yield step 721 and/or step 723.

Continuing discussing FIG. 7A, in some embodiments, step 721 may be a step of the at least one monitoring-device 100 detecting the peril/loss (719) that has occurred (or is occurring) at or within the given storage unit 101 being monitored. In some embodiments, step 721 may be a step of detecting the peril/loss (719) event at the at least one storage unit 101 from at least one sensor 505 reading of the at least one monitoring-device 100. In some embodiments, step 721 may be a step of transmitting the detected peril/loss (719) event from the at least one monitoring-device 100 to the set of instructions (e.g., NINCE 367) on the at least one server 309 of the subscription provider. In some embodiments, the at least one monitoring-device 100 may wirelessly transmit data related to a loss/peril 719 event at or within that given storage unit 101 to NINCE 367. In some embodiments, NINCE 367 may automatically reformat/interpret that received data and transmit various data/alters/warnings/notices to the authorized persons through HIS to their respective computing-devices 373. In some embodiments, NINCE 367 may automatically escalate based on the data received at 367 from the at least one monitoring-device 100; and/or NINCE 367 may seek an escalation command from one or more of the authorized persons. In some embodiments, completion of step 721 may be that some form of peril/loss has been detected at or within the given storage unit 101 being monitored with the at least one monitoring-device 100. In some embodiments, step 721 may transition into step 723.

Continuing discussing FIG. 7A, in some embodiments, step 723 may be a step of validating that the detected peril/loss event has actually occurred. In some embodiments, step 723 may entail additional data generation by the at least one monitoring-devices 100, such as, but not limited to, date/time stamp, image and/or audio captures. In some embodiments, step 723 may entail analysis, evaluation, and/or interpretation of data generated by the at least one monitoring-devices 100. In some embodiments, at least some of that analysis, evaluation, and/or interpretation may be carried out by NINCE 367 (e.g., by running various logic and/or algorithms). In some embodiments, at least some of that analysis, evaluation, and/or interpretation may be carried out by one or more of the authorized persons, such as, but not limited to, facility operator 405. In some embodiments, step 723 may entail one or more physical inspections of the given storage unit 101 to confirm the loss/peril event. In some embodiments, such physical inspections may be carried out by one or more of the authorized persons. In some embodiments, once validation/confirmation that peril/loss event has occurred, then step 723 may transition into step 725.

Continuing discussing FIG. 7A, in some embodiments, step 725 may be a step of gathering information for a purpose of initiating/submitting an insurance loss claim to the insurance company. In some embodiments, step 725 may entail an authorized person (e.g., the tenant/insured/subscriber) interacting with HIS to obtain information from NINCE 367 and/or to obtain data from the at least one monitoring-device 100. In some embodiments, step 725 may entail information from physical inspection(s) of the storage-unit 101 and/or its contents. In some embodiments, step 725 may transition into step 727.

Continuing discussing FIG. 7A, in some embodiments, step 727 may be a step of electronically transmitting an insurance loss claim (using HIS 400 in some embodiments) to the insurance company 771. In some embodiments, step 727 may be a step of electronically transmitting the insurance loss claim from the set of instructions (e.g., NINCE 367) on the at least one server to the insurance company 771 (insurance carrier) for review by the insurance company 771. In some embodiments, in step 727, the tenant 401/insured/subscriber may generate/create/submit the insurance loss claim via HIS and their computing-device 373 (tenant device 303); and then NINCE 367 may transmit the electronic/digital insurance loss claim to the at least one server of the insurance claim. In some embodiments, step 727 may yield step 713.

In some embodiments, prior to the step 727, the set of instructions (e.g., NINCE 367) may receive from a computing-device 373 associated with tenant 401 (e.g., tenant device 303), a request for the set of instructions (e.g., NINCE 367) to generate the insurance loss claim. In some embodiments, then the set of instructions (e.g., NINCE 367), with inputs received from the computing-device 373 (e.g., see step 725) associated with tenant 401 (e.g., tenant device 303) and from inputs received from the at least one monitoring-device 100, may generate the insurance loss claim. In some embodiments, then the set of instructions (e.g., NINCE 367) may communicate the generated insurance loss claim to the computing-device 373 associated with tenant 401 (e.g., tenant device 303); and the set of instructions (e.g., NINCE 367) may request an approval from tenant 401 for the set of instructions (e.g., NINCE 367) to electronically transmit the generated insurance loss claim to the insurance company 771. In some embodiments, upon the set of instructions (e.g., NINCE 367) receiving an approval of tenant 401 from the computing-device 373 associated with tenant 401 (e.g., tenant device 303), then the set of instructions (e.g., NINCE 367) may perform step 727.

Continuing discussing FIG. 7A, in some embodiments, step 713 may be a step of the insurance company (insurance carrier) determining if the submitted insurance loss claim will be approved/accepted. In some embodiments, to aid in evaluating the received insurance loss claim, the insurance company, through HIS, may obtain additional information from NINCE 367 and/or from the at least one monitoring-device 100 associated with that storage unit 101. In some embodiments, step 713 may outside of method 700. In some embodiments, step 713 may yield step 715 if the insurance loss claim is approved/accepted.

Continuing discussing FIG. 7A, in some embodiments, step 715 may be a step of the insurance company (insurance carrier) paying out to the policy holder (e.g., the tenant/subscriber) on the approved/accepted insurance loss claim. In some embodiments, step 715 might involve the insurance company 771 (insurance carrier) communicating to the policy holder (e.g., tenant 401) that the insurance claim has been denied or that further information is required to finalize a ruling by the insurance company 771. In some embodiments, step 715 may outside of method 700.

Figure 7B:
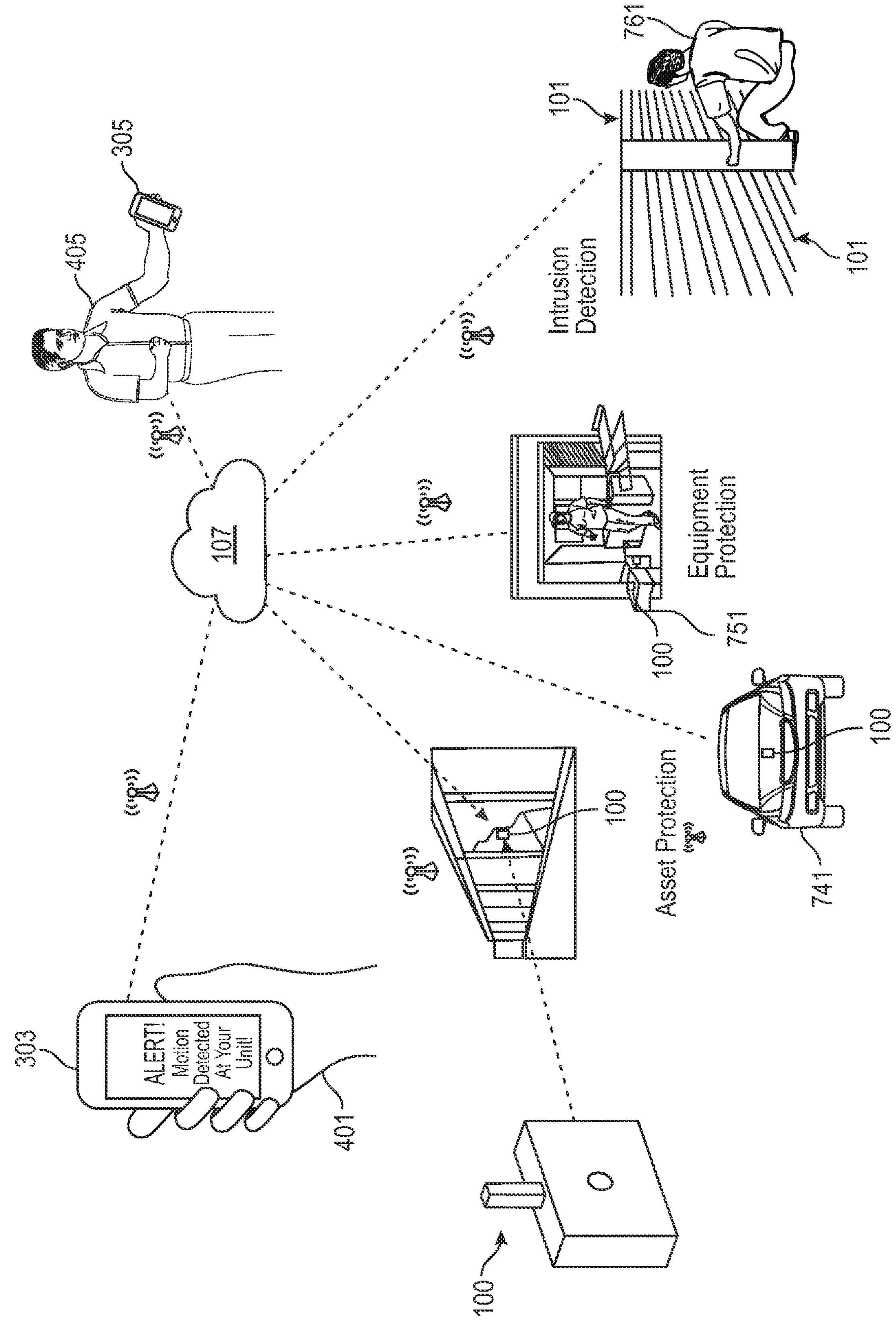
FIG. 7B may depict a system for remotely monitoring a given storage unit using at least one monitoring-device installed within that given storage unit.

FIG. 7B is just an expansion of FIG. 1, showing various monitoring-devices 100 being used in various asset monitoring scenarios, such as, but not limited to, monitoring storage-units 101, monitoring a vehicle 741, monitoring equipment/tools 751, combinations thereof, and/or the like. Thus, FIG. 7B may illustrate various asset protection applications/scenarios using at least one monitoring-device 100 for each category of asset to be protected/monitored. In some embodiments, for each storage unit 101 there may be at least one monitoring-device 100 installed within; for each vehicle 741, there may be at least one monitoring-device 100 installed on that given vehicle 741; and for each tool or each group of tools, there may be at least one monitoring-device 100 associated therewith. FIG. 7B may show that these various monitoring-devices 100 may be in wireless communication with network/cloud 107, then to the various computing-devices 373, such as, but not limited to tenant device 303 and facility operator device 305. In some embodiments, the subscription service/monitoring provider's server(s), and NINCE 367, which may be running on such servers, may be a portion of network/cloud 107. FIG. 7B may also show a thief 761 tampering with (e.g., opening and/or cutting into) a given storage unit 101 being monitored with at least one monitoring-device 100 inside (or potentially outside) of that storage unit 101; wherein the at least one monitoring-device 100 may detect storage unit 101 door motion/vibration (and/or some other detection such as fire, smoke, water, rodents, humidity, temperature, combinations thereof, and/or the like) and may report this event via wireless communications to NINCE 367; and then NINCE 367 may reformat and/or interpret that reported data in the form of an alert/warning/notice that may then be communicated to the various authorized persons, such as the tenant 401, via HIS, and that tenant's 401 tenant device 303; and/or to facility operator 405, via HIS, and that facility operator device 305. Other authorized persons could also be reported to.

In some embodiments, vehicle 741 may be selected from one or more of: a wheeled vehicle, a motor vehicle, a car, an automobile, a truck, a pickup truck, a flatbed truck, a box truck, a sport utility vehicle (SUV), a van, a motorcycle, a bike, a bicycle, a dirt bike, a motorbike, a golf cart, a quad, an ATV (all-terrain vehicle), a snowmobile, a sand-rail, a dune buggy, an RV (recreational vehicle), a motorhome, a camper, a trailer, a fifth-wheel, a vessel, a boat, a kayak, a canoe, an aircraft, a plane, a helicopter, a drone, a tracked vehicle, a skid steerer, an excavator, a bull dozer, a scissor lift, a cherry picker, a man lift, combinations thereof, and/or the like.

Note, a given monitoring-device 100 that may be monitoring a given controlled space for transitory use 101 (storage unit/space 101), may be located inside or outside of that given controlled space for transitory use 101 (storage unit/space 101). In some embodiments, a given monitoring-device 100 that may be monitoring a given controlled space for transitory use 101 (storage unit/space 101), may be located outside and proximate of that given controlled space for transitory use 101 (storage unit/space 101) (e.g., within five [5] feet of that given controlled space for transitory use 101 [storage unit/space 101]). For example, and without limiting the scope of the present invention, monitoring-device 100 as a door-break-sensor, may be located outside (or inside) of the given controlled space for transitory use 101 (storage unit/space 101) that it is monitoring.

Figure 7C:
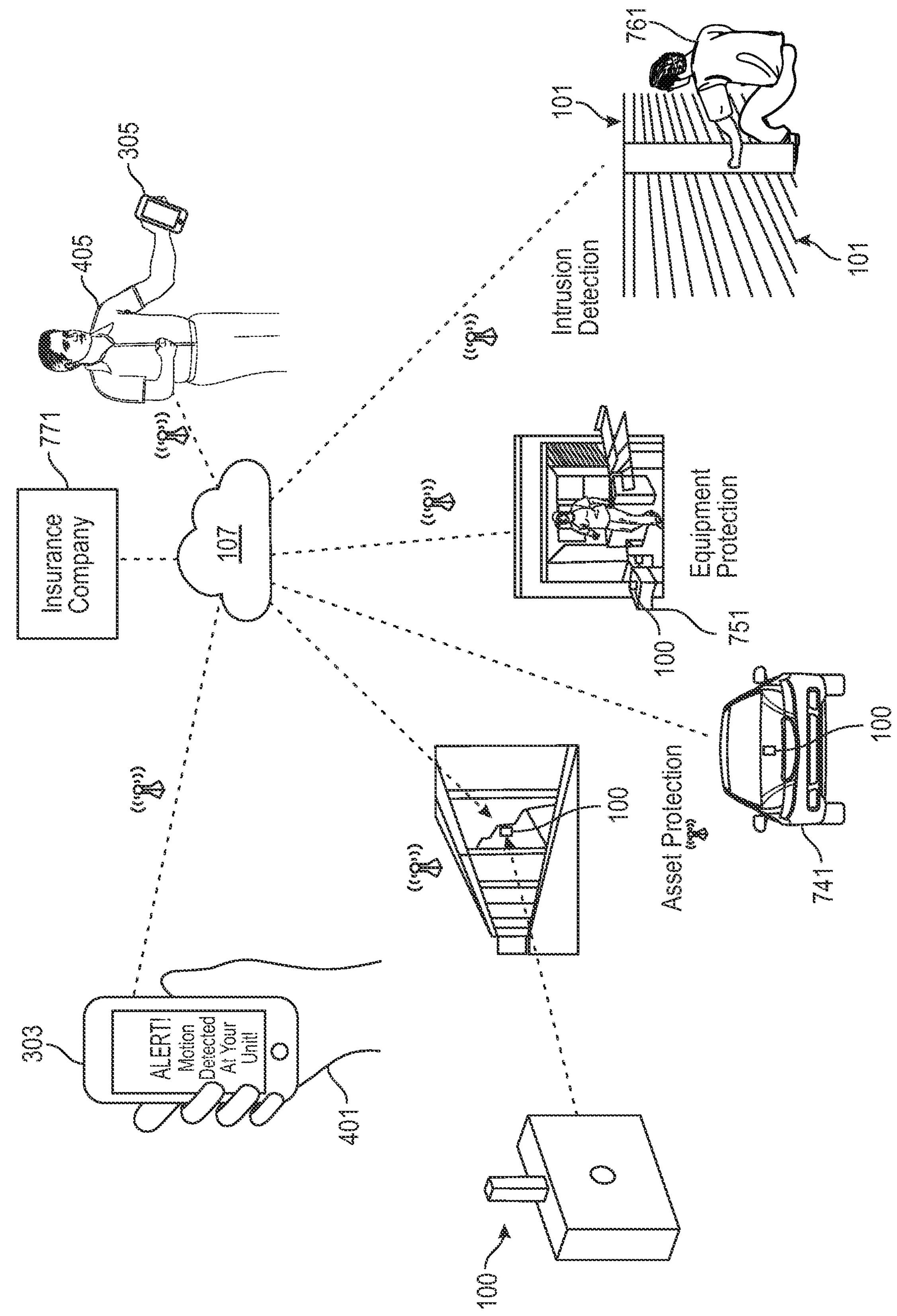
FIG. 7C may depict a system for remotely monitoring a given storage unit using at least one monitoring-device installed within that given storage unit.

FIG. 7C may just a further expansion of FIG. 7B, that now includes insurance company/carrier 771 that may be in communication with the various monitoring-devices 100. In some embodiments, at least one server of insurance company/carrier 771 may be in communication with the various monitoring-devices 100; and at least some of that communication may be wireless communication. In some embodiments, at least one server of insurance company/carrier 771 may be in communication with NINCE 367 that may be located in or part of network/cloud 107. Thus, FIG. 7C may further support method 700 and/or FIG. 7A.

Figure 8A:
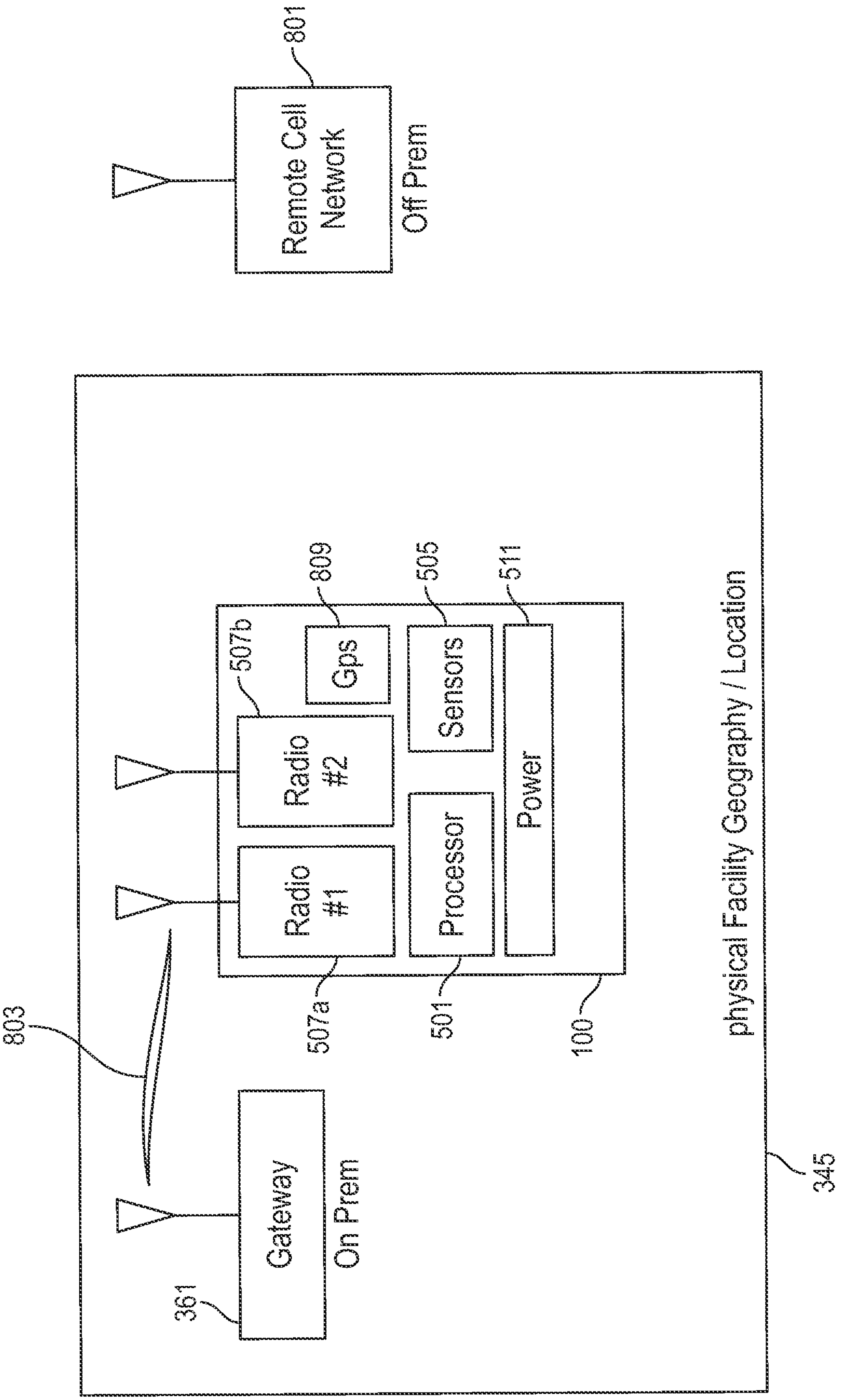
FIG. 8A may depict relativity short-range low power wireless communications between a given monitoring-device and a gateway, wherein both the monitoring-device and the gateway may be located on the same premises/grounds (but possibly at different locations within those premises/grounds).

FIG. 8A may show a schematic block diagram of a low power wireless connection/communications 803 between a given radio/antenna (e.g., primary radio 507*a*) of a given monitoring-device 100 and an ad hoc wireless network (e.g., specifically a gateway 361 of that ad hoc wireless network) located on that storage facility's 345 premises/grounds. In some embodiments, the wireless connection/communications 803 between that given monitoring-device 100 (e.g., via primary radio 507*a*) and the ad hoc wireless network (e.g., gateway 361) may be low power as in a LP WAN connection/communications; and this may preserve/extend a battery life of power source 511 of that given monitoring-device 100. In some embodiments, a given monitoring-device 100 may default to use of a low power wireless connection/communication 803 through its primary radio 507*a*, when such a connection may be established. In some embodiments, when the low power wireless connection/communications 803 are possible (e.g., with low power wireless communications between primary radio 507*a* and gateway 361), then monitoring-device 100 may not wirelessly directly connect to cellular network 801. In some embodiments, cellular network 801 may be operated by a third-party cellular service provider, such as, but not limited to, Verizon, AT&T, T-Mobile, combinations thereof, and/or the like. In some embodiments, and in general, cellular network 801 may have cellular towers (e.g., receivers/transmitters) located offsite with respect to storage facility's 345 premises/grounds. (Although some storage facility's 345 premises/grounds could have a cellular tower onsite.)

In some embodiments, upon "certain conditions" at a given monitoring-device 100, that monitoring-device 100 may switch over to higher power wireless communications 805 between secondary radio 507*b* and cellular network 801 (e.g., shown in FIG. 8B), when it may be desired to sacrifice battery life of power source 511 in favor of increased data/information communications between the given monitoring-device 100, NINCE 367, and end-user computing-devices 373. In some embodiments, the "certain conditions" may be an escalation determination, as determined by NINCE 367 and/or as determined by an authorized person (such as but not limited to, the tenant, the facility operator, the subscription service/monitoring service personnel, law enforcement personnel, fire department personnel, first responder personnel, insurance company personnel, etc.). In some embodiments, an escalation determination as determined by NINCE 367, may be based on data received from the given monitoring-device 100 at NINCE 367, wherein that data may be of sensor(s) 505 readings that exceed at least one predetermined threshold; wherein such sensor(s) 505 reading may indicate a serious problem, such as, but not limited to, fire, flooding, earthquake, tornado, smoke, volatile chemical(s), unauthorized access, combinations thereof, and/or the like.

FIG. 8A (FIG. 8B and FIG. 8C) may also show that a given monitoring-device 100 may comprise at least one GPS module 809. In some embodiments, GPS module 809 may permit a geographical location (e.g., in a coordinate system) to be generated for the given monitoring-device 100. In some embodiments, GPS module 809 may a type of I/O means 509. In some embodiments, GPS module 809 may a type of communications 507. In some embodiments, GPS module 809 may a type of sensor 505.

Figure 8B:
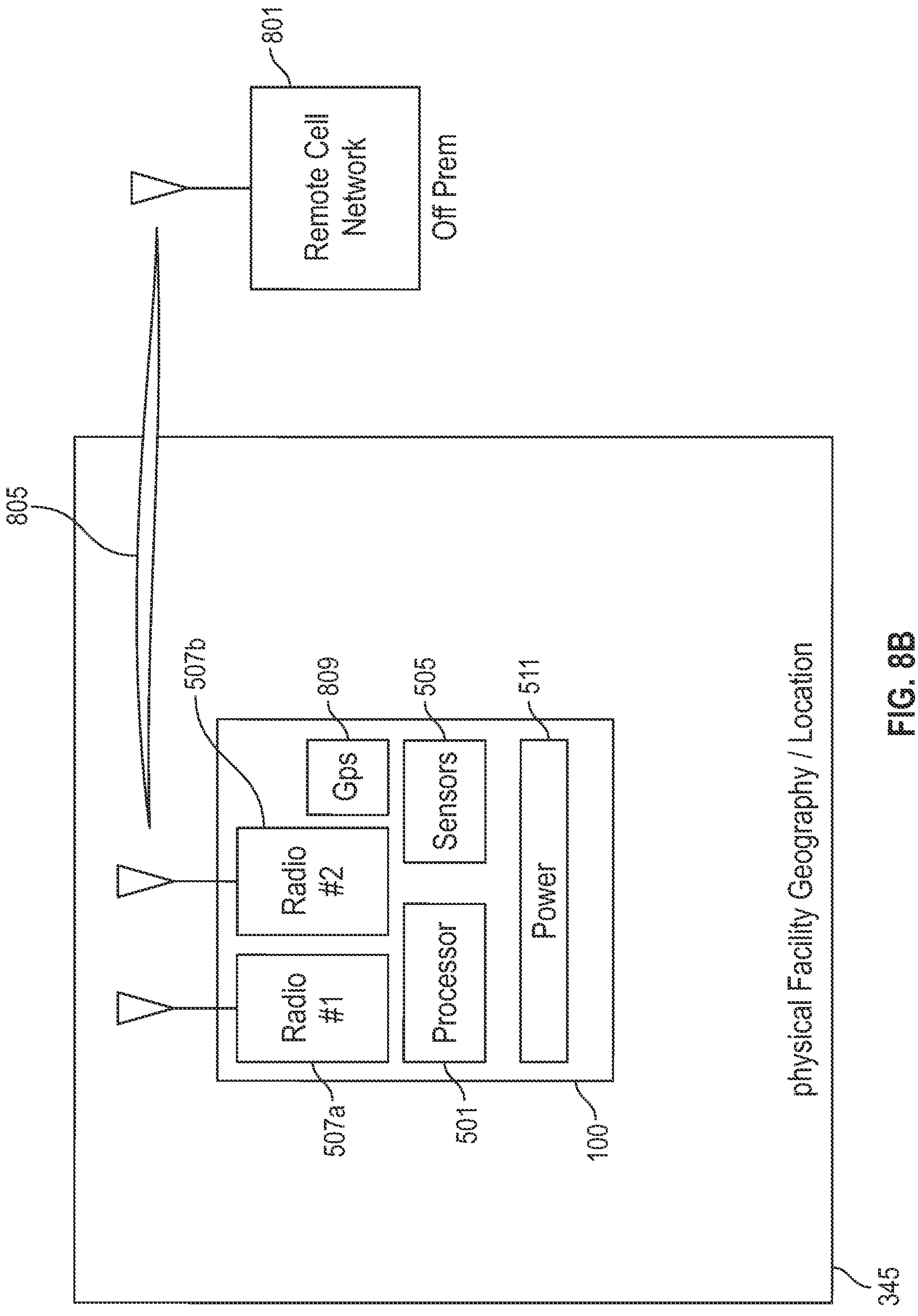
FIG. 8B may depict longer-range and higher power wireless communications between a given monitoring-device and a cellular network, wherein the monitoring-device may located on/at a given storage facility (e.g., installed within a given storage-unit).

FIG. 8B may show a schematic block diagram of a low power (or low bandwidth cellular) wireless connection/communications 805 between a given radio/antenna (e.g., secondary radio 507*b*) of a given monitoring-device 100 and cellular network 801. In some embodiments, wireless connection/communications 805 may be a backup communication route as compared to low power wireless connection/communication 803. In some embodiments, use of wireless connection/communications 805 may be triggered when low power wireless connection/communication 803 may not be available.

FIG. 8B may show a schematic block diagram of a high power (or higher power or conventional/traditional cellular or higher bandwidth) wireless connection/communications 805 between a given radio/antenna (e.g., secondary radio 507*b*) of a given monitoring-device 100 and cellular network 801. The communication scenario shown in FIG. 8B may occur: when there may no ad hoc wireless network (with one or more gateways 361) located onsite at storage facility's 345 premises/grounds; when storage facility's 345 premises/grounds may have an ad hoc wireless network (with one or more gateways 361), but there may a connection problem between primary radio 507*a* and gateway 361 preventing establishment of low power wireless connection/communication 803; when storage facility's 345 premises/grounds may have an ad hoc wireless network (with one or more gateways 361), but at least one of the "certain conditions" has occurred (or is occurring), such that it may be desirable to switch over to the wireless connection/communications 805 for increased bandwidth functionality; and/or combinations thereof; and/or the like.

In some embodiments, the at least one monitoring-device 100 may utilize primary radio 507*a* when the primary radio 507*a* is able to establish a low power wireless connection 803 with a local gateway 361 and when a mode of operation for the at least one monitoring-device 100 may be a power saving mode (a default mode of operation in some embodiments). In some embodiments, the local gateway 361 may be local if that local gateway 361 may be within short-range of the at least one monitoring-device 100 (e.g., if gateway 361 may be located onsite of storage facility 345). In some embodiments, if the primary radio 507*a* may be unable to establish the low power wireless connection 803 with the local gateway 361, then the secondary radio 507*b* may attempt to establish a cellular connection 805 with a cellular network 801. Or in some embodiments, if the mode of operation for the at least one monitoring-device 100 may be a higher power mode, then the secondary radio 507*b* may attempt to establish the cellular connection 805 with the cellular network 801. In some embodiments, the higher power mode may be triggered by the "certain conditions" at a given monitoring-device 100, such as, but not limited to, an escalation event. For example, and without limiting the scope of the present invention, in some embodiments, an escalation event may be a possible unauthorized intrusion, possibly a theft in progress or attempt at theft in progress or other critical peril or predetermined condition; wherein switching over to the higher power mode (or higher bandwidth mode) may permit faster transmission of video and/or camera images from the given at least one monitoring-device 100, to NINCE 367, and then on to authorized stakeholder(s) (e.g., tenant 401). In some embodiments, use of the cellular connection 805 may cease once there has been a de-escalation event, and if possible, the lower power wireless connection/communication may be re-instated.

In some embodiments, when wireless connection/communication 805 may not be needed/necessary, wireless communications of the given monitoring-device 100 may revert back to using low power wireless connection/communication 803. In some embodiments, this may occur when low power wireless connection/communication 803 is able to re-established. In some embodiments, this may occur when the given monitoring-device 100 receives a switch radio command from NINCE 367 and originating from NINCE 367 and/or from an authorized computing-device 373 in communication with NINCE 367, e.g., via HIS 400. In some embodiments, this may occur when "the certain predetermined conditions" are met/applies and "the certain different predetermined conditions" are not met/does not apply.

Figure 8C:
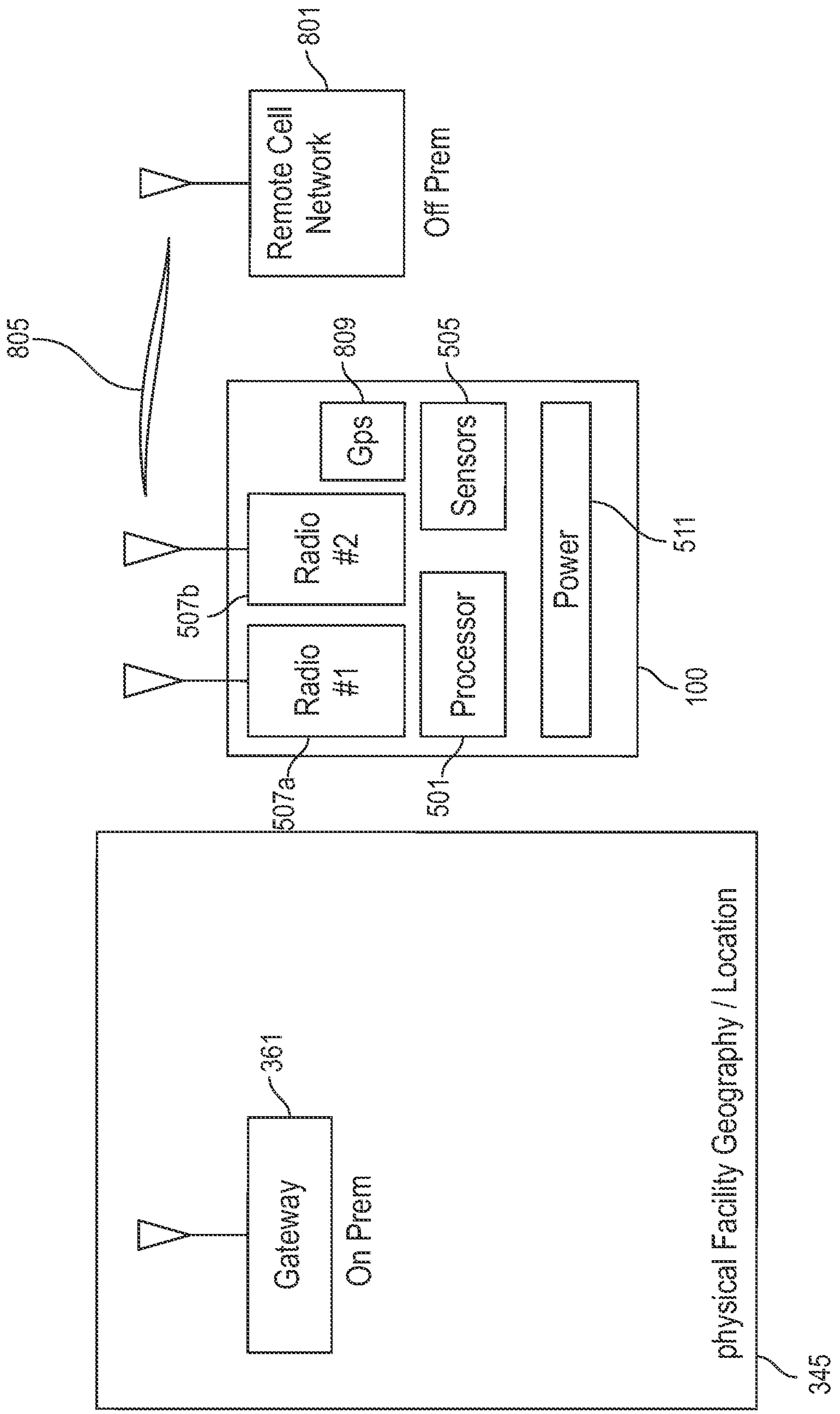
FIG. 8C may depict longer-range and higher power wireless communications between a given monitoring-device and a cellular network, wherein the monitoring-device may be physically associated with an asset to be monitored and that asset has been removed from its storage facility.

FIG. 8C may depict a scenario when the given monitoring-device 100 has been physically moved offsite from storage facility's 345 premises/grounds, such that a low power connection/communications 803 between primary radio 507*a* and gateway 361 of the ad hoc network are no longer possible (because the proximity threshold has been exceeded), in which case, that monitoring-device 100 may automatically switch over to wireless connection/communications 805 between its secondary radio 507*b* and cellular network 801. In some embodiments, wireless connection/communications 805 may be a cellular connection/communications. For example, and without limiting the scope of the present invention, the scenario shown in FIG. 8C may occur in a theft situation, when an asset (such as, but not limited to, vehicle 741 and/or equipment/tool 751) that has at least one monitoring-device 100 attached to that asset has been removed from storage facility's 345 premises/grounds in an unauthorized manner. For example, and without limiting the scope of the present invention, the scenario shown in FIG. 8C may occur when an asset (such as, but not limited to, vehicle 741 and/or equipment/tool 751) that has at least one monitoring-device 100 attached to that asset has been intentionally and properly removed from storage facility's 345 premises/grounds, such as, but not limited to, an RV being taken out for a family vacation, a contractor removing tools/equipment 751 necessary for work, or the like. That asset could have been some tangible object (such as, but not limited to, vehicle equipment/tool 751) previously stored within a given storage unit 101; or that asset could have been a vehicle 741 stored on storage facility's 345 premises/grounds.

Continuing discussing FIG. 8C, in some embodiments, the given monitoring-device 100 associated with a given asset (e.g., vehicle 741, equipment/tool 751, shipping containers, utility trailers, PODs, combinations thereof, and/or the like) may comprise GPS-module 809. In some embodiments, GPS module 809 may be used to determine a location for the given asset. In some embodiments, wireless connection/communications with cellular network 801 may be used to determine an approximate location for the given asset.

Continuing discussing FIG. 8C, in some embodiments, in order to provide continuous battery power-optimized wireless connectivity outside a locally defined controlled space for transient use in order to maintain the monitoring service, and optionally including geo-tracking, when a given monitoring-device 100 moves outside the initial defined location and into surrounding local areas, broader regions or across the USA, when primary radio 507*a* is able to establish a low power wireless connection (such as, but not limited to, NFC, LAN, or WAN) with a primary network then primary radio 507*a* may be utilized. However, in some embodiments, if the primary radio 507*a* is unable to establish a such a low power wireless connection, then the secondary radio 507*b* may attempts to establish a connection with the secondary network (e.g., cellular network 801), which in this case may require either a longer range WAN radio or cellular radio networks that ensure the broader desired geographic network connectivity only when outside the range of the local primary radio 507*a* network thus, the monitored-device 100 consumes/utilizes the higher power secondary radio 507*b* only until given monitoring-device 100 returns back to the local lower power network and re-established its primary radio 507*a* network connection (e.g., to gateway 361). In some embodiments, it should also be noted that the reverse may also apply, i.e., that the primary radio 507*a* low power wireless connection is re-established when the low power network is able to establish a steady and reliable low power wireless connection.

In some embodiments, a given monitoring-device 100 may switch from low power wireless communications using primary radio 507*a* to secondary radio 507*b*. In some embodiments, the given monitoring-device 100 may switch from secondary radio 507*b* use to low power wireless communications using primary radio 507*a*. In some embodiments, use of secondary radio 507*b* may allow for longer range wireless communications as compared to primary radio 507*a*; and/or use of secondary radio 507*b* may allow for higher power wireless communications as compared to primary radio 507*a*. In some embodiments, use of secondary radio 507*b* may allow the given monitoring-device 100 to access increased/higher bandwidth wireless communications as compared to using primary radio 507*a*. However, use of secondary radio 507*b* may use more power than use of primary radio 507*a*. In some embodiments, use of secondary radio 507*b* may be done when there may be a need and/or a desire for access to increased bandwidth (e.g., to transmit larger files sizes and/or to transmit more files), such as, but not limited to, transmitting sensor 505 data at an increased rate; transmitting video, image, and/or audio captured by the given monitoring-device 100; streaming video, image, and/or audio captured by the given monitoring-device 100; combinations thereof. In some embodiments, when the need and/or the desire for access to increased bandwidth no longer exists, the given monitoring-device 100 may switch back from secondary radio 507*b* use to primary radio 507*a*; i.e., use of secondary radio 507*b* (e.g., when be using for increased bandwidth access) may be for brief durations in time. In some embodiments, switching from primary radio 507*a* to secondary radio 507*b* may be triggered and/or controlled by one or more of: certain sensor 505 data/reading beyond a predetermined threshold; determination of an escalation event; the given monitoring-device 100 being moved into a location where primary radio 507*a* cannot connect; receiving a proper switch radio command from NINCE 367 originating from NINCE 367 and/or originating from an authorized computing-device 373 in communication with NINCE 367; combinations thereof, and/or the like. In some embodiments, when use of secondary radio 507*b* may be triggered because primary radio 507*a* cannot connect, secondary radio 507*b* can and may operate in a low power mode; i.e., just because the given monitoring-device 100 may be using secondary radio 507*b*, such use may not be a scenario requiring increased bandwidth access. In some embodiments, switching from secondary radio 507*b* to primary radio 507*a* may be triggered and/or controlled by one or more of: certain sensor 505 data/reading within/under a predetermined threshold; determination of an de-escalation event; the given monitoring-device 100 being moved into a location where primary radio 507*a* can connect; receiving a proper switch radio command from NINCE 367 originating from NINCE 367 and/or originating from an authorized computing-device 373 in communication with NINCE 367; combinations thereof, and/or the like. Inclusion of primary radio 507*a* and secondary radio 507*b*, and their use rules, may prolong battery power (power source 511) of the given monitoring-device 100.

In some embodiments, primary radio 507*a* may be configured for low power wireless communications, such as, but not limited to, low power LAN, low power NFC, Zigbee, 802.15, BT, BLE, RFID, WiFi, low power WAN, LoRa, SigFix, combinations thereof, and/or the like.

In some embodiments, secondary radio 507*b* may be configured for low power and/or higher power wireless communications, such as, but not limited to, cellular, 4G, LTE, 5G, NB-IoT, LTE Cat-M1, LoRa, SigFox, combinations thereof, and/or the like.

In some embodiments, communication pathways shown in FIG. 1, FIG. 7B, FIG. 7C, FIG. 8A, FIG. 8B, and FIG. 8C, may be in alignment/cooperation/corroboration of the flows shown in FIG. 3A, FIG. 3B, FIG. 3C, and/or FIG. 4.

In some embodiments, embodiments of this invention may be a system (systems) for monitoring a given controlled space (e.g., storage unit 101) using at least one monitoring-device 100. In some embodiments, such a system may comprise the at least one monitoring-device 100 and a set of instructions non-transitorily stored in memory of at least one server 309. In some embodiments, the set of instructions may be NINCE 367 or a portion thereof. In some embodiments, the at least one server 309 may be a computing-device 373 of the provider for the subscription and monitoring service. In some embodiments, the at least one server 309 may be a server owned and/or controlled by the provider for the subscription and monitoring service. In some embodiments, the at least one monitoring-device 100 may comprise at least one sensor 505 for sensing a condition of the given controlled space (e.g., storage unit 101). In some embodiments, the at least one monitoring-devices 100 may comprise at least one radio 507 (with at least one antenna). In some embodiments, the at least one sensor 505 and the at least one radio 507 may be operatively linked. In some embodiments, the set of instructions (e.g., NINCE 367) may be configured to instruct and/or control the at least one monitoring-device 100 in how to function. In some embodiments, the at least one radio 507 may be configured for two-way wireless communications between the at least one monitoring-device 100 and the at least one server 309 (which may be running the set of instructions [e.g., NINCE 367]). In some embodiments, when the at least one monitoring-device 100 and the at least one server 309 may be in communication with each other, the at least one monitoring-device 100 periodically may wirelessly transmit information (e.g., sensor 505 data) to the at least one server 309 for use by the set of instructions (e.g., NINCE 367).

In some embodiments, the set of instructions (e.g., NINCE 367) may comprise two-way communications instructions for two-way communications in deploying a purpose-built natural language message protocol that deploys simple text and/or audible format (such as, but not limited to, an SMS messaging text format, but also optionally instant messaging, web messaging, chat messaging, mobile app messaging, and/or an audible voice format such as text-to-speech (robot voice)/speech (robot voice)-to-text, or the like) between the at least one server and a computing-device 373 associated with an authorized end-user, such as a tenant, tenant N+1, or facility operator, of the system. In some embodiments, these two-way communications instructions (of the set of instructions) may comprise an ability to execute one or more of the following:

(a) send predetermined natural language commands in the text message format(s) and/or optionally voice message format(s) from NINCE 367 (the set of instructions) to the computing-device 373 associated with the authorized end-user of the system;

(b) receive predetermined natural language commands in the text message format(s) and/or optionally voice message format(s) from the computing-device 373 associated with the authorized end-user of the system;

(c) interpret and convert the received predetermined natural language commands into commands that are executable by processor 501 of the at least one monitoring-device 100;

(d) transmit the commands that are executable by the processor 500 of the at least one monitoring-device 100, from the at least one server 309 to the at least one monitoring-device 100;

(e) receive the information (e.g., sensor data) from the at least one monitoring-device 100;

(f) interpret and convert the received information from the at least one monitoring-device 100 into content that is in the text message format(s) and optionally voice message format(s); and (g) transmit the content in the text message format(s) and optionally voice message format(s), from the at least one server to the computing-device 373 associated with the authorized end-user.

Then in some embodiments, the at least one monitoring-device 100 may receive from the at least one server 309 the transmission of the commands that are executable by the processor 501 of the at least one monitoring-device 100. Then in some embodiments, the processor 501 of the at least one monitoring-device 100 may execute the commands that are executable by the processor 501 of the at least one monitoring-device 100 that are received from at least one server 309. In some embodiments, the execution of the commands that are executable by processor 501 of the at least one monitoring-device 100, may cause the at least one monitoring-device 100 to generate additional information (e.g., sensor 505 data) and to transmit at least some of that additional information to the set of instructions (e.g., NINCE 367) on the at least one server 309. In some embodiments, the set of instructions (e.g., NINCE 367) may receive the at least some of the additional information from the at least one monitoring-device 100. Then in some embodiments, the set of instructions (e.g., NINCE 367) may interpret, convert, and/or transmit some portion of the at least some of the additional information as at least one text/SMS message (or another means of HIS 400) to the at least one computing-device 373.

In some embodiments, systems for monitoring a given storage space 101 may utilize one or more monitoring-devices 100, and wherein that system may comprise space monitoring software. In some embodiments, that space monitoring software may be accessed via HIS 400 and may include a web-based portal and/or interface (e.g., a Facility Web Manager), a mobile app, graphical user interfaces, combinations thereof, and/or the like. Such interface options may be accessed on one or more of: tenant device 303, facility operator device 305, provider device 309, and/or third party device 311. Via such interfaces: new tenants 401 may be onboarded; accounts created; accounts opened; accounts activated; accounts deactivated; settings, rules, preferences, and/the like entered; monitoring-devices 100 armed or disarmed; monitoring-devices 100 enabled or disabled; sensors 505 enabled or disabled; historical logs accessed and/or reviewed; and/or the like. In some embodiments, this software may allow status of: monitoring-devices 100, sensors 505 (e.g., change of status/state, sensor data status/state, power, connectivity, etc.), system, battery 511 level, connectivity, combinations thereof, and/or the like to be monitored and/or checked. In some embodiments, such interfaces may provide various dashboards and/or analytics of this information. In some embodiments, this software may allow display via one of these interfaces deployed monitoring-devices 100 in a representative 2D (two dimensional) and/or 3D (three dimensional) map of a given storage facility 345.

In some embodiments, various access authorization requirements may be utilized, such as, but not limited to, caller ID checking, PIN checking, two step authentication, QR-codes (bar codes), voice recognition, fingerprint recognition, biometrics recognition, and/or the like.

An existing storage space 101 without any monitoring capabilities may be retrofitted with one or more monitoring-devices 100. In some embodiments, systems for monitoring a given storage space 101 may utilize one or more monitoring-devices 100, such that the system may be scalable, modular, and/or extendable by adding one or more additional monitoring-devices 100 to the system or alternatively easily removed and redeployed elsewhere when not in use and another storage unit 101 may be more preferable to a given tenant 401 and/or facility operator 405. In some embodiments, such retrofitting may be done without wires and/or adding wires. Electrical power may come from one or more batteries (e.g., power source 511), with ultra-long lasting battery life; and/or from renewable energy sources, such as solar energy, wind energy, and/or the like.

In some embodiments, methods for monitoring a given storage space 101 may utilize one or more monitoring-devices 100, such that the method may be scalable, modular, and/or extendable by adding one or more additional monitoring-devices 100 to the system or alternatively easily removed and redeployed elsewhere when not in use and another storage unit 101 may be more preferable to a given tenant 401 and/or facility operator 405.

In some embodiments, the one or more monitoring-devices 100 may be preconfigured for easy of installation and quick setup ahead of intended end-user demand, permitting a plug and play installation without wiring and cabling.

In some embodiments, the details, information, alerts, reminders, notices, notifications, alarms, and/or the like generated by a given monitoring-device 100 and/or by its controlling software may be communicated to the various interested party via text message, SMS message, audible messages (e.g., two-way robo voice calls), and/or through other software interfaces optionally included, and/or the like. That is, in some embodiments, access to an applicable mobile app and/or access to web portal interface may not be necessary.

In some embodiments, the details, information, alerts, reminders, notices, notifications, alarms, and/or the like generated by a given monitoring-device 100 and/or by its controlling software may be communicated to the various interested party via text message, SMS message, internet browser, email, voice call, video call, voicemail, private message, dedicated/proprietary software application (e.g., the storage space monitoring software or portion thereof), combinations thereof, and/or the like.

In some embodiments, communications from the given monitoring-device 100 may be done in real-time and/or substantially near real-time (e.g., minus computing times and transmission times).

In some embodiments, editing, changing, and/or updating rules, preferences, settings, and/or the like for a given monitoring-device 100 and/or by its controlling software may be communicated to from various interested party via text message, SMS message, mobile app, web portal/interface, and/or the like. For example, and without limiting the scope of the present invention, the tenant/renter may supply rules pertaining to escalation of alarms. In some embodiments, text messaging and/or SMS messaging may then be two way.

In some embodiments, various algorithms, machine learning, and/or AI may be used to improve rules and responses to rules, such as, but not limited to, enhancing end-user experience, accuracy of predictive warnings, response times for communications, collective knowledge, real-time knowledge, combinations thereof, and/or the like, individually or in combination, to further optimize the authorized stakeholder hierarchy escalation rules and automatic/semi-automatic behavior. False alarms may be minimized over time as the machine learning and/or AI "learns" what the tenant/renter may deem as acceptable and unacceptable behavior.

Similarly, algorithms, machine learning, and AI use may facilitate and enhance engagement and relevance with authorized users interfacing with the two-way text messaging (such as SMS messaging) and/or audible voice messaging (such as text-to-voice, voice-to-text), including natural language use in such two-way communications.

In some embodiments, one or more monitoring-devices 100 may be used to monitor a given defined space 101 and/or an asset. In some embodiments, the defined space 101 and/or the asset may be selected from one or more of the following: an interior space; an interior zone; enclosed spaces; a room of a building; rooms; marine vessels (e.g., vessels, boats, ships, jet skis, skidoos, kayaks, canoes, house boats, and the like); RVs (e.g., recreational vehicles, campers, motor homes, fifth wheels, and the like); equipment used with camping (e.g., tents, campsites, and the like); equipment used in moving (e.g., moving boxes, moving trucks, moving vehicles, and the like); pods (e.g., storage pods);

trailers; trucks; mailboxes; vacant homes; vacant buildings; locked buildings; hotel rooms; construction sites, construction yards; pets; pet enclosures, animals; animal enclosures; stables; animal stalls; rentals (e.g., residential, commercial, and the like); vacation rentals; cabins; hunter blinds; hunter traps; warehouses; fleets; off road vehicles (e.g., Jeeps, sport utility vehicles [SUVs], pickup trucks, and the like); quads; ATVs (e.g., all-terrain vehicles, three-wheelers); apartments, AirBNB rental properties; car rentals; bicycle rentals; vehicle rentals; schools; motorcycles; waste totes; livestock movement and/or containers; aircraft; luggage; trash; trash containers; fields; yards; lots; parking lots and/or parking spots (spaces); sheds; post office boxes; vehicle(s) 741, combinations thereof, portions thereof, and/or the like.

In some embodiments, for user(s) to install, setup, onboard, routinely use, control, and/or benefit from a given monitoring-device 100 within its given controlled space (for transitory use) 101, any one of the following is not needed, used, nor desired: (1) a mobile app (mobile application) accessible from a smartphone, tablet computer, laptop, or other computer; (2) a web portal accessible from a computer; (3) pairing between that monitoring-device 100 and a user's computer (e.g., smartphone, tablet computer, laptop, smartwatch, or the like computer); (4) Bluetooth; (5) Bluetooth being enabled; (6) NFC (near field communication) between that monitoring-device 100 and a user's computer (e.g., smartphone, tablet computer, laptop, smartwatch, or the like computer); and/or the like. That is, any one or more of these is not needed, used, nor desired for user(s) to install, setup, onboard, routinely use, control, and/or benefit from a given monitoring-device 100 within its given controlled space (for transitory use) 101.

This is desirable because install, setup, onboard, routine use, and/or control of a given electronic device (such as, but not limited to, a smart sensor or monitoring device) that requires use of a mobile app, web portal, (at least initial) pairing between that electronic device and a user's computer, Bluetooth being enabled on the user's computer, NFC between the user's computer and the electronic device, and/or the like—are barriers/obstacles to user adoption/compliance of that given electronic device (such as, but not limited to, a smart sensor or monitoring device). Most users would prefer to not have to use a mobile app, web portal, establishing pairing between the electronic device and the user's computer, having their Bluetooth being enabled on the user's computer, NFC between the user's computer and the electronic device, and/or the like to install, setup, onboard, routinely use, and/or control that given electronic device.

Instead, in some embodiments, the users may interface, in a two-way (bidirectional) manner between the user's personal computer (e.g., smartphone, tablet computer, laptop, smartwatch, or the like) and the monitoring-device 100, via SMS/text messaging; which users are generally very comfortable doing, as SMS/text messaging is a common and low barrier activity of most users.

Further, because no mobile app, web portal, device pairing, Bluetooth enablement, NFC pairing/direction communication, or the like is needed, used, or desired, then installation, setup, onboarding, routine use, and/or control of the users monitoring-device(s) 100 may be readily demonstrated to new/prospective users because the new/prospective users are not bothered nor deterred from adoption by being forced to use a mobile app, web portal, device pairing, Bluetooth enablement, NFC pairing/direction communication, or the like. This results in lower friction to engage new/prospective or existing users, by providing a better actual customer experience, and drives higher user adoption.

In some embodiments, monitoring-device 100 is not configured for one or more of: use with a mobile app, use with a web portal, Bluetooth, NFC pairing/direction communication, or the like (with respect to installing, setting up, onboarding, routinely using, and/or controlling a given monitoring-device 100 within its given controlled space [for transitory use] 101). In some embodiments, monitoring-device 100 is not paired with a user computing-device 303/305. In some embodiments, monitoring-device 100 is not Bluetooth enabled. In some embodiments, monitoring-device 100 does not engage in direct device-to-device NFC communications between monitoring-device 100 and user (tenant) computing-device 303. In some embodiments, monitoring-device 100 does not engage in direct device-to-device (wireless or wired) communications between monitoring-device 100 and user (tenant) computing-device 303.

In some embodiments, for user(s) to install, setup, onboard, routinely use, and/or control a given monitoring-device 100 within its given controlled space (for transitory use) 101, QR-codes, bar codes, barcodes, 2D codes, 3D codes, NFC, or the like are not needed, used, nor desired. Instead, in some embodiments, the users may interface, in a two-way (bidirectional) manner between the user's personal computer (e.g., smartphone, tablet computer, laptop, smartwatch, or the like) and the monitoring-device(s) 100, via SMS/text messaging.

In some embodiments, software running on server(s) 309 (computer-server(s) 309) may receive SMS/text messages from the user computing-device 303/305 (such as, but not limited to, a smartphone), translate at least some of the content of that SMS/text message into a command, data, and/or information that is communicated to the monitoring-device(s) 100 and understood by the monitoring-device(s) 100; and that monitoring-device 100 may then provide a responsive communication back to the server 309, wherein the server 309 may then translate/convert at least some of that responsive communication into a SMS/text message that is delivered to the user computing-device 303/305. In some embodiments, monitoring-device 100 may transmit communications (wherein at least a portion of that communication may be in wireless format) to the server(s) 309 (e.g., in a format that would typically not be recognized by a human); wherein the server(s) 309 may then translate/convert at least part of communication from the monitoring-device 100 into a SMS/text message format and then transmit that SMS/text message to the user computing-device 303/305 of the given user. In this manner, the users may interface (interact, instruct, command, use, and/or receive data/information), in a two-way (bidirectional) means between the user's computing-device 303/305 (e.g., smartphone, tablet computer, laptop, smartwatch, or the like) and the monitoring-device 100.

Note, on the backend (e.g., via server(s) 309 and/or NINCE 367) there may be an association/linkage (e.g., in a database accessible by server(s) 309) between specific monitoring-device(s) 100 and a specific tenant device 303 (such as, but not limited to, a particular/specific smartphone) for purposes of authentication, validation, security, and/or enabling the above noted communications routing, via server(s) 309 as an intermediary, between those given specific monitoring-device(s) 100 its associated specific tenant device 303. This association may be executed by software (such as, but not limited to, NINCE 367) running on server(s) 309 and/or by the provider accessing the server(s) 309. This association/linkage is not done directly by the tenant 401. Enablement of this association/linkage between specific monitoring-device(s) 100 and a specific tenant device 303 may be empowered by the tenant 401 establishing the monitoring subscription service with the provider (the provider provides, controls, is responsible for, and/or maintains monitoring-devices 100, servers 309, and/or NINCE 367). When tenant 401 establishes the, a telephone number for their tenant device 303 may be provided and this telephone number may be used to establish the association/linkage between specific monitoring-device(s) 100 and that tenant device 303.

In some embodiments, prior to a given monitoring-device 100 being used to monitor a given controlled space (for transitory use) 101 or portion thereof, a relationship (association/linkage) may be established between that given monitoring-device 100 and server(s) 309 and/or NINCE 367. In some embodiments, the given monitoring-device 100 may comprise some type/form of predetermined (embedded) (unique) ID/address; and that predetermined (embedded) (unique) ID/address is associated to a particular controlled space 101. In some embodiments, this association/linkage is made only once for that particular controlled space 101. If that given monitoring-device 100 is later moved to a different controlled space 101, then the former association/linkage may be disassociated, removed, and/or deleted; and a new linkage/association created/logged. In some embodiments, this association/linkage is done on the backend by server(s) 309, NINCE 367, and/or the provider interacting with server(s) 309 and/or NINCE 367. In some embodiments, it may be the operator/management 405 of the grounds/facility 345 who enters, requests, initiates, and/or makes the association of the given monitoring-device 100 to the particular controlled space 101. In some embodiments, once the association/linkage between the given monitoring-device 100 and the particular controlled space 101 has been established (e.g., on/at server(s) 309/NINCE 367), then the tenant 401/403, using tenant device 303, may interface with that given monitoring-device 100, without direct device-to-device communications between that given monitoring-device 100 and that tenant device 303. That is, for that tenant 401/403, using tenant device 303, to interface with that given monitoring-device 100, tenant 401/403 does not need to pair their tenant device 303 to that given monitoring-device 100, nor does tenant 401/403 need to download or use any type of mobile app on their tenant device 303. Further, that tenant 401/403 need not be anywhere near to that particular controlled space 101 or to grounds/facility 345 in order to interface with that given monitoring-device 100. Rather, that tenant 401/403 may use their (associated/linked) tenant device 303 to send and/or receive text/SMS messages as the means for interfacing, using, and/or controlling that given monitoring-device 100. This is equally applicable when that given monitoring-device 100 may be electronic-lock 100 and/or smart-lock 100. In contrast, prior art smart locks/smart sensors generally require the end user to download a mobile app to their smartphone and then using that mobile app along with enabled Bluetooth to pair directly between their smartphone and the given prior art lock/smart sensor; wherein all of this must be done while that end-user is physically present at the location of the given prior art smart locks/smart sensors. Whereas, embodiments of the present invention avoid this undesired friction common with the prior art need for use of mobile apps, enabled Bluetooth, direct device-to-device pairing, and the need to be physically present onsite for that initial pairing. Embodiments of the present invention provide a far simpler approach, without this friction, of associating/un-associating/reassociating the monitoring-devices 100 (electronic-locks 100 and/or smart-locks 100) to controlled spaces 201. This process of establishing the relationship (association/linkage) to the (deployed) monitoring-devices 100 (electronic-locks 100 and/or smart-locks 100) (with tenant devices 303 and/or with controlled spaces 101) may be executed as a single step (at/on/via server(s) 309/NINCE 367); and the tenant(s) 401/403 are not physically required to be present at the physical location of the associated/linked monitoring-devices 100 (electronic-locks 100 and/or smart-locks 100) for these associations/linkages to be established. This also allows other/additional end-users (e.g., tenant(s) 403) of the controlled space(s) 201 to be added easily and effortlessly for use of the associated/linked monitoring-devices 100 (electronic-locks 100 and/or smart-locks 100), and without any need for mobile app use, Bluetooth enablement, direct device-to-device pairing, even if for only a single use.

In some embodiments, an authorized user (e.g., a subscribed tenant 401/403 and/or facility operator 405) may be able to access sensor(s) reading(s)/output(s) and/or status information of associated/linked monitoring-device(s) 100 (electronic-locks 100 and/or smart-locks 100). In some embodiments, use of, monitoring of, and/or control of associated/linked monitoring-device(s) 100 (electronic-locks 100 and/or smart-locks 100) may be done by authorized user(s) (e.g., subscribed tenant(s) 401/403 and/or facility operator(s) 405), via their (associated/linked) computing devices (e.g., via text/SMS messaging). However, in some embodiments, who (e.g., tenant(s) 401/403) is actually provided such information, use, and/or control access may be centrally determined by a given facility operator 405 (and/or by the provider).

In some embodiments, monitoring-device 100, during its intended use as a monitoring device, may be (removably) fixedly installed/attached to at least some portion of controlled space (for transitory use) 101 (such as, but not limited to, a self-storage unit 101), such as, but not limited to, an interior wall (or an interior surface of a ceiling, door, window, or the like) of that controlled space (for transitory use) 101. See e.g., FIG. 1, FIG. 3A, FIG. 3B, FIG. 5B, and/or FIG. 7B. See also reference numerals 213, 215, 217, and/or 515 which show various mounting means for (removable) attachment of monitoring-device 100 to controlled space (for transitory use) 101.

However, in some embodiments, monitoring-device 100 may be detached and then reattached to another interior location within that given controlled space (for transitory use) 101 or moved and attached within a different controlled space (for transitory use) 101. A (human) person may do the actual moving of a given monitoring-device 100 from one location to another. For example, a tenant 401 and/or the facility operator 405 may move a given monitoring-device 100 to different locations within a given/same controlled space (for transitory use) 101; and/or the tenant 401 and/or the facility operator 405 may move the monitoring-device 100 from one controlled space (for transitory use) 101 to another/different controlled space (for transitory use) 101. During such human powered movement of the given monitoring-device 100, that monitoring-device 100 may not be monitoring its intended controlled space (for transitory use) 101. Once that given monitoring-device 100 is attached to an interior surface of its controlled space (for transitory use) 101, then monitoring of that controlled space (for transitory use) 101 by that monitoring-device 100 may commence. The flexibility in being able to move monitoring-devices 100 (via human power) by choice of tenants 401 and/or the facility operators 405 is, at least in part, what provides the ability for on-demand monitoring of controlled spaces (for transitory use(s)) 101 using such monitoring-devices 100. But such human powered movement of monitoring-devices 100 is not autonomous movement of the monitoring-devices 100 within a given controlled space (for transitory use) 101 or from one controlled space (for transitory use) 101 to another/different controlled space (for transitory use) 101.

In some embodiments, when a given monitoring-device 100 may be in use for monitoring of its associated controlled space (for transitory use) 101, that monitoring-device 100 may be fixedly mounted, stationary, fixed, non-moving, non-autonomous, non-flying, non-roving, non-walking, non-crawling, non-rolling, non-translating, not moving around with respect to its controlled space (for transitory use) 101 that is monitored. However, that monitoring-device 100 may have at least some moving parts in some embodiments, but that monitoring-device 100 as an overall unit may not be moving around that controlled space (for transitory use) 101.

Additionally, when the given controlled space (for transitory use) 101 may be movable and in a condition of movement (transit), such as, but not limited to, a moving truck in transit, a moving POD (or the like) in transit, a cargo container in transit, and/or the like, the monitoring-device(s) 100 mounted to that controlled space (for transitory use) 101 in transit are stationary/fixed with respect to its controlled space (for transitory use) 101. So, while the controlled space (for transitory use) 101 may be in transit, from the framework (reference) of the controlled space (for transitory use) 101, its monitoring-device(s) 100 are stationary/fixed.

In some embodiments, when a given monitoring-device 100 may be in use for monitoring at least one object within its associated controlled space (for transitory use) 101, that monitoring-device 100 may be stationary, fixed, non-moving, non-autonomous, non-flying, non-roving, non-walking, non-crawling, non-rolling, non-translating, not moving around and/or the like with respect to the at least one object that is monitored. However, that monitoring-device 100 may have at least some moving parts in some embodiments, but that monitoring-device 100 as an overall unit may not be moving around that controlled space (for transitory use) 101 and/or not moving around that at least one object. In some embodiments, the at least one object may physically fit inside of a given controlled space (for transitory use) 101. In some embodiments, the at least one object may be a vehicle, a boat, a RV, and/or the like.

In some embodiments, the tenant/client personal computing devices 303 (such as, but not limited to, a mobile/smart phone) may be used to (indirectly) interface with mounted and in use monitoring device(s) 100, within a given controlled space (for transitory use) 101, when the tenant/client personal computing devices 303 may be remotely (or locally) located from the given controlled space (for transitory use) 101 and/or the grounds 345. In some embodiments, the operator/manager and/or provider computing devices 305/309 (such as, but not limited to, a mobile/smart phone) may be used to (indirectly) interface with mounted and in use monitoring device(s) 100, within a given controlled space (for transitory use) 101, when the operator/manager and/or provider computing devices 305/309 may be remotely (or locally) located from the given controlled space (for transitory use) 101 and/or the grounds 345.

Figure 9:
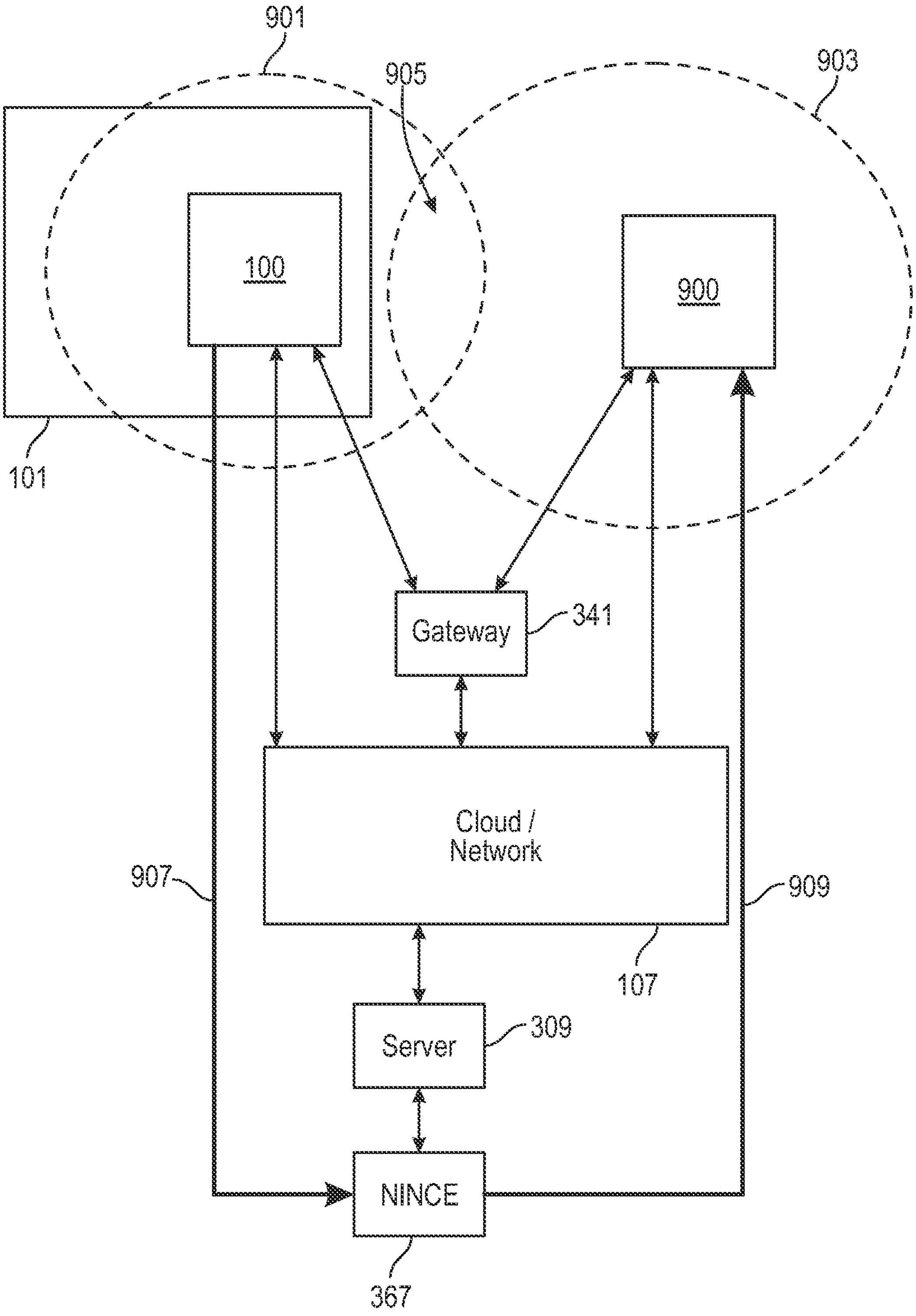
FIG. 9 is a block diagram showing a series of events that may occur when a previously known (electronic, computing, and/or mobile) device comes into physical proximity with a given (monitoring and/or lock) device associated with and/or installed at a given controlled space for transitory use (e.g., a given self-storage unit/space).

FIG. 9 is block diagram showing a series of events that may occur when a previously known device 900 comes into physical proximity with a given device 100. In FIG. 9 device 100 may be one or more of: a monitoring-device 100, an electronic-lock 100, and/or a smart lock 100. In FIG. 9 device 900 may be a generally handheld and/or mobile computing device, such as, but not limited to, a smart phone, a tablet computing device, a laptop, a smart watch, and/or a fob. In some embodiments, device 900 may be selected from one or more of: tenant device 303, facility operator device 305, provider device 309, and/or third-party device 311. In some embodiments, device 100 and/or device 900 may be configured for wireless (e.g., radio wave) communications of predetermined characteristics and/or protocol(s), such as, but not limited to, NFC (near field communications), RFID (radio frequency ID), WiFi, BT (Bluetooth), 802.15, ZigBee, LP-WAN, LoRa, LoRa WAN, low power wireless, cellular, and/or the like. In some embodiments, device 100 and/or device 900 may comprise one or more antennas that may be configured for wireless (e.g., radio wave) communications of predetermined characteristics and/or protocol(s), such as, but not limited to, NFC (near field communications), RFID (radio frequency ID), WiFi, BT, 802.15, ZigBee, LP-WAN, LoRa, LoRa WAN, low power wireless, cellular, and/or the like.

Continuing discussing FIG. 9, in some embodiments, device 100 via its one or more antennas may broadcast radio waves of predetermined characteristics and/or protocols up to a (variable) boundary denoted as effective-radio-signal-coverage 901 and for simplicity shown as generally spherical broken (dashed) line in FIG. 9 surrounding device 100. Similarly, in some embodiments, device 900 via its one or more antennas may broadcast radio waves of predetermined characteristics and/or protocols up to a (variable) boundary denoted as effective-radio-signal-coverage 903 and for simplicity shown as generally spherical broken (dashed) line in FIG. 9 surrounding device 900. However, it is understood that in reality, both effective-radio-signal-coverage 901 and effective-radio-signal-coverage 903 may degrade the further from the given transmitting antenna(s) and/or suffer from various environmental physical structures, interference, and/or blockages. In some embodiments, once device 900 comes within a certain minimum distance (proximity) from device 100, such that region-of-radio-signals-overlap 905 may come into existence. In some embodiments, region-of-radio-signals-overlap 905 may be region where effective-radio-signal-coverage 901 and effective-radio-signal-coverage 903 intersect (overlap) each other, with sufficient signal strength that device 100 may detect the presence of device 900 (e.g., by detecting its radio wave and/or optical emissions).

Continuing discussing FIG. 9, in some embodiments, once device 100 may detect the presence of device 900, then that detection event may be a “triggering event” that results in one or more communications from device 100 to NINCE 367 that are summarized in FIG. 9 by “trigger-communication-to-NINCE 907.” In some embodiments, in terms of data content trigger-communication-to-NINCE 907 may comprise that device 100 may have detected the presence of device 900. In some embodiments, in reality the heavy arrow of trigger-communication-to-NINCE 907 in FIG. 9 may initially move (wirelessly) from device 100 to cloud/network/internet 107, either directly or indirectly via gateway 341, and then from cloud/network/internet 107 to Server(s) 309, and NINCE 367 may be running on Server(s) 309. That is, this heavy arrow 907 in FIG. 9 may be representative of the trigger-notification sent from device 100 to NINCE 367 as a result of region-of-radio-signals-overlap 905 being of sufficient strength for device 100 to detect the presence of proximate device 900. In some embodiments, upon NINCE 367 receiving and/or validating trigger-communication-to-NINCE 907, NINCE 367 may then cause "NINCE-communication-to-device 909" from NINCE 367 to be sent to device 900. In some embodiments, in terms of data content, NINCE-communication-to-device 909 may comprise one or more notifications and/or messages, in at least a human natural language format (such as, but not limited to, a message and/or notification in English that a human would generally understand), so that a user (human) of device 900 may see, read, hear, and/or feel this one or more notifications and/or messages.

In some embodiments, any notification and/or message arising from and/or coming from NINCE 367 and destined (targeted) to a given user (such as, but not limited to, Tenant 401 and/or 403 and/or Facility Operator 405) may be in one or more of the following formats: email to the user; SMS (text message) to the user; an automated phone call and/or voicemail to the user; an in-app notification/message to the user; an in-phone notification/message (phone notification) to the user; an in-screen (on-screen) notification/message to the user; a notification/message to the user in cloud-based and/or web-based app and/or web-portal; a pop-up notification/message appearing on a screen to the user; a direct message (DM) to the user; a private message (PM) to the user; combinations thereof; and/or the like. In some embodiments, targeting the given user may be done by targeting a device of the user, such as, but not limited to, device 900, tenant device 303, facility operator device 305, provider device 309, third-party device 311, a fob of the user; by targeting software running on the user device; by targeting an address associated with that user, such as, but not limited to, an email address of the user, a phone number of the user, and/or the like; by targeting an address associated with the user's device 900, such as, but not limited to, a MAC address of device 900, an IP address of device 900, a serial number of device 900, a unique identifier of device 900 and/or the like; combinations thereof; and/or the like.

In some embodiments, the notification and/or message to the given user may comprise one or more of: a visual component; an auditory component; a touch, a tactile, and/or a vibratory component; portions thereof; combinations thereof; and/or the like. In some embodiments, the visual component and/or the auditory (sound) component may comprise human natural language elements, such as, but not limited to: a letter, a number, a word, a sentence, a statement, a phrase, a saying, a greeting, a question, a paragraph, a motto, a tagline, a brand, a trademark, punctuation, combinations thereof, and/or the like. In some embodiments, the visual component may further comprise one or more of: a graphic, an animation, a video, a photograph, an icon, an emoji, an avatar, a logo, portions thereof, combinations thereof, and/or the like.

Figure 12A:
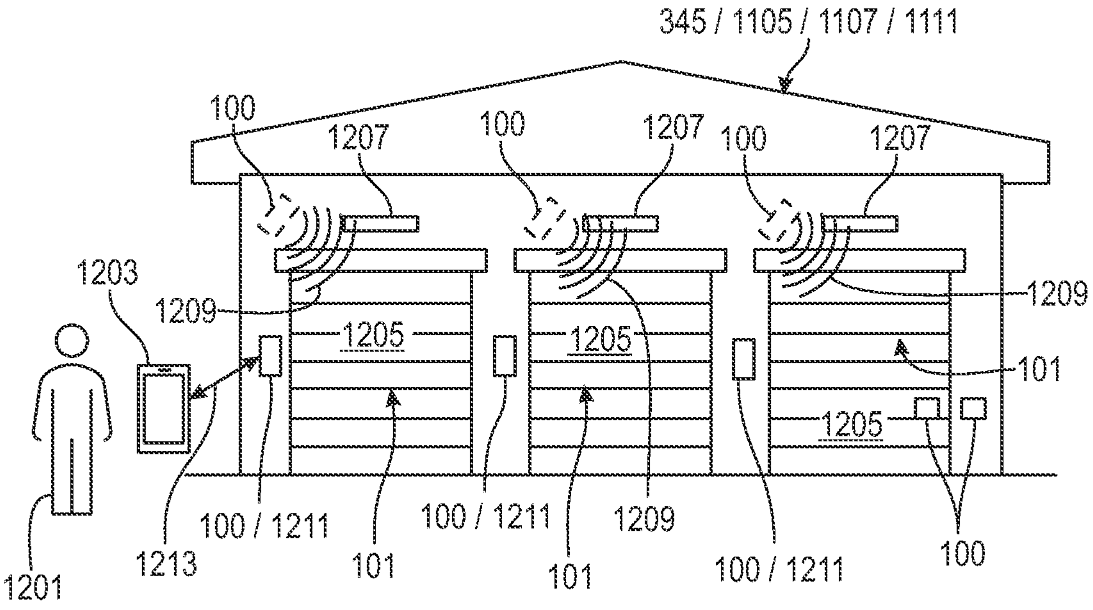
FIG. 12A may be a partial and different view of a storage facility (grounds), as compared to FIG. 11, e.g., a front, side, and/or partial elevation view.

In some embodiments, if the notification and/or message to the given user (and/or to that user's device) from NINCE 367 may comprise a human natural language question posed to the user, then that user may respond with human natural language to answer and/or respond to the posed natural language question. In some embodiments, the natural language question from NINCE 367 to the user may be in the form of a binary question, a polar question, a general question, a yes-no question, and/or the like, wherein these may be a type of question whose expected answer is one of two choices, i.e., an affirmative response/answer (e.g., yes or an equivalent) or a negative response/answer (e.g., no or an equivalent). In some embodiments, the user may respond to the NINCE 367 posed natural human language question, with a human natural language answer (such as, but not limited to, yes, no, or appropriate contextual equivalents), and the user may respond using one or more of the following formats: in the same format that the user had received the question from NINCE 367; email to NINCE 367; SMS (text message) to NINCE 367; a phone call and/or voicemail to NINCE 367; an in-app notification/message to NINCE 367; an in-phone notification/message (phone notification) back to NINCE 367; using an in-screen notification/message back to NINCE 367; a notification/message to NINCE 367 via an in cloud-based and/or web-based app and/or web-portal; a pop-up notification/message appearing on a screen to the user back to NINCE 367; a direct message (DM) back to NINCE 367; a private message (PM) back to NINCE 367; combinations thereof; and/or the like. In this manner, the user and NINCE 367 may engage in an AI (artificial intelligence) bot conversation, such as, but not limited to, generative AI for conversation. Also, in some embodiments, NINCE 367 need not ask any question of the user, e.g., when entry into a given controlled space for transitory use (storage unit/space) 101 may be pre-authorized and pre-entry detected, such as, not limited to, as shown in FIG. 12A and FIG. 13B. That is, NINCE 367 use of such questions to the users may be situationally aware.

Continuing discussing FIG. 9, in some embodiments, the one or more notification and/or message of NINCE-communication-to-device 909 may be in one or more of the following formats: email to the user; SMS (text message) to the user; an automated phone call and/or voicemail to the user; an in-app notification/message to the user; an in-phone notification/message (phone notification) to the user; an in-screen notification/message to the user; a notification/message to the user in cloud-based and/or web-based app and/or web-portal; a pop-up notification/message appearing on a screen to the user; a direct message (DM) to the user; a private message (PM) to the user; combinations thereof; and/or the like. In some embodiments, in reality the heavy arrow of NINCE-communication-to-device 909 in FIG. 9 may move from NINCE 367 operating on Server 309 to cloud/network/internet 107, then (wirelessly) from cloud/network/internet 107 either directly, or indirectly via gateway 341, to device 900. That is, this heavy arrow 309 in FIG. 9 may be representative of the notification(s)/message(s) sent from NINCE 367 to device 900 as a result of region-of-radio-signals-overlap 905 of sufficient strength for device 100 to detect the presence of proximate device 900 to device 100. Similarly, the user, via their device 900 may communicate with NINCE 367 using one or more of: radio transmissions, optical transmissions, gateway 341, cloud/network/internet 107, Server(s) 309, a portion thereof, combinations thereof, and/or the like; and these communications from the user using their device 900 to NINCE 367 may comprise natural language elements, aspects, components, content, combinations thereof, and/or the like.

In some embodiments, FIG. 9 may show a system for providing at least one message (notification) 909 to a known electronic-device 900 or to a user of the known electronic-device 900, based on at least one electronic-monitoring-device 100 detecting proximity of the known electronic-device 900 to the at least one electronic-monitoring-device 100. In some embodiments, such a system may comprise the at least one electronic-monitoring-device 100 and a set of instructions (e.g., NINCE 367). In some embodiments, this at least one message 909 may be at least one notification 909. In some embodiments, this system may further comprise the at least one message (notification) 909. In some embodiments, the set of instructions may be software and/or may be NINCE 367. In some embodiments, the set of instructions (e.g., NINCE 367) may non-transitorily reside in electronic-storage (such as, but not limited to, a hard drive or the like). In some embodiments, the set of instructions (e.g., NINCE 367) may be executable by at least one processor of at least one computer-server 309. In some embodiments, the at least one computer-server 309 may comprise the electronic-storage or may be in communication with the electronic-storage. In some embodiments, the set of instructions (e.g., NINCE 367) may be in at least intermittent communication with the at least one electronic-monitoring-device 100. In some embodiments, the set of instructions (e.g., NINCE 367) may be in at least intermittent communication with the known electronic-device 900. In some embodiments, when the at least one electronic-monitoring-device 100 detects a broadcast 903 from the known electronic-device 900 of a particular characteristic, the at least one electronic-monitoring-device 100 communicates that detection of the known electronic-device 900 to the set of instructions (e.g., NINCE 367). In some embodiments, the set of instructions (e.g., NINCE 367) may generate the at least one message (notification) 909. In some embodiments, the set of instructions (e.g., NINCE 367) may communicate the at least one message (notification) 909 to the known electronic-device 900 or to the user of the known electronic-device 900.

In some embodiments, the at least one electronic-monitoring-device 100 may comprise at least one sensor 505 and at least one antenna 507 (see e.g., FIG. 5A to FIG. 5C). In some embodiments, the at least one electronic-monitoring-device 100 may be configured to monitor a controlled space for transitory use 101. In some embodiments, the controlled space for transitory use 101 may be at least one self-storage unit 101 (see e.g., FIG. 1, FIG. 3A, FIG. 3B, FIG. 7B, and/or FIG. 7C).

Continuing discussing system embodiments of FIG. 9, in some embodiments, the at least one message (notification) 909 may comprise an element that is in a human understandable natural language format that is configured to be seen and/or heard by the user of the known electronic-device 900. In some embodiments, the human understandable natural language may comprise one or more of: a letter, a number, a word, a sentence, a statement, a phrase, a saying, a greeting, a question, a paragraph, a motto, a tagline, a brand, a trademark, punctuation, combinations thereof, and/or the like, and in a human recognizable language, such as, but not limited to, English (Spanish, etc.). In some embodiments, the at least one message (notification) 909 may be of a format selected from one or more of the following: an email to an email-address of the user; a text message to the user; a short message service (SMS) message to the user; an automated phone call to a phone number of the user; an in-app message to the user; an in-phone message (phone notification) to the user; a message displayed on a screen of the known electronic-device; a cloud-based app message; a web-based app message; a web-portal message; a pop-up message appearing on the screen; a direct message (DM) to the user appearing on the screen; a private message (PM) to the user appearing on the screen; an auditory file that is configured to be emitted from a speaker of the known electronic-device; a portion thereof; combinations thereof; and/or the like.

Continuing discussing system embodiments of FIG. 9, in some embodiments, a type of the known electronic-device 900 may be selected from one or more of: a smart phone, a tablet computing device, a laptop, a smart watch, a handheld-electronic-device, a handheld-computing-device, an electronic device that is configured to be wearable by a user, a computing device that is configured to be wearable by the user, or a fob, a portion thereof, combinations thereof, and/or the like.

Continuing discussing system embodiments of FIG. 9, in some embodiments, the broadcast 903 from the known electronic-device 900 may originate from one or more of the following: an antenna of the known electronic-device 900; a speaker of the known electronic-device 900; a lens of the known electronic-device 900; a screen of the known electronic-device 900; a portion thereof; combinations thereof, and/or the like. In some embodiments, the broadcast 903 from the known electronic-device is in a format selected from one or more of the following: a radio transmission, an optical transmission, an electromagnetic transmission, a laser transmission, a sound transmission, a portion thereof, combinations thereof, and/or the like. In some embodiments, the broadcast 903 from the known electronic-device 900 may be a "reflection" or a (screen) display of a quick response (QR) code; wherein the particular characteristic of the broadcast 903 may comprise the quick response (QR) code. Note, "reflection" in this context may be applicable if the QR code on the known electronic-device 900 may be a sticker (label) instead of being displayed from a screen of the known electronic-device 900, such that what a sensor 505 (such as, but not limited to a camera) of the at least one electronic-monitoring-device 100 detects is the reflection of this QR code sticker (label). Additionally, in some embodiments, such a QR code may be replaced with any other type of: optical code, barcode (bar code), 2D code (two-dimensional code), 3D code (three-dimensional code), a portion thereof, combinations thereof, and/or the like.

Continuing discussing system embodiments of FIG. 9, in some embodiments, the broadcast 903 or a portion of the broadcast 903 may be received at one or more of: an antenna 507 of the at least one electronic-monitoring-device 100, a camera 505 of the at least one electronic-monitoring-device 100, a microphone 509 of the at least one electronic-monitoring-device 100, or a sensor 505 of the at least one electronic-monitoring-device 100 that is configured for detecting the broadcast 903 from the known electronic-device 900. In some embodiments, I/O 509 of the at least one electronic-monitoring-device 100 may comprise at least one microphone.

Continuing discussing system embodiments of FIG. 9, in some embodiments, the particular characteristic of the broadcast 903, of the known electronic-device 900, may comprise at least one unique identifier of the known electronic-device 900 or of the user. In some embodiments, prior to the at least one electronic-monitoring-device 100 detecting proximity of the known electronic-device 900, the set of instructions (e.g., NINCE 367) may associate that at least one unique identifier with the known electronic-device 900 or with the user, in a database that the set of instruction (e.g., NINCE 367) is configured to communicate with; and then in some embodiments, the set of instructions (e.g., NINCE 367) may pass (communicate) that at least one identifier (of the known electronic-device 900 or of the user) to the at least one electronic-monitoring-device 100; so that moving forward in time, i.e., in the future, now that the at least one electronic-monitoring-device 100 has the capacity to detect a "known" electronic-device 900, because now the at least one electronic-monitoring-device 100 is capable of receiving broadcasts 903 from that particular electronic-device 900 and recognizing that particular electronic-device 900 is associated with a particular user.

Continuing discussing system embodiments of FIG. 9, in some embodiments, after the set of instructions (e.g., NINCE 367) has communicated the at least one message (notification) 909 (to the known electronic-device 900 and/or to the user), the set of instructions (e.g., NINCE 367) may be configured to receive and to respond to a responsive-communication from the known electronic-device 900 or from the user. In some embodiments, the responsive-communication may be responsive to the at least one message (notification) 909. In some embodiments, the responsive-communication may comprise an element that is in a same human understandable natural language format as the at least one message (notification) 909 was in. In some embodiments, the responsive-communication may be in a same format as a format of the at least one message (notification) 909.

Continuing discussing system embodiments of FIG. 9, in some embodiments, the set of instructions (e.g., NINCE 367) may be programmed to interpret the at least one electronic-monitoring-device 100 receiving the broadcast 903 from the known electronic-device 900 in overlapping time with receiving an access event to the controlled space for transitory use 101, as being an authorized access to that the controlled space for transitory use 101. In some embodiments, the set of instructions (e.g., NINCE 367) may (only) communicate the at least one message (notification) 909 if the set of instructions (e.g., NINCE 367) has also received a communication from the at least one electronic-monitoring-device 100 of an access event that overlaps in time to when the at least one electronic-monitoring-device 100 detects the broadcast 903. In some embodiments, the access event may be at least one sensor 505 (such as, but not limited to, a motion detector) of the at least one electronic-monitoring-device 100 detecting that the controlled space for transitory use 101 that the at least one electronic-monitoring-device 100 is monitoring is being accessed. In some embodiments, such an access event may be one of the possible triggered events discussed below in a step 1001 of a method 1000 in FIG. 10.

Figure 10:
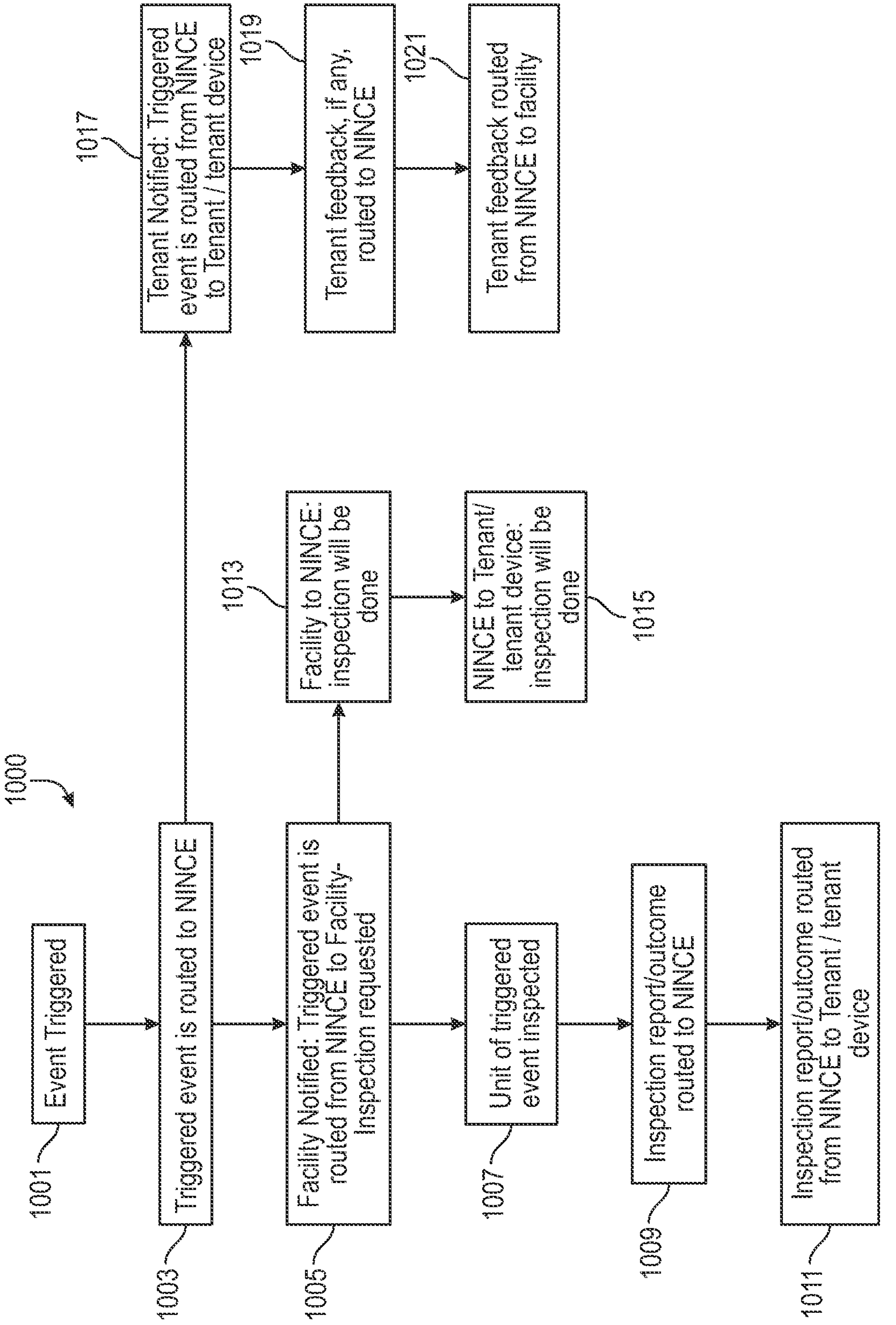
FIG. 10 is a flow diagram that may show at least some steps of a method of reporting a triggered event to a tenant.

FIG. 10 is a flow diagram that may show at least some steps of a method 1000 of reporting a triggered event to a given Tenant 401. In some embodiments, execution of method 1000 may resolve the potential event without Tenant 401/403 involvement (automatically from the perspective of Tenant 401/403) or with minimal involvement. In some embodiments, method 1000 may comprise one or more of: step 1001, step 1003, step 1005, step 1007, step 1009, step 1011, step 1013, step 1015, step 1017, step 1019, step 1021, portions thereof, combinations thereof, and/or the like. In some embodiments, at least one or more of these steps may be: optional, omitted, executed out of reference numeral order, combinations thereof, and/or the like.

Continuing discussing FIG. 10, in some embodiments, step 1001 may be a step of an event being triggered. In some embodiments, the event may be triggered at a given deployed monitoring-device 100 that may be installed within a given controlled space for transitory use 101 (such as, but not limited, to a given storage unit/space) (space 101). In some embodiments, the triggered event may result from that given monitoring-device 100 generating one or more sensor readings that are outside of a predetermined range (threshold).

For example, and without limiting the scope of the present invention, the triggered event may be one or more of: detection of device 900 (see e.g., FIG. 9); access to that given controlled space for transitory use 101 is detected; unauthorized access to that given controlled space for transitory use 101 is detected; a too high of a temperature reading in that given controlled space for transitory use 101; a too low of a temperature reading in that given controlled space for transitory use 101; an excessive smoke detection reading in that given controlled space for transitory use 101; a fire detection in that given controlled space for transitory use 101; excessive water detection in that given controlled space for transitory use 101; leak detection in that given controlled space for transitory use 101; too high of humidity detected in that given controlled space for transitory use 101; too low of humidity detected in that given controlled space for transitory use 101; excessive unauthorized motion detected in that given controlled space for transitory use 101; excessive airborne predetermined chemicals, molecules, compounds, radon, VOCs (volatile organic compounds), carbon dioxide, carbon monoxide, odors, smells, portions thereof, combinations thereof, and/or the like detected in that given controlled space for transitory use 101; excessive noise/sound detected at that monitoring-device 100 (such as, but not limited to, above a predetermined decibel threshold); excessive noise/sound of a particular and/or predetermined quality detected at that monitoring-device 100 (such as, but not limited to, sound of breaking glass); excessive movement of that monitoring-device 100; excessive vibration of that monitoring-device 100; movement and/or motion (above a minimum threshold) detected of the monitoring-device 100 itself (by that monitoring-device 100 and/or by another proximate monitoring-device 100); movement and/or motion (above a minimum threshold) detected within that given storage unit/space 101 by its monitoring-device 100; excessive movement of the given storage unit/space 101 itself or a portion thereof where that monitoring-device 100 is located; excessive vibration of the given storage unit/space 101 itself or a portion thereof where that monitoring-device 100 is located; portions thereof; combinations thereof; and/or the like. In some embodiments, completion of step 1001, may progress method 1000 to step 1003.

Note, in some embodiments, running of time from the start of a given trigger may be used to end that particular trigger event. NINCE 367 may provide a time period of designated time to awaiting loop feedback closure from the end user of the controlled space and/or from the facility. The duration can be fixed or adaptable based on usage patterns of the user, designated by the facility, designated by user, or smartly learned based on the use of machine learning of the end users patterns and other contextual information from other property sensors and/or information.

Continuing discussing FIG. 10, in some embodiments, step 1003 may be a step of routing the triggered event of step 1001 to NINCE 367. In some embodiments, when the triggered event may be originating at/from the given monitoring-device 100, then that monitoring-device 100 may send the triggered event to NINCE 367. In some embodiments, completion of step 1003, may progress method 1000 to step 1005 and/or to step 1017.

Continuing discussing FIG. 10, in some embodiments, step 1005 may be a step of routing (sending and/or transmitting) the triggered event of step 1001 (or a portion thereof) from NINCE 367 to the Facility 345, facility operate device 305, and/or the Facility Operator 405, where the triggered event originated from. In some embodiments, included within the step 1005 facility notification may be a request that the Facility 345 conduct some form of inspection of the given controlled space for transitory use 101 where the triggered event was triggered (originated) from, with an intent to either verify the triggered event or find there is no triggered event (or that the triggered event has stopped). In some embodiments, completion of step 1005, may progress method 1000 to step 1007 and/or to step 1013.

Continuing discussing FIG. 10, in some embodiments, step 1007 may be a step of (physically) inspecting the given controlled space for transitory use 101 where the triggered event was triggered from. In some embodiments, the inspection of the given controlled space for transitory use 101 may be conducted by one or more of: a human (e.g., a Facility Operator 405), a camera, a drone, a robot, an appropriate sensor device, portions thereof, combinations thereof, and/or the like. In some embodiments, this inspection may generate/output an inspection report/outcome. In some embodiments, the inspection report/outcome (or a portion thereof) may be in a digital file format. In some embodiments, the inspection report/outcome may comprise data as to whether or not the triggered event was verified or not. In some embodiments, completion of step 1007, may progress method 1000 to step 1009.

Continuing discussing FIG. 10, in some embodiments, step 1009 may be a step of routing the inspection report/outcome from step 1007 to NINCE 367. In some embodiments, in step 1009, NINCE 367 may receive the inspection report/outcome from step 1007. In some embodiments, the inspection report/outcome may be transmitted (sent) from facility operator device 305 to NINCE 367. In some embodiments, completion of step 1009, may progress method 1000 to step 1011.

Continuing discussing FIG. 10, in some embodiments, step 1011 may be a step of routing (sending) the inspection report/outcome (or a portion thereof) to Tenant 401/403 of that given controlled space for transitory use 101 that was inspected. In some embodiments, NINCE 367 may transmit (send) the inspection report/outcome (or the results or conclusion of that inspection) to tenant device 303. For example, and without limiting the scope of the present invention, if the triggered event in step 1001 had been an unauthorized access warning, and if the step 1007 inspection determined that this warning was a false alarm (or the like), then the step 1011 notification/message from NINCE 367 to Tenant 401/403 may be a simple as letting that Tenant 401/403 know that this was a mere false alarm; in which case, the Tenant 401/403 is not required to do anything further and has received peace of mind. Whereas, if the step 1007 inspection determined that the unauthorized access warning was legitimate, then the step 1011 notification/message from NINCE 367 to Tenant 401/403 may notify that Tenant 401/403 of the legitimate incident and/or pose an escalation question to that Tenant 401/403. For example, and without limiting the scope of the present invention, such an escalation question might read as follows, "Josephine, motion was noticed in your unit B177 on Feb. 19, 2024, at 6:06 am PST at Acme Storage, Denton. Was this you? Please reply Yes or No."

Continuing discussing FIG. 10, in some embodiments, step 1013 may be a step of NINCE 367 receiving confirmation that inspection will be done of the given controlled space for transitory use 101 by the Facility 345 where the trigger event of step 1001 had originated from. In some embodiments, facility operator device 305 may send (transmit) this confirmation message to NINCE 367. In some embodiments, this confirmation message to NINCE 367 may also include a timeframe in which the inspection shall be conducted and/or completed by. In some embodiments, completion of step 1013, may progress method 1000 to step 1015.

Continuing discussing FIG. 10, in some embodiments, step 1015 may be a step of NINCE 367 sending (transmitting) to the given Tenant 401/403 a notification/message that an inspection will be done of their rented (lease) controlled space for transitory use 101 where the event trigger had occurred in step 1001. In some embodiments, this NINCE 367 notification/message to Tenant 401/403 may also include the (approximate) timeframe in which the inspection shall be conducted (and/or completed by). In some embodiments, in step 1015, NINCE 367 may send this notification/message to tenant device 303. In some embodiments, execution of step 1015 may provide peace of mind to Tenant 401/403 regarding this triggered event incident, and may do so, without any Tenant 401/403 involvement in some instances. In some embodiments, if method executes step 1015, then Tenant 401/403 may be expecting and/or waiting on the NINCE 367 notification/message from step 1011.

Continuing discussing FIG. 10, in some embodiments, step 1017 may be a step of NINCE 367 sending a notice, notification, and/or message to Tenant 401/403 and/or to tenant device 303 of the triggered event from step 1001 (or a portion thereof), so that Tenant 401/403 can be made aware of the potential issue and/or incident with their space/unit 101. In some embodiments, depending upon the nature of the triggered event, the step 1017 notification/message to Tenant 401/403 from NINCE 367, may include feedback from Tenant 401/403. For example, and without limiting the scope of the present invention, if the step 1001 triggered event had been an unauthorized access warning, then the step 1017 NINCE 367 notification/message to Tenant 401/403, may include a request for feedback from that Tenant 401/403 if the sensed access was authorized or not. In some embodiments, completion of step 1017, may progress method 1000 to step 1019.

Continuing discussing FIG. 10, in some embodiments, step 1019 may be a step of NINCE 367 receiving feedback from Tenant 401/403, if the step 1017 NINCE 367 notification/message to Tenant 401/403 had included a request for Tenant 401/403 feedback. For example, and without limiting the scope of the present invention, if the step 1001 triggered event had been an unauthorized access warning, then the step 1017 NINCE 367 notification/message to Tenant 401/403, may include a request for feedback from that Tenant 401/403 if the sensed access was authorized or not. And then if the Tenant 401/403 reports back to NINCE 367 in step 1019 that the access was indeed unauthorized, then NINCE 367 in step 1021 can relay that information to the Facility 345, facility operator device 305, and/or the Facility Operator 405, which in turn may heighten the need for the step 1007 inspection, if that inspection had yet to occur. Whereas, if the Tenant 401/403 reports back to NINCE 367 in step 1019 that the access was actually authorized, then NINCE 367 in step 1021 can relay that information to the Facility 345, facility operator device 305, and/or the Facility Operator 405, so that step(s) 1005, 1007, 1009, 1011, 1013, and/or 1015 may be canceled, not executed, and/or the like. In some embodiments, completion of step 1019, may progress method 1000 to step 1021.

Continuing discussing FIG. 10, in some embodiments, step 1021 may be a step of NINCE 367 sending the Tenant 401/403 feedback, if any, to the Facility 345, facility operator device 305, and/or the Facility Operator 405.

In some embodiments, communications between the various hardware and/or devices of FIG. 10, such as, but not limited to, monitoring-device 100, tenant device 303, facility operator device 305, provider device 309, third-party device 311, device 900, Server(s) 309, and/or NINCE 367 may utilize one or more of: radio waves (such as, but not limited to, wireless communications and/or cellular communications), gateway 341, clout/network/internet 107, Server (s) 309, a portion thereof, combinations thereof, and/or the like (see e.g., FIG. 3A to FIG. 4).

Figure 11:
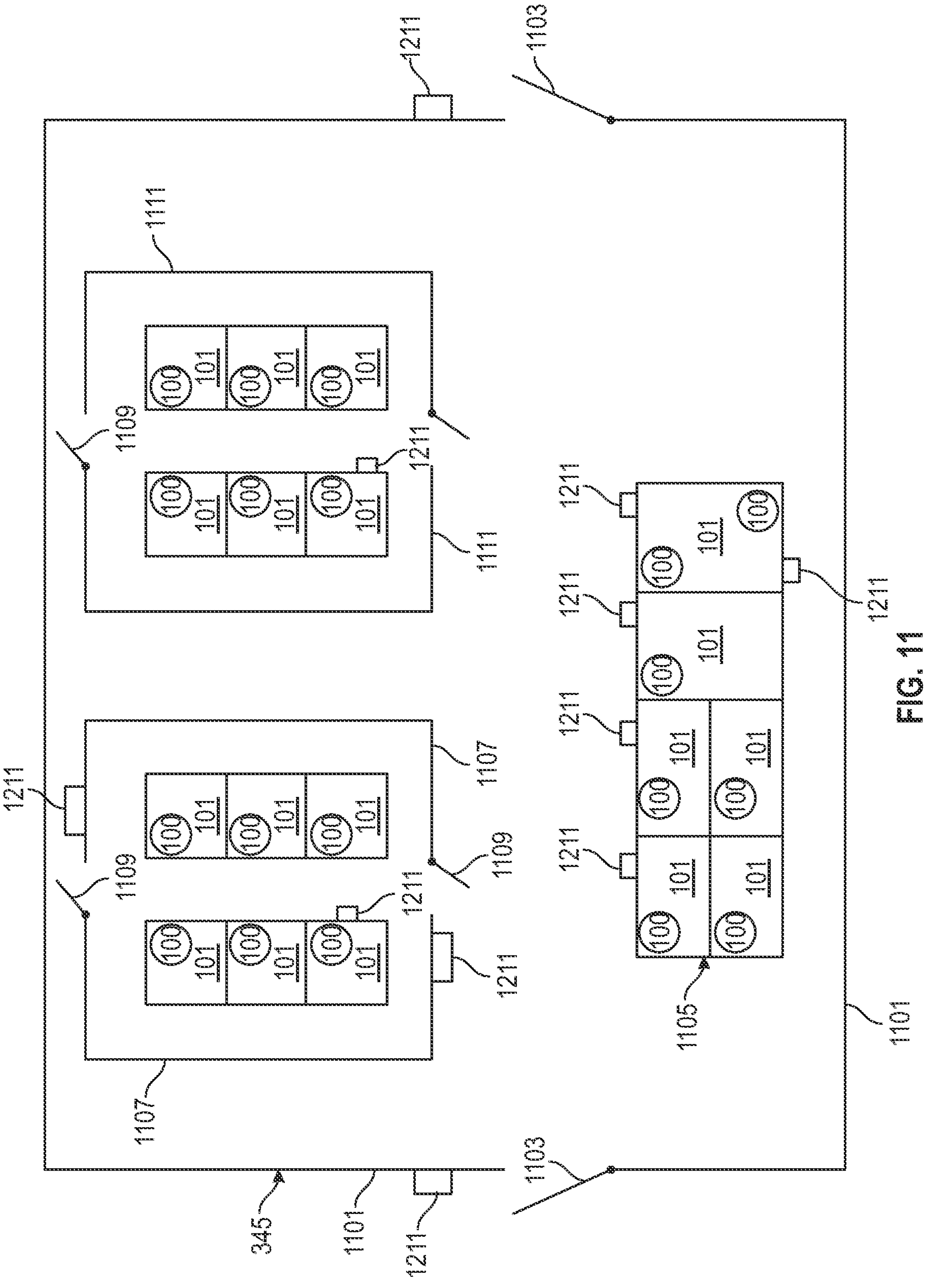
FIG. 11 may show a top-down schematic view of a given and/or a typical storage facility (grounds) outfitted with monitoring-devices and/or presence identifiers (e.g., with a plurality of buildings, storage units, monitoring-devices, presence identifiers, gates, and/or doors).

FIG. 11 may show a top-down schematic view of a given and/or a typical storage facility (grounds) 345. In some embodiments, storage facility (grounds) 345 may comprise (have) one or more controlled spaces for transitory use 101 therein, such as, but not limited to, storage units 101 and/or vehicle yard(s), hangars, and/or stalls that may be configured for storing one or more vehicles 741 and/or the like. FIG. 11 may show a top-down schematic view of at least one level of a given and/or a typical storage facility (grounds) 345. In some embodiments, an outermost boundary of storage facility (grounds) 345 may be facility perimeter (boundary) 1101. In some embodiments, storage facility (grounds) 345 may comprise at least one facility perimeter (boundary) 1101. In some embodiments, facility perimeter (boundary) 1101 may be an outermost boundary and/or perimeter of a given storage facility (grounds) 345. In some embodiments, facility perimeter (boundary) 1101 may be at least one wall and/or at least one fence. In some embodiments, at least a portion of facility perimeter (boundary) 1101 may coincide with an outermost portion of a building. In some embodiments, facility perimeter (boundary) 1101 may be at least substantially (continuous) around its storage facility (grounds) 345, except for at least one gate 1103 (or door 1103). In some embodiments, storage facility (grounds) 345 and/or facility perimeter (boundary) 1101 may comprise at least one gate 1103 (or door 1103). In some embodiments, at least one gate 1103 (or door 1103) may be configured (sized) for movement, entry, exit, ingress, egress, and/or the like of motor vehicles in and/or out of storage facility (grounds) 345, such as, but not limited to, cars, SUVs (sport utility vehicles), vans, trucks, pickup trucks, flatbed trucks, box trucks, semitrucks, tractors, tractor-trailers, forklifts, motorcycles, bicycles, scooters, drones, robots, trains, trams, train cars, boxcars, skid steers, excavators, combinations thereof, and/or the like. In some embodiments, at least one gate 1103 (or door 1103) may be configured (sized) for movement, entry, exit, ingress, egress, and/or the like of humans in and/or out of storage facility (grounds) 345. In some embodiments, at least one gate 1103 (or door 1103) may be at least one of: a swing door, a swing gate, a hinged door, a hinged gate, a rollup door, a rolldown door, and/or the like. In some embodiments, at least one gate 1103 (or door 1103) may be manually and/or automatically operated. In some embodiments, at least one gate 1103 (or door 1103) may be locally (onsite) and/or remotely (offsite) controlled and/or operated. In some embodiments, at least one gate 1103 (or door 1103) may be lockable. In some embodiments, at least one gate 1103 (or door 1103) may automatically lock when closed.

Continuing discussing FIG. 11, in some embodiments, storage facility (grounds) 345 may comprise at least one building or a portion of at least one building. In some embodiments, storage facility (grounds) 345 may comprise at least one building or a portion of at least one building, such as, but not limited to, a drive-up building 1105, a climate-controlled building 1107, a building 1111, a portion thereof, combinations thereof, and/or the like. In some embodiments, each of drive-up building 1105, climate-controlled building 1107, and/or building 1111, may comprise (have) at least one level (floor). In some embodiments, at least one of drive-up building 1105, climate-controlled building 1107, and/or building 1111 may comprise (have) two or more levels (floors). In some embodiments, different levels (floors) may be accessible by stairs, ladders, elevators, escalators, dumbwaiters, conveyors, combinations thereof, and/or the like. In some embodiments, each of drive-up building 1105, climate-controlled building 1107, and/or building 1111, may comprise (contain) its own one or more controlled spaces for transitory use 101 (storage units 101). In some embodiments, drive-up building 1105 may be configured to be driven up from via one or more motor vehicles. In some embodiments, climate-controlled building 1107 and/or its controlled spaces for transitory use 101 (storage units 101) may be climate controlled, with respect to temperature and/or humidity. In some embodiments, at least a portion of climate-controlled building 1107 may not be climate controlled (such as, but not limited to, portions outside of at least one of its storage units 101). In some embodiments, drive-up building 1105 and/or building 1111 and/or its controlled spaces for transitory use 101 (storage units 101) may be climate controlled, with respect to temperature and/or humidity. In some embodiments, at least a portion of drive-up building 1105 and/or building 1111 may not be climate controlled. In some embodiments, climate control when present at a given storage facility (grounds) 345 may be provided by HVAC equipment that is typical and/or well understood in the prior art of building climate control. In some embodiments, any building or a portion of any building of storage facility (grounds) 345 may comprise (have) at least one door 1109. In some embodiments, building drive-up building 1105, climate-controlled building 1107, and/or building 1111 may comprise (have) at least one door 1109. In some embodiments, at least one door 1109 may be configured (sized) for movement, entry, exit, ingress, egress, and/or the like of motor vehicles in and/or out of a building of storage facility (grounds) 345; and/or in some embodiments, at least one door 1109 may be configured (sized) for movement, entry, exit, ingress, egress, and/or the like of humans in and/or out of a building of storage facility (grounds) 345. In some embodiments, at least one door 1109 may be lockable. In some embodiments, at least one door 1109 may automatically lock when closed. In some embodiments, at least one door 1109 may be implemented as a gate. In some embodiments, at least one door 1109 may be at least one of: a swing door, a swing gate, a hinged door, a hinged gate, a rollup door, a rolldown door, and/or the like. In some embodiments, at least one door 1109 may be manually and/or automatically operated. In some embodiments, at least one door 1109 may be locally (onsite) and/or remotely (offsite) controlled and/or operated.

Continuing discussing FIG. 11, in some embodiments, (removably or permanently) located on the premises of storage facility (grounds) 345 may be at least one monitoring-device 100. In some embodiments, (removably or permanently) located in and/or on at least one controlled space for transitory use 101 (storage unit 101) of that storage facility (grounds) 345 may be at least one monitoring-device 100. In some embodiments, at least one controlled space for transitory use 101 (storage unit 101) of that storage facility (grounds) 345 may have located on or within at least two (separate and distinct) monitoring-devices 100. In some embodiments, a given monitoring-device 100 may be located outside of the controlled space for transitory use 101 that it monitors (but within line of sight and/or within radio wave communication range). In some embodiments, a given monitoring-device 100 may be located outside of the controlled space for transitory use 101 that it monitors, such as, but not limited to, when that monitoring-device 100 may be configured to function as a door (break) sensor for its controlled space for transitory use 101.

Continuing discussing FIG. 11, in some embodiments, located on and/or in: storage facility (grounds) 345, facility perimeter (boundary) 1101, a fence (of storage facility (grounds) 345), a wall (of storage facility (grounds) 345), (facility) gate 1103, drive-up building 1105, climate-controlled building 1107, (building) door 1109, building 1111, a building (of storage facility (grounds) 345), controlled space for transitory use 101 (storage unit 101), door 1205 (of storage unit 101) may be at least one presence identifier 1211. Note, see also FIG. 12A and/or FIG. 12B for door 1205 and/or presence identifier 1211.

Not explicitly shown in FIG. 11, but shown in FIG. 3B, in some embodiments, located on storage facility (grounds) 345 may be at least one hub/gateway 341 and/or at least one audible indicator 343. In some embodiments, presence identifier(s) 1211 and/or monitoring-device(s) 100 may be in (wired and/or wireless) communications with: hub/gateway (s) 341/361, NINCE 367 (computer server(s)), user-devices noted herein, combinations thereof, and/or the like. In some embodiments, monitoring-device(s) 100 and/or presence identifier(s) 1211 may utilize cellular communications to communicate with NINCE 367.

In some embodiments, any gate and/or door of storage facility (grounds) 345, such as, but not limited to (facility) gate 1103, (building) door 1109, (storage unit and/or rollup) door 1205, may have at least one associated presence identifier 1211 posted on and/or at that particular gate and/or door, and/or within near physical proximity to that particular gate and/or door (e.g., being ten feet or less between the given gate and/or door and its presence identifier 1211). Note, (storage unit and/or rollup) door 1205 is shown in FIG. 12A and in FIG. 12B. In some embodiments, proximity between a given presence identifier 1211 and the gate and/or door that is associated with that presence identifier 1211 may be twenty-five (25) feet or less from each other.

In some embodiments, the presence identifier 1211 that is associated with a given gate and/or door may be remotely located from each other. For example, and without limiting the scope of the present invention, a (pre) authorized user 401 remotely located from their controlled space for transitory use 101, and via using their smartphone 303 may authenticate another user 1215 for entry and/or use of that controlled space for transitory use 101 by entering a code (e.g., a pin) via their smartphone 303 that is in communication with NINCE 367; and then NINCE 367 may pass this authorization to a monitoring-device 100 of that controlled space for transitory use 101 and/or to a local presence identifier 1211 of that controlled space for transitory use 101. See e.g., FIG. 12A or FIG. 12B. In this particular example, authorized user's 401 smartphone 303 may be a remotely located presence identifier 1211 (with respect to the controlled space for transitory use 101).

FIG. 12A may be partial and different view of storage facility (grounds) 345, as compared to FIG. 11, e.g., a front, side, and/or partial elevation view. FIG. 12A may show a schematic diagram of a system of how a given user 1201 may be pre-identified and/or pre-authorized for access (entry) into a given controlled space for transitory use 101 (storage unit 101) before a door 1205 of that given controlled space for transitory use 101 (storage unit 101) is even (unlocked and/or) opened. Note, in some embodiments, FIG. 12A, FIG. 13A, and FIG. 13B may be used together to understand how the given user 1201 may be pre-identified and/or pre-authorized for access (entry) into the given controlled space for transitory use 101 (storage unit 101) before the door 1205 of that given controlled space for transitory use 101 (storage unit 101) is even (unlocked and/or) opened. FIG. 12A provides the system and schematic views; whereas, FIG. 13A and FIG. 13B may provide the method and/or the steps.

Continuing discussing FIG. 12A, in some embodiments, when user 1201 and/or when user-device 1203 come within proximity of the controlled space for transitory use 101 (storage unit 101) that user 1201 intends to enter (access), but before entry, and the door 1205 of that controlled space for transitory use 101 (storage unit 101) may even be closed, communications and/or interactions may occur between that user 1201 and a presence identifier 1211 of that controlled space for transitory use 101 (storage unit 101); and/or communications and/or interactions may occur between that user-device 1203 and the presence identifier 1211 of that controlled space for transitory use 101 (storage unit 101). In some embodiments, if that user 1201 and/or that user-device 1203 have already (previously) been associated (linked) in a database or the like with that particular controlled space for transitory use 101 (storage unit 101), its monitoring-device (s) 100, and/or its presence identifier 1211; then when user 1201 and/or user-device 1203 comes into proximity to that presence identifier 1211, then software with access to that database may recognize that user 1201 and/or user-device 1203. Further, if the linkage(s) in that database include entry (access) authorization for that user 1201 and/or that user-device 1203 with that particular controlled space for transitory use 101 (storage unit 101), then when that user 1201 actually does enter that particular controlled space for transitory use 101 (storage unit 101) (after the proximity based interactions/communications with the presence identifier 1211), and when that entry of that user 1201 into that particular controlled space for transitory use 101 (storage unit 101) is detected by monitoring-device(s) 100 (within that controlled space for transitory use 101 (storage unit 101)), there are no unauthorized entry warnings/messages triggered (generated) and/or that entering user 1201 may actually be welcomed (e.g., via message(s) and/or notice(s) accessible from that user-device 1203). In some embodiments, the welcoming (and/or confirmation) message(s)/notice(s) may include (comprise) content of at least one of: that user's 1201 name (e.g., first name, middle name, nickname, surname [last name], full name, nickname, username, space identifier 1207, facility 345 location's name, facility's 345 physical address, time of entry, date of entry, combinations thereof, and/or the like). In some embodiments, this database and the software that has access to the database may be operating on at least one of: NINCE 367 (computer server(s)), monitoring-device(s) 100, presence identifier(s) 1211, user-device 1203, combinations thereof, and/or the like. In some embodiments, this database and the software that has access to the database may be non-transitorily saved (stored) in memory and/or storage of at least one of: NINCE 367 (computer server(s)), monitoring-device(s) 100, presence identifier(s) 1211, user-device 1203, combinations thereof, and/or the like.

Continuing discussing FIG. 12A, in some embodiments, user 1201 may be a user of one or more controlled spaces for transitory use 101 (storage units 101). In some embodiments, user 1201 may be a human user of one or more controlled spaces for transitory use 101 (storage units 101). In some embodiments, user 1201 may be a human and/or a robot (drone) user of one or more controlled spaces for transitory use 101 (storage units 101). In some embodiments, user 1201 may be any human user noted herein, including, but not limited to, Tenant 401, Tenant N+1 403, Facility Operator (storage facility worker) 405. In some embodiments, user 1201 may or may not be pre-authorized for entry (access) into a given controlled space for transitory use 101 (storage unit 101), depending upon what authorization(s) and/or permission(s) are set by the tenant subscriber 401 of that particular controlled space for transitory use 101 (storage unit 101) in the software (e.g., that may be running on NINCE 367 [computer server(s)]). In some embodiments, user 1201 may or may not be pre-authorized for entry (access) into a given controlled space for transitory use 101 (storage unit 101), depending upon what authorization(s) and/or permission(s) are set by the Facility Operator 405 of that particular controlled space for transitory use 101 (storage unit 101) in the software (e.g., that may be running on NINCE 367 [computer server(s)]).

Continuing discussing FIG. 12A, in some embodiments user device 1203 may be at least one of: a device, an electronic device, a computing device, a (human) wearable device, a (human) handled device, combinations thereof, and/or the like, used by user 1201. In some embodiments, user device 1203 may be selected from one or more of: tenant device 303, facility operator device 305, provider device 309, third-party device 311, a fob, a key fob, an electronic fob, a computing fob, a battery powered device, a battery powered fob, a smartphone, a smartwatch, a tablet computer, a laptop computer, an electronic device, a computing device, a computer, a portion thereof, combinations thereof, and/or the like. In some embodiments, user device 1203 may comprise: at least one antenna (configured for wireless, RFID (radio frequency ID and/or radio frequency identification), NFC [near field communication], Bluetooth, and/or the like communications), at least one camera (configured for reading QR codes, barcodes, alphanumeric codes, biometrics, and/or the like), at least one screen (configured for displaying QR codes, barcodes, alphanumeric codes, messages, notifications, warnings (concerns), and/or the like), at least one speaker (configured for emitting sound in the form of a code and/or an instruction), at least one microphone (configured for picking up sound in the form of a code and/or an instruction), combinations thereof, and/or the like.

Continuing discussing FIG. 12A, in some embodiments, communication-pathway 1213 may refer to communications and/or interactions between user 1201 and a presence identifier 1211; and/or communication-pathway 1213 may refer to communications and/or interactions between user device 1203 and a presence identifier 1211. In some embodiments, communication-pathway 1213 may be of a form, format, and/or type selected from one or more of: a wireless communication, a radio wave communication, a RFID communication, a NFC communication, a Bluetooth communication, a cellular communication, an optical communication, an IR (infrared) communication, an acoustic (sound) communication, a physical touch interaction, a portion thereof, combinations thereof, and/or the like.

Continuing discussing FIG. 12A, in some embodiments, the "proximity" between the user 1201 and the presence identifier 1211 of a given controlled space for transitory use 101 (storage unit 101); and/or between user device 1203 and the presence identifier 1211 of a given controlled space for transitory use 101 (storage unit 101) that may enable effective communications (interactions) 1213 may be dependent upon the communication technology utilized.

For example, and without limiting the scope of the present invention, when optical communications 1213 (e.g., between user device 1203 and presence identifier 1211) may be used (e.g., QR code, barcode, alphanumeric code reading), then the "proximity" may be dependent upon the optical specifications of the (reading and/or scanning) camera utilized, but may in some embodiments, be from ten (10) feet distance to one quarter (0.25) of an inch (or less) in distance between the display and the reader (camera)—depending upon the focal length of that camera (scanner); and may also require line of sight (between the code and the camera). Further, the display (e.g., of the given code) may be of/on the user device 1203 and if so, then the (reading) camera is of/on the presence identifier 1211; however, if the display (e.g., of the given code) is of/on the presence identifier 1211, then the (reading) camera is of/on the user device 1203.

For example, and without limiting the scope of the present invention, when wireless communications 1213 (e.g., between user device 1203 and presence identifier 1211) may be used (such as, but not limited to, RFID, NFC, Bluetooth, and/or the like), then the "proximity" may be twenty (20) feet or less distance between emitting (broadcasting and/or transmitting) antenna and the reading (interrogating and/or receiving) antenna.

For example, and without limiting the scope of the present invention, when NFC wireless communications 1213 (e.g., between user device 1203 and presence identifier 1211) may be used, then the "proximity" may be four (4) centimeters (cm) or less distance between emitting (broadcasting and/or transmitting) antenna and the reading (interrogating and/or receiving) antenna.

For example, and without limiting the scope of the present invention, when active RFID wireless communications 1213 (e.g., between user device 1203 and presence identifier 1211) may be used, then the "proximity" may be one hundred (100) meters or less distance between an active emitting (broadcasting and/or transmitting) antenna and the reading (interrogating and/or receiving) antenna.

For example, and without limiting the scope of the present invention, when passive RFID wireless communications 1213 (e.g., between user device 1203 and presence identifier 1211) may be used, then the "proximity" may be twelve (12) meters or less distance between a passive (but activated) emitting (broadcasting and/or transmitting) antenna and the reading (interrogating and/or receiving) antenna.

In some embodiments, the emitting (broadcasting and/or transmitting) antenna may receive wireless power from the reading (interrogating and/or receiving) antenna to enable the activity of the emitting (broadcasting and/or transmitting) antenna; i.e., the emitting (broadcasting and/or transmitting) antenna may be passive.

Further, when the emitting (broadcasting and/or transmitting) antenna may be of/on the user device 1203, then the reading (interrogating and/or receiving) antenna is of/on the presence identifier 1211; however, if the emitting (broadcasting and/or transmitting) antenna is of/on the presence identifier 1211, then the reading (interrogating and/or receiving) antenna is of/on the user device 1203.

For example, and without limiting the scope of the present invention, when acoustic (sound) communications 1213 (e.g., between user device 1203 and presence identifier 1211) may be used, then the "proximity" may be ten (10) feet or less distance between an emitting speaker and a reading microphone. Further, when the emitting speaker may be of/on the user device 1203, then the reading microphone is of/on the presence identifier 1211; however, if the emitting speaker is of/on the presence identifier 1211, then the reading microphone is of/on the user device 1203.

For example, and without limiting the scope of the present invention, when communications 1213 between user 1201 and presence identifier 1211 may be used, such as if user 1201 (physically and/or manually) enters a code (password and/or pin) into (onto) presence identifier 1211 and/or if presence identifier 1211 reads (scans and/or sees) some biometric(s) of user 1201, then the "proximity" may be: fifty (50) or less, forty (40) feet or less, thirty (30) feet or less, twenty-five (25) fee or less, twenty (20) feet or less, fifteen (15) feet or less, ten (10) feet or less, five (5) feet or less, or three (3) feet or less, distance between user 1201 and presence identifier 1211. For example, and without limiting the scope of the present invention, when acoustic (sound) communications 1213 between user 1201 and presence identifier 1211 may be used, then the "proximity" may be five (5) feet or less distance between a vocalizing (speaking) user 1201 and a reading microphone of/on presence identifier 1211.

Continuing discussing FIG. 12A, in some embodiments, door 1205 may be a door of a given controlled space for transitory use 101 (storage unit 101). In some embodiments, door 1205 may be a rollup door. In some embodiments, a given controlled space for transitory use 101 (storage unit 101) may comprise (have) at least one door 1205. In some embodiments, user 1201 may use door 1205 for entering (or existing) the given controlled space for transitory use 101 (storage unit 101). In some embodiments, at least one door 1205 may be configured (sized) for movement, entry, exit, ingress, egress, and/or the like of motor vehicles in and/or out of the given controlled space for transitory use 101 (storage unit 101); and/or in some embodiments, at least one door 1205 may be configured (sized) for movement, entry, exit, ingress, egress, and/or the like of humans in and/or out of the given controlled space for transitory use 101 (storage unit 101). In some embodiments, at least one door 1205 may be lockable. In some embodiments, at least one door 1205 may automatically lock when closed (with an integral [electronic and/or mechanical] locking system and/or means). In some embodiments, at least one door 1205 may be configured to be locked by a separate, distinct, and/or removable lock, such as, but not limited to, a padlock and/or the like. In some embodiments, at least one door 1205 may be implemented as a gate. In some embodiments, at least one door 1205 may be at least one of: a swing door, a swing gate, a hinged door, a hinged gate, a rollup door, a rolldown door, a sliding door, and/or the like. In some embodiments, at least one door 1205 may be manually and/or automatically operated. In some embodiments, at least one door 1205 may be locally (onsite) and/or remotely (offsite) controlled and/or operated.

Continuing discussing FIG. 12A, in some embodiments, a given controlled space for transitory use 101 (storage unit 101) may comprise (have) at least one unit (space) identifier 1207. In some embodiments, for a given storage facility (grounds) 345, each separate and distinct controlled space for transitory use 101 (storage unit 101) thereon may have its own separate and distinct (unique) unit (space) identifier 1207 that identifies that each separate and distinct controlled space for transitory use 101 (storage unit 101). In some embodiments, a given unit (space) identifier 1207 may be in an alphanumeric format or in a numeric format. For example, and without limiting the scope of the present invention, an alpha portion of a given unit (space) identifier 1207 may identify a building of that given storage facility (grounds) 345 and the numeric portion may identify a particular storage unit 101 of that building. In some embodiments, a given unit (space) identifier 1207 may be located on at least one of an exterior of: a front wall, door 1205, above the door 1205, next to the door 1205, and/or the like of a particular (given) controlled space for transitory use 101 (storage unit 101). In some embodiments, unit (space) identifier 1207 may be a visual indicator for the given controlled space for transitory use 101 (storage unit 101). In some embodiments, a given unit (space) identifier 1207 may function, operate, and/or be placed in at least a substantially (mostly) similar manner as an apartment number on an apartment, a suite number on a suite, an office number on an office, an address number for real estate, and/or the like. In some embodiments, a presence identifier 1211 may be integrated into a unit (space) identifier 1207 or vice versa.

Continuing discussing FIG. 12A, in some embodiments, a given controlled space for transitory use 101 (storage unit 101) may have (comprise) at least one monitoring-device 100 located on an inside of that given controlled space for transitory use 101 (storage unit 101). The monitoring-device(s) 100 shown in broken lines (dotted lines) in FIG. 12A are shown in broken lines (dotted lines) to indicate that these monitoring-device(s) 100 are located within (inside) these storage units 101, since the doors 1205 shown in FIG. 12A are shown in a closed (shut) configuration. In some embodiments, a given monitoring-device 100 emits and/or detects from its at least one sensor a given sensing-path 1209 within that given storage unit 101. In some embodiments, sensing-path 1209 may extend from the at least one sensor of its monitoring-device 100 to a solid surface within that storage unit 101.

However, in some embodiments, at least one monitoring-device 100 may be located outside of its controlled space for transitory use 101. For example, and without limiting the scope of the present invention, at least some externally located monitoring-device(s) 100 may be door break sensors, accelerator sensor, shaking/moving sensors, PIR sensors, combinations thereof, and/or the like.

Continuing discussing FIG. 12A, in some embodiments, a given controlled space for transitory use 101 (storage unit 101) may have (comprise) at least one presence identifier 1211. In some embodiments, a given presence identifier 1211 may be attached to (mounted to and/or located on) an exterior surface of: of a wall, a fence, a post, a beam, a fixture, a door, combinations thereof, and/or the like of at least one of: storage facility (grounds) 345, facility perimeter (boundary) 1101, (facility) gate 1103, drive-up building 1105, climate-controlled building 1107, (building) door 1109, building 1111, controlled space for transitory use (storage unit/space) 101, door 1205, combinations thereof, and/or the like. In some embodiments, a given presence identifier 1211 may be attached to (mounted to and/or located on) an interior surface of: of a wall, a fence, a post, a beam, a fixture, a door, combinations thereof, and/or the like of at least one of: storage facility (grounds) 345, facility perimeter (boundary) 1101, (facility) gate 1103, drive-up building 1105, climate-controlled building 1107, (building) door 1109, building 1111, controlled space for transitory use (storage unit/space) 101, door 1205, combinations thereof, and/or the like. In some embodiments, a given presence identifier 1211 may be configured to communicate with and/or to interact with user 1201 and/or with user device 1203 (e.g., via communication-pathway 1213). In some embodiments, a given presence identifier 1211 may be (presence-identifier 1211 may be implemented in a form factor) selected from one or more of: monitoring-device 100; another, additional, and/or different monitoring-device 100; a unit (space) identifier 1207; a displayed QR code; a QR code reader; a displayed barcode; a barcode reader; a RFID tag; a RFID reader; a NFC tag; a NFC reader; a biometric reader (e.g., camera, scanner, and/or microphone); a fingerprint reader; a motion detector; a keypad; an alphanumeric code input means (such as, but not limited, to a keypad and/or touchscreen); a numeric code input means (such as, but not limited, to a keypad and/or touchscreen); a displayed phone number; a displayed code; a displayed alphanumeric code; a displayed numeric code; a displayed short form code; a displayed long form code; a displayed (predetermined) TEXT message; a displayed (predetermined) TEXT (SMS) message; a sign; a placard; a tag; a label; a sticker; an antenna; a camera; a speaker; a microphone; a touch screen (touchscreen); a lock, an electronic lock; a smart lock; an electronic device; a computing device; a computer; a portion thereof; combinations thereof; and/or the like. In some embodiments, any such displayed code(s), if any, may be specific and/or unique to the associated (linked) controlled space for transitory use (storage unit/space) 101 and/or unit (space) identifier 1207. In some embodiments, a given presence identifier 1211 may be located: externally from its given controlled space for transitory use (storage unit/space) 101; outside of the building that the given controlled space for transitory use (storage unit/space) 101 is in (at); on a perimeter (e.g., facility perimeter [boundary] 1101) access of the property (e.g., storage facility [grounds] 345) that the given controlled space for transitory use (storage unit/space) 101 is in (at); completely remotely from the given controlled space for transitory use (storage unit/space) 101, such as, but not limited to, elsewhere in a city, in another city, in another state, across the country, in another country, in and/or on a body of water, ocean, sea, lake, river, stream, creek, and/or pond, in the air; combinations thereof; and/or the like. City as used herein may be replaced with county, town, village, parish, neighborhood, community, development, and/or the like.

Figure 12B:
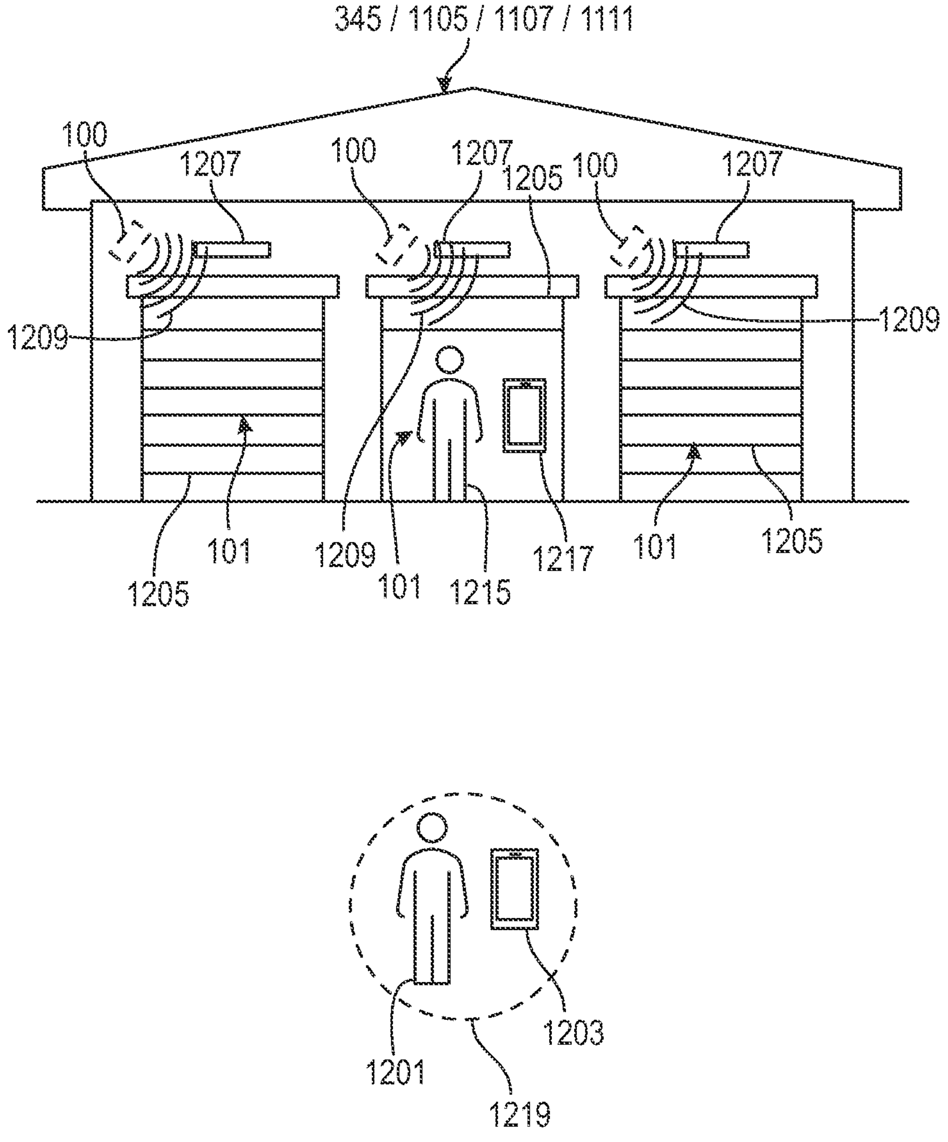
FIG. 12B may be a partial and different view of storage facility (grounds) 345, as compared to FIG. 11, e.g., a front, side, and/or partial elevation view.

FIG. 12B may be partial and different view of storage facility (grounds) 345, as compared to FIG. 11, e.g., a front, side, and/or partial elevation view. FIG. 12B may show a schematic diagram of a system of how a given user 1215 may be post-identified and/or post-authorized for access (entry) into a given controlled space for transitory use 101 (storage unit 101) after that user 1215 has actually entered that given controlled space for transitory use 101 (storage unit 101). Note, in some embodiments, FIG. 12B, FIG. 13A, and FIG. 13C may be used together to understand how the given user 1215 may be post-identified and/or post-authorized for access (entry) into the given controlled space for transitory use 101 (storage unit 101) after that user 1215 has actually entered that given controlled space for transitory use 101 (storage unit 101). FIG. 12B provides the system and schematic views of this; whereas, FIG. 13A and FIG. 13C may provide the method and/or the steps for accomplishing this.

In FIG. 12B, after the given user 1215 has entered the given controlled space for transitory use 101 (storage unit 101), at least one monitoring-device 100 of and/or within that given controlled space for transitory use 101 (storage unit 101) detects that entry (such as, but not limited to, detecting motion, detecting magnetically-coupled sensors are separated, a temperature change, a sound, combinations thereof, and/or the like). Then in some embodiments, that monitoring-device 100 that had made that (entry and/or presence) detection, may execute an onboard rule set (via its embedded and/or integral processor(s)), to determine if this detection event is locally (onsite) authorized or if a message (notification) should be sent to the NINCE 367 (computer-server(s)) (to notify the NINCE 367 [computer-server(s)] of this detected entry event). For example, and without limiting the scope of the present invention, the onboard rule set may be one where entries in the given controlled space for transitory use 101 (storage unit 101) during certain and/or predetermined times, hours, days, and/or dates may be treated as locally authorized (such as, but not limited to, during normal business hours for the tenant subscriber for that particular controlled space for transitory use 101 [storage unit) 101]); whereas, detected entries at other certain (different) and/or predetermined times, hours, days, and/or dates (such as, but not limited to, after hours) may call for that detecting monitoring-device 100 to send an entry (presence) communication, message, notification and/or warning (concern) to NINCE 367 (computer-server(s)).

In some embodiments, if the entry (presence) communication, message, notification and/or warning (concern) is sent to NINCE 367 (computer-server(s)) (e.g., because of the onboard rule set of the detecting monitoring-device 100), then NINCE 367 (computer-server(s)) may cause communication(s), message(s), notification(s), and/or warning(s) (concern[s]) to be communicated to previously authorized user(s) 1201 and/or to previously authorized user device(s) 1203, letting them know of the detected entry into that given controlled space for transitory use 101 (storage unit 101); and/or requesting feedback from previously authorized user (s) 1201, as to whether or not the current detected entry (presence) is authorized or not. Note, the previously authorized user(s) 1201 and/or to previously authorized user device(s) 1203, may be those that the tenant subscriber of that particular controlled space for transitory use 101 (storage unit 101) that has previously identified to NINCE 367 (computer-server(s)) as being authorized for entry into that particular controlled space for transitory use 101 (storage unit 101) (and that previous authorization may be stored in a database accessible by NINCE 367 [computer-server(s)]). Also note, that the previously authorized user(s) 1201 and/or to previously authorized user device(s) 1203 may (or may not) be located offsite (remotely) from that particular controlled space for transitory use 101 (storage unit 101) (that currently has user 1215 therein). In FIG. 12B this is indicated by reference numeral 1219 that points to broken line boundary surrounding previously authorized user(s) 1201 and/or to previously authorized user device(s) 1203 in FIG. 12B. That is, in some embodiments, the previously authorized user(s) 1201 and/or to previously authorized user device(s) 1203 may be at that particular controlled space for transitory use 101 (storage unit 101) or remote from that particular controlled space for transitory use 101 (storage unit 101) as indicated by off-site (remotely located) 1219 location. FIG. 12B explicitly shows the remote location of the previously authorized user(s) 1201 and/or to the previously authorized user device(s) 1203; however, if the user 1215 is actually also a previously authorized user 1201 then FIG. 12B may also show the situation when the previously authorized user 1201 is at that particular controlled space for transitory use 101 (storage unit 101) where the detection event has occurred.

Recall, in the communication(s) from NINCE 367 (computer-server(s)) to the previously authorized user(s) 1201 and/or to the previously authorized user device(s) 1203, the NINCE 367 (computer-server(s)) may have requested feedback from the previously authorized user(s) 1201, as to whether or not the current detected entry (presence) is authorized or not. The previously authorized user(s) 1201 (e.g., via use of the previously authorized user device(s) 1203) may respond appropriately back to the NINCE 367 (computer-server(s)) with the requested feedback, letting the NINCE 367 (computer-server(s)) know whether or not that detected entry is authorized or not.

In some embodiments, communications between the previously authorized user(s) 1201 and the NINCE 367 (computer-server(s)); and/or between the previously authorized user device(s) 1203 and the NINCE 367 (computer-server (s)) may be in one or more of the following forms: TEXT message, SMS TEXT message, mobile app notification, in phone notification, phone call, robo call, web app notification, mobile app event, web interface, email, direct message (DM), popup message, in app chat, in web chat, a portion thereof, combinations thereof, and/or the like.

In some embodiments, communications from: NINCE 367 (computer-server(s)), the previously authorized user(s) 1201, and/or the previously authorized user device(s) 1203 may comprise (include) human natural language (such as, but not limited to, at least a portion of a communication being in the English language). In some embodiments, the request feedback communication from NINCE 367 (computer-server(s)) to the previously authorized user(s) 1201 and/or to the previously authorized user device(s) 1203 (about the detected entry) may be in the form of a binary question, a polar question, a closed question, and/or the like, wherein the called for answer to the posed question is expected in one of two choices, one that provides an affirmative answer to the question or one that provides a negative answer to the question; i.e., the answer may be "yes" or "no," "1" or "2," or the like. In some embodiments, NINCE 367 may be able to understand and/or interpret an answer to a question posed by NINCE 367 by NINCE's 367 use of and/or understanding of context (e.g., between its question and the feedback answer received from the given user), contextual signature(s), human natural language(s), combinations thereof, and/or the like.

In some embodiments, the responsive communication from the previously authorized user(s) 1201 (e.g., via using the previously authorized user device(s) 1203) may be in one or more of the following forms: TEXT message, SMS TEXT message, mobile app notification, in phone notification, phone call, robo call, keyed response to robo call, voice response to robo call, web app notification, mobile app event, web interface, email, direct message (DM), popup message, in app chat, in web chat, button click (engagement), a portion thereof, combinations thereof, and/or the like. In some embodiments, the responsive communication from the previously authorized user(s) 1201 (e.g., via using the previously authorized user device(s) 1203) may be in a human natural language (e.g., "yes" or "no" or the like).

In some embodiments, the previously authorized user(s) 1201 and/or the previously authorized user device(s) 1203) may not respond at all to the query from the NINCE 367 (computer-server(s)) (about the detected entry) or may respond too late (i.e., after a predetermined time interval has run) to the query from the NINCE 367 (computer-server(s)). In some embodiments, in such scenarios, the NINCE 367 (computer-server(s)) may send communications about the detected entry to other possible approved end users 1201 (secondary approved end users 1201) who might authenticate the detected entry. This might be done in cases where multiple people share the same given controlled space for transitory use 101 (storage unit 101), such as, but not limited to, a business who has multiple employees using the same given controlled space for transitory use 101 (storage unit 101) or a multi-member family, group, club, association, or the like using the same given controlled space for transitory use 101 (storage unit 101).

Figure 13A:
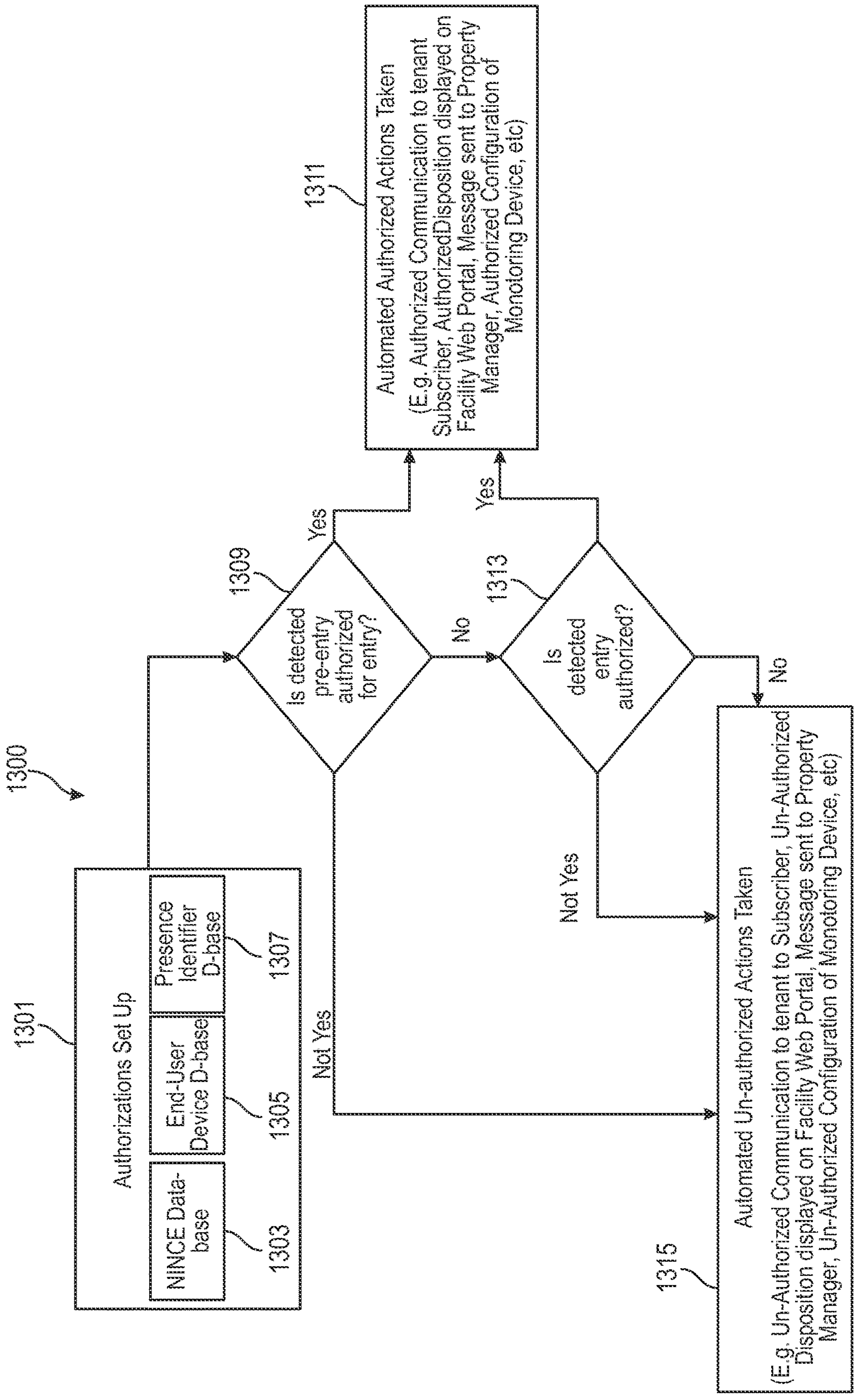
FIG. 13A may be a flow diagram that shows at least some steps in a method of determining if user(s) of a given controlled space for transitory use may be authorized (or not) for entry and/or use of that given controlled space for transitory use per pre-entry scenarios and per post-entry scenarios.
Figure 13B:
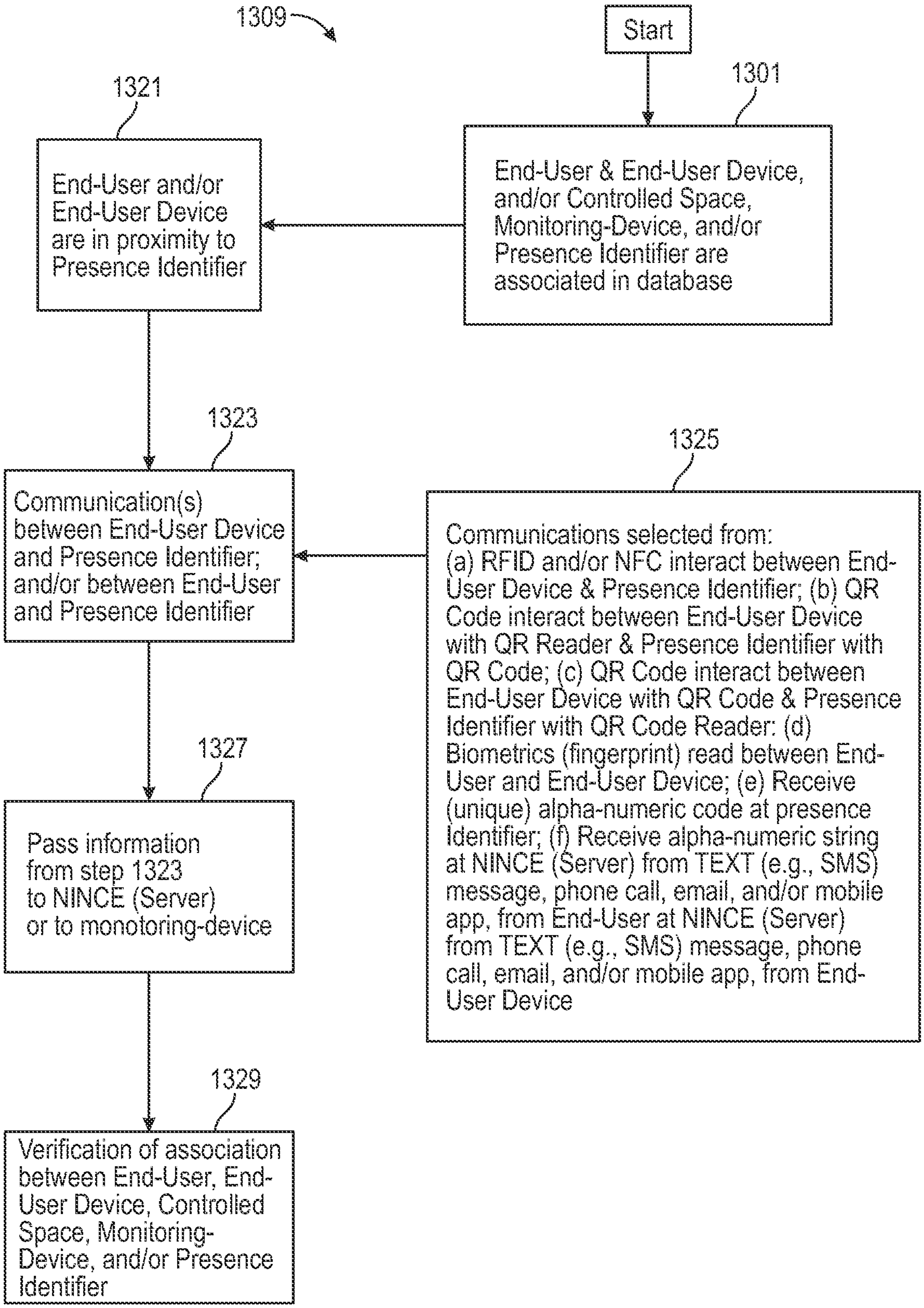
FIG. 13B may be a flow diagram that shows sub-steps of the method of FIG. 13A with respect to the pre-entry scenarios.

In some embodiments, if the initial previously authorized user(s) 1201 and/or the initial previously authorized user device(s) 1203, and/or the secondarily contacted other approved end users 1201 timely provide an affirmative (positive) confirmation that the detected entry was appropriate, then the NINCE 367 (computer-server(s)) may treat that entry as appropriate, authorized, and/or authenticated (and then follow-on automated actions may [optionally] be taken, see e.g., step 1311 in FIG. 13A). Whereas, if the NINCE 367 (computer-server(s)) does not timely receive such an affirmative (positive) confirmation that the detected entry was appropriate or receives feedback that the detected entry was not permitted, then the NINCE 367 (computer-server(s)) may treat that detected entry as non-appropriate, non-authorized, and/or non-authenticated (and may then follow-on automated actions may be taken, see e.g., step 1315 in FIG. 13A)).

Continuing discussing FIG. 12B, in some embodiments, user 1215 may be a user of one or more controlled spaces for transitory use 101 (storage units 101). In some embodiments, user 1215 may be a human user of one or more controlled spaces for transitory use 101 (storage units 101). In some embodiments, user 1215 may be a human and/or a robot (drone) user of one or more controlled spaces for transitory use 101 (storage units 101). In some embodiments, user 1215 may be any human user noted herein, including, but not limited to, user 1201, Tenant 401, Tenant N+1 403, Facility Operator (storage facility worker) 405. In some embodiments, user 1215 may or may not be (pre) authorized for entry (access) into a given controlled space for transitory use 101 (storage unit 101), depending upon what authorization(s) and/or permission(s) are set by the tenant subscriber 401 of that particular controlled space for transitory use 101 (storage unit 101) in the software (e.g., that may be running on NINCE 367 [computer server(s)]). In some embodiments, user 1215 may or may not be (pre) authorized for entry (access) into a given controlled space for transitory use 101 (storage unit 101), depending upon what authorization(s) and/or permission(s) are set by the Facility Operator 405 of that particular controlled space for transitory use 101 (storage unit 101) in the software (e.g., that may be running on NINCE 367 [computer server(s)]).

Continuing discussing FIG. 12B, in some embodiments, user device 1217 may be at least one of: a device, an electronic device, a computing device, a (human) wearable device, a (human) handled device, combinations thereof, and/or the like, used by user 1215. In some embodiments, user device 1217 may be selected from one or more of: tenant device 303, facility operator device 305, provider device 309, third-party device 311, user device 1203 (if user 1215 is a user 1201), a fob, a key fob, an electronic fob, a computing fob, a battery powered device, a battery powered fob, a smartphone, a smartwatch, a tablet computer, a laptop computer, an electronic device, a computing device, a computer, a portion thereof, combinations thereof, and/or the like. In some embodiments, user device 1217 may comprise: at least one antenna (configured for wireless, RFID, NFC, Bluetooth, and/or the like communications), at least one camera (configured for reading QR codes, barcodes, alphanumeric codes, biometrics, and/or the like), at least one screen (configured for displaying QR codes, barcodes, alphanumeric codes, messages, notifications, warnings (concerns), and/or the like), at least one speaker (configured for emitting sound in the form of a code and/or an instruction), at least one microphone (configured for picking up sound in the form of a code and/or an instruction), combinations thereof, and/or the like.

In FIG. 12B three different scenarios may occur, namely, (1) authorized user(s) 1201 (and/or 401) provides a "yes" (or the equivalent) feedback regarding the detected entry being authorized; (2) authorized user(s) 1201 (and/or 401) provides a "no" (or the equivalent) feedback regarding the detected entry being not authorized; or (3) the authorized user(s) 1201 (and/or 401) provides no (timely) feedback regarding the nature of the detected entry, i.e., a no acknowledgment scenario. In the case of the no acknowledgement scenario, NINCE 367 may have communicated the entry detection; may only take action(s) as the rule set(s) at the monitoring-device(s) 100 and/or at the NINCE 367 have set. For example, and without limiting the scope of the present invention, if after hours entry is detected, NINCE 367 may not need an affirmed command even though NINCE 367 might send a message; and even during hours of operation, NINCE 367 may still send a request for feedback and NINCE 367 logic flow could choose to state for example, but not limited in some cases to, not timely receiving a "yes" (or the equivalent) will be treated as a not authorized entry. Meaning, NINCE 367 default for an application may be that NINCE 367 must timely receive a "yes" (or the equivalent) to authorize the detected entry, and if not, then this may be treated an unauthorized entry detection. While NINCE 367 may request feedback, it is not required for NINCE 367 to send the initial message. See also, FIG. 13A.

FIG. 13A may show at least some steps in a method 1300. In some embodiments, method 1300 may be method of determining if user(s) of a given controlled space for transitory use 101 (storage unit 101) may be authorized, approved, and/or authenticated (or not) for entry and/or use of that given controlled space for transitory use 101 (storage unit 101). In some embodiments, method 1300 may comprise steps of: step 1301, step 1309, step 1311, step 1313, 1315, combinations thereof, and/or the like. In some embodiments, at least one step of method 1300 may be optional, skipped, and/or omitted. In some embodiments, at least some steps of method 1300 may be executed out of numeral order with respect to the identified reference numerals for the steps.

Continuing discussing FIG. 13A, in some embodiments, step 1301 may be a step of setting up authorizations as to which user(s) 1201 may be authorized to enter and/or use a given controlled space for transitory use 101 (storage unit 101). In some embodiments, when the given user 1201 is a tenant of the given controlled space for transitory use 101 (storage unit 101), or a person authorized for entry into the given controlled space for transitory use 101 (storage unit 101), then these pre-identifications and/or pre-authorizations may be determined, selected, and entered by the tenant subscriber 401 into NINCE 367 (computer-server(s) 309), which stores these pre-identifications and/or pre-authorizations associations into at least one database 1303 that is in communication with NINCE 367 (computer-server(s)). In some embodiments, in addition to or in the alternative to tenant subscriber 401, other user(s) may setup such pre-identifications and/or pre-authorizations. In some embodiments, such pre-identification and/or pre-authorization may be determined, selected, setup, and/or entered by at least one of, tenant subscriber 401, facility/property manager 405, by the property management company, customer service, and/or the like, into NINCE 367, as to who (which user(s)) and/or as to which user device(s) may be enter and/or access a given controlled space for transitory use 101; wherein such setup may be non-transitorily store in one or more database(s) 1303, 1305, and/or 1307. In some embodiments, for a given pre-identifications and/or pre-authorizations association at least some of the following information may be non-transitorily stored in the database 1303: user's 1201 name and contact information (such as, but not limited to, email address(es) and/or phone number(s)); details of that user's 1201 user device 1203 (such as, but not limited to, make, model, serial number, MAC address, IP address, a unique identifier for that user device 1203, and/or the like); one or more associated controlled spaces for transitory use 101 (storage units 101) that are covered under the relevant tenant subscription (which may be identified by their units (spaces) identifiers 1207); identification of at least one deployed (internal) monitoring-device(s) 100 per each identified controlled space for transitory use 101 (storage unit 101); identification of any deployed (external) presence identifiers 1211 per each identified controlled space for transitory use 101 (storage unit 101); combinations thereof; and/or the like. In some embodiments, at least some of the information provided into database 1303 (i.e., the pre-identifications and/or pre-authorizations associations), as noted immediately above, may be provided by the tenant subscriber 401.

Continuing discussing FIG. 13A and step 1301, in some embodiments, when the given user 1201 is a Facility Operator (storage facility worker) 405 of the given controlled space for transitory use 101 (storage unit 101), or a person authorized for entry into the given controlled space for transitory use 101 (storage unit 101), then these pre-identifications and/or pre-authorizations may be determined, selected, setup, and entered by the Facility Operator (storage facility worker) 405 into NINCE 367 (computer-server(s)), which stores these pre-identifications and/or pre-authorizations associations into at least one database 1303 (and/or into 1305 and/or 1307) that is in communication with NINCE 367 (computer-server(s)). In some embodiments, for a given pre-identifications and/or pre-authorizations association at least some of the following information may be non-transitorily stored in the database 1303 (and/or into 1305 and/or 1307): user's 1201 name and contact information (such as, but not limited to, email address(es) and/or phone number(s)); details of that user's 1201 user device 1203 (such as, but not limited to, make, model, serial number, MAC address, IP address, a unique identifier for that user device 1203, and/or the like); one or more associated controlled spaces for transitory use 101 (storage units 101) that are approved for entry therein; identification of at least one deployed (internal) monitoring-device(s) 100 per each identified controlled space for transitory use 101 (storage unit 101); identification of any deployed (external) presence identifiers 1211 per each identified controlled space for transitory use 101 (storage unit 101); combinations thereof; and/or the like. In some embodiments, at least some of the information provided into database 1303 (i.e., the pre-identifications and/or pre-authorizations associations), as noted immediately above, may be provided by Facility Operator (storage facility worker) 405.

Continuing discussing FIG. 13A and step 1301, in some embodiments, the pre-identifications and/or pre-authorizations associations non-transitorily stored in database(s) 1303 may additionally, or in the alternative, be non-transitorily stored in database(s) 1305 and/or in database(s) 1307. In some embodiments, database(s) 1305 may be in communication with user device(s) 1203. In some embodiments, database(s) 1307 may be in communication with presence identifier(s) 1211 and/or with monitoring-device(s) 100. For example, and without limiting the scope of the present invention, when tenant subscriber 401 (or Facility Operator (storage facility worker) 405 or by the property management company, or by customer service and/or the like), using user device 1203, may be initially populating the pre-identifications and/or pre-authorizations associations into database(s), the first database that may be accessed may be database(s) 1305, e.g., if communications with NINCE 367 and/or its database(s) 1303 are not currently (immediately) available; however, once communications with NINCE 367 and/or its database(s) 1303 are available, then database(s) 1303 may be populated with these pre-identifications and/or pre-authorizations associations. In some embodiments, NINCE 367 may cause at least some of these pre-identifications and/or pre-authorizations associations that are non-transitorily stored in its database(s) 1303 to also be non-transitorily stored in database(s) 1305 and/or 1307 (e.g., for redundancy). In some embodiments, once at least one pre-identification and/or pre-authorization association has been non-transitorily stored in a database(s) 1303, 1305, and/or 1307, the step 1301 may progress to step 1309.

Continuing discussing FIG. 13A, in some embodiments, step 1309 may be a step of determining if a detected presence at a given controlled space for transitory use 101 (storage unit 101), before that given controlled space for transitory use 101 (storage unit 101) has been entered, is authorized for entry (access) and/or use of that given controlled space for transitory use 101 (storage unit 101). Note, the actual details of step 1309 are shown in FIG. 13B. If the step 1309 determination is one of authorization for access (entry and/or use), then method 1300 may proceed to step 1311; whereas, if the step 1309 determination is one of not-authorized or if there was no pre-entry presence detection, then method 1300 may proceed to step 1313.

Continuing discussing FIG. 13A, in some embodiments, step 1311 may be a step of (optionally) taking at least one (predetermined and/or contextual signature based or the like) action pursuant to authorized access determination from step 1309. In some embodiments, the at least one action taken may be selected from one or more of: (1) communicating a message from computer-server 309 (where NINCE 367 may be executing thereon) and/or from monitoring-device 100 to at least one of: the at least one user 401, the end-user 1201, the at least one user-device 303, the end-user-device 1203, a tenant subscriber 401 of the controlled space for transitory use 101, a property manager 405 of the controlled space for transitory use 101, an owner of a property with (that has) the controlled space for transitory use 101, a call center, a customer service center, centralized management of the property(s) 345, a monitoring company of the property 345 or of the controlled space for transitory use 101, a tenant-subscriber-web-portal (used by the at least one user 401), a tenant-subscriber-mobile-app (used by the at least one user 401), a tenant-subscriber-wallet-pass (used by the at least one user 401); a facility web portal for the facility 345 (used by property manager 405), and/or a facility-mobile-app (used by property manager 405) associated with the facility 345; (2) upon the monitoring-device 100, of the controlled space for transitory use 101, detecting entry into the controlled space for transitory use 100, after a successful verification from the step (d) (step 1329), communicating a welcome-message (and/or a confirmation message) from computer-server 309 (where NINCE 367 may be executing thereon) and/or from the monitoring-device 100 to the end-user 1201 and/or to the end-user-device 1203; (3) displaying or logging an authorized disposition event to the facility web portal, to the facility-mobile-app, to the tenant-subscriber-web-portal, to the tenant-subscriber-mobile-app and/or to the tenant-subscriber-wallet-pass; (4) authorizing a configuration for one or more monitoring-device(s) associated with the controlled space for transitory use; combinations thereof; and/or the like. In some embodiments, the "message" in item (1) in the immediately above (long) sentence may pertain to a presence detected at presence-identifier 1211 being authorized and/or that a detected entry into the controlled space for transitory use 100, from the monitoring-device 100, is authorized. In some embodiments, the at least one action taken may be may be predetermined. In some embodiments, the at least one action taken may be of step 1311 may originate from NINCE 367 (computer-server(s)).

Figure 13C:
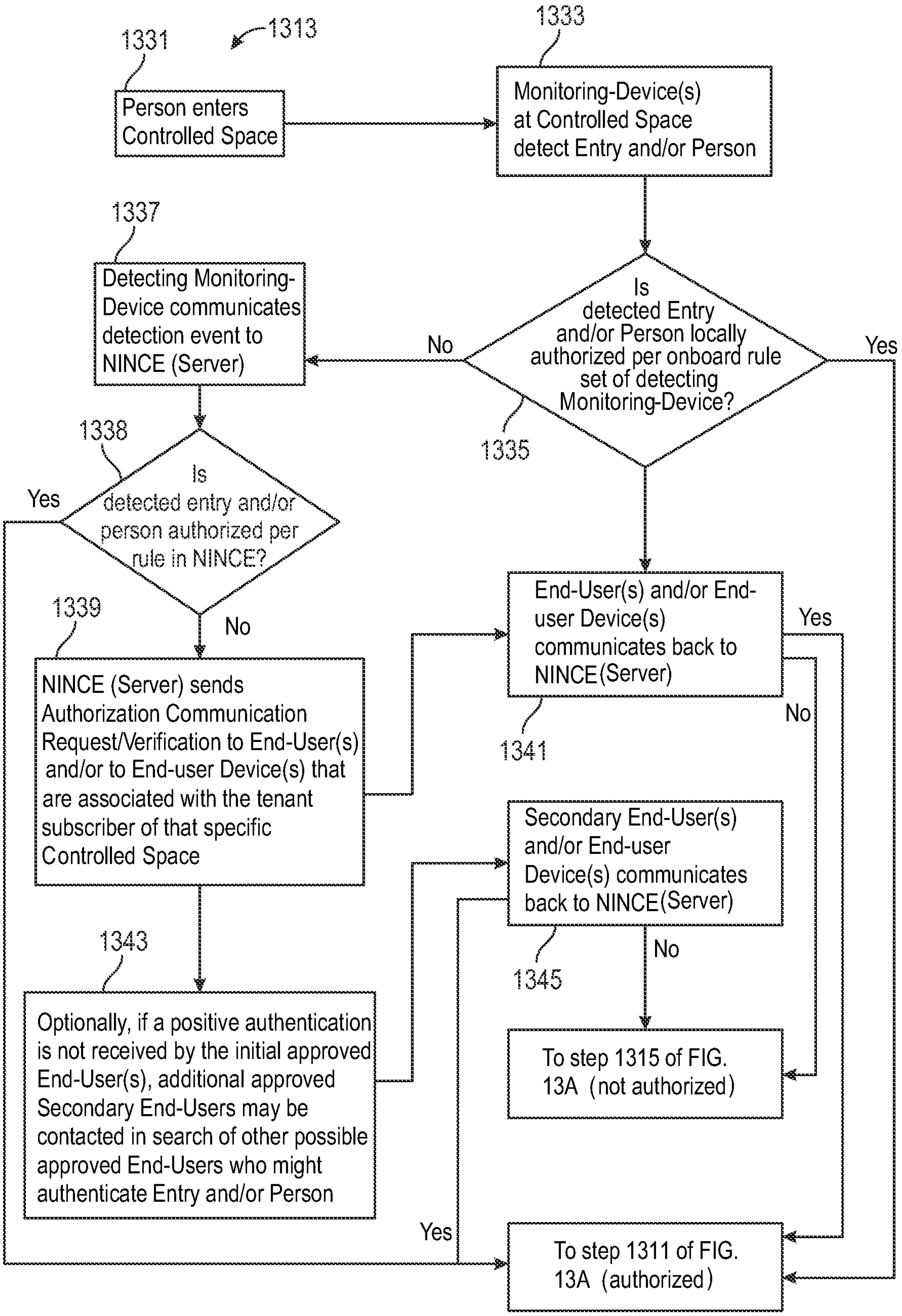
FIG. 13C may be a flow diagram that shows sub-steps of the method of FIG. 13A with respect to the post-entry scenarios.

Continuing discussing FIG. 13A, in some embodiments, step 1313 may be a step of determining if a detected entry, by at least one monitoring-device 100, within a given controlled space for transitory use 101 (storage unit 101) is authorized or not. Note, the actual details of step 1313 are shown in FIG. 13C. If the step 1313 determination is one of authorization for access (entry and/or use), then method 1300 may proceed to step 1311; whereas, if the step 1313 determination is one of not-authorized, then method 1300 may proceed to step 1315.

Continuing discussing FIG. 13A, in some embodiments, step 1315 may be a step of (optionally) taking at least one (predetermined and/or based on a contextual signature) action pursuant to un-authorized access determination from step 1313. In some embodiments, the (optional) at least one (predetermined and/or based on a contextual signature) action may be selected from: communicating a message, a notification, and/or a warning (concern) to authorized user(s) 1201 (and/or stake holders) that there has been an un-authorized entry event detected at the given controlled space for transitory use 101 (storage unit 101); communicating a message, a notification, and/or a warning (concern) to authorized user device(s) 1203 that there has been an un-authorized entry event detected at the given controlled space for transitory use 101 (storage unit 101); communicating a message, a notification, and/or a warning (concern) to tenant subscriber 401 that there has been an un-authorized entry event detected at the given controlled space for transitory use 101 (storage unit 101); displaying and/or logging an un-authorized disposition event on a Facility Web Portal (or the like); communicating a message, a notification, and/or a warning (concern) to Property Manager (Facility Operator (storage facility worker) 405) that there has been an un-authorized entry event detected at the given controlled space for transitory use 101 (storage unit 101); communicating a message and/or a notification to the Facility Operator (storage facility worker) 405 that a physical inspection of the given controlled space for transitory use 101 (storage unit 101) in question should be immediately carried out; logging an un-authorized configuration for one or more monitoring-device(s) 100 associated with that given controlled space for transitory use 101 (storage unit 101); combinations thereof; and/or the like. In some embodiments, these at least one (predetermined and/or based from a contextual signature) action(s) of step 1315 may originate from NINCE 367 (computer-server(s)).

In FIG. 13C three different scenarios may occur, namely, (1) authorized user(s) 1201 (and/or 401) provides a "yes" (or the equivalent) feedback regarding the detected presence and/or entry being authorized; (2) authorized user(s) 1201 (and/or 401) provides a "no" (or the equivalent) feedback regarding both the detected presence and the detected entry being not authorized; or (3) the authorized user(s) 1201 (and/or 401) provides no (timely) feedback regarding the nature of the detected presence or of the detected entry, i.e., a no acknowledgment scenario. In the case of the no acknowledgement scenario (the "not yes" scenario), NINCE 367 may have communicated the pre-entry and/or the post-entry detection; may only take action(s) as the rule set(s) at the monitoring-device(s) 100 and/or at the NINCE 367 have set. For example, and without limiting the scope of the present invention, if after hours entry is detected, NINCE 367 may not need an affirmed command even though NINCE 367 might send a message; and even during hours of operation, NINCE 367 may still send a request for feedback and NINCE 367 logic flow could choose to state for example, but not limited in some cases to, not timely receiving a "yes" (or the equivalent) will be treated as a not authorized entry. Meaning, NINCE 367 default for an application may be that NINCE 367 must timely receive a "yes" (or the equivalent) to authorize the detected entry, and if not, this may be treated as an unauthorized pre-entry and/or unauthorized entry detection.

FIG. 13B shows at least some sub-steps of step 1309 from FIG. 13A. In some embodiments, at least some of the steps shown in FIG. 13B may also correspond to the system of FIG. 12A. In some embodiments, step 1309 may comprise steps: step 1301, step 1321, step 1323, step 1327, combinations thereof, and/or the like. In some embodiments, step 1301 may be a prerequisite and/or a precondition to step 1309 and/or to step 1321. In some embodiments, at least one step of the method of FIG. 13B (step 1309) may be optional, skipped, and/or omitted. In some embodiments, at least some steps of the method of FIG. 13B (step 1309) may be executed out of numeral order with respect to the identified reference numerals for the steps.

In some embodiments, step 1321 may be a step of a given presence identifier 1211, of a given controlled space for transitory use 101 (storage unit 101), coming into proximity with the presence of a user 1201 and/or of a user device 1203. Note, this "proximity" has been defined above in the discussion of FIG. 12A; note, this "proximity" must be sufficiently close to enable the communication(s) of step 1323 and/or from a communication technology (technique) selected from list 1325. In some embodiments, this presence identifier 1211 may be externally located to its given controlled space for transitory use 101 (storage unit 101) as shown in FIG. 12A and as discussed above in the discussion of FIG. 12A. In some embodiments, execution of step 1321 may transition step 1309 to step 1323.

Continuing discussing FIG. 13B, in some embodiments, step 1323 may be a step of communication(s) between user device 1203 and the presence identifier 1211 of step 1321; and/or between user 1201 and that presence identifier 1211. In some embodiments, step 1323 may select, utilize, execute, and/or implement at least one communication technology and/or communication technique from list 1325. In some embodiments, execution of step 1323 may transition step 1309 to step 1327.

Continuing discussing FIG. 13B, in some embodiments, list 1325 may be a list of communication technologies and/or communication techniques that may be utilized in execution of step 1323. In some embodiments, list 1325 may comprise at least one of: (a) RFID and/or NFC interaction(s) between user device 1203 and presence identifier 1211; (b) QR code interaction(s) between user device 1203 with a QR code reader (e.g., an appropriately configured camera) and presence identifier 1211 with a displayed QR code; (c) QR code interactions between user device 1203 with a displayed QR code and presence identifier 1211 with a QR code reader (e.g., an appropriately configured camera); (d) biometrics (such as, but not limited to, fingerprints) reading and/or scanning between user 1201 and presence identifier 1211 (e.g., with appropriately configured camera(s) and/or microphone(s)); (e) receiving (unique) alpha-numeric code(s) (or the like) at presence identifier 1211; (f) receiving alpha-numeric (or the like) string(s) at NINCE 367 (computer server(s)) from TEXT (e.g., SMS) message, phone call, email, mobile app, and/or web portal/app, from user device 1203; (g) receiving pin (code) assigned to (associated with) a particular (pre) authorized user 1201 at NINCE (Server) from TEXT (e.g., SMS) message, phone call, email, mobile app, and/r web portal/app, from user device 1203; a portion thereof; combinations thereof; and/or the like. Note, in some embodiments, the pin code may be provided from one particular user 1201 to another (different) user 1201, for example, where the different user 1201 might not have their pin code; as that would permit a pre-authorize user 1201, with a pin, to let another (different) user 1201 achieve pre-entry authorization for entry, access, and/or use of the given controlled space for transitory use 101 (storage unit 101) and before that different user 1201 actually even opens the door 1205 to that given controlled space for transitory use 101 (storage unit 101). In some embodiments, step 1323 may select, utilize, execute, and/or implement at least one communication technology and/or communication technique from list 1325.

Continuing discussing FIG. 13B, in some embodiments, step 1327 may be a step of passing (communicating) at least some of the communicated information obtained (and/or generated) from executing step 1323 to NINCE 367 (computer server(s)) and/or to at least one monitoring-device 100 of that given controlled space for transitory use 101 (storage unit 101). In some embodiments, the information that may be communicated in the step 1323 and/or in the step 1327 communication(s) may be selected from: user's 1201 name; user's 1201 contact information (such as, but not limited to, email address(es) and/or phone number(s)); details of that user's 1201 user device 1203 (such as, but not limited to, make, model, serial number, MAC address, IP address, a unique identifier for that user device 1203, and/or the like); the controlled space for transitory use 101 (storage unit 101) associated with the presence identifier 1211 used in step 1323 (which may be identified by its unit (space) identifier 1207); identification of at least one deployed (internal) monitoring-device(s) 100 per that identified controlled space for transitory use 101 (storage unit 101); identification of any deployed (external) presence identifier(s) 1211 per that identified controlled space for transitory use 101 (storage unit 101); combinations thereof; and/or the like. In some embodiments, execution of step 1327 may transition step 1309 to step 1329.

Continuing discussing FIG. 13B, in some embodiments, step 1329 may be a step of verifying if at least some of the information that is communicated in the step 1323 communication(s) matches up with the pre-identification(s) and/or pre-authorization(s) association(s) that had been non-transitorily stored in database(s) 1303, 1305, and/or 1307 as part of the precondition of step 1301. For example, and without limiting the scope of the present invention, if one or more of the information elements passed in step 1327 does correctly match up with corresponding information in the database(s) from step 1301, then verification may pass. For example, and without limiting the scope of the present invention, if one or more of the information elements passed in step 1327 does not match up with corresponding information in the database(s) from step 1301, then verification may fail. If the verification occurs, the step 1309 goes down the "Yes" pathway in FIG. 13A (leading to step 1311); whereas, if this verification does not occur (or fails), then step 1309 goes down the "No" pathway in FIG. 13A (leading to step 1313).

Note, if step 1323 and/or step 1327 fails to execute, then step 1309 goes down the "No" pathway in FIG. 13A (leading to step 1313).

In some embodiments, step 1301, step 1309, and optionally step 1311 may be of a method for determining if a detected presence in proximity but outside of a controlled space for transitory use 101 may be authorized for entry into that controlled space for transitory use 101. In some embodiments, such a method may comprise steps of: a step 1301, a step 1321, a step 1323 and/or step 1327, and a step 1329. See e.g., FIG. 12A, FIG. 13A, and FIG. 13B.

In some embodiments, step 1301 may be a step of setting up authorization(s) for at least one user 401 or for at least one user-device 303 to enter the controlled space for transitory use 101 by linking identity-information of the at least one user 401 or by linking identity-information of the at least one user-device 303 with an identifier 1207 of the controlled space for transitory use 101 in a database (such as, but not limited to, database 1303, 1305, and/or 1307). In some embodiments, this database(s) may be in at least intermittent communication with at least one of: the computer-server 309 (with NINCE 367 executing thereon), the monitoring-device 100, or the at least one user-device 303. In some embodiments, the step 1301 may comprise linking identifying-information of the monitoring-device 100 with the identity-information of the at least one user 401 or with the identity-information of the at least one user-device 303 and with identifier 1207 of the controlled space for transitory use 101 in the database (such as, but not limited to, database 1303, 1305, and/or 1307). In some embodiments, information pertaining to the controlled space for transitory use 101 that is identified in the database by its identifier 1207 may also comprise identification of its monitoring-device 100 or identification of its presence-identifier 1211 as being linked to that identifier 1207 in the database. See e.g., FIG. 12A, FIG. 13A, and FIG. 13B.

In some embodiments, step 1321 may be a step of an end-user 1201 or an end-user-device 1203 being in proximity to presence-identifier 1211 to enable communication between presence-identifier 1211 and the end-user 1201 or to enable communication between presence-identifier 1211 and the end-user-device 1203. See e.g., FIG. 12A, FIG. 13A, and FIG. 13B.

In some embodiments, step 1323 and/or step 1327 may be a step of receiving at a computer-server 309 (with NINCE 367 executing thereon) and/or receiving at a monitoring-device 100, identifying information of the end-user 1201 or identifying information of the end-user-device 1203. In some embodiments, this identifying information may be captured and/or transmitted by presence identifier 1211. In some embodiments, the monitoring-device 100 may be configured to monitor the controlled space for transitory use 101. In some embodiments, presence-identifier 1211 may be in at least in intermittent communication with the computer-server 309 and/or with monitoring-device 100. In some embodiments, a form of communication between presence-identifier 1211 and end-user 1201 and/or a form of communication between presence-identifier 1211 and end-user-device 1203, with respect to the step 1321 (and/or with respect to step 1323 and/or step 1327), may be determined, at least in part, by what form factor presence-identifier 1211 is implemented in (various form factors for a given presence-identifier 1211 are stated above in the FIG. 12A discussion). In some embodiments, with respect to step 1321 (and/or with respect to step 1323 and/or step 1327), a form of communication between presence-identifier 1211 and end-user 1201 and/or a form of communication between presence-identifier 1211 and end-user-device 1203 may be selected from one or more of the following communication formats: RFID interaction between end-user-device 1203 and presence-identifier 1211; NFC interaction between end-user-device 1203 and presence-identifier 1211; QR code interaction between end-user-device 1203 with a QR code reader and presence-identifier 1211 with a displayed QR code; QR code interaction between end-user-device 1203 with a displayed QR code and presence-identifier 1211 with a QR code reader; biometric reading of end-user 1201 by a camera or a microphone of presence-identifier 1211; receiving an alpha-numeric code at presence-identifier 1211; combinations thereof; and/or the like. In some embodiments, the identifying information of end-user 1201 or the identifying information of end-user-device 1203 may be received at presence-identifier 1211 prior to the method executing the step 1323 and/or step 1327, the identifying information of end-user 1201 and/or the identifying information of end-user-device 1203 may be sent from presence-identifier 1211 to the computer-server 309 and/or to monitoring-device 100. In some embodiments, prior to the execution of step 1327, the identifying information of end-user 1201 or the identifying information of end-user-device 1203 is communicated from end-user 1201 and/or from end-user-device 1203 to presence-identifier 1211 in one or more of the following communication formats: RFID interaction between end-user-device 1203 and presence-identifier 1211; NFC interaction between end-user-device 1203 and presence-identifier 1211; QR code interaction between end-user-device 1203 with a QR code reader and presence-identifier 1211 with a displayed QR code; QR code interaction between end-user-device 1203 with a displayed QR code and presence-identifier 1211 with a QR code reader; biometric reading from (of) end-user 1201 by a camera or a microphone of presence-identifier 1211; receiving an alpha-numeric code at presence-identifier 1211; receiving an alpha-numeric code at a keypad (or the like) (which may be a presence-identifier 1211); combinations thereof; and/or the like. In some embodiments, with respect to step 1327, the identifying information of end-user 1201 and/or the identifying information of end-user-device 1203 may be communicated to computer-server 309 and/or to monitoring-device 100 in a content format that may comprise one or more of: at least one word and/or at least one number in a human natural language; an alpha-numeric code, an alpha-numeric string, a numeric code, a numeric string, a pin number, combinations thereof, and/or the like. In some embodiments, with respect to the step 1327, the identifying information of end-user 1201 and/or the identifying information of end-user-device 1203 may be received at computer-server 309 and/or at monitoring-device 100 by one or more of the following communication forms: from a TEXT message, from a SMS message, from a phone call, from an email, from a mobile app, from a mobile phone notification, from a web portal, from a web app, combinations thereof, and/or the like. See e.g., FIG. 12A, FIG. 13A, and FIG. 13B.

In some embodiments, step 1329 may be a step of verifying whether or not the identifying information of the end-user 1201 or the identifying information of the end-user-device 1203 matches the identity-information of the at least one user 401 or matches the identify-information of the at least one user-device 303 and matches to the identifier 1207 of the controlled space for transitory use 101. In some embodiments, if step 1329 verification sufficiently matches per a (predetermined) rule set; and/or if step 1329 verification sufficiently matches a contextual signature (contextual-signature), then at least one action is taken, wherein the at least one action taken may be of step 1311. In some embodiments, step 1329 verification may also consider using the identifying-information of the monitoring-device 100 linked to the given controlled space for transitory use 101 in the database (such as, but not limited to, database 1303, 1305, and/or 1307) (for verification purposes). See e.g., FIG. 12A, FIG. 13A, and FIG. 13B.

Contextual signatures, in the context of presence identifiers, multiple monitoring, and/or detection methods, may refer to specific patterns and/or indicators that emerge from analyzing various data sources and/or events in their relevant contexts. These signatures may be unique identifiers and/or markers that help identify specific conditions, anomalies, and/or potential threats within a system or environment. In a scenario where presence identifiers, multiple monitoring, and detection methods are employed, each sensing different things and events at different times, contextual signatures may be useful for understanding significance of observed data and/or triggering appropriate actions. Use and/or implementation of contextual signatures may involve data collection, followed by analyzing the collected data; then performing contextual analysis; followed by generating one or more contextual signatures; and then taking actions based thereon and/or developing insights. With respect to data collection, different presence identifiers, monitoring and/or detection methods collect data from various sources and/or events. These sources could include user activity, presence identifier activity, motion sensors, environmental sensors, date, time of day, geographical coordinates of the monitoring-devices 100, network traffic, system logs, current (or real-time acquired) data, historical data, combinations thereof, and/or the like. With respect to data analysis, each monitoring method analyzes its respective data streams and/or establishes thresholds and/or criteria for identifying abnormal behavior and/or potential threats. These thresholds may be based on statistical models, machine learning algorithms, predefined rules, combinations thereof, and/or the like. Contextual analysis involves examining the relationships and/or dependencies between different data sources and events. It considers the broader context in which these events occur to determine their significance. For example, a sudden spike in activity or motion-detected traffic may not be concerning during peak usage hours but could be indicative of nefarious activity during off-peak hours. With respect to contextual signature generation, based on the contextual analysis, specific patterns may emerge, which may be termed and/or deemed a given contextual signature. These could be combinations of data attributes, temporal correlations, spatial relationships, behavioral anomalies that signal potential security threats, operational issues, combinations thereof, and/or the like. With respect to actionable insights, once contextual signatures are identified, appropriate actions may be taken based on predefined response mechanisms. These actions may include notifying or alerting potentially effected stakeholders and/or authorized end-users, such as but not limited to, tenant subscribers 401, facility operators 405, property managers 405, central management of a property 345, property owners, call center personnel, monitoring center personnel, and system administrators, triggering automated responses, adjusting security policies, initiating further investigation, combinations thereof, and/or the like. Overall, contextual signatures can enhance effectiveness of monitoring and/or detection systems (and/or methods thereof) by providing a deeper understanding of the observed data and enabling more informed decision-making in response to potential threats and/or anomalies as well as, improving operations and customer experience. In the context of self-storage facilities 345, contextual signatures may play a role in providing security enhancements, improve customer (e.g., tenant 401) satisfaction and/or peace of mind, and/or improve operational efficiency. For example, and without limiting the scope of the present invention, with respect to traffic and/or facility use traffic assessment, acoustic sensors, magnetic break sensors (e.g., door or gate), light-level sensors, temperature sensors, humidity sensors, water sensors, optical image sensors, and/or motion detectors may monitor traffic, environmental conditions, and/or activity within a self-storage facility 345. Unusual patterns such as high noise levels and/or increased motion during off-hours could indicate unauthorized access and/or potential security threats on the property 345. For example, and without limiting the scope of the present invention, with respect to pattern evaluation and unauthorized entry detection, motion sensors deployed in controlled areas may detect patterns of movement and/or visitation. Inconsistencies in visitation patterns and/or correlations with other sensors (e.g., keypad entries and/or the like) may signal unauthorized access attempts and/or suspicious behavior. For example, and without limiting the scope of the present invention, with respect to squatter detection, increased presence and/or activity in vacant storage units 101 over time may indicate potential issues with unauthorized occupants. Historical occupancy data and absence of authorized access events help identify potential squatter situations, prompting remediating interventions. For example, and without limiting the scope of the present invention, with respect to authorized event determination, changes in vibration, motion, temperature, and/or noise levels in storage units 101 may be assessed to determine the likelihood of authorized access and/or usage. Contextual signatures may differentiate between authorized activities (e.g., tenant 101 visits during accepted hours) and unauthorized events (e.g., unauthorized access attempts or suspicious activity during non-operational hours). These examples demonstrate how contextual signatures derived from multi-sensor data analysis enhance protection, safety, security measures and/or operational oversight in self-storage facilities 345. By identifying anomalies and potential security concerns, smart monitoring systems help facility managers 405 maintain a secure and well-managed environment for tenants 401 and their belongings.

Contextual signature verification may refer to a process of confirming authenticity and/or validity of a detected pattern and/or event based on its contextual signature. It may involve analyzing characteristics and/or attributes associated with a detected pattern within its broader context to determine its legitimacy and/or significance. In practical terms, contextual signature verification may involve comparing the detected pattern and/or event with known patterns, historical data, and/or contextual information to assess its consistency and coherence with expected behavior and/or predefined criteria. This verification process may help to ensure that the detected pattern is not a false positive or an anomaly but rather a genuine representation of the intended signal or event. For example, in a security monitoring system, contextual signature verification may involve analyzing characteristics of motion detected by sensors in relation to factors such as, but not limited to, date, time of day, location, and/or environmental conditions. By cross-referencing these contextual factors with known patterns of authorized and unauthorized activity, the system and/or method may verify whether the detected motion corresponds to expected behavior or potential security concerns. In essence, contextual signature verification adds an additional layer of intelligence and reliability to monitoring systems (and/or methods) by considering the broader context in which events occur. It enables systems (and/or methods) to make more informed decisions about the significance of detected patterns, including predicting potential emerging concerns before they occur, reducing false alarms, and improving overall accuracy and effectiveness in various applications. Contextual signature verification may be used in step 1311 and/or in step 1315. Contextual signature verification may be used in step 1309 and/or in step 1313.

In some embodiments, the method, step, and/or the system may be looking at routines and/or patterns of one or more tenants 401 and their use of their storage unit(s) 101; such as, but not limited to, noting that the one or more tenants 401 visits their storage unit 101 at a same time daily, or at same time weekly, or the like. Thus, with this learned (observed) context, the method, step, and/or the system may change the language, tone, and/or escalation patterns of messaging to that tenant 401 based on such presumptive learned and/or observed patterns of behavior. For example, and without limiting the scope of the present invention, even if the tenant 401 does not respond to an initial motion detected message, a presumption could be made that it is an authorized user based on the time and/or day of detected motion, so there would be no need to send a follow-up message to the tenant's 401 backup (secondary) contact, if any.

Beyond the prior mentioned applications of contextual signatures, contextual signatures may be used broadly for enhancing real-time data-driven decision making. Contextual signatures provide valuable data insights that may inform strategic decision-making processes at self-storage facilities 345. By analyzing trends and patterns in customer behavior, facility 345 usage, and operational efficiency, management may identify areas for operational improvement and implement targeted approaches to enhance overall performance, whether this be manually or through systemized automated actions.

In other uses, analyzing contextual signatures may enhance customer experience of tenant subscribers 401 by analyzing contextual signatures, such as, entry and exit times, frequency of visits, and unit 101 access and/or usage patterns, self-storage facilities 345 may tailor their services to better meet the needs of their customers. For example, if certain customers tend to access their units during specific times of the day or week, the facility 345 may optimize staffing and service availability accordingly. Contextual signatures derived from motion sensors and people tracking provide insights into customer behavior, enabling facilities 345 to tailor services and security measures accordingly. Additionally, in combination with environmental monitoring contributes to security by detecting anomalies such as sudden temperature changes or unexpected humidity levels, which might indicate unauthorized access or potential risks to stored items.

In other uses, analyzing contextual signatures may help self-storage facilities 345 optimize their layout and resource allocation. By combining insights gained from monitoring which areas are most frequently access, such as, controlled spaces for transitory use 101 (which may or may not be self-storage units 101) or other areas of the facility 345 are most frequently accessed, management may allocate resources more effectively and ensure that high-demand areas are properly maintained.

In still other uses, by analyzing contextual signatures related to facility 345 equipment usage and performance within controlled spaces for transitory use 101 or other areas of the facility 345, self-storage facilities 345 may implement predictive maintenance strategies to proactively address equipment failures or maintenance issues before they escalate or even occur. This may help minimize downtime and ensure uninterrupted service for customers. For example, anomalies detected by environmental sensors may trigger proactive maintenance actions, preventing potential damage to equipment that requires more expensive repairs, reducing (or avoiding) downtime, while maintaining property environmental conditions to ensure best conditions for items that are stored in the controlled spaces for transitory use 101.

In still other uses, analyzing contextual signatures including detected data by monitoring-devices 100 and presence identifiers 1211 in combination with time of day, day of week, month, and trends thereof, aid in resource planning and management by providing real-time visibility and trends into facility operations and resource utilization. This enables operational management to make informed decisions regarding staffing levels, inventory management, and resource allocation to optimize efficiency and reduce costs.

In still other uses, utilizing contextual signatures with environmental monitoring sensors may also contribute to energy efficiency and cost savings by optimizing HVAC systems and resource usage based on real-time environmental data. For example, by utilizing contextual data from traffic patterns of facility 345 use from presence identifiers 1211, monitoring-devices 100 and monitoring temperature and humidity levels, facilities 345 may adjust HVAC settings to minimize energy consumption while still maintaining ideal storage conditions and ensuring customer satisfaction of tenants 401.

FIG. 13C shows at least some sub-steps of step 1313 from FIG. 13A. In some embodiments, at least some of the steps shown in FIG. 13C may also correspond to the system of FIG. 12B. In some embodiments, step 1313 may comprise steps: step 1331, step 1333, step 1335, step 1337, step 1338, step 1339, step 1341, step 1343, step 1345, combinations thereof, and/or the like. In some embodiments, at least one step of the method of FIG. 13C (step 1313) may be optional, skipped, and/or omitted. For example, and without limiting the scope of the present invention, in some embodiments, step 1335 may be replaced with step 1338, or both step 1335 and step 1338 may be executed, or neither step 1335 and 1338 may be executed. In some embodiments, at least some steps of the method of FIG. 13C (step 1313) may be executed out of numeral order with respect to the identified reference numerals for the steps.

In some embodiments, step 1331 may be a step of at least one (1) person (and/or drone and/or robot) physically entering into a given controlled space for transitory use 101 (storage unit 101) that has at least one (1) monitoring-device 100 (removably or permanently) mounted therein (and/or thereon). In some embodiments, the controlled space for transitory use 101 comprises a storage unit 101 at a storage facility 345. In some embodiments, the controlled space for transitory use 101 may be at least one storage unit 101. In some embodiments, completion of step 1331 may progress step 1313 to step 1333.

Continuing discussing FIG. 13C, in some embodiments, step 1333 may be a step of the at least one (1) monitoring-device 100 (from step 1331) detecting the entered person(s) (drone(s) and/or robot(s) into that given controlled space for transitory use 101 (storage unit 101); and/or detecting the entry (such as, but not limited to, detecting motion, detecting magnetically-coupled sensors are separated, a temperature change, a sound, combinations thereof, and/or the like). In some embodiments, execution of step 1333 may transition step 1313 to step 1335.

Continuing discussing FIG. 13C, in some embodiments, step 1335 may be a step of determining if the detection event from step 1333 satisfies (is compliant) with an onboard rule set of the monitoring-device 100 (that made the detection) and/or of NINCE 367. For example, and without limiting the scope of the present invention, the onboard rule set may be one where entries into the given controlled space for transitory use 101 (storage unit 101) during certain and/or predetermined times, hours, days, and/or dates may be treated as locally authorized (such as, but not limited to, during normal business hours for the tenant subscriber for that particular controlled space for transitory use 101 [storage unit 101]); whereas, detected entries at other certain (different) and/or predetermined times, hours, days, and/or dates (such as, but not limited to, after hours) may call for that detecting monitoring-device 100 to send an entry (presence) communication, message, notification and/or warning (concern) to NINCE 367 (computer-server(s)). Note, in some embodiments, NINCE 367 and/or authorized users (via NINCE 367) may change, modify, update onboard rule sets of monitoring-devices 100. In some embodiments, execution of step 1335 may transition step 1313 to step 1311 if the detection event was compliant (satisfied) the onboard rule set or to step 1337 if the detection event did not satisfy the onboard rule set.

In some embodiments, use of a given onboard rule set of a given monitoring-device 100 (e.g., with onboard microprocessor 501, memory 503, and with one or more sensors 505) (and/or of NINCE 367 [see e.g., step 1338] in some embodiments) may be useful and/or important for defining the behavior and/or decision-making processes, including local performance without the real-time need to communicate with NINCE 367, of (for) the given monitoring-device 100. Such onboard rule set(s) may govern how the monitoring-device 100 interprets and/or reacts to its own sensor data; and may trigger actions based on predefined criteria or learned contextual awareness (contextual signature(s)). With respect to monitoring thresholds, thresholds may be defined levels of sensor activity that trigger specific actions. For example, motion sensors may be programmed to detect a certain percentage of motion within defined time intervals, such as (but not limited to) 80% motion over a 10-second, 30-second, or 1-minute window (or other timeframe). Similarly, monitoring-devices 100, such as magnetically-coupled door-break sensors 100, may monitor the duration for which a door 1205 (1103 and/or 1109) remains open or closed to determine its state. With respect to minimum or maximum thresholds, such thresholds may establish minimum or maximum acceptable levels of sensor 505 activity required to qualify as a qualified, significant, and/or reportable event. For instance, a light sensor 505 may trigger an action only when the light level falls below a certain threshold, indicating darkness. With respect to health check reporting frequency of a given monitoring-device 100, its onboard rule set(s) may include (comprise) parameters for how frequently monitoring-device 100 reports its status to a central network and/or NINCE 367. This ensures timely updates of monitoring for monitoring-device 100 health, ambient, and/or environmental conditions, and system integrity. With respect to contextual use of multiple sensors (such as, but not limited to, sensors 505), onboard rule set(s) may incorporate data from multiple distinct sensor types and/or multiple of the same sensor type, to make informed decisions and/or recommendations. For example, temperature sensors can contextualize motion detection by disregarding motion during extreme temperature conditions. With respect to access hours and authorization, monitoring-device 100 can distinguish between authorized and unauthorized events based on user-defined access hours (e.g., user 401 and/or 405). Motion detected during authorized access hours may not trigger immediate alerts, while motion detected outside of these hours may be considered unauthorized and prompt alerts. With respect to audible alerts and deterrents: onboard rule set(s) may include provisions for audible alerts or deterrents, such as beepers and/or sirens (or the like), to deter unauthorized access or activity detected by monitoring-device 100. With respect to waiting time between presence detection, a time interval between successive presence detections can be used to determine the duration of presence or the end of an event. With respect to multi-touch (not physical touch) point authentication, by using multiple sensor (such as, but not limited to, sensors 505) types within a single monitoring-device 100 or across adjacent monitoring-devices 100, the monitoring system can establish multi-touch point authentication of conditions, enhancing the reliability and accuracy of detected events. In summary, onboard rule sets for monitoring-devices 100 with sensors may play a useful and/or important role in defining how the given monitoring-device 100 interprets and/or reacts to sensor data, triggers actions, and whether communication with the central network or NINCE 367 is warranted. These onboard rule sets ensure effective monitoring, accurate event detection, and appropriate response mechanisms tailored to specific environmental contexts and security requirements.

Also note, in some embodiments, it may be the NINCE 367, running on server(s) 309 that store and execute one or more onboard rule set(s) (rule set(s)), see e.g., step 1338 of FIG. 13C. In at least some such scenarios, the monitoring-device(s) 101 may or may not be executing the onboard rule set(s). In at least some such scenarios, the monitoring-device (s) 101 and/or NINCE 367, running server(s) 309 may be executing onboard rule set(s) (which may be different from each other). For example, and without limiting the scope of the present invention, in some embodiments, (after receiving the detected entry event) NINCE 367 running on the computer-server 309 may determine if the detected entry from the step 1333 satisfies a rule set (other onboard rule set) executable on the computer-server 309 and/or NINCE 367, then the detected entry event may be authorized (and the method may proceed to step 1311); whereas, if the detected entry from the step 1333 fails to satisfy the rule set (the other onboard rule set), then the computer-server 309 (via operation of NINCE 367) may send the detected entry event to at least one authorized user 401 or to at least one authorized user-device 303 (e.g., per step 1339). In some embodiments, execution and/or inclusion of step 1338 in the method may be optional or omitted. In some embodiments, when step 1338 may be included in the method, then step 1335 may be executed, skipped (or omitted), and if step 1335 is skipped (or omitted), then step 1333 may proceed to step 1337, and step 1337 may proceed to step 1338, and execution of step 1338 may progress to step 1311 or to step 1339.

Continuing discussing FIG. 13C, in some embodiments, there may be no active onboard rule set (of monitoring-device 100 and/or of NINCE 367) and in such scenarios step 1333 may progress to step 1337, i.e., step 1335 may be skipped and/or omitted (or in the alternative, the “no” pathway from step 1335 may be interpreted as being triggered if there may be no active onboard rule set of monitoring-device 100 and/or of NINCE 367).

Continuing discussing FIG. 13C, in some embodiments, step 1337 may be a step of the monitoring-device 100 that detected the entry event and where that detected entry event failed to satisfy an onboard rule set of that monitoring-device 100 and/or NINCE 367 or there were no active onboard rule sets, then sending (communicating) that detection entry event to NINCE 367 (computer server(s)) (for evaluation thereof and/or action thereon). In some embodiments, execution of step 1337 may transition step 1313 (i.e., the method of FIG. 13C) to step 1339.

Continuing discussing FIG. 13C, in some embodiments, step 1339 may be a step of the NINCE 367 (computer server(s)) sending the detected entry event to authorized user(s) 1201 and/or to their authorized user device(s) 1203; and/or wherein the NINCE 367 (computer server(s)) in that ongoing communication may also request feedback from the authorized user(s) 1201 and/or from the authorized user device(s) 1203 as to whether or not the reported on detection entry event was/is authorized or not. In some embodiments, the request for feedback from the NINCE 367 (computer server(s)) may be in the form of a binary question, a polar question, a closed question, and/or the like, in a human natural language (such as, but not limited to, English), wherein the called for answer to the posed question is expected in one of two choices, one that provides an affirmative answer to the question or one that provides a negative answer to the question; i.e., the answer may be "yes" or "no," "1" or "2," or the like. In some embodiments, execution of step 1339 may transition step 1313 to step 1341 and/or to step 1343.

Continuing discussing FIG. 13C, in some embodiments, step 1341 may be a step of the NINCE 367 (computer server(s)) (timely) receiving feedback communication(s) from the authorized user(s) 1201 and/or from the authorized user device(s) 1203 as to whether or not the reported-on detection entry event was/is authorized or not. In some embodiments, this received feedback may include at least some elements that are/were entered by the user(s) 1201 in a human natural language (such as, but not limited to, English). In some embodiments, execution of step 1341 may transition step 1313 (the method of FIG. 13C) to step 1311 if the received feedback had indicated that the entry event was authorized or to step 1315 if the received feedback had indicated that the entry event was un-authorized; or in some embodiments, step 1341 may transition to step 1315 in a "not yes" (no acknowledgment) scenario. That is, in some embodiments, the "no" pathway from step 1341 shown in FIG. 13C may also be the "not yes" (i.e., the no acknowledgment) pathway leading to step 1315.

Continuing discussing FIG. 13C, in some embodiments, step 1343 may be an optional step that may occur if step 1341 fails to execute or if step 1341 is not timely received by the NINCE 367 (computer server(s)). In some embodiments, NINCE 367 (computer server(s)) may have a predetermined (and/or editable) time-frame upon which NINCE 367 (computer server(s)) must receive the feedback in step 1341 or else NINCE 367 (computer server(s)) may then execute step 1343; or step 1341 may transition to step 1315 in a "not yes" (no acknowledgment) scenario as indicated in FIG. 13A. That is, in some embodiments, the "no" pathway from step 1341 shown in FIG. 13C may also be the "not yes" (i.e., the no acknowledgment) pathway leading to step 1315. In some embodiments, step 1343 may be a step of (optionally) the NINCE 367 (computer server(s)) sending the detected entry event to "secondary" (other) authorized user (s) 1201 and/or to their authorized user device(s) 1203 that were not attempted to be communicated with in step 1339; and/or wherein the NINCE 367 (computer server(s)) in that ongoing communication may also request feedback from the secondary (other) authorized user(s) 1201 and/or from their authorized user device(s) 1203 as to whether or not the reported on detection entry event was/is authorized or not. In some embodiments, the request for feedback from the NINCE 367 (computer server(s)), to the secondary (other) authorized user(s) 1201 and/or to their authorized user device(s) 1203, may be in the form of a binary question, a polar question, a closed question, and/or the like, in a human natural language (such as, but not limited to, English), wherein the called for answer to the posed question is expected in one of two choices, one that provides an affirmative answer to the question or one that provides a negative answer to the question; i.e., the answer may be "yes" or "no," "1" or "2," or the like. In some embodiments, execution of step 1343 may transition step 1313 to step 1345.

Continuing discussing FIG. 13C, in some embodiments, step 1345 may be a step of the NINCE 367 (computer server(s)) (timely) receiving feedback communication(s) from the secondary (other) authorized user(s) 1201 and/or from the secondary (other) authorized user device(s) 1203 (of those the secondary (other) authorized user(s) 1201) as to whether or not the reported-on detection entry event was/is authorized or not. In some embodiments, this received feedback may include at least some elements that are/were entered by the secondary (other) user(s) 1201 in a human natural language (such as, but not limited to, English). In some embodiments, execution of step 1345 may transition step 1313 to step 1311 if the received feedback had indicated that the entry event was authorized or to step 1315 if the received feedback had indicated that the entry event was un-authorized. In some embodiments, if step 1341 timely executes within the predetermined timeframe, then steps 1343 and 1345 may not execute (occur).

FIG. 13C may show a flow diagram of at least some steps in a method for determining if a detected entry into a controlled space for transitory use 101 is authorized. In some embodiments, FIG. 13C may comprise steps of: step 1333, step 1335, step 1337, and step 1339. In some embodiments, this method may also comprise at least one or more steps of: step 1341, step 1343, step 1343, step 1311, and/or step 1315.

Discussing FIG. 13C, in some embodiments, step 1333 may be as described above and/or may be a step of detecting entry into the controlled space for transitory use 101 from at least one monitoring-device 100 that is monitoring that controlled space for transitory use 101, wherein this detected entry results in a detected entry event. This detected entry into the given controlled space for transitory use 101 may be shown in FIG. 12B by user 1215 and/or by user device 1217; and this stage in the method, the method may not know if entry by user 1215 and/or by user device 1217 is authorized or not.

Discussing FIG. 13C, in some embodiments, step 1335 may be as described above and/or may be a step of if the detected entry from the step 1333 satisfies an onboard rule set running on the at least one monitoring-device 101, then the detected entry event is authorized; and if so, then this method may proceed to step 1311 of FIG. 13A. In some embodiments, the onboard rule set is non-transitorily stored in storage 503 of the at least one monitoring-device 101 and is executable when called into memory 503 of the at least one monitoring-device 101 by at least one processor 501 of the at least one monitoring-device 101. In some embodiments, when the computer-server 309 (where NINCE 367 may be running thereon) is in communication with the at least one monitoring-device 101, the onboard rule set may be editable by the computer-server 309. In some embodiments, the onboard rule set may specify (require and/or call for) that entry detections from the at least one monitoring-device 101 during normal operating hours, as determined by an authorized user 401 and/or 405 of the controlled space for transitory use 101, are deemed to satisfy that onboard rule set (which may progress this method to step 1311); and that entry detections outside of the normal operating hours are deemed to fail satisfying that onboard rule set thus automatically being deemed unauthorized (which may progress this method to step 1315).

Discussing FIG. 13C, in some embodiments, step 1337 may be as described above and/or may be a step of if the detected entry from the step 1333 fails to satisfy the onboard rule set running on the at least one monitoring-device 101, then the at least one monitoring-device 101 sends (transmits and/or communicates) the detected entry event to computer-server 309 (with NINCE 367 executable thereon).

Discussing FIG. 13C, in some embodiments, step 1339 may be as described above and/or may be a step of, after receiving the detected entry event, the computer-server 309 (per operation of NINCE 367) sends (transmits and/or communicates) the detected entry event to at least one authorized user 401 (and/or 405) and/or to at least one authorized user-device 303. In some embodiments, the at least one authorized user is a user of the controlled space for transitory use 101 that has been authorized for such use by a tenant subscriber 401 of the controlled space for transitory use 101 and/or by a property manager 405 of the controlled space for transitory use 101. In some embodiments, the at least one authorized user-device is a device used by the at least one authorized user 401 and that has been authorized for use in the controlled space for transitory use 101 by a tenant subscriber 401 of the controlled space for transitory use 101 and/or by a property manager 450 of the controlled space for transitory use 101. In some embodiments, the at least one authorized user-device 303 (and/or 1203) may be selected from one or more of: a fob, a key fob, an electronic fob, a computing fob, a battery powered device, a battery powered fob, a smartphone, a smartwatch, a tablet computer, a laptop computer, an electronic device, a computing device, a NFC tag, a QR code reader, a RFID device, a computer, combinations thereof, and/or the like. In some embodiments, the step 1339 sending from the computer-server 309 may comprise a request for a responsive-communication (from the at least one authorized user 401 and/or from the at least one authorized user-device 303—see step 1341) to include whether or not the detected entry event is authorized or unauthorized. In some embodiments, this request may comprise a contextual signature and/or request contextual signature verification. In some embodiments, this request may be in a content form that may comprise a question in a binary form, wherein a called for answer to the question is expected in one of two choices, one that provides an affirmative answer to the question or one that provides a negative answer to the question. In some embodiments, this request may be in a content form that may comprise at least one word and/or at least one number in a human natural language (such as, but not limited to, English word(s)). In some embodiments, this request may be in a content form that may comprise a question, wherein a response to the question, as part of the responsive-communication, is completely understood contextually and/or cognitively by the use of artificial intelligence as to whether the response is an affirmative-answer to the question or whether the response provides a negative-answer to the question. In some embodiments, this request may be in a content form that may comprise a question, wherein a response to the question, as part of the responsive-communication, may be selected (by the authorized user 401) from (by) engaging a button and/or a clicking a hyperlink whereby engaging the button and/or clicking the hyperlink determines if the response is an affirmative-response or a negative-response to the question. In some embodiments, the step 1339 sending from the computer-server 309 (via NINCE 367) may be in a communication form selected from one or more of: a TEXT message, a SMS message, an email, a mobile app message, a web app message, a web portal message, a pop-up message, a direct message (DM), a mobile phone notification, a chat bot message, a phone screen notification, a phone call, a voicemail, a sound from a speaker of the at least one monitoring-device 101, combinations thereof, and/or the like. These communication form(s) may be engageable (accessible) by the user 401 using the user-device 303.

Discussing FIG. 13C, in some embodiments, step 1341 may be as described above and/or may be a step of if a "responsive-communication" is timely received at the computer-server 309 (with NINCE 367 executable thereon) from the at least one authorized user 401 and/or from the at least one authorized user-device 303, then the detected entry event is deemed authorized or unauthorized per information in the responsive-communication; and this method may progress to either step 1311 (if authorized) or to step 1315 (if not authorized); i.e., it may be the at least one authorized user 401 and/or the at least one authorized user-device 303 that determines if the detected entry event is authorized or not and reports that determination back to NINCE 367 (computer-server 309). In some embodiments, the responsive-communication and/or its information may be in a content form that comprises an answer in a binary form (to the request from the computer-server 309), wherein the answer is expected in one of two choices, one that provides an affirmative answer to a question or one that provides a negative answer to the question. In some embodiments, the responsive-communication may be in a content form that comprises at least one word or at least one number in a human natural language (such as, but not limited to, English). In some embodiments, the responsive-communication may be in a content form that is completely understood contextually and/or cognitively by the use of artificial intelligence. In some embodiments, the responsive-communication may be selected from engaging a button or clicking a hyperlink, wherein engaging the button or clicking the hyperlink determines whether or not the detected entry event is authorized or unauthorized (it may be the authorized user 401 who engages the button and/or the hyperlink). The button may be virtual display on a touchscreen of the user's 401 device 303. In some embodiments, the responsive-communication received at the computer-server 309 (from the user 401 and/or their device 303) may be in a communication form selected from one or more of: a TEXT message; a SMS message; an email; a mobile app message; a web app message; a web portal message; a direct message (DM); a response from a mobile phone notification; a chat bot message; a phone call; a voicemail; a response from a robo call; and/or a sound from a speaker of an electronic device, from a user of the controlled space for transitory use, picked up by a microphone from the at least one monitoring-device, combinations thereof, and/or the like.

Discussing FIG. 13C, in some embodiments, step 1343 may be as described above and/or may be a step of if the responsive-communication (from the at least one authorized user 401 and/or from the at least one authorized user-device 303) is not timely received at the computer-server 309 (with NINCE 367 executable thereon), then the computer-server 309 (via NINCE 367) sends the detected entry event to at least one other (secondary) authorized user 403 and/or to at least one other (secondary) authorized user-device, if the at least one other authorized user 403 exists or if the at least one other user-device exists; whereas, if the at least one other authorized user 403 does not exist (e.g., because was not specified by the at least one authorized user 401) and if the at least one other user-device does not exist, then the detected entry event is deemed unauthorized (and the method may progress to step 1315). In some embodiments, the step 1343 sending from the computer-server 309 (via NINCE 367) may comprise a request for "feedback-communication" (from the at least one other user 403 and/or from the at least one other user-device) to include whether or not the detected entry event is authorized or unauthorized. In some embodiments, this request may be in a content form that comprises a question in a binary form, wherein a called for answer to the question is expected in one of two choices, one that provides an affirmative answer to the question or one that provides a negative answer to the question. In some embodiments, this request may be in a content form that may comprise at least one word and/or at least one number in a human natural language (such as, but not limited to, English). In some embodiments, this request may be in a content form that may be completely understood contextually by the use of artificial intelligence. In some embodiments, the feedback-communication may be selected from engaging a button or clicking a hyperlink, wherein engaging the button or clicking the hyperlink determines whether or not the detected entry event is authorized or unauthorized. It may be the other user 403 who engages the button and/or clicks the hyperlink using their other user-device and the button may be a virtual button displayed on a touchscreen of that other user-device. In some embodiments, the step 1343 sending from the computer-server 309 (via NINCE 367) may be in a communication form selected from one or more of: a TEXT message, a SMS message, an email, a mobile app message, a web app message, a web portal message, a pop-up message, a direct message (DM), a mobile phone notification, a chat bot message, a phone screen notification, a phone call, a voicemail, a sound from a speaker of the at least one monitoring-device, combinations thereof, and/or the like. These communication form(s) may be engageable (accessible) by the other user 403 using the other user-device.

Discussing FIG. 13C, in some embodiments, step 1345 may be as described above and/or may be a step of if a "feedback-communication" is timely received at the computer-server 309 (with NINCE 367 executable thereon) from the at least one other authorized user 403 and/or from the at least one other authorized user-device, then the detected entry event is deemed authorized or unauthorized per an instruction in the feedback-communication; and this method may progress to either step 1311 (if authorized) or to step 1315 (if not authorized); i.e., it may be the at least one other authorized user 403 and/or the at least one other authorized user-device that determines if the detected entry event is authorized or not and reports that determination back to NINCE 367 (computer-server 309). In some embodiments, if the feedback-communication is not timely received at the computer-server 309, then the detected entry event is deemed unauthorized (and the method may progress to step 1315). In some embodiments, the feedback-communication may be in a content form that may comprise an answer in a binary form to the request from the computer-server 309 (from step 1343), wherein the answer is expected in one of two choices, one that provides an affirmative answer to a question or one that provides a negative answer to the question. In some embodiments, the feedback-communication may be in a content form that may comprise at least one word and/or at least one number in a human natural language (such as, but not limited to, English). In some embodiments, the feedback-communication may be in a content form that is completely understood contextually by the use of artificial intelligence. In some embodiments, the feedback-communication may be selected from engaging a button or clicking a hyperlink, wherein engaging the button or clicking the hyperlink determines whether or not the detected entry event is authorized or unauthorized. It may be the other user 403, using their other user-device, who engages the button and/or clicks the hyperlink. The button may be a virtual button displayable on a touchscreen of the other user-device. In some embodiments, the feedback-communication received at the computer-server 309 (and accessible and/or usable by NINCE 367) may be in a communication form selected from one or more of: a TEXT message; a SMS message; an email; a mobile app message; a web app message; a web portal message; a direct message (DM); a response from a mobile phone notification; a chat bot message; a phone call; a voicemail; a response from a robo call; and/or a sound from a speaker of an electronic device, from a user of the controlled space for transitory use, picked up by a microphone from the at least one monitoring-device, combinations thereof, and/or the like. These communication form(s) may come from the other user-device and/or from the other-user 403.

Continuing discussing FIG. 13C, in some embodiments, determination as to whether the "responsive-communication" (from the at least one authorized user 401 and/or from the at least one authorized user-device 303) is timely received in the step 1341 and/or whether the "feedback-communication" (from the at least one other authorized user 403 and/or from the at least one other authorized user-device) is timely received in step 1345 is measured against a predetermined (and/or editable) timeframe executable on NINCE 367 operating on the computer-server 309 that counts down upon execution of the step 1339 or the step 1343, respectively.

Discussing FIG. 13C and FIG. 13A, in some embodiments, step 1311 may be as described above and/or may be a step of when the detection entry event is deemed authorized, this method may further comprises a step of taking at least one (predetermined) action and/or at least one action that is based on contextually learned behavior of the controlled space for transitory use 101. In some embodiments, the at least one (predetermined) action may be selected from one or more of: (i) sending a message from the computer-server 309 and/or from the at least one monitoring-device 101 to at least one of: the at least one authorized user 401, the at least one authorized user-device 303, the at least one other authorized user 403, the at least one other authorized user-device, a tenant subscriber 401 of the controlled space for transitory use 101, a property manager 405 of the controlled space for transitory use 101, an owner of the controlled space for transitory use 101, a tenant-subscriber-web-portal, a tenant-subscriber-mobile-app, a tenant-subscriber-wallet-pass, a facility web portal, a facility-mobile-app of a facility 345 that manages the controlled space for transitory use 101, central management of a property 345, property 345 owner(s), call center personnel, or monitoring center personnel; (ii) sending a welcome-message (and/or a confirmation message) from the computer-server 309 and/or from the at least one monitoring-device 101 to the at least one authorized user 401 or to the at least one authorized user-device 303 (i.e., the step 1333 detected user 1215 and/or device 1217 may be now deemed an authorized user 401 and/or an authorized device 303); (iii) displaying or logging an authorized disposition event to the tenant-subscriber-web-portal, the tenant-subscriber-mobile-app, the tenant-subscriber-wallet-pass, to the facility web portal, or to the facility-mobile-app; (iv) authorizing a configuration for the at least one monitoring-device; combinations thereof; and/or the like.

Discussing FIG. 13C and FIG. 13A, in some embodiments, step 1315 may be as described above and/or may be a step of when the detection entry event is deemed unauthorized, this method may further comprise a step of taking at least one (predetermined) action and/or of taking at least one action that is based on contextually learned behavior of the controlled space for transitory use 101. In some embodiments, the at least one (predetermined) action may be selected from one or more of: (i) sending a warning communication from the computer-server or from the at least one monitoring-device to at least one of: the at least one authorized user 401, the at least one authorized user-device 303, the at least one other authorized user 403, the at least one other authorized user-device, a tenant subscriber 401 of the controlled space for transitory use 101, a property manager 405 of the controlled space for transitory use 101, an owner of the controlled space for transitory use 101, a tenant-subscriber-web-portal, a tenant-subscriber-mobile-app, a tenant-subscriber-wallet-pass, a facility web portal, a facility-mobile-app of a facility 345 that manages the controlled space for transitory use 101, central management of a property 345, property 345 owner(s), call center personnel, or monitoring center personnel, wherein the warning communication comprises content that there has been an unauthorized entry into the controlled space for transitory use 101; (ii) displaying or logging an unauthorized disposition event on the tenant-subscriber-web-portal, the tenant-subscriber-mobile-app, the tenant-subscriber-wallet-pass, the facility web portal, and/or the facility-mobile-app; (iii) sending a message from the computer-server 309 and/or from the at least one monitoring-device 101 to the property manager 405 that a physical inspection of the controlled space for transitory use 101 should be executed; (iv) logging an unauthorized configuration for the at least one monitoring-device 101; combinations thereof; and/or the like.

Continuing discussing FIG. 13C, also note, in some embodiments, it may be the NINCE 367, running on server (s) 309 that store and execute one or more onboard rule set(s) (rule set(s)), see e.g., step 1338. In at least some such scenarios, the monitoring-device(s) 101 may or may not be executing the onboard rule set(s). In at least some such scenarios, the monitoring-device(s) 101 and/or NINCE 367, running server(s) 309 may be executing onboard rule set(s) (which may be different from each other). For example, and without limiting the scope of the present invention, in some embodiments, (after receiving the detected entry event via step 1337) NINCE 367 running on the computer-server 309 may determine if the detected entry from the step 1333 satisfies a rule set (other onboard rule set) executable on the computer-server 309 and/or NINCE 367, then the detected entry event may be authorized if the rule is satisfied (and the method may proceed to step 1311); whereas, if the detected entry from the step 1333 fails to satisfy the rule set (the other onboard rule set), then the computer-server 309 (via operation of NINCE 367) may send the detected entry event to at least one authorized user 401 or to at least one authorized user-device 303 (e.g., per step 1339). In some embodiments, execution and/or inclusion of step 1338 in the method may be optional or omitted. In some embodiments, when step 1338 may be included in the method, then step 1335 may be executed, skipped (or omitted), and if step 1335 is skipped (or omitted), then step 1333 may proceed to step 1337, and step 1337 may proceed to step 1338, and execution of step 1338 may progress to step 1311 or to step 1339.

FIG. 13C may show a flow diagram of at least some steps in a method for determining if a detected entry into a controlled space for transitory use 101 is authorized. In some embodiments, FIG. 13C may comprise steps of: step 1333, step 1337, step 1338, and step 1339. In some embodiments, this method may also comprise at least one or more steps of: step 1341, step 1343, step 1311, and/or step 1315. Note, in this particular method embodiment, in step 1338 execution of the onboard rule set formerly by monitoring-device 101 (in now skipped step 1335) may now instead be carried out by NINCE 367 running on a given computer-server 309.

FIG. 13C may show a flow diagram of at least some steps in a method for determining if a detected entry into a controlled space for transitory use 101 is authorized. In some embodiments, FIG. 13C may comprise steps of: step 1333, step 1337, and step 1339. In some embodiments, this method may also comprise at least one or more steps of: step 1341, step 1343, step 1343, step 1311, and/or step 1315. Note, in this particular method embodiment step 1335 and step 1338 may be omitted (e.g., because monitoring-device 100 and NINCE 367 may not be running an applicable [onboard] rule set); and step 1333 may progress to step 1337, and step 1337 may progress to step 1339.

FIG. 13C may show a flow diagram of at least some steps in a method for determining if a detected entry into a controlled space for transitory use 101 is authorized. In some embodiments, FIG. 13C may comprise steps of: step 1333, step 1335, step 1338, step 1337, and step 1339. In some embodiments, this method may also comprise at least one or more steps of: step 1341, step 1343, step 1343, step 1311, and/or step 1315. Note, in this particular method embodiment an additional (other and/or different) onboard rule set may be carried out by NINCE 367 running on a given computer-server 309; i.e., so both monitoring-device 101 and NINCE 367 (operating on server 309) may each be executing a (different) onboard rule set. Satisfying either onboard rule set may result in this method progressing to step 1311.

Note, language appearing in FIG. 14A to FIG. 16A is not intended to be restrictive or limited to that specific and/or exact language. That is, deviations from the actual language used is intended as within the scope of the present invention. For example, and without limiting the scope of the present invention: "view," "action," "manage" or "details" could be interchangeable language; "smart" or "monitored" could be interchangeable language; "space," "unit," "monitored space," "monitored unit," "smart space," "smart unit," "truck," "trailer," "vehicle," or "container" could be interchangeable language; "info," "information," "details" "specifics," "particulars," could be interchangeable language; "ID," "identifier," "No.," "Number," could be interchangeable language; "health," "battery," "charge," or "level" could be interchangeable language; "output," "reading," "telematic," "feed," or "sensor" could be interchangeable language; "incident" or "event" could be interchangeable language; and/or "last" or "most recent" could be interchangeable language are all examples of possible language appearing in FIG. 14A to FIG. 16A. Note, the word "device" in FIG. 14A to FIG. 16A may refer to one or more monitoring-devices 100. Note, the word "space," "unit," "monitored space," "monitored unit," "smart space," "smart unit," "truck," "trailer," "vehicle," or "container" in FIG. 14A to FIG. 16A may refer to one or more controlled spaces for transitory use 101 (spaces 101).

Figure 14A:
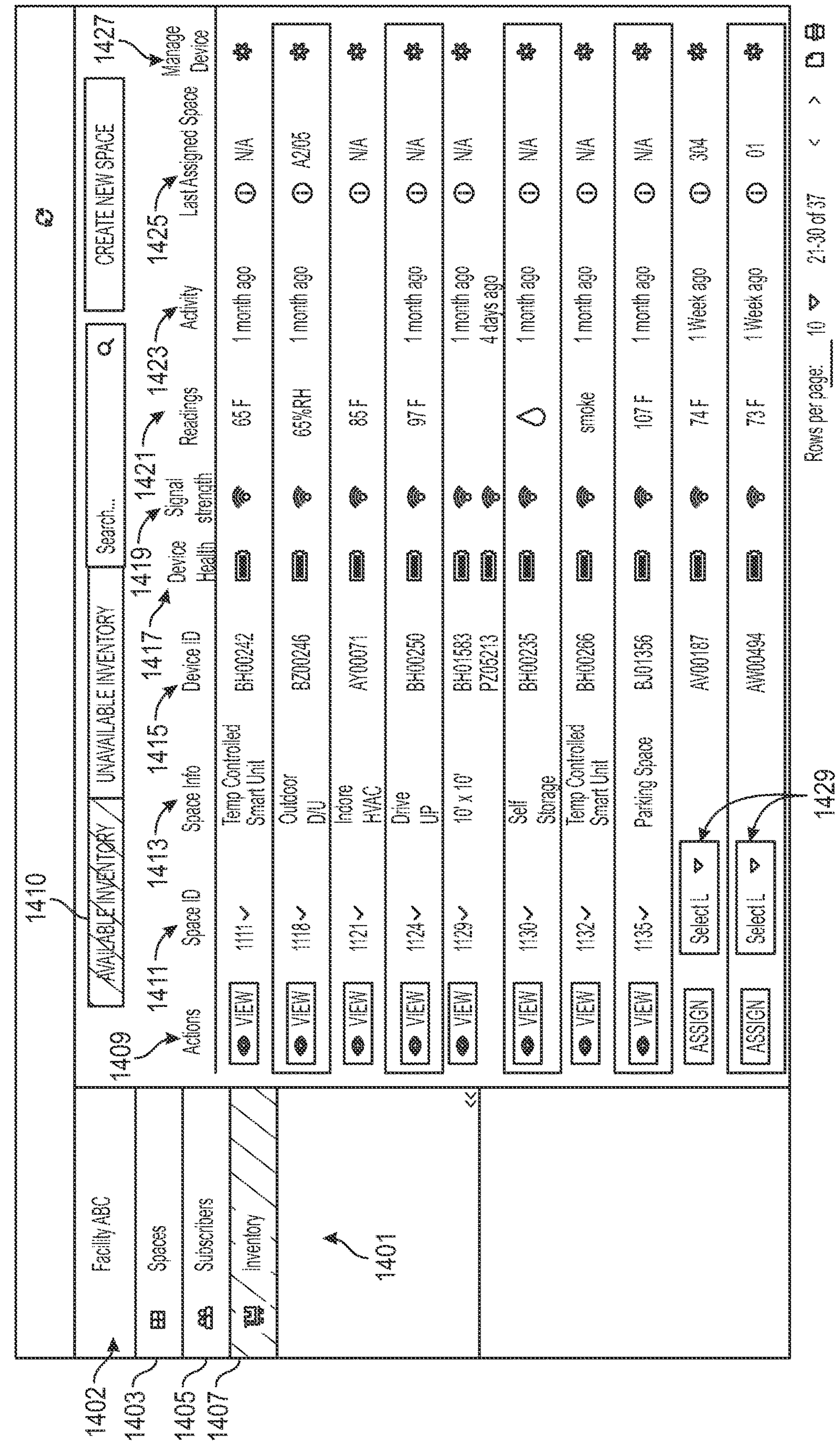
FIG. 14A shows a possible displayed user-interface-inventory-page of a graphical-user interface (GUI), according to at least one embodiment, that may be configured to be displayed upon a screen.

Within portal software, whether by web portal or web app, mobile app, and whether viewed on a desktop tablet or mobile phone or various other interfaces, FIG. 14A shows an example of an end-user management user interface that establishes relationships between monitoring-devices 100 and controlled space for transitory use 101 (spaces 101). On a side bar 1401, Tab 1407 shows a user-interface-inventory-page 1400 that may be standalone or may combine with other pages (windows/screens) of the overall displayable user-interface (GUI), dedicated to monitoring spaces 101, using monitoring-devices 100, with or without subscribers 401 or end-users assigned as well as optionally end user or subscriber assignment pages (windows/screens) of the overall displayable user-interface (GUI).

It is on a page or user interface like this user-interface-inventory-page 1400, that monitoring-devices 100 may be manually (or automatically) assigned (and installed) by property/space managers 405, other property 345 personnel to a controlled space 101, or in some cases even by the subscriber 401 of the space 101. This assignment may be completed by the end-user selecting 'select space' button 1429 (FIG. 14A) that creates a linkage to assigned monitoring 'device ID' 1415 or alternatively the assignment may be done by selecting the controlled space 101 by tapping button, scanning UPC or QR code, associated with the space 101, or reading the space 101 via RFID or NFC technology with the proper end-user device in hand. With the desired controlled space 101 identified equivalently the unique 'device ID' 1415 may be assigned by typing in directly or selecting from screen by clicking selection means 1429 and locating the available physical monitoring-device 100 in inventory to complete the marriage between controlled space 101 and the given monitoring-device 100. Alternatively, the end user may also scan the QR code, UPC code, or NFC logic/tag on the monitoring-device 100 to identify the monitoring-device 100 in hand, to make the assignment (association) to the given space 101 even easier and/or to streamline this process space 101 to monitoring-device 100 assignment (association) process.

Note, IDs (and/or identifiers) of monitoring-devices 100 (such as, but not limited to, IDs 1415) displayed in user-interface-inventory-page 1400 (and/or in overall displayable user-interface (GUI) or the like) need not be integral to a particular monitoring-device 100 and/or need not be the only ID (and/or identifier) for a particular monitoring-device 100. It is possibly that a label, a sticker, tag (such as, but not limited to, RFID and/or NFC), or the like, could be affixed to the monitoring device 100 that is distinct from the monitoring-device's own integral ID (such as, but not limited to, a serial number), but that acts as an intermediary to create a relationship for use in the inventory system and/or method and/or for use in the database(s) 1303, on/in the UI, and/or in the NINCE 367. In some embodiments, monitoring-devices 100 IDs (and/or identifiers) (such as, but not limited to, IDs 1415) may be generated by facility 345 personnel or by other approved end-users. In some embodiments, monitoring-devices 100 IDs (and/or identifiers) (such as, but not limited to, IDs 1415) may be generated during aspects of provisioning whether central or local. In some embodiments, monitoring-devices 100 IDs (and/or identifiers) (such as, but not limited to, IDs 1415) may be generated by applying a label (sticker and/or tag) onto and/or within the given monitoring-device 100 that is not the same ID as that from the manufacturer or supplier (such as, but not limited to, a serial number) of the monitoring-device 100 itself. However, NINCE 367, the overall displayable user-interface (GUI), and/or the user-interface-inventory-page 1400 may be configured to work with either a such user generated IDs and/or with a supplier (manufacturer or the like) supplied integral IDs for the monitoring-devices 100.

Note, space name 1411, space number 1411 or space description 1413 may not only be typed in by hand or discovered by QR code, UPC, NFC, RFID, and/or the like, but they may also be downloaded, maintained, updated, and/or displayed via an automated API (application program interface) connection from the point-of-sale (POS) software 1715, that often maintains the space names 1411, space numbers 1411, and/or space descriptions 1413.

Note, reference numeral 1411 when referring to an individual space 101 name, number, and/or identifier may be unit (space) identifier 1207—or column 1411 may be populated with a plurality of unit (space) identifier 1207, on a row-by-row basis.

Note, point-of-sale (POS) as used herein may refer to the process of when a given space 101 may be rented (leased) by a given tenant 401.

This entire inventory related software method and/or system may be incorporated within (to) the POS software 1715, such that space names 1411, space numbers 1411, and/or space descriptions 1413 do not even require API information to be passed between two different software solutions. See e.g., FIG. 17D, FIG. 20A, FIG. 20B, FIG. 25, FIG. 26A, and/or FIG. 26B for such an integrated system and/or methods.

The above process deals with connecting a standalone monitoring-device 100 in assigning (associating) it to a controlled space 101. This may be done in advance of point-of-sale (POS) by pre-associating (and pre-installing) the monitoring-device 100 with a physical space 101 name 1411 (FIG. 14A) (unit (space) identifier 1207), such as by pre-installing the monitoring-device 100 ahead of tenant 401 subscription; versus having to create the assignment (association) during the POS process, wherein monitoring-device 100 assignment to space 101 during POS may be described as "on-the-fly" device assignment (association). Further, this process also permits monitoring-device 100 assignment (association) to a space 101 that is already occupied in the case a tenant 401 determines they desire to have the space 101 monitored after POS, sometime later. This would follow a similar process as on-the-fly scenario.

The benefits of pre-assigning (pre-associating) and pre-installing a monitoring-device 100 to a controlled space 101 is the facilitation of a contactless move-in of the tenant 401 subscriber without the need for facility personnel 405 to visit the controlled space 101 as part of the POS process, whether just before, during, or after. Further, pre-assigning (pre-associating) and pre-installing permits online, web, and/or remote rentals (leases) of a space 101 that are completely contactless of the tenant 401 subscriber with respect to thus not needing to physically interface with property space manager 405 or associated personnel. This permits a hands-off process during POS and thereafter (with respect to space 101 rental setup and setup of monitoring for that space 101). The same may be said and true of renting a monitored space 101 over the phone via a call center, web rental, or via a chat bot interface. Such a pre-assignment (pre-association) and pre-installment method and/or system may be a lowest friction for the tenant 401 as this makes activation of services easiest for property personnel 405. Note, "pre-assignment" may be interchanged with "pre-association" as used herein; and may refer to a database linkage (record) between a given identifier of a given monitoring-device 100 and a given identifier of a given space 101; whereas, "install" may refer to the physical act of placing, locating, mounting, adhering, fixing, fastening, and/or the like of at least one given monitoring-device 100 in a manner to monitor a particular space 101.

Now, in the case of the on-the-fly method and/or system, which is alternatively used versus pre-assignment (pre-association) and pre-installment method and/or system, tenant 401 subscribers may rent a space 101 online, at the counter, or even existing tenants 401, may as well upgrade to the monitoring of their space 101. In this on-the-fly method and/or system, the assignment (association) of the monitoring-device(s) 100 to the specific space 101 is done at or around the same time as the POS conversion (i.e., just before, during, just after, or event much after in the case of an existing tenant). The benefits of this this on-the-fly method and/or system are that it permits more flexible (or versatile) use of none pre-installed monitoring-devices 100 inventory that is maintained to matched actual tenant 401 subscriber demand for the monitoring services and permits the facility 345 to easily (or more versatile) add monitoring-devices 100 based on real time tenant 401 subscriber demand. However, a potential downside is that the space 101 must be visited physically for physical monitoring-device(s) 100 installment, just before, during, or just after the POS rental of the space 101 of the tenant's 401 completion for the monitoring services subscription so thereby possibly requiring coordination with a tenant 401 to physically access the space 101 if the tenant has already occupied the unit. The on-the-fly approach may be used for all of the various types of POS user interfaces. It is a novel approach to more efficiently, matching the quantity of monitoring-devices 100 assets to actual growing tenant 401 demand, and in a real time manner. It is one key component to building monitoring as an ancillary service approach and largely enabled in part by this novel inventory management and tracking approach, see e.g., user-interface-inventory-page 1400 of FIG. 14A.

Note, to assist and make easy for property space managers 405 and associated personnel, the monitoring-devices 100 may be pre-provisioned, centrally, and/or remotely to "show up" in the monitoring software (NINCE 367) inventory displayed in the software as shown in FIG. 14A (user-interface-inventory-page 1400) such as unassigned devices IDs "AV00187" and/or "AW00494" in FIG. 14A. This pre-provisioning may be done by a centralized function as part of the property space operating company, alternatively, by the supplier of the monitoring-devices 100, the monitoring software (NINCE 367), and/or other value-enabling third party company (or their personnel.)

In some embodiments, this pre-provisioning of monitoring-devices 100 to a given monitoring network of a given facility 345 may occur before the monitoring-devices 100 even physically arrive at that given facility 345, such that when those monitoring-devices 100 do physically arrive at that given facility 345, those monitoring-devices 100 and that monitoring network are easily to recognize and communicate with each other and thus permits auto population into the unassigned in inventory portion of user-interface-inventory-page 1400. Further, in some embodiments, pre-provisioning of monitoring-devices 100 may also comprise pre-assigning (pre-associating) those monitoring-devices 100 to actual and particular space(s) 101 of that given facility 345 (however, actual physical installment can obviously only happen once the given monitoring-device 100 is at its space 101).

Please note by doing this, when package(s) of additional monitoring-devices 100 are shipped to a facility 345 from a different (remote) location, this permits the potential that when the monitoring-devices 100 do physically arrive within the established perimeter boundaries of a property's 345 monitoring network, the now arrived monitoring-devices 100 may self-recognize the property 345 specific network for which it was previously (and centrally) pre-provisioned and quickly and easily permit an out of box ready usage. Said differently, the monitoring-devices 100 may show up in inventory in FIG. 14A as unassigned and be immediately ready for space 101 assignment (association) without any need for monitoring-device 100 setup or configuration. However, note in some embodiments, that monitoring-devices 100 may have cellular network connectivity means and as such may be able to be on cellular network all the time; and if so, then the recognition of the monitoring network presence by the given monitoring-device 100 is not a requirement for central provisioning.

Using this remote pre-provisioning method and/or system permits, faster, lower end-user friction of use, and lower operator complexity given automated visibility of the monitoring-devices 100 that appear in inventory which are then ready for assignment (association) to controlled spaces 101 in only one basic step (e.g., via use of user-interface-inventory-page 1400); or if during the pre-provisioning pre-assignment (pre-association) was done, then the monitoring-devices 100 that appear in inventory may already be assigned (associated) to controlled spaces 101 such that not even that step is needed.

Alternatively, property manager 405 or operations personnel could also receive shipped non-provisioned monitoring-devices 100 and scan (read) monitoring-devices 100 upon receipt, which could also bring the monitoring-devices 100 into the facility's 345 inventory, into user-interface-inventory-page 1400 visibility. A benefit with such local-provisioning is that it avoids centralized and/or remote provisioning, but local-provisioning requires an extra step for the facility 345 operational personnel. Note, such scanning may be by QR codes, barcodes (UPC), RFID, and/or NFC technology.

FIG. 14A shows a possible displayed user-interface-inventory-page 1400, according to at least one embodiment, that may be configured to be displayed upon a screen, such as, but not limited to, a touchscreen, of an end-user computing and/or electronic device. In some embodiments, this end-user may be a facility operator 405 (or an agent thereof) of a given facility 345. In some embodiments, this end-user computing and/or electronic device may be a facility operator device 305. In some embodiments, user-interface-inventory-page 1400 may be one user-interface page out of several different (interconnected) user-interface pages of an overall displayable (graphical) user-interface (GUI) that is configured for facilitating facility 345 operator(s) 405 to view, control, manage, change, edit, communicate, combinations thereof, and/or the like with respect to the relationships and/or the statuses of and/or as between their: tenant subscribers 401, prospective tenant subscribers, monitoring-devices 100, and/or controlled spaces for transitory use 101, of their given facility 345 (or facilities 345). In some embodiments, this overall displayable user-interface (GUI) may comprise user-interface-inventory-page 1400, user-interface-monitored-spaces-page 1500, and user-interface-subscribers-page 1600. See e.g., FIG. 15A for user-interface-monitored-spaces-page 1500; and see FIG. 16A for user-interface-subscribers-page 1600. In some embodiments, this overall displayable user-interface (GUI) may be running on (computer) server(s) (such as, server[s] 309), as a part of NINCE 367, or interfacing with NINCE 367.

Continuing discussing FIG. 14A, in some embodiments, user-interface-inventory-page 1400 may display a list of all available monitoring-devices 100 that are "in inventory" for a given facility 345. In some embodiments, "in inventory" may mean the monitoring-devices 100, of a facility 345, that are not currently associated with a tenant subscriber 401 in NINCE 367 (and/or in NINCE's database(s) 1303). In some embodiments, user-interface-inventory-page 1400 may display a list of all available monitoring-devices 100, associated with that given facility 345 that are not currently associated with a tenant subscriber 401 in NINCE 367 (and/or in NINCE's database(s) 1303). In some embodiments, user-interface-inventory-page 1400 may display a list of all available monitoring-devices 100, associated with that given facility 345 that are not currently part of an active (consummated) subscription agreement with a tenant subscriber 401 in NINCE 367 (and/or in NINCE's database(s) 1303). That is, monitoring-devices 100 associated with that given facility 345 but that are currently associated with a tenant subscriber 401 in NINCE 367 (and/or in NINCE's database(s) 1303) will not be displayed upon user-interface-inventory-page 1400 (see instead user-interface-monitored-spaces-page 1500 of FIG. 15A for monitoring-devices 100 that are associated with tenant subscribers 401).

Continuing discussing FIG. 14A, in some embodiments, common to user-interface-inventory-page 1400, user-interface-monitored-spaces-page 1500, and/or user-interface-subscribers-page 1600, may be a grouping of displayable and engageable page navigation buttons 1401 (or the like) that may be engaged by the user to navigate between main pages of the overall displayable user-interface (GUI). In some embodiments, these main pages may be user-interface-inventory-page 1400, user-interface-monitored-spaces-page 1500, and user-interface-subscribers-page 1600. In some embodiments, the user (facility operator 405) may engage (select) any of these navigation buttons 1401 by touching the screen at the given button's 1401 displayed screen location, if the screen is a touchscreen, or using another input means, such as, but not limited to, a mouse. In some embodiments, grouping of displayable and engageable page navigation buttons 1401 may be located in a left most column region of the displayable window of the overall displayable user-interface (GUI) on a screen of facility operator device 305. In other embodiments, grouping of displayable and engageable page navigation buttons 1401 may be located elsewhere. In some embodiments, grouping of displayable and engageable page navigation buttons 1401 may comprise: a "Spaces" ("Monitored Spaces" or "Units" or "Monitored Units" or the like) navigation button 1403, a "Subscribers" (or "Renter" or "Tenant" or other end-user of controlled space reference) navigation button 1405, and an "Inventory" navigation button 1407. In some embodiments, user (facility operator 405) engagement of "Monitored Spaces" navigation button 1403 may be configured to bring up display of user-interface-monitored-spaces-page 1500 on a window of the overall displayable user-interface (GUI), displayed on a screen of facility operator device 305. In some embodiments, user (facility operator 405) engagement of Subscribers navigation button 1405 may be configured to bring up display of user-interface-subscribers-page 1600 on a window of the overall displayable user-interface (GUI), displayed on a screen of facility operator device 305. In some embodiments, user (facility operator 405) engagement of Inventory navigation button 1407 may be configured to bring up display of user-interface-inventory-page 1400 on a window of the overall displayable user-interface (GUI), displayed on a screen of facility operator device 305.

In some embodiments, if user-interface-inventory-page 1400 is currently active (selected), then Inventory navigation button 1407 may be highlighted or visually accentuated as compared to Monitored Spaces navigation button 1403 and to Subscribers navigation button 1405. See e.g., FIG. 14A.

In some embodiments, if user-interface-monitored-spaces-page 1500 is currently active (selected), then Monitored Spaces navigation button 1403 may be highlighted or visually accentuated as compared to Subscribers navigation button 1405 and to Inventory navigation button 1407. See e.g., FIG. 15A.

In some embodiments, if user-interface-subscribers-page 1600 is currently active (selected), then Subscribers navigation button 1405 may be highlighted or visually accentuated as compared to Monitored Spaces navigation button 1403 and to Inventory navigation button 1407. See e.g., FIG. 16A.

Continuing discussing FIG. 14A, user-interface-inventory-page 1400 may comprise display of facility identifier/name 1402 that is configured to identify a given (particular) facility 345 that may be the subject of user-interface-inventory-page 1400. In some embodiments, facility identifier/name 1402 may identify this given (particular) facility 345. In the case of an identifier 1402, this may be alpha and/or numeric. In the case of a name 1402, this may be a common name for this given (particular) facility 345. For example, and without limiting the scope of the present invention, in FIG. 14A facility identifier/name 1402 may be a generic name of "Facility ABC."

Continuing discussing FIG. 14A, the contents shown in user-interface-inventory-page 1400 may correspond to an Available Inventory 1410 button (or the like) of user-interface-inventory-page 1400 being selected. In some embodiments, user-interface-inventory-page 1400 may comprise Available Inventory 1410 button (or the like) (that may be user engageable/selectable). Conversely, in some embodiments, user-interface-inventory-page 1400 may also comprise an Unavailable Inventory button (or the like) (which is not selected in FIG. 14A).

Continuing discussing FIG. 14A, user-interface-inventory-page 1400 may comprise display of information and/or content in a tabular and/or grid manner (or the like) comprising at least one of the following columns: a view details column 1409, a spaces 101 ID column 1411, a spaces 101 info column 1413, a devices 100 ID column 1415, a devices 100 health column 1417, a devices 100 signal strength status column 1419, a devices 100 outputs column 1421, a last reading (or last activity or last motion or the like) column 1423, a last assigned location column 1425, a manage devices 100 column 1427, combinations thereof, and/or the like. In some embodiments, user-interface-inventory-page 1400 may be configured such that the user may hide, collapse, expand, display, and/or the like one or more of these columns (and their corresponding contents). In some embodiments, user-interface-inventory-page 1400 may be configured such that the user may move the spatial relationship of these columns around with respect to each other.

Continuing discussing FIG. 14A, in some embodiments, in each row of this table and/or grid, may identify at least one unique monitoring-device 100 (that is in inventory of that given facility 345), with its unique identifier being located in the devices 100 ID column 1415. In some embodiments, the unique identifiers of monitoring-devices 100 in the devices 100 ID column 1415 may be alphanumeric or any other means for uniquely identifying all monitoring-devices 100 of a given facility 345 (including those monitoring-devices 100 not in inventory, i.e., those monitoring-devices 100 listed in/on user-interface-monitored-spaces-page 1500) on an individual monitoring-device 100 basis. Note, in some embodiments, a given space 101 could be associated with two or more monitoring-devices 100, see e.g., space 101 with an ID of "1129" in FIG. 14A (user-interface-inventory-page 1400) which currently has two different monitoring-devices 100 assigned to it, that of monitoring-device 100 ID "BH01583" and that of monitoring-device ID "PZ05213."

Continuing discussing FIG. 14A, in some embodiments, a given monitoring-device 100 shown in user-interface-inventory-page 1400, on a row-by-row basis and identified by its unique identifier, may be associated with a given controlled space for transitory use 101, identified in user-interface-inventory-page 1400 by the contents of spaces 101 ID column 1411 of that row, if that particular monitoring-device 100 is currently already installed with that particular controlled space for transitory use 101; wherein this configuration may be known as "pre-installed" and that particular controlled space for transitory use 101 may currently be vacant, as in has not current tenant subscriber 401 associated with that particular controlled space for transitory use 101.

Whereas, if a given monitoring-device 100, that is in inventory of that facility 345, is "loose" and/or not installed with a particular controlled space for transitory use 101, then the row for that monitoring-device 100 in user-interface-inventory-page 1400 under column 1411 may not show any particular controlled space for transitory use 101 and/or may show a means 1429 for selecting a particular controlled space for transitory use 101 to be associated with that particular monitoring-device 100. See e.g., FIG. 14A. In some embodiments, this means 1429 may be engageable by the user (e.g., facility operator 405). In some embodiments, this means 1429 may be a drop-down menu that lists available controlled spaces for transitory use 101 of the given facility 345 that do not currently have an associated monitoring-device 100. In some embodiments, this means 1429 upon engagement of the user (e.g., facility operator 405) may cause NINCE 367 to select from a list of currently available controlled spaces for transitory use 101 of the given facility 345 that do not currently have an associated monitoring-device 100; in some embodiments, NINCE 367 may do selection this randomly or per a rule set.

In some embodiments, available (loose and/or not-assigned) monitoring-device(s) 100 may be made physically available to a given subscriber 401 (and/or end-user) directly, such as, but not limited to, a dedicated pick-up area, automatic locker, or any other means whereby the given subscriber 401 (and/or end-user) simply picks up the available (loose and/or not-assigned) monitoring-device(s) 100. In some embodiments, NINCE 367 may cause instructions to be sent to that given subscriber 401 (and/or end-user) regarding how to pick up such available (loose and/or not-assigned) monitoring-device(s) 100 and as how to install such available (loose and/or not-assigned) monitoring-device(s) 100 for monitoring their space 101. Further, the facility's 345 monitoring network and/or those installed monitoring-device(s) 100, may automatically communicate such installment to NINCE 367 and NINCE 367 may recognize which particular space 101 the installment(s) have been made to and may then automatically remove such installed monitoring-device(s) 100 from the loose and/or the non-assigned designation to the assigned designation in user-interface-inventory-page 1400, user-interface-monitored-spaces-page 1500, and/or the like.

Continuing discussing FIG. 14A, in some embodiments, spaces 101 ID column 1411 and/or spaces info column 1413 may be displayed to the left of devices 100 ID column 1415 (because from the facility operator 405 perspective they are more familiar with the info of spaces 101 ID column 1411 and/or of spaces info column 1413).

Continuing discussing FIG. 14A, in some embodiments, view details column 1409 may be a column populated by displayable "View" buttons, with one such displayable button per row of user-interface-inventory-page 1400. In some embodiments, a given "View" button of column 1409, of a given row of user-interface-inventory-page 1400, may be user (facility operator 405) engageable (such as, but not limited to, by touching that button on the screen and/or by using a mouse or the input means like). In some embodiments, the user's engagement of such a View button may cause the overall displayable user-interface (GUI) to open a new screen displayable window of all the user-interface-inventory-page 1400 details of that particular row; and optionally with some additional details and/or user engageable options not appearing on user-interface-inventory-page 1400.

Continuing discussing FIG. 14A, in some embodiments, spaces 101 ID column 1411, on a row-by-row basis, may display an identifier for a given controlled space for transitory use 101, of that facility 345, that is currently associated with one or more (installed) monitoring-devices 100. In some embodiments, the identifiers for the controlled spaces for transitory use 101 listed in spaces 101 ID column 1411, may be the same as units (spaces) identifiers 1207 (e.g., with respect to format used and/or with respect to actual identifier used). In some embodiments, these identifiers may be determined and/or selected by the facility operator 405 and which may correspond to the facility operator's 405 own preexisting units (spaces) identifiers 1207, at their given facility 345. These spaces 101 identifiers may be numeric, alpha, alphanumeric, and/or the like. In some embodiments, each space 101 identifier may be unique for a given building of the facility 345 and/or of the given facility 345. These spaces 101 identifiers may be used to identify one space 101 from another (different) space 101, at a given facility 345.

Continuing discussing FIG. 14A, in some embodiments, spaces 101 info column 1413, on a row-by-row basis, may display information for a given controlled space for transitory use 101, of that facility 345, if there is a controlled space for transitory use 101 listed in the 1411 column for that particular row. In some embodiments, this information appearing in a given row for column 1413 may comprise at least one of: space 101 type, space 101 size (dimensions and/or area), space 101 features, space 101 address, space 101 location information, space 101 floor identifier, combinations thereof, and/or the like. In some embodiments, space 101 type may be selected from: a storage unit, a parking space, a room type, covered, uncovered, temperature controlled, climate controlled, a combination thereof, and/or the like. In some embodiments, space 101 features may be selected from: temperature controlled, humidity controlled, climate controlled, environmental controlled, refrigerated, air filtration of a minimum rating, HVAC characteristics, clean room, light cycle controlled, a combination thereof, and/or the like.

Continuing discussing FIG. 14A, in some embodiments, devices 100 health column 1417, on a row-by-row basis, and down column 1417, may display monitoring-devices 100 current (or latest) health information, such as, but not limited to, battery (or batteries) remaining charge, state of charge, status of charge, life remaining of monitoring-device 100, and/or the like. Each such row may be associated with at least one particular monitoring-device 100 and so the 1417 column may report health information for that at least one particular monitoring-device 100 of and in that row. In some embodiments, battery charge remaining may be indicated by displayable graphics, with a different displayable graphic for different states of battery charge (such as, but not limited to, a battery icon with various lightable bars to indicate charge status).

Continuing discussing FIG. 14A, in some embodiments, devices 100 signal strength status column 1419, on a row-by-row basis, and down column 1419, may display monitoring-devices 100 current (or latest) wireless communications signal strength; which in turn may be indicative of good or poor connectivity issues for the given monitoring-device 100. Each such row may be associated with at least one particular monitoring-device 100 and so the 1419 column may report signal strength for that at least one particular monitoring-device 100 of and in that row. In some embodiments, signal strength may be indicated by displayable graphics, with a different displayable graphic for different states of signal strength.

Continuing discussing FIG. 14A, in some embodiments, monitoring-devices 100 outputs column 1421, on a row-by-row basis, and down column 1421, may display monitoring-devices 100 current (or latest) sensor(s) 505 readings, outputs, telematic feeds, combinations thereof, and/or the like. Each such row may be associated with at least one particular monitoring-device 100 and so the 1421 column may report sensor(s) readings for that at least one particular monitoring-device 100 of and in that row. In some embodiments, sensor(s) readings may be indicated by displayed numbers, values, units, percentages, and/or with displayable graphics (icons), wherein a different displayable graphic may be used for different values of sensor readings. With respect to sensor(s) type see the above discussion of sensor(s) 505. In some embodiments, any sensor 505 type may have its reading(s), outputs, and/or telematic feed(s) displayed in column 1421. In some embodiments, any sensor 505 output, reading, and/or telematic feed reported in column 1421 may be user engageable to bring up another (new) window, which may bring up additional and/or other information and/or details of that particular sensor 505 output, reading, and/or telematic feed; which may include video feed(s)/clip(s), live video feed, audio feed(s)/clip(s), live audio, and/or historical and/or trend data beyond what may have been displayed in column 1421.

Continuing discussing FIG. 14A, in some embodiments, last activity (or "last output" or "last report" or "last incident" or "last motion" or the like) column 1423, on a row-by-row basis, and down column 1423, may display monitoring-devices 100 last detected incident, output, reading, telematic feed, motion event, and/or the like in a displayed temporal (time) format, that may or may not include a time and/or a date of the last detected motion for a particular monitoring-device 100. In some embodiments, column 1423 may be applicable when one or more of the monitoring-devices 100, in inventory, comprise at least one sensor 505 that is configured for detecting motion. By using user-interface-inventory-page 1400, with column 1423 included, a facility operator 405 may tell by a mere quick glance if motion detected in a vacant space 101 could be problematic.

Continuing discussing FIG. 14A, in some embodiments, last assigned location column 1425, on a row-by-row basis, and down column 1425, may display a prior space 101 that the given monitoring-devices 100 may have associated (installed) with, if any. If a given monitoring-device 100, of that facility 345, had not been previously associated (installed) with another (different) space 101 from the space 101 indicated in that row under column 1411, then in that row, in column 1425 the displayed value may be, "NA," "N/A," and/or the like to indicate not applicable.

However, if a given monitoring-device 100, of that facility 345, had been previously associated (installed) with another (different) space 101 from the space 101 indicated in that row under column 1411, then in that row, in column 1425 the displayed value may be that another (different) space 101, displayed using the format for unit (space) identifier 1207.

Further, in some embodiments, in a given row, and in column 1425 may be a displayed icon, graphic, and/or hyperlink that may be user engageable. If that displayed icon, graphic, and/or hyperlink is engaged (selected) by the user (e.g., facility operator 405), then user-interface-inventory-page 1400 may transition to assignment-history-display 1431 or may cause assignment-history-display 1431 to popup as a window overlaid on top of at least a portion of user-interface-inventory-page 1400 or next to user-interface-inventory-page 1400.

Figure 14B:
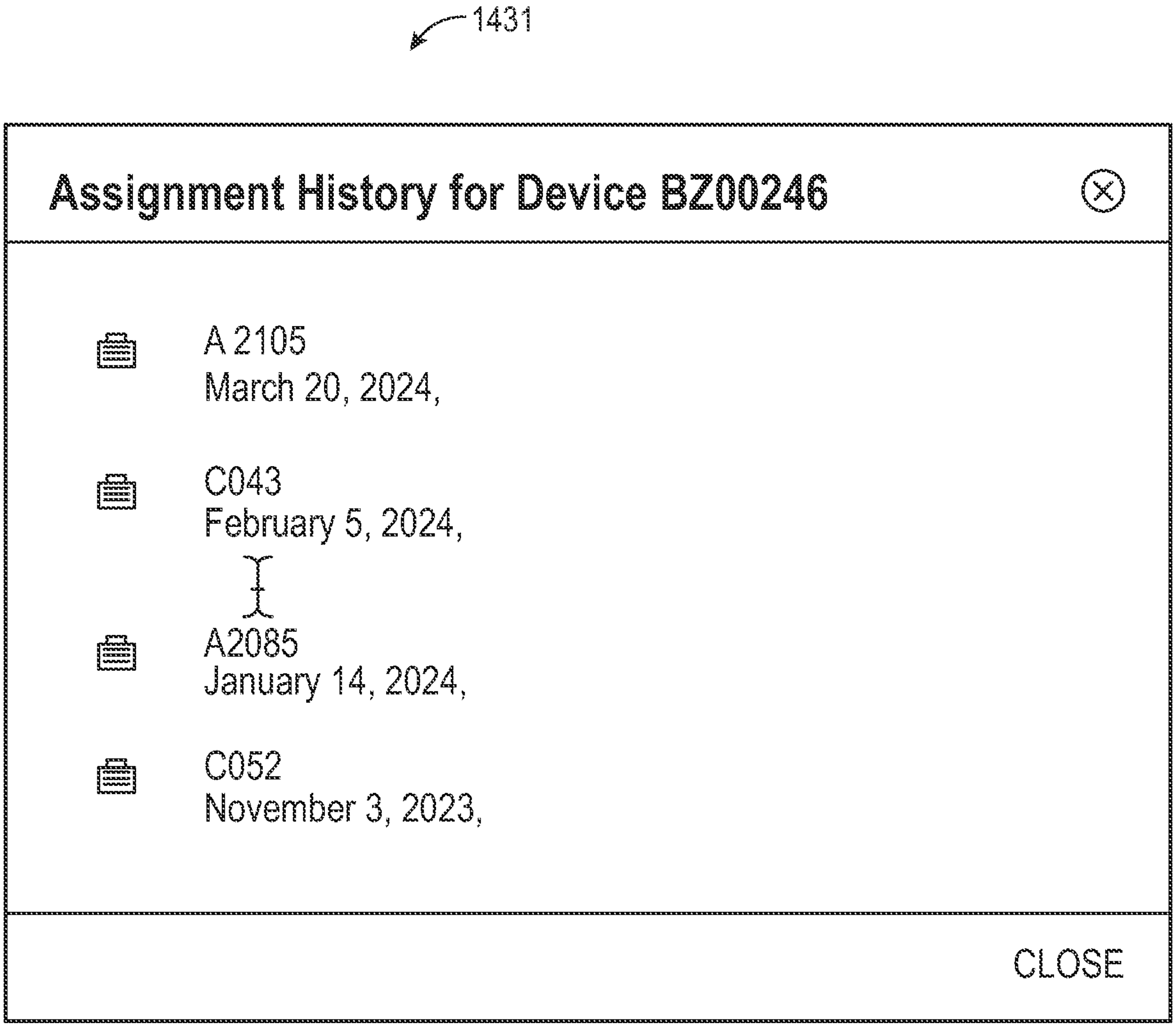
FIG. 14B shows a possible displayed assignment-history-display window of a GUI, according to at least one embodiment, that may be configured to be displayed upon a screen.

Note, in some embodiments, the disclosure of FIG. 14B, a portion thereof, and/or the like may optional. Note, in some embodiments, the disclosures, features, and/or functions, of FIG. 14B, a portion thereof, and/or the like may be incorporated into other page(s) (window(s) of the overall displayable user-interface (GUI), such as, but not limited to, user-interface-inventory-page 1400 and/or user-interface-monitored-spaces-page 1500.

An embodiment and an example of assignment-history-display 1431 may be shown in FIG. 14B. In some embodiments, assignment-history-display 1431 may be a displayable window of the overall displayable user-interface (GUI) that displays, in a chronological order, all the different spaces 101, of a given facility 345, that the given monitoring-device 100 has previously been associated and/or installed with. This history may display the given prior spaces 101 (ID'ed by their unit (space) identifier 1207) and may display the last time and/or date when that given monitoring-device 100 was associated (installed) in that given prior space 101. For example, and without limiting the scope of the present invention, FIG. 14B may show the monitoring-device 100 prior spaces 101 association (installment) history of the monitoring-device 100 indicated in FIG. 14A with a device ID of BZ00246.

Returning back to discussing FIG. 14A, in some embodiments, manage devices column 1427, on a row-by-row basis, and down column 1425, may display a graphic, icon, and/or a hyperlink that is configured to be engaged (selected) by the user (e.g., facility operator 405), that when engaged (selected) allows the user to manage the monitoring-devices 100 associated with the space 101 indicated on that row (by column 1411 in that row), if any. In some embodiments, when this graphic, icon, and/or a hyperlink of a given row in column 1427 may be user engaged, the user may elect to remove the monitoring-device 100 from that space 101, or the user may elect to transfer that monitoring-device 100 to another (different) space 101, or start a find protocol if the user believes that the given monitoring-device 100 may be lost. In some embodiments, when this graphic, icon, and/or a hyperlink of a given row in column 1427 may be user engaged, the user may elect to remove, add, or transfer monitoring-devices 100 between spaces 101 and/or from/to a given space 101 and a general stocking area (location) for in inventory, but not pre-installed, monitoring-devices 100. In some embodiments, monitoring-devices 100 management similar and/or equivalent to manage device buttons 1427 may be done from other page(s) (window(s)) of the overall displayable user-interface (GUI) (such as, but not limited to manage device(s) 1541 button and/or manage device(s) 1631 button) and/or from a manage devices page (window).

Figure 15A:
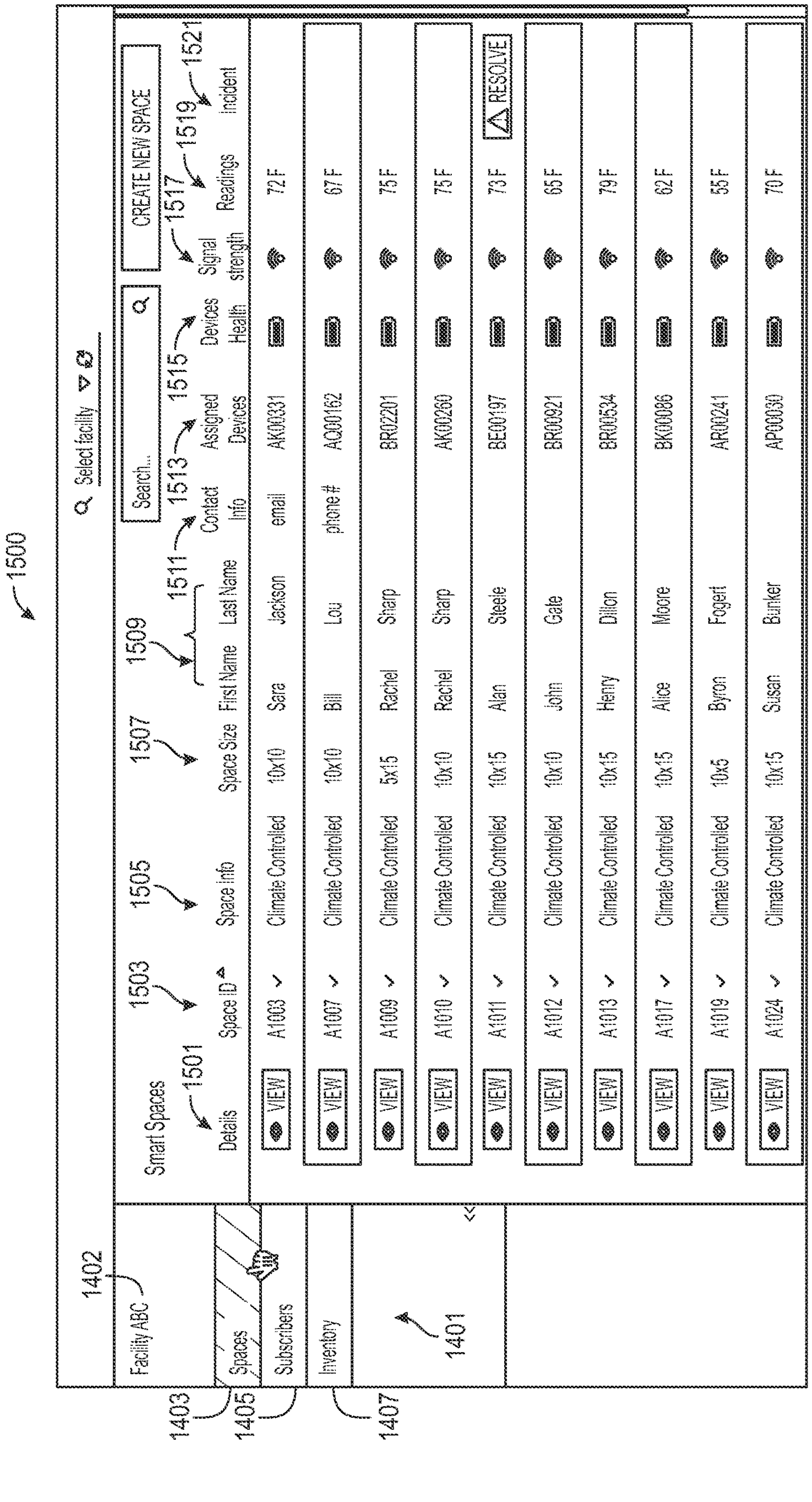
FIG. 15A shows a possible displayed user-interface-monitored-spaces-page, of a GUI, according to at least one embodiment, that may be configured to be displayed upon a screen.

FIG. 15A shows a possible displayed user-interface-monitored-spaces-page 1500, according to at least one embodiment, that may be configured to be displayed upon a screen, such as, but not limited to, a touchscreen, of an end-user computing and/or electronic device. In some embodiments, this end-user may be a facility operator 405 (or an agent thereof) of a given facility 345. In some embodiments, this end-user computing and/or electronic device may be a facility operator device 305. In some embodiments, user-interface-monitored-spaces-page 1500 may display monitoring-devices 100, of a facility 345, that are out of inventory because those monitoring-devices 100 are associated with: active (and/or current) tenant subscriber(s) 401, activated end-user, activated services relationship in NINCE 367 (and/or in NINCE's database(s) 1303), active subscription agreements in NINCE 367 (and/or in NINCE's database(s) 1303), combinations thereof, and/or the like. That is, the monitoring-devices 100 of user-interface-monitored-spaces-page 1500 at any moment in time are mutually exclusive to the monitoring-devices 100 in user-interface-inventory-page 1400 (of FIG. 14A).

Continuing discussing FIG. 15A, user-interface-monitored-spaces-page 1500 may comprise display of information and/or content in a tabular and/or grid manner (or the like) comprising at least one of the following columns: view details column 1501, spaces 101 IDs column 1503, spaces 101 info column 1505, spaces 101 size column 1507, subscriber 401 name column 1509, subscriber 401 contact info column 1511, assigned devices 100 column 1513, devices 100 health column 1515, devices 100 signal strength column 1517, devices 100 sensors outputs/readings column 1519, last activity (or the like) column 1521, combinations thereof, and/or the like. In some embodiments, user-interface-monitored-spaces-page 1500 may be configured such that the user may hide, collapse, expand, display, and/or the like one or more of these columns (and their corresponding contents). In some embodiments, user-interface-monitored-spaces-page 1500 may be configured such that the user may move the spatial relationship of these columns around with respect to each other.

Continuing discussing FIG. 15A, in some embodiments, view details column 1501 may be a column populated by displayable "View" buttons, with one such displayable button per row of user-interface-monitored-spaces-page 1500. In some embodiments, a given "View" button of column 1501, of a given row of user-interface-monitored-spaces-page 1500, may be user (facility operator 405) engageable (such as, but not limited to, by touching that button on the screen and/or by using a mouse or the input means like). In some embodiments, the user's engagement of such a View button may cause the overall displayable user-interface (GUI) to open a new screen displayable window that includes all the user-interface-monitored-spaces-page 1500 details (information) of that particular row; and optionally with some additional details (information) and/or user engageable options not appearing on user-interface-monitored-spaces-page 1500. See e.g., FIG. 15B and/or FIG. 15D.

Continuing discussing FIG. 15A, in some embodiments, spaces 101 IDs column 1503, on a row-by-row basis, may display an identifier for a given controlled space for transitory use 101, of that facility 345, that may currently be associated with one or more (installed) monitoring-devices 100. In some embodiments, the identifiers for the controlled spaces for transitory use 101 listed in spaces 101 ID column 1503, may be the same as units (spaces) identifiers 1207 (e.g., with respect to format used and/or with respect to actual identifier used). In some embodiments, these spaces 101 identifiers may be determined and/or selected by the facility operator 405 and which may correspond to the facility operator's 405 own preexisting units (spaces) identifiers 1207, at their given facility 345. These spaces 101 identifiers may be numeric, alpha, alphanumeric, and/or the like. In some embodiments, each space 101 identifier may be unique for a given building of the facility 345 and/or of the given facility 345. These spaces 101 identifiers may be used to identify one space 101 from another (different) space 101, at a given facility 345.

Continuing discussing FIG. 15A, in some embodiments, spaces 101 info column 1505, on a row-by-row basis, may display information for a given controlled space for transitory use 101, of that facility 345. In some embodiments, this information appearing in a given row for column 1505 may comprise at least one of: space 101 type, space 101 size (dimensions and/or area), space 101 features, space 101 address, space 101 location information, space 101 floor identifier, combinations thereof, and/or the like. In some embodiments, space 101 type may be selected from: a storage unit, a parking space, a room type, covered, uncovered, temperature controlled, climate controlled, a combination thereof, and/or the like. In some embodiments, space 101 features may be selected from: temperature controlled, humidity controlled, climate controlled, environmental controlled, refrigerated, air filtration of a minimum rating, HVAC characteristics, clean room, light cycle controlled, a combination thereof, and/or the like.

Continuing discussing FIG. 15A, in some embodiments, spaces 101 size column 1507, on a row-by-row basis, may display a size, dimensions, and/or area for a given controlled space for transitory use 101, of that facility 345. For example, and without limiting the scope of the present invention, column 1507 displays of "10×10," "5×15," "10×15," or some other size might be in feet as the units and may refer to approximate interior length and width of a given controlled space for transitory use 101. Recall in some embodiments, controlled spaces for transitory use 101 may be not limited to self-storage units 101; for example, and without limiting the scope of the present invention, controlled spaces for transitory use 101 may be selected from: trucks and/or trailers. Note, a more comprehensive list of space(s) 101 examples appears earlier in this patent specification.

Continuing discussing FIG. 15A, in some embodiments, subscriber name column 1509, on a row-by-row basis, may display at least a name, a first name, a last name, a middle name, a username, a nickname, combinations thereof, and/or the like of a given subscriber(s) (such as, but not limited to, a given tenant subscriber 401) of that particular controlled space for transitory use 101, indicated on that row. It some embodiments, multiple authorized subscriber names may be listed and/or displayed.

Continuing discussing FIG. 15A, in some embodiments, subscriber (or subscribers) contact info column 1511, on a row-by-row basis, may display contact information for that subscriber(s) of at least a phone number, an email, a mailing address, combinations thereof, and/or the like of the given subscriber of that particular controlled space for transitory use 101, indicated on that row.

Continuing discussing FIG. 15A, in some embodiments, in each row of this table and/or grid, may be at least one unique monitoring-device 100, with its unique identifier being located in the assigned device 100 column 1513. In some embodiments, the unique identifiers of monitoring-devices 100 in the assigned device 100 column 1513 may be alphanumeric or any other means for uniquely identifying all monitoring-devices 100 of a given facility 345 (including those monitoring-devices 100 both in inventory [i.e., those monitoring-devices 100 listed in/on user-interface-inventory-page 1400] and not in inventory [i.e., those monitoring-devices 100 listed in/on user-interface-monitored-spaces-page 1500]) on an individual monitoring-device 100 basis. That is, when a given monitoring-device 100 is listed in assigned device 100 column 1513, that particular monitoring-device 100 will not appear in devices 100 ID column 1415 (and vice-versa); however, the informational content and/or informational format appearing in assigned device 100 column 1513 and in devices 100 ID column 1415, may be the same, which is an identifier for a particular monitoring-device 100.

Continuing discussing FIG. 15A, in some embodiments, devices health column 1515, on a row-by-row basis, and down column 1515, may display monitoring-devices 100 current (or latest) health information, such as, but not limited to, battery (or batteries) remaining charge. Each such row may be associated with one particular monitoring-device 100 and so the 1515 column may report health information for that particular monitoring-device 100 of and in that row. In some embodiments, battery charge remaining may be indicated by displayable graphics, with a different displayable graphic for different states of battery charge (such as, but not limited to, a battery icon with various lightable bars to indicate charge status).

Continuing discussing FIG. 15A, in some embodiments, devices signal strength column 1517, on a row-by-row basis, and down column 1517, may display monitoring-devices 100 current (or latest) wireless communications signal strength; which in turn may be indicative of good or poor connectivity issues for the given monitoring-device 100. Each such row may be associated with one particular monitoring-device 100 and so the 1517 column may report signal strength for that particular monitoring-device 100 of and in that row. In some embodiments, signal strength may be indicated by displayable graphics, with a different displayable graphic for different states of signal strength.

Continuing discussing FIG. 15A, in some embodiments, devices sensors outputs/readings column 1519, on a row-by-row basis, and down column 1519, may display monitoring-devices 100 current (or latest) sensor(s) readings (outputs). Each such row may be associated with one particular monitoring-device 100 and so the 1519 column may report sensor(s) readings for that particular monitoring-device 100 of and in that row. In some embodiments, sensor(s) readings may be indicated by displayed numbers, values, units, percentages, and/or with displayable graphics, wherein a different displayable graphic may be used for different values of sensor readings. With respect to sensor(s) type see the above discussion of sensor(s) 505. In some embodiments, any sensor 505 type may have its reading(s) and/or outputs displayed in column 1519. In some embodiments, any sensor 505 output, reading, and/or telematic feed reported in column 1519 may be user engageable to bring up another (new) window, which may bring up additional and/or other information and/or details of that particular sensor 505 output, reading, and/or telematic feed; which may include video feed(s)/clip(s), live video feed, audio feed(s)/clip(s), live audio, and/or historical and/or trend data beyond what may have been displayed in column 1519.

Continuing discussing FIG. 15A, in some embodiments, last activity (or "last output" or "last report" or "last incident" or "last motion" or the like) column 1521, on a row-by-row basis, and down column 1521, may display monitoring-devices 100 last detected incident, output, reading, telematic feed, motion event, and/or the like event in a displayed temporal (time) format, that may or may not include a time and/or a date of the last detected motion for a particular monitoring-device 100. In some embodiments, last activity column 1521, on a row-by-row basis, and down column 1521, may display whether the given monitoring-device 100 has any unresolved detected event(s) (and/or incident(s)). In some embodiments, if there may be a reported unresolved detected event(s) (and/or incident(s)) in a given row of column 1521, then user-interface-monitored-spaces-page 1500 may display a "Resolve" or the like engageable button (and/or hyperlink) that the facility operator 405 may engage to resolve that particular unresolved detected motion event(s) (and/or incident(s)). In some embodiments, column 1521 may be applicable when one or more of the monitoring-devices 100 comprise at least one sensor 505 that is configured for detecting motion. By using user-interface-monitored-spaces-page 1500, with column 1521 included, a facility operator 405 may tell by a mere quick glance if motion detected in a 101 could be problematic.

Figure 15B:
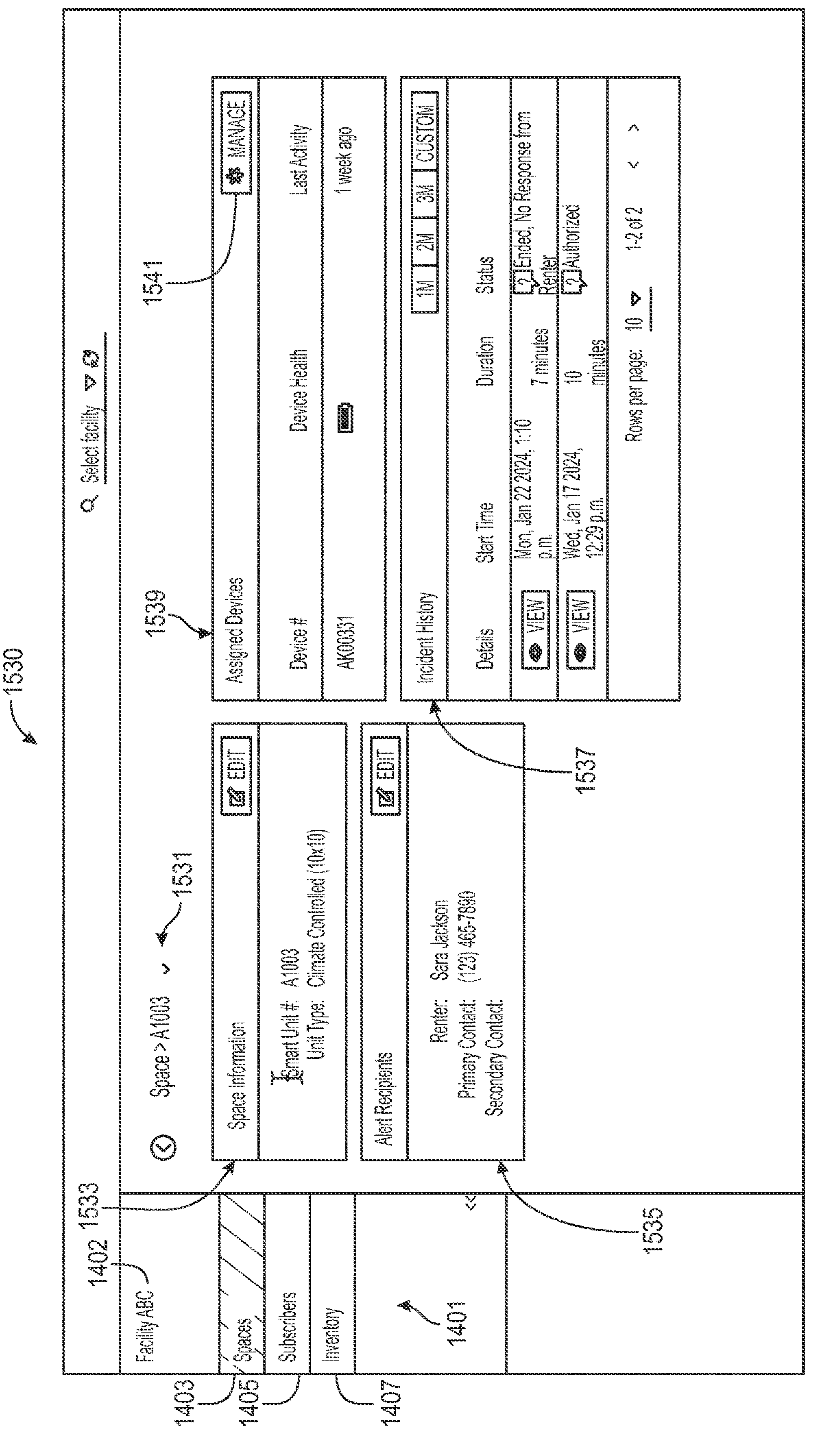
FIG. 15B may show a user-interface-monitored-space-details-page, of a GUI, according to at least one embodiment, that may be configured to be displayed upon a screen.
Figure 15C:
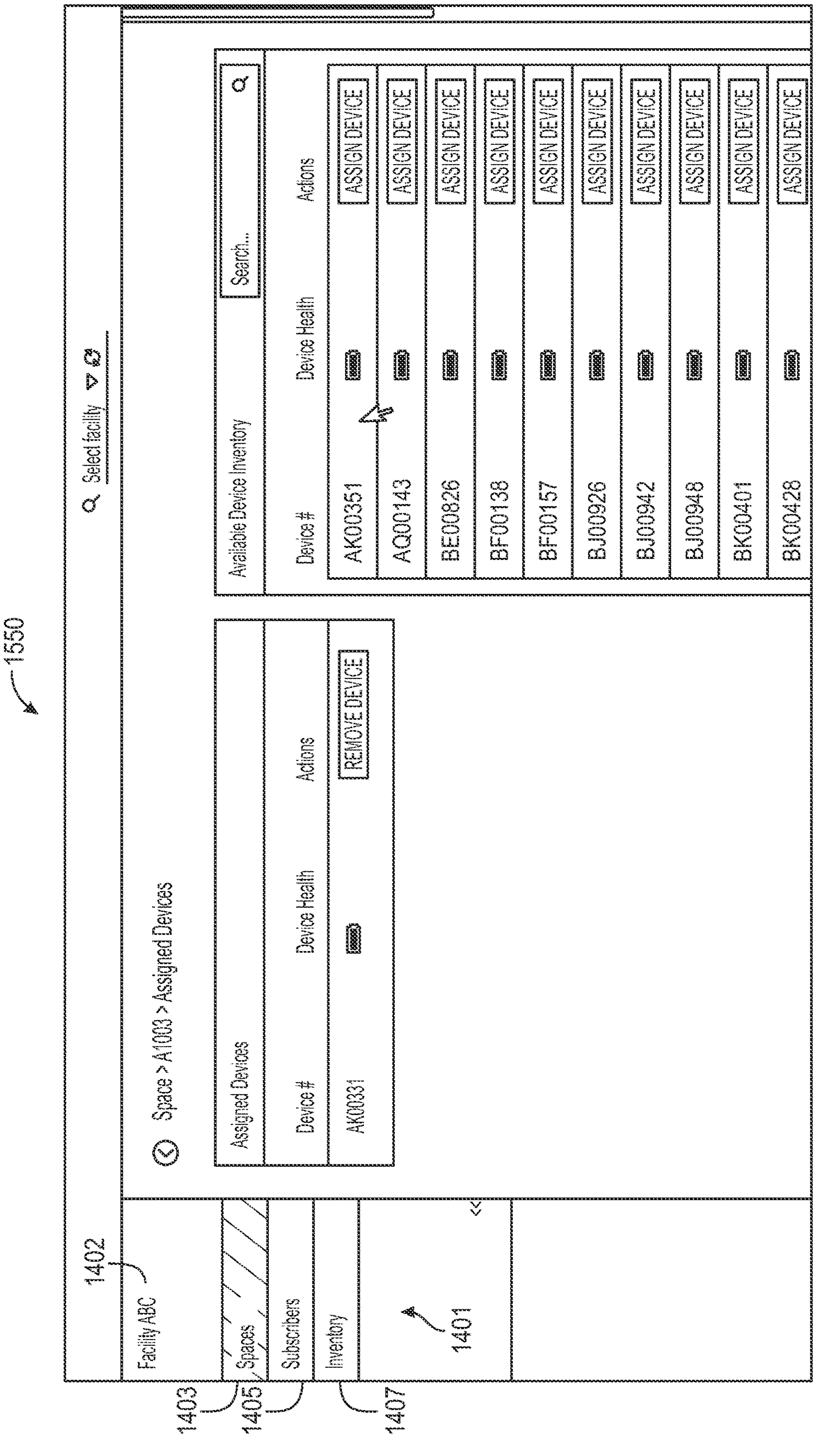
FIG. 15C may show a user-interface-manage-devices-page, of a GUI, according to at least one embodiment, that may be configured to be displayed upon a screen.
Figure 15D:
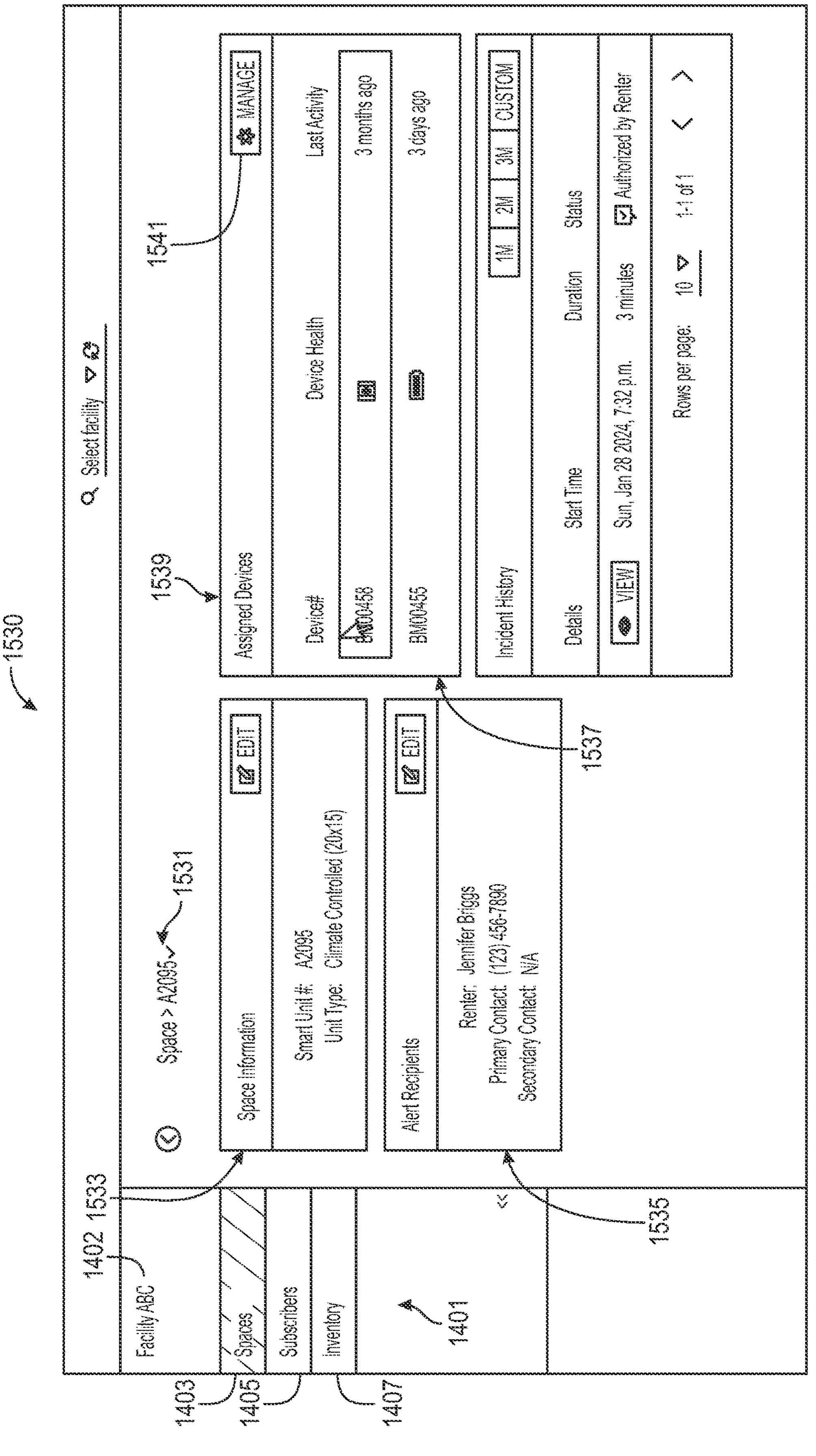
FIG. 15D may show a user-interface-monitored-space-details-page, of a GUI, according to at least one embodiment, that may be configured to be displayed upon a screen.

Note, in some embodiments, the disclosure of FIG. 15B, FIG. 15C, FIG. 15D, a portion thereof, and/or the like may optional. Note, in some embodiments, the disclosures, features, and/or functions, of FIG. 15B, FIG. 15C, FIG. 15D, a portion thereof, and/or the like may be incorporated into other page(s) (window(s) of the overall displayable user-interface (GUI), such as, but not limited to, user-interface-inventory-page 1400 and/or user-interface-monitored-spaces-page 1500.

An embodiment and an example of a selected (engaged) View button from column 1501 of user-interface-monitored-spaces-page 1500 may be shown in FIG. 15B. FIG. 15B may show a user-interface-monitored-space-details-page 1530, which may display at least some details of a particular controlled space for transitory use 101 that is currently assigned (associated) with at least one active (paying) tenant subscriber 401, along with at least one monitoring-device 100 assigned (associated) with that particular controlled space for transitory use 101. In some embodiments, the user's 405 engagement of such a View button from user-interface-monitored-spaces-page 1500 may cause the overall displayable user-interface (GUI) to open a new screen displayable window 1530 that displays all the user-interface-monitored-spaces-page 1500 details of that particular row; and optionally with some additional details and/or user engageable options not appearing on user-interface-monitored-spaces-page 1500. In some embodiments, user-interface-monitored-space-details-page 1530, for a particular monitored space 101 (controlled space for transitory use 101) may display details, particulars, and/or information of that particular monitored space 101.

The "View" button in some embodiments may navigate the user to a more detailed view showing the tenant's 401 controlled-use space 101, information about the space 101, and current and/or historical monitoring information of the space 101.

Continuing discussing FIG. 15B, in some embodiments, user-interface-monitored-space-details-page 1530 may display monitored space ID 1531. In some embodiments, monitored space ID 1531 may display an identifier for a given controlled space for transitory use 101 (monitored space 101), of that facility 345, that may be currently associated with one or more (installed) monitoring-devices 100. In some embodiments, the identifiers for the monitored space 101, may be the same as unit (space) identifier 1207 (e.g., with respect to format used and/or with respect to actual identifier used). In some embodiments, monitored space ID 1531 identifier may be determined and/or selected by the facility operator 405 and which may correspond to the facility operator's 405 own preexisting units (spaces) identifiers 1207, at their given facility 345. These monitored space ID 1531 identifiers may be numeric, alpha, alphanumeric, and/or the like. In some embodiments, each monitored space ID 1531 identifier may be unique for a given building of the facility 345 and/or of the given facility 345. These monitored space ID 1531 identifiers may be used to identify one space 101 from another (different) space 101, at a given facility 345. Merely, as an example, monitored space ID 1531 in FIG. 15B has an alphanumeric value of "A1003" which corresponds to a value of "A1003" from a row of column 1503 in FIG. 15A; i.e., the "View" button from FIG. 15A associated with monitored space 101 of "A1003" had its "View" button engaged to generate FIG. 15B.

Continuing discussing FIG. 15A, in some embodiments, monitored space info 1533 may display information for that controlled space for transitory use 101 (monitored space 101). In some embodiments, this information appearing in the monitored space info 1533 region (portion) may comprise at least one of: monitored space ID 1531, space 101 type, space 101 size (dimensions and/or area), space 101 features, combinations thereof, and/or the like. In some embodiments, space 101 type may be selected from: a storage unit, a parking space, a room type, covered, uncovered, temperature controlled, climate controlled, a combination thereof, and/or the like. In some embodiments, space 101 features may be selected from: temperature controlled, humidity controlled, climate controlled, environmental controlled, refrigerated, air filtration of a minimum rating, HVAC characteristics, clean room, light cycle controlled, a combination thereof, and/or the like. In some embodiments, spaces 101 size may display a size, dimensions, and/or area for a given controlled space for transitory use 101. For example, and without limiting the scope of the present invention, size displays may be of "10×10," "5×15," "10×15," or some other size; wherein such values may be in feet as the units and may refer to approximate interior length and width of that controlled space for transitory use 101.

Continuing discussing FIG. 15A, in some embodiments, user-interface-monitored-space-details-page 1530 may display message-recipients 1535. In some embodiments, "message-recipients" may be tenant subscriber(s) 401 of that particular monitored space 101 listed in FIG. 15B (in user-interface-monitored-space-details-page 1530). In some embodiments, there may be two or more different "message-recipients" and/or tenant subscriber(s) 401 of that particular monitored space 101. In some embodiments, when there may be two or more different "message-recipients" and/or tenant subscriber(s) 401, they may be further categorized as primary, secondary, and so on. In some embodiments, "message-recipients" may be users of that particular monitored space 101 listed in FIG. 15B (in user-interface-monitored-space-details-page 1530) other than facility operator 405. In some embodiments, "message-recipients" may be person(s) (and/or their user device(s)) that NINCE 367, associated monitoring-device(s) 100, facility operator 405, and/or the like, get contacted and/or communicated with, regarding their rented (leased) monitored space 101, regarding sensor (s) 505 detected output(s) (reading(s)) from their associated monitoring-device(s) 100, their account status, combinations thereof, and/or the like. In some embodiments, message-recipients 1535 may comprise display of tenant subscriber's 401 name(s) and/or contact information, such as, but not limited to, at least one phone number, at least one email, at least one mailing address, at least one user account identifier and/or address, combinations thereof, and/or the like. In some embodiments, message-recipients 1535 may be communicated with via various types of notifications and/or messages that may be displayable and/or listened from a user's smartphone 303, from mobile apps, from web app notifications, combinations thereof, and/or the like.

Continuing discussing FIG. 15B, in some embodiments, user-interface-monitored-space-details-page 1530 may display event history 1537. In some embodiments, event history 1537 may display a list, on a row-by-row basis of sensor(s) 505 detected output(s) (reading(s), event(s), and/or incident(s)) from the associated monitoring-device(s) 100, of that particular monitored space 101, and according to date and/or time of detected output(s) (reading(s) and/or event (s)). For example, and without limiting the scope of the present invention, the event(s) displayed in event history 1537 may be detected sensor(s) 505, such as, but not limited to, motion events, detected door breaks, detected entry, temperature readings exceeding set thresholds, humidity readings exceeding set thresholds, noise level exceeding set threshold holds, video monitoring camera video and/or image feed(s)/clip(s) detecting an incident, microphone audio monitoring feed(s)/clip(s), and/or the like of/in the given monitored space 101. In some embodiments, each such row may correspond to a single detected output (reading and/or event). In some embodiments, a given row of event history 1537 may further comprise a displayable user engageable "View" button that upon engagement may cause display of details or further details of the given detected output (reading and/or event). In some embodiments, event history 1537 may further comprise one or more displayed user engageable filters to re-order how the history may be displayed.

Continuing discussing FIG. 15B, in some embodiments, user-interface-monitored-space-details-page 1530 may display assigned device(s) 1539. In some embodiments, assigned device(s) 1539 may display at least one monitoring-device 100 by its unique identifier. In some embodiments, the unique identifier(s) of monitoring-device(s) 100 in the assigned device(s) 1539 may be alphanumeric or by any other means (such as, but not limited to, QR code, UPC, barcode, visual code, RFID, NFC, sound prompt, combinations thereof, and/or the like) for uniquely identifying the associated (assigned) monitoring-device(s) 100 of that particular monitored space 101. Merely, as an example, assigned device(s) 1539 in FIG. 15B has an alphanumeric value of "AK00331" which corresponds to a value of "AK00331" from a row of column 1513 in FIG. 15A; i.e., the "View" button from FIG. 15A associated with monitored space 101 of "A1003" had its "View" button engaged to generate FIG. 15B.

Continuing discussing FIG. 15B, in some embodiments, assigned device(s) 1539 may display manage device(s) 1541. In some embodiments, manage device(s) 1541 may be a displayable user engageable button, graphic, icon, hyperlink, and/or the like, that upon being user engaged, may permit the user 405 to manage monitoring-device(s) 100 of that particular monitored space 101. See e.g., FIG. 15C.

An embodiment and an example of a selected (engaged) manage device(s) 1541 from assigned device(s) 1539 and/or from user-interface-monitored-space-details-page 1530 may be shown in FIG. 15C. FIG. 15C may show a user-interface-manage-devices-page 1550, which may display monitoring-device(s) 100 that are currently assigned (associated) with the given monitored space 101 and/or may display a list of available (in inventory) monitoring-device(s) 100 that may be selected to become assigned (associated) with the given monitored space 101. In some embodiments, the given monitored space 101 may have more than one monitoring-device 100 assigned (associated). In some embodiments, the list of available monitoring-device(s) 100 may coincide with the monitoring-device(s) 100 shown in FIG. 14A and/or in user-interface-inventory-page 1400.

Continuing discussing FIG. 15C, in some embodiments, with respect to a monitoring-device 100 that is currently assigned (associated) to the particular monitored space 101, from user-interface-manage-devices-page 1550, that monitoring-device 100 may be user 405 selected for removal from that particular monitored space 101, which if selected may transfer that particular monitoring-device 100 from the currently assigned (associated) designation to currently unassigned (unassociated) (which means a transfer to inventory), with respect to that monitoring-device 100's status (designation).

Continuing discussing FIG. 15C, in some embodiments, with respect to a monitoring-device 100 that is currently in the available list (in inventory) (currently unassigned [unassociated] to the particular monitored space 101), from user-interface-manage-devices-page 1550, that monitoring-device 100 may be user 405 selected for adding to that particular monitored space 101, which if selected may transfer that particular monitoring-device 100 from the available list (the in inventory list) to become currently assigned (associated) with that particular monitored space 101.

FIG. 15D may be substantially similar to FIG. 15B, except that FIG. 15D may be an example that shows two or more monitoring-device(s) 100 being currently assigned (associated) with the given monitored space 101. An embodiment and an example of a selected (engaged) View button from column 1501 of user-interface-monitored-spaces-page 1500 may be shown in FIG. 15D. FIG. 15D may show a user-interface-monitored-space-details-page 1530, which may display at least some details of a particular controlled space for transitory use 101 that is currently assigned (associated) with at least one active (paying) tenant subscriber 401, along with at least two (2) monitoring-devices 100 currently assigned (associated) with that particular controlled space for transitory use 101 (monitored space 101). Further shown merely as an example in FIG. 15D, in the assigned device(s) 1539 field (region, portion, box, and/or window), one of the monitoring-device 100 status is shown with a good device health; whereas, the other monitoring-device 100 status is shown with a potentially problematic device health (e.g., a low or dead battery/state of charge).

Note, in some embodiments, the disclosure of FIG. 16A, FIG. 16B, FIG. 16C, FIG. 16D, FIG. 16E, a portion thereof, and/or the like may optional. Note, in some embodiments, the disclosures, features, and/or functions, of FIG. 16A, FIG. 16B, FIG. 16C, FIG. 16D, FIG. 16E, a portion thereof, and/or the like may be incorporated into other page(s) (window(s) of the overall displayable user-interface (GUI), such as, but not limited to, user-interface-inventory-page 1400 and/or user-interface-monitored-spaces-page 1500. In some embodiments, in an automated system and/or method utilizing API(s) (application program interface(s)) scenario and/or a NINCE 367 with integrated POS (point-of-sale) software, the end-users of the overall displayable user-interface (GUI) may not need to go within FIG. 16A to FIG. 16E because all such tenant 401 (or other space 101 end-user) information may be automatically retrieved from the API(s) and/or because the NINCE 367 is fully integrated with the POS software. In some embodiments, absent such API(s) and/or the fully integrated NINCE 367 (with the POS software), then FIG. 16A to FIG. 16E may be used for data entry of such tenant 401 (or other space 101 end-user) information. In some embodiments, with such API(s) and/or with the fully integrated NINCE 367 (with the POS software), then FIG. 16A to FIG. 16E may be used for viewing purposes only for reference and not as page(s) (window(s)) that workflow for the end-user (e.g., facility operator 405) even needs to interface with for setting up, managing, or ending a tenant's 401 monitoring service.

Figure 16A:
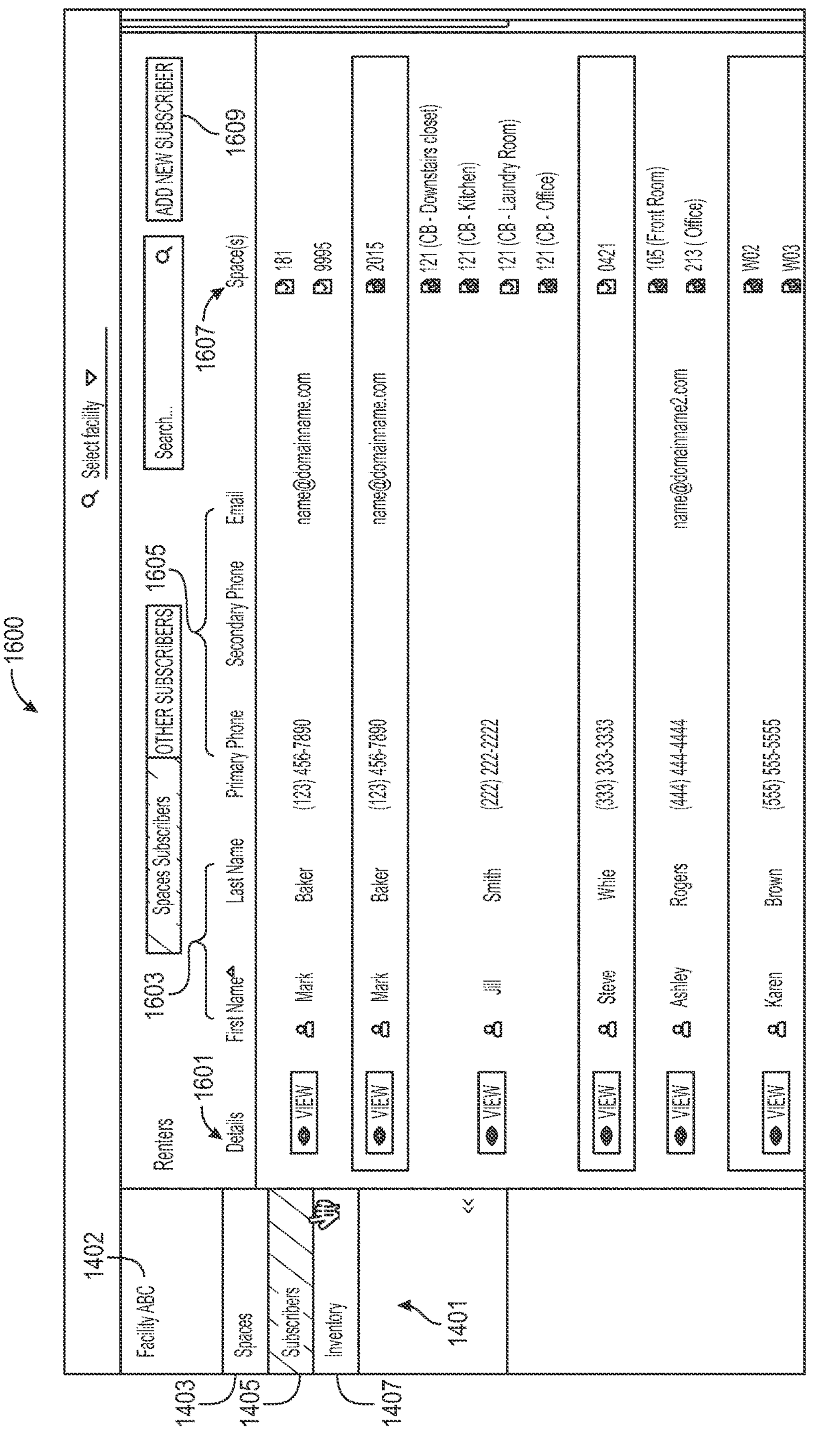
FIG. 16A shows a possible displayed user-interface-subscribers-page, of a GUI, according to at least one embodiment, that may be configured to be displayed upon a screen.

FIG. 16A shows a possible displayed user-interface-subscribers-page 1600, according to at least one embodiment, that may be configured to be displayed upon a screen, such as, but not limited to, a touchscreen, of an end-user computing and/or electronic device. In some embodiments, this end-user may be a facility operator 405 (or an agent thereof) of a given facility 345. In some embodiments, this end-user computing and/or electronic device may be a facility operator device 305. In some embodiments, user-interface-subscribers-page 1600 may display information of space(s) 101 end-users, such as, but not limited to, tenant subscribers 401 or non-subscription end-users that have and/or that are currently subscribed to and/or are receiving monitoring services of one or more spaces 101 that the tenant subscribers 401 or non-subscriber end-user may be renting (leasing) (or owned), wherein the monitoring may be carried by one or more monitoring-device(s) 100 that are associated with each such monitored space(s) 101.

Note, in some embodiments, services "subscription" may mean a database 1303 (or the like) linkage relationship (record) of a tenant 401 (or renter or patron or end user) of space 101 plus activation of monitoring services, whether paid for or not, or advertised as a separate service or integral as a feature and/or service of the given controlled use space 101. In some embodiments, there may be a specific subscription agreement for the monitoring service(s) (of space (s) 101). But in some other embodiments, a purchase and/or agreement could come as integral of the space 101 leasing itself. In either embodiment, the monitoring service may be turned on or turned off to a specific end-user as part of the terms of the space 101 "rental agreement" (lease or the like) without the need for a specific "subscription agreement" or even standalone subscription for monitoring services. However, the relationships of the end-users (such as, but not limited to, tenant 401) to a space 101 with at least one associated (assigned) monitoring-device 100 may be the same in all use cases.

Continuing discussing FIG. 16A, user-interface-subscribers-page 1600 may comprise display of information and/or content in a tabular and/or grid manner (or the like) comprising at least one of the following columns: View details (or manage details or the like) column 1601, subscriber info column(s) 1603, subscriber contact info column(s) 1605, assigned (associated) monitored space(s) 1607, add new subscriber 1609, combinations thereof, and/or the like. In some embodiments, user-interface-subscribers-page 1600 may be configured such that the user may hide, collapse, expand, display, and/or the like one or more of these columns (and their corresponding contents). In some embodiments, user-interface-subscribers-page 1600 may be configured such that the user may move the spatial relationship of these columns around with respect to each other.

Continuing discussing FIG. 16A, in some embodiments, view details column 1601 may be a column populated by displayable and engageable "View" buttons (or Manage Subscriber or Manage Details or the like), with one such displayable button per row of user-interface-subscribers-page 1600. In some embodiments, a given "View" button of column 1601, of a given row of user-interface-subscribers-page 1600, may be user (facility operator 405) engageable (such as, but not limited to, by touching that button on the screen, by using a mouse, by microphone picked up voice, sound, and/or audible command [selection], and/or by other input means). In some embodiments, the user's engagement of such a View button may cause the overall displayable user-interface (GUI) to open a new screen displayable window that includes all the user-interface-subscribers-page 1600 details (information) of that particular row; and optionally with some additional details (information) and/or user engageable options not appearing on user-interface-subscribers-page 1600. See e.g., FIG. 16B.

Continuing discussing FIG. 16A, in some embodiments, subscriber info column(s) 1603, on a row-by-row basis, may display at least a name, a first name, a last name, a middle name, a username, a nickname, combinations thereof, and/or the like of a given subscriber (such as, but not limited to, a given tenant subscriber 401) that is currently associated with monitoring services at least one controlled space for transitory use 101 (monitored space 101), indicated on/in that row. In some embodiment, one such person 401 may be indicated per row of user-interface-subscribers-page 1600. In other embodiments, other end-users who are authorized for use of the given space 101 may be included in the displayed rows with their respective information. Still in other embodiments, these other end-users may be listed separately in their own downs but for the same spaces 101.

Continuing discussing FIG. 16A, in some embodiments, subscriber contact info column(s) 1605, on a row-by-row basis, may display contact information for that subscriber 401 of at least a phone number, an email, a mailing address, combinations thereof, and/or the like, of the given subscriber 401.

Continuing discussing FIG. 16A, in some embodiments, assigned (associated) monitored space(s) ID(s) column 1607, on a row-by-row basis, may display an identifier for each controlled space for transitory use 101 (space 101), that may currently be associated with that tenant subscriber 401 (for monitoring services thereof). In some embodiments, a given tenant subscriber 401 (displayed in user-interface-subscribers-page 1600) may have at least one (1) associated monitored space 101 (but could have two or more). In some embodiments, the identifiers for the monitored spaces 101 listed in assigned (associated) monitored space(s) ID(s) column 1607, may be the same as units (spaces) identifiers 1207 (e.g., with respect to format used and/or with respect to actual identifier used). In some embodiments, these spaces 101 identifiers 1607 may be determined and/or selected by the facility operator 405 and which may correspond to the facility operator's 405 own preexisting units (spaces) identifiers 1207, at their given facility 345. These spaces 101 identifiers 1607 may be numeric, alpha, alphanumeric, and/or the like. In some embodiments, each space 101 identifier 1607 may be unique for a given building of the facility 345 and/or of the given facility 345. These spaces 101 identifiers 1607 may be used to identify one space 101 from another (different) space 101, at a given facility 345.

Continuing discussing FIG. 16A, in some embodiments, add new subscriber 1609 may display a user engageable button, graphic, icon, and/or hyperlink that when user engage may permit entry of a new tenant subscriber 401 into the NINCE 367 software system and/or method. In some embodiments, add new subscriber 1609 may be user engaged via voice, sound, and/or audible command(s), selection(s), and/or instruction(s). In some embodiments, add new subscriber 1609 may be optional, unnecessary, or rarely used because this information may be automatically be entered into NINCE 367 and/or database(s) 1303 via API(s) (application program interface(s)) and/or when NINCE 367 may be integrated with POS software.

Figure 16B:
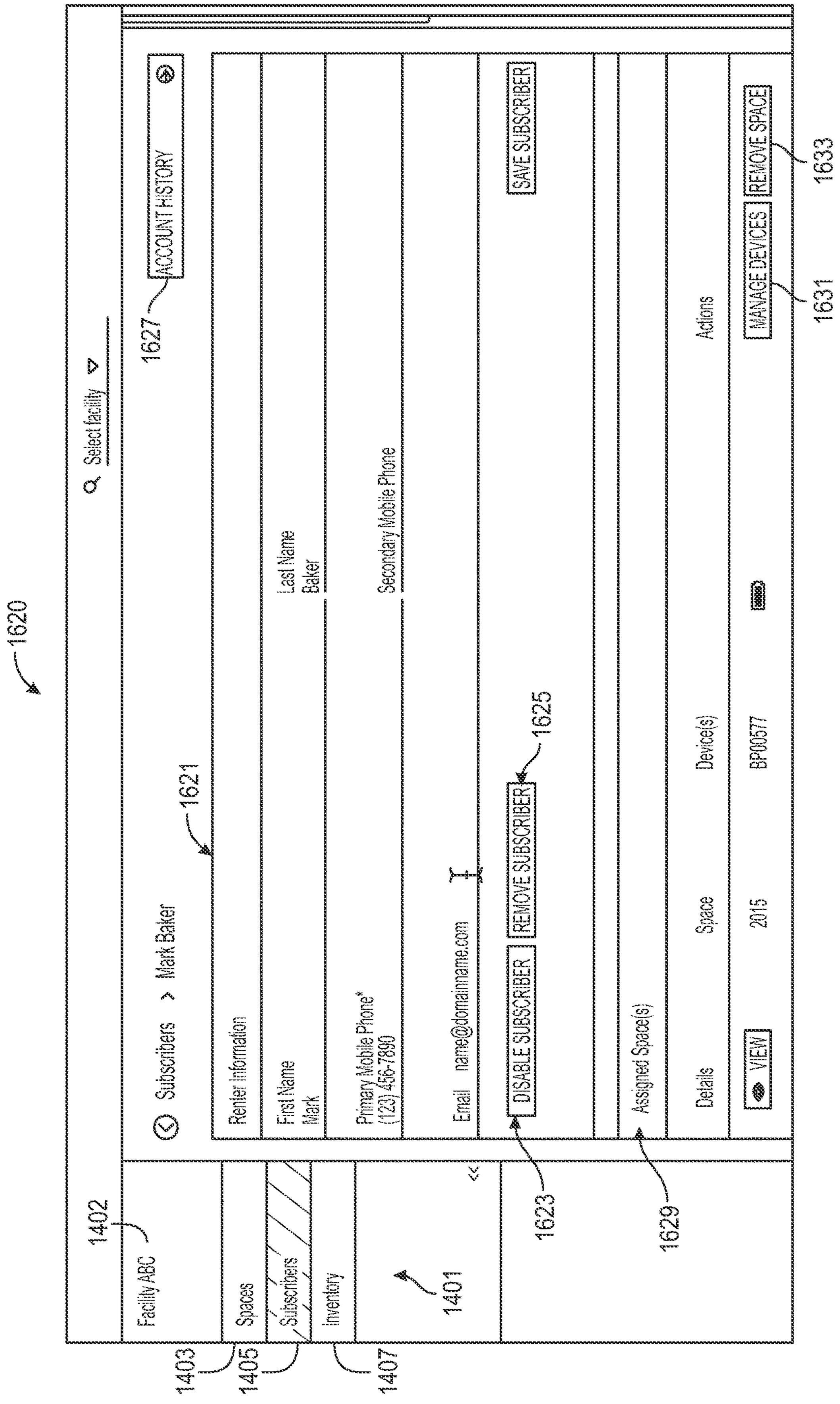
FIG. 16B may show a user-interface-subscriber-details-page, of a GUI, according to at least one embodiment, that may be configured to be displayed upon a screen.

An embodiment and an example of a selected (engaged) View button from column 1601 of user-interface-subscribers-page 1600 may be shown in FIG. 16B. FIG. 16B may show a user-interface-subscriber-details-page 1620, which may display at least some details (information) of a given active tenant subscriber 401, along with monitored space(s) 101 associated (assigned) with that given tenant subscriber 401 and at least one monitoring-device 100 associated (assigned) with that particular monitored space(s) 101. In some embodiments, an active tenant 401 subscriber may be one that is approved for use in the space 101 according to the rule(s) of the facility operator 405 which in some embodiments means current in payment states of the space 101 itself while in others it may mean current in payment status of the monitoring service itself, or combinations thereof. In some embodiments, such rule(s) may be all specific to the managers/operators 405 of the spaces 101 as to when someone is removed from active status due to payment and/or use. In some embodiments, active in this context may simply mean active monitoring of a given space 101 with a tenant 401 (or the like) using that space 101 (for its intended purpose). In some embodiments, the user's 405 engagement of such a View button from user-interface-subscribers-page 1600 may cause the overall displayable user-interface (GUI) to open a new screen displayable window 1620 that may display all the user-interface-subscribers-page 1600 details (information) of that particular row for that given tenant subscriber 401; and optionally may display with some additional details (information) and/or user engageable options not appearing on user-interface-subscribers-page 1600. In some embodiments, user-interface-subscriber-details-page 1620 may display details, particulars, and/or information of a given active tenant subscriber 401.

Continuing discussing FIG. 16B, in some embodiments, subscriber info 1621 may be a region (portion) of user-interface-subscriber-details-page 1620 that displays at least a name, a first name, a last name, a middle name, a username, a nickname, contact information for that subscriber, a phone number for that subscriber, an email for that subscriber, a mailing address for that subscriber, combinations thereof, and/or the like of a given subscriber (such as, but not limited to, a given tenant subscriber 401).

Continuing discussing FIG. 16B, in some embodiments, disable subscriber 1623 may be a region (portion) of user-interface-subscriber-details-page 1620 and/or of subscriber info 1621 that displays a user engageable button, graphic, icon, and/or hyperlink that is configured upon user engagement to permit disabling that currently selected tenant subscriber 401. In some embodiments, disablement of that tenant subscriber 401 may result in a cessation of monitoring services of any monitored space(s) 101 associated (assigned) with that particular disabled tenant subscriber 401, from the disabled tenant subscriber 401 point of view (such as, but not limited, to stopping monitoring related reporting to that disabled tenant subscriber 401). That is, from the facility operator 405 point of view, monitoring services may remain active.

In some embodiments, in API (application program interface) or NINCE 367 plus POS software integrated software flows, this disable subscriber 1623 and/or a re-enable feature may be entirely automated based on signals of payment status of the tenant 401 to the space 101 or lack thereof.

Continuing discussing FIG. 16B, in some embodiments, remove subscriber 1625 may be a region (portion) of user-interface-subscriber-details-page 1620 and/or of subscriber info 1621 that displays a user engageable button, graphic, icon, and/or hyperlink that is configured upon user engagement to permit removal of that currently selected tenant subscriber 401. In some embodiments, removal of that tenant subscriber 401 may result in dissociation (un-assignment) of that tenant subscriber 401 from any previously associated (assigned) monitored space(s) 101. In some embodiments, when a given monitored space 101 becomes designated as dissociated (unassigned) from any tenant subscriber(s) 401, then such a monitored space 101 may be vacant. However, note a vacant monitored space 101 may still have chattels therein. See also, FIG. 16D.

In some embodiments, in API (application program interface) or NINCE 367 plus POS software integrated software flows, this remove subscriber 1625 and/or a re-add subscriber feature may be entirely automated based on signals of payment status of the tenant 401 to the space 101 or lack thereof.

Continuing discussing FIG. 16B, in some embodiments, subscriber account history 1627 may be a region (portion) of user-interface-subscriber-details-page 1620 and/or of subscriber info 1621 that displays a user engageable button, graphic, icon, and/or hyperlink that is configured upon user engagement to bring up a window populated with an account history details and/or information for that particular tenant subscriber 401.

Continuing discussing FIG. 16B, in some embodiments, assigned monitored space(s) 1629 may be a region (portion) of user-interface-subscriber-details-page 1620 that displays a list of monitored space(s) 101 that are currently assigned (associated) with that particular tenant subscriber 401. In some embodiments, assigned monitored space(s) 1629 may also display monitoring-device(s) 100 that are currently assigned (associated) with/to the currently assigned (associated) monitored space(s) 101 of that particular tenant subscriber 401.

Continuing discussing FIG. 16B, in some embodiments, manage device(s) 1631 may be a region (portion) of user-interface-subscriber-details-page 1620 and/or of assigned monitored space(s) 1629 that displays a user engageable button, graphic, icon, and/or hyperlink that is configured upon user engagement to bring up a window managing the assigned (associated) monitoring-device(s) 100 for that monitored space 101, including being able to remove and/or add monitoring-device(s) 100 to that monitored space 101.

Continuing discussing FIG. 16B, in some embodiments, remove monitored space(s) 1633 may be a region (portion) of user-interface-subscriber-details-page 1620 and/or of assigned monitored space(s) 1629 that displays a user engageable button, graphic, icon, and/or hyperlink that is configured upon user engagement to permit removal of that currently selected monitored space 101 from being associated (assigned) to that particular tenant subscriber 401. See e.g., FIG. 16C.

Figure 16C:
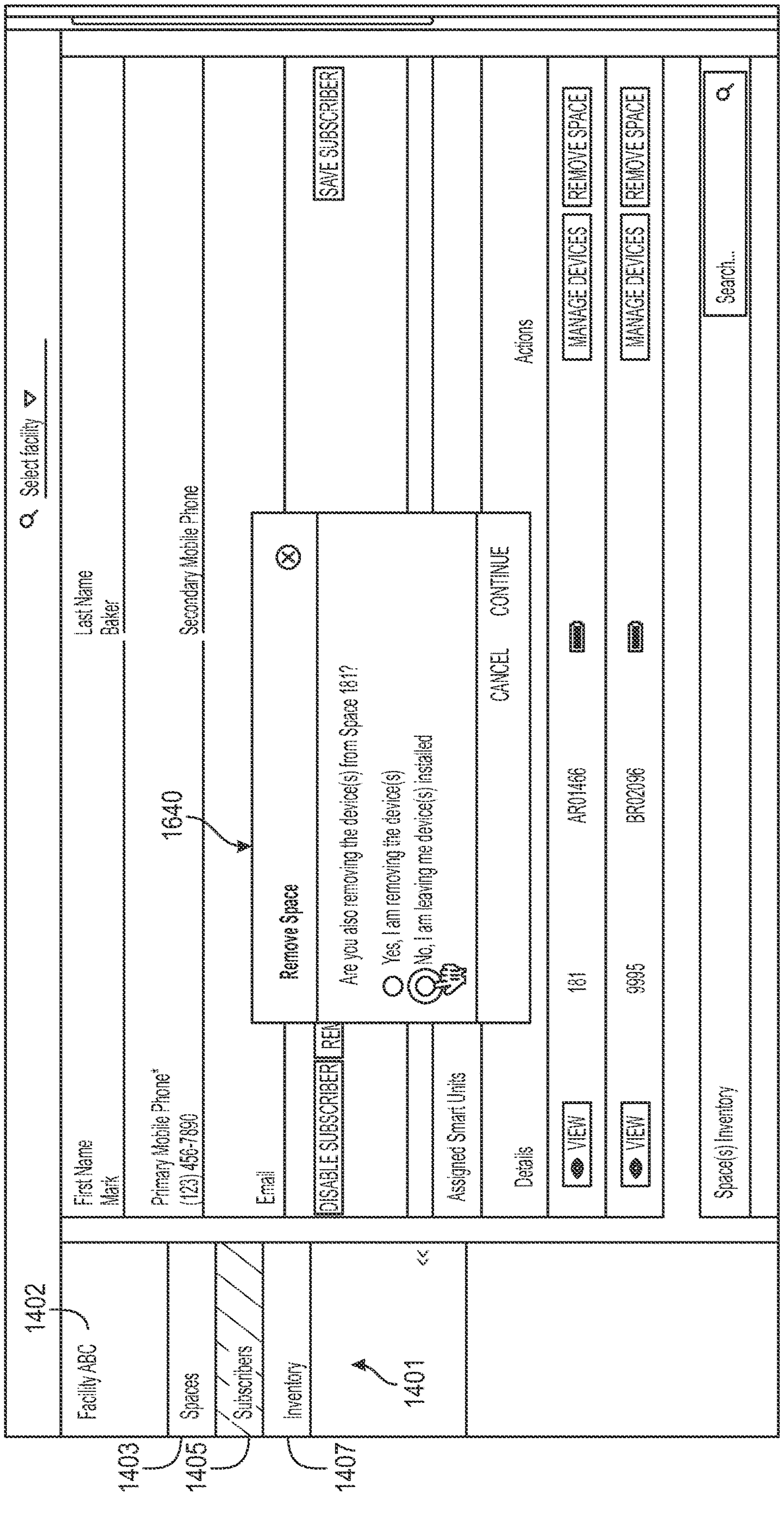
FIG. 16C may show a user-interface-remove-monitored-space-page, of a GUI, according to at least one embodiment, that may be configured to be displayed upon a screen.

An embodiment and an example of a selected (engaged) remove monitored space 1633 button from user-interface-subscriber-details-page 1620 and/or from assigned monitored space(s) 1629, may be shown in FIG. 16C. FIG. 16C may show a user-interface-remove-monitored-space-page 1640, which may display a question posed to the user and may be configured to receive a response from the user, as to whether the associated (assigned) (installed) monitoring-device(s) 100 of that monitored space 101 being removed from that selected tenant subscriber 401, should also be removed from that monitored space 101; or if those associated (assigned) (installed) monitoring-device(s) 100 of that monitored space 101 being removed from that selected tenant subscriber 401, should remain associated (assigned) (installed) with that monitored space 101 (which could result in a vacant, yet pre-installed monitored space 101 that may be displayed in user-interface-inventory-page 1400). In some embodiments, remove monitored space 1633 button may be optional, skipped, omitted, or implemented, but rarely used.

In some embodiments, in API (application program interface) or NINCE 367 plus POS software integrated flows, this remove monitored space 1633 functionality may be entirely automated based on positional signals of the assigned monitoring-device(s) 100; and/or based on default setting the previously assigned monitoring-device(s) 100 to the given space 101 will remain to assigned, unless the user elects for removal. Further, in some embodiments, the logic and/or functionality of remove monitored space 1633 may be built into the API or into the NINCE 367 plus POS software integrated software.

Figure 16D:
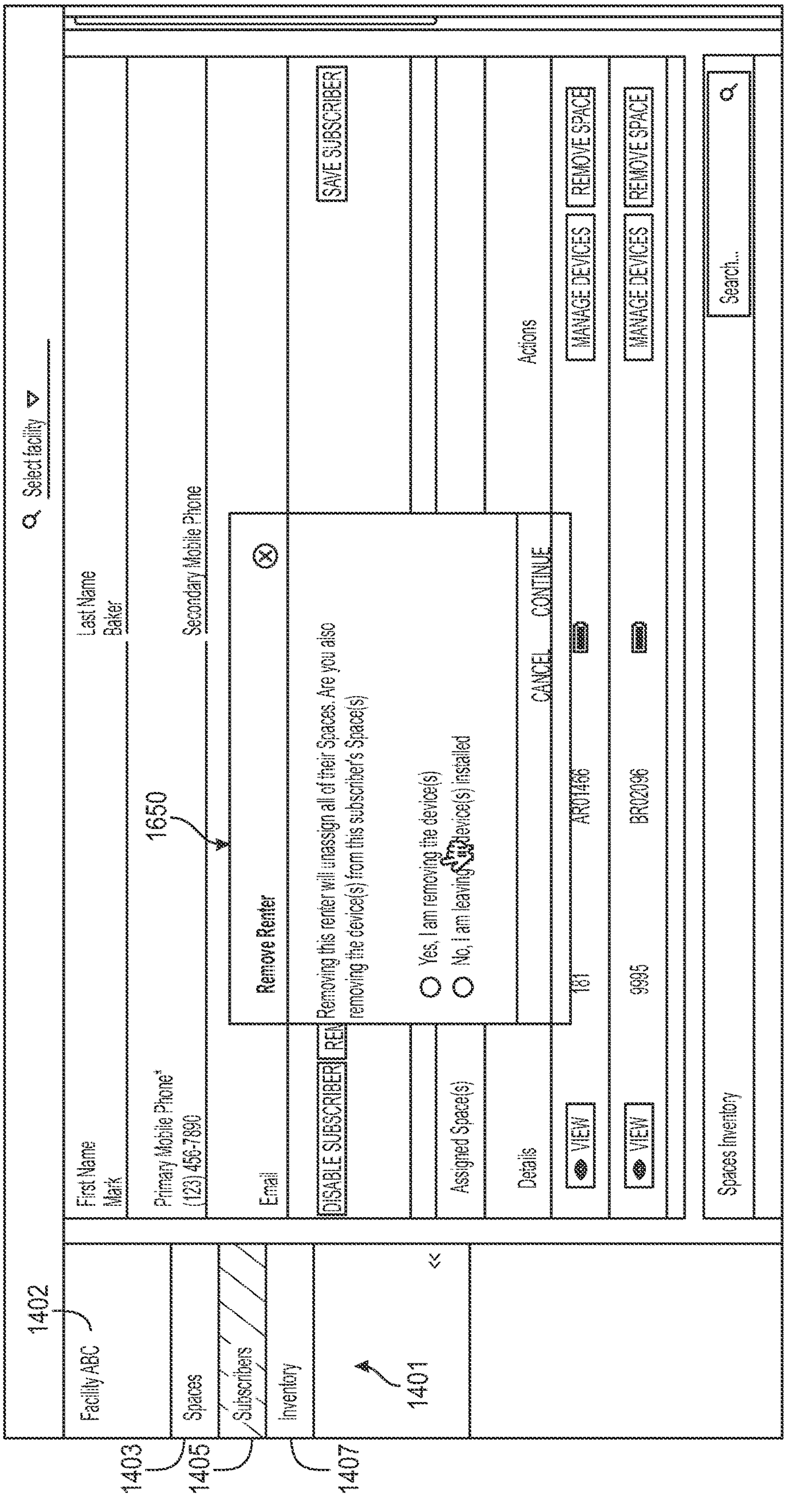
FIG. 16D may show a user-interface-remove-smart-subscriber-page, of a GUI, according to at least one embodiment, that may be configured to be displayed upon a screen.

An embodiment and an example of a selected (engaged) remove subscriber 1625 button from user-interface-subscriber-details-page 1620 and/or from subscriber info 1621, may be shown in FIG. 16D. FIG. 16D may show a user-interface-remove-smart-subscriber-page 1650, which may display a question posed to the user and may be configured to receive a response from the user, as to whether the associated (assigned) (installed) monitoring-device(s) 100 of the monitored space(s) 101 being dissociated from that selected tenant subscriber 401, should also be removed from those monitored space(s) 101; or if those associated (assigned) (installed) monitoring-device(s) 100 of those monitored space(s) 101 being dissociated from that selected tenant subscriber 401, should remain associated (assigned) (installed) with those monitored space(s) 101 (which could result in vacant, yet pre-installed monitored space(s) 101 that may be displayed in user-interface-inventory-page 1400). In some embodiments, remove subscriber 1625 button may be optional, skipped, omitted, or implemented, but rarely used.

In some embodiments, in API (application program interface) or NINCE 367 plus POS software integrated flows, this remove subscriber 1625 functionality may be entirely automated. Further, in some embodiments, the logic and/or functionality of remove subscriber 1625 may be built into the API or into the NINCE 367 plus POS software integrated software.

Figure 16E:
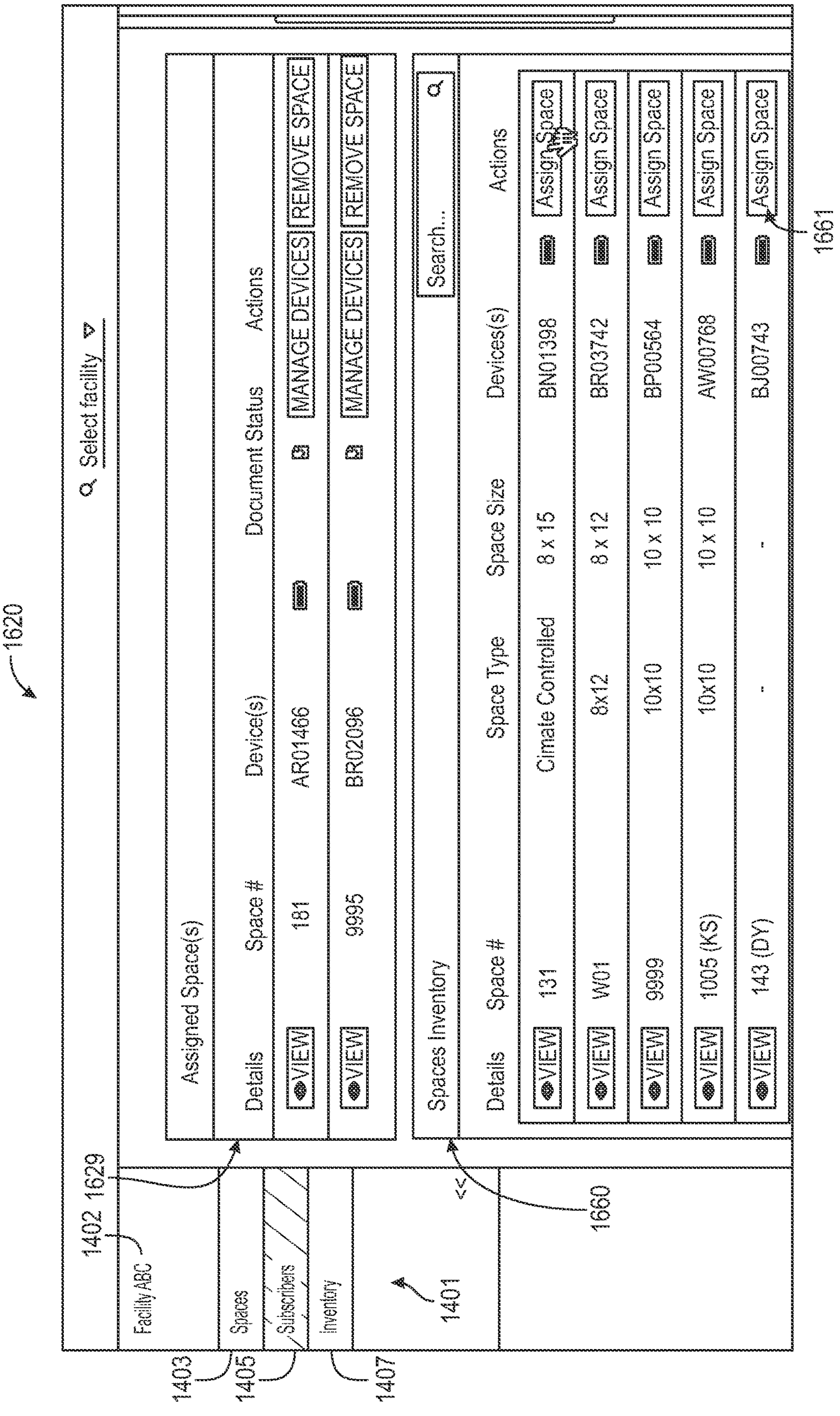
FIG. 16E may show a bottom (or different) portion of the user-interface-subscriber-details-page of FIG. 16B, of a GUI, according to at least one embodiment, that may be configured to be displayed upon a screen.

FIG. 16E may be a continuation of a bottom portion of FIG. 16B, showing that below the assigned monitored space(s) 1629 region of user-interface-subscriber-details-page 1620 may further display content (e.g., user-interface-monitored-space-inventory-page 1660). An embodiment and an example of a selected (engaged) View button from column 1601 of user-interface-subscribers-page 1600 may be shown in FIG. 16E. FIG. 16E may show a bottom portion of user-interface-subscriber-details-page 1620, which may display at least some details (information) of a given active (paying) tenant subscriber 401, along with monitored space (s) 101 associated (assigned) with that given tenant subscriber 401 and at least one monitoring-device 100 associated (assigned) with that particular monitored space(s) 101. In some embodiments, the user's 405 engagement of such a View button from user-interface-subscribers-page 1600 may cause the overall displayable user-interface (GUI) to open a new screen displayable window 1620 that may display all the user-interface-subscribers-page 1600 details (information) of that particular row for that given tenant subscriber 401; and optionally may display with some additional details (information) and/or user engageable options not appearing on user-interface-subscribers-page 1600. In some embodiments, user-interface-subscriber-details-page 1620 may display details, particulars, and/or information of a given active (paying) tenant subscriber 401.

As shown in FIG. 16E, user-interface-subscriber-details-page 1620 may further comprise a region (portion) designated as user-interface-monitored-space-inventory-page 1660. In some embodiments, user-interface-monitored-space-inventory-page 1660 may display in a grid, table, and/or tabular format, a list of available vacant spaces 101 (of a given facility 345) that are not currently assigned (associated) with tenant subscribers 401; i.e., user-interface-monitored-space-inventory-page 1660 may display list of available vacant spaces 101 that are in inventory (e.g., of a given facility 345) and that are ready to be rented (leased). In some embodiments, if the given space 101 that is vacant and/or inventory currently has at least one assigned (associated) and installed monitoring-device 100, then that space 101 may be designated as a monitored space 101.

Continuing discussing FIG. 16E, in some embodiments, user-interface-monitored-space-inventory-page 1660 may display assign monitored space 1661. In some embodiments, assign monitored space 1661 may be a displayable user engageable button, graphic, icon, hyperlink, and/or the like, that upon being user engaged, may permit the user 405 to add a formerly vacant and in inventory (smart) space 101 to now being assigned (associated) with that particular tenant subscriber 401.

With respect to the overall displayable user-interface (GUI) and/or portions thereof, such as, but not limited to, the disclosures of FIG. 14A to FIG. 16E, or a portion thereof, at least some of the graphical user interface (GUI) functionality may be executed and/or replaced with voice interface and/or with automation from APIs or from NINCE 367 fully integrated with the POS software; however, the underlying embedded logic workflows in the voice interface and/or in the automated embodiments may be substantially similar or equivalent to the GUI embodiments.

Figure 17A:
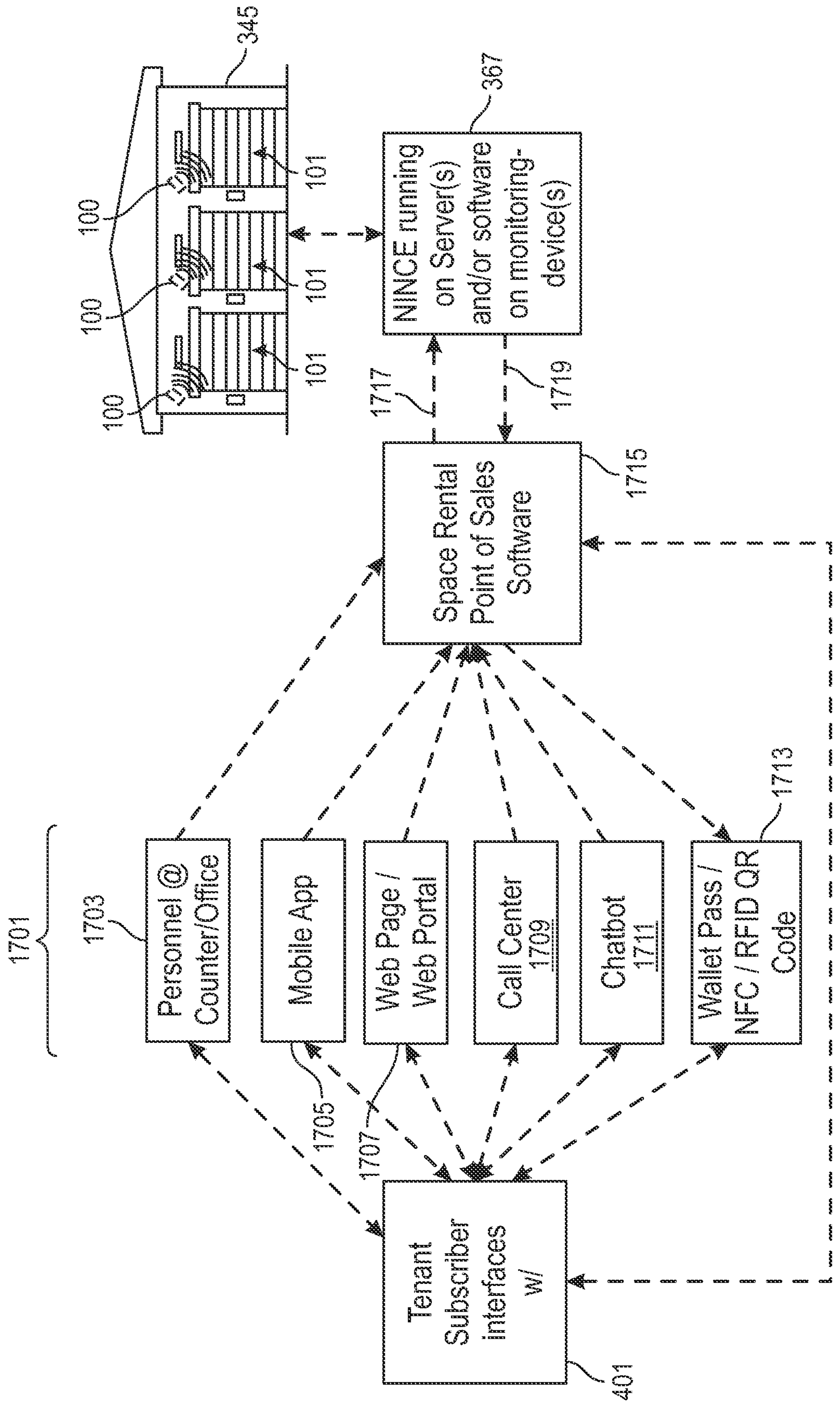
FIG. 17A may show a system showing block diagrams that may illustrate at least some possible communication pathways between tenant and/or subscribers, various user interface means, point-of-sale (POS) software, NINCE (Network Intelligent Notification & Configuration Engine) software, monitoring-devices, and APIs (application program interfaces).
Figure 17B:
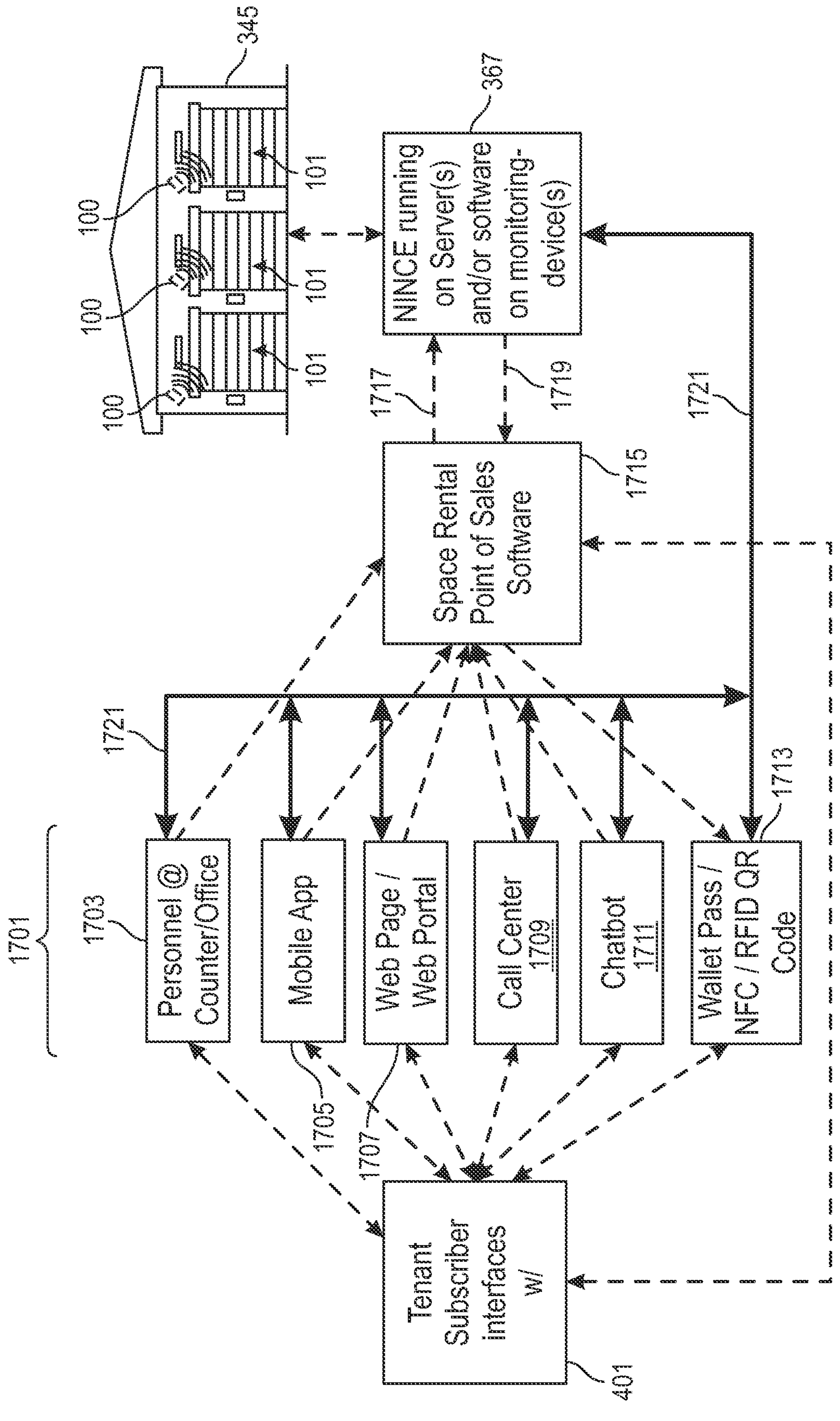
FIG. 17B may show a system showing block diagrams that may illustrate at least some possible communication pathways between tenant and/or subscribers, various user interface means, POS software, NINCE software, monitoring-devices, and APIs.

Tenant 401 monitoring services subscriptions may be automated in various ways from inventory whether in a preinstall monitored space 101 or in on-the-fly approach. For example, and without limiting the scope of the present invention, three (3) different software topology approaches may be used for such automation. FIG. 17A and FIG. 17B (see also FIG. 18A, FIG. 18B, FIG. 21, FIG. 22A, and/or FIG. 22B) may show a first software topology approach where the POS software 1715 and the monitoring software (NINCE 367) are separate and different pieces of software from each other, but that may be integrated to work together by use of one or more APIs (application program interfaces) either between the monitoring software (NINCE 367) and the POS software 1715 and/or between the monitoring software (NINCE 367) and user-interface-means 1701.

Figure 17C:
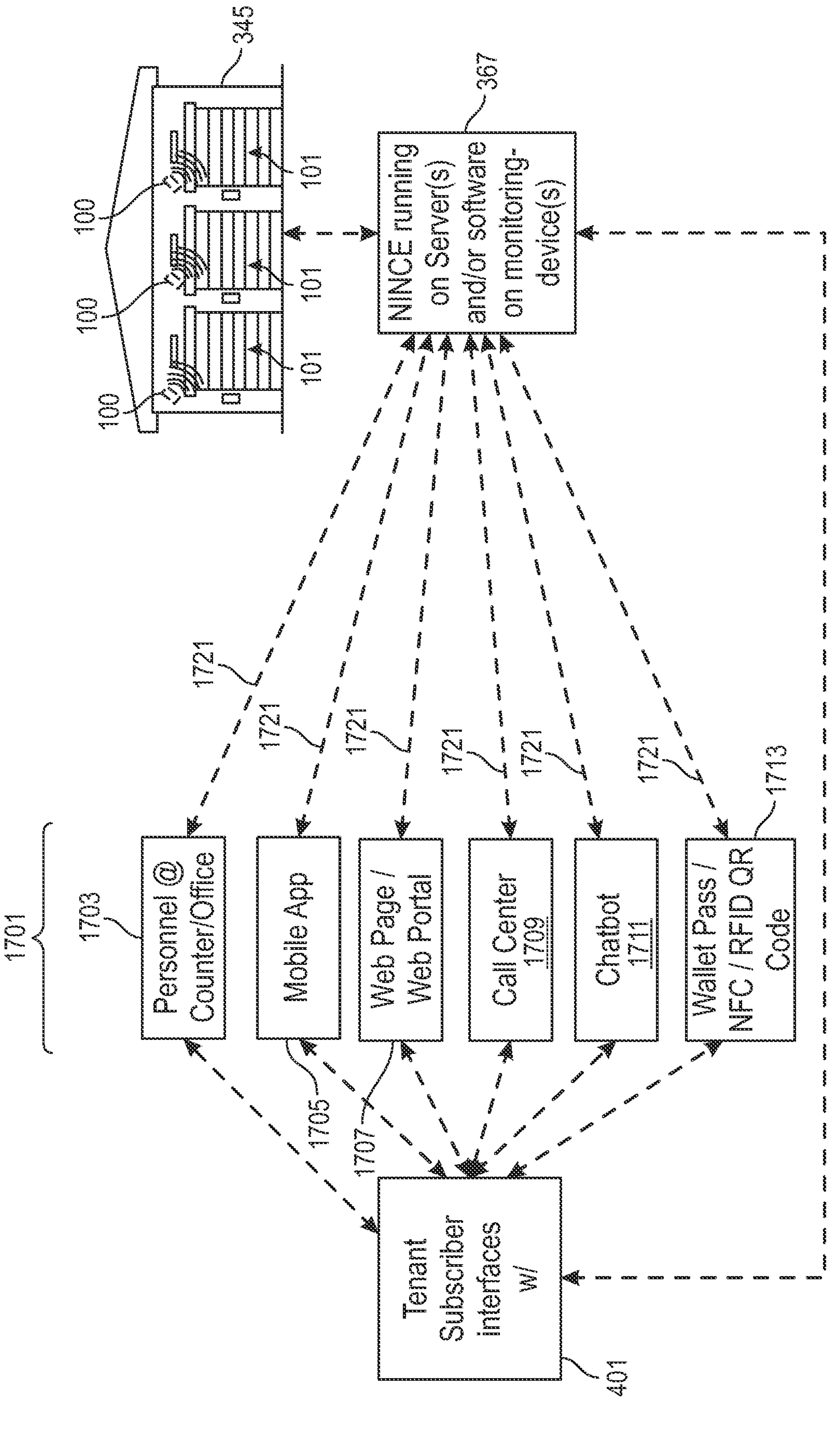
FIG. 17C may show a system showing block diagrams that may illustrate at least some possible communication pathways between tenant and/or subscribers, various user interface means, NINCE software, monitoring-devices, and APIs.

FIG. 17C (see also FIG. 19A, FIG. 19B, FIG. 23, and/or FIG. 24) may show a second software topology approach where there is no connection between the POS software 1715 and the monitoring software (NINCE 367), but where automation may be implemented by use of one or more APIs between the monitoring software (NINCE 367) and user-interface-means 1701.

Figure 17D:
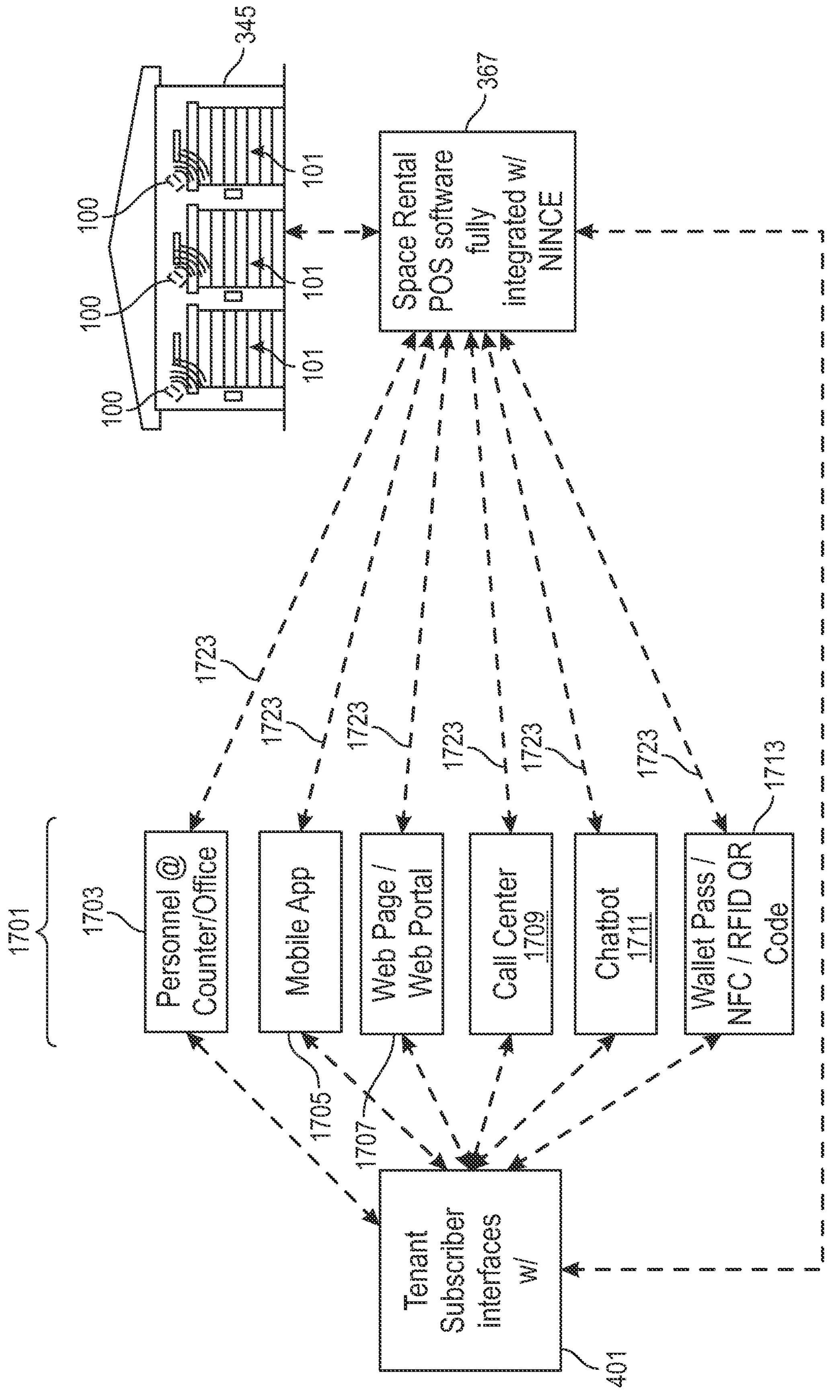
FIG. 17D may show a system showing block diagrams that may illustrate at least some possible communication pathways between tenant and/or subscribers, various user interface means, monitoring-devices, and NINCE software that has been integrated with POS software.

FIG. 17D (see also FIG. 20A, FIG. 20B, FIG. 25, FIG. 26A, and/or FIG. 26B) may show a third software topology approach where there is the POS software 1715 and the monitoring software (NINCE 367) are fully integrated with each other, e.g., as two modules that are built and/or intended to seamlessly communicate with each other, where automation may be implemented by the monitoring software (NINCE 367) (with integral POS functionality) communicating with the user-interface-means 1701.

With respect to FIG. 17A and/or FIG. 17B, a benefit of having API connection(s) and one-way or two-way communications with the POS software 1715 and the monitoring software (NINCE 367) is that the space's 101 name, identifier and/or description may be automatically brought into the monitoring software (NINCE 367) or alternatively the monitoring-device 100 information including the space 101 the monitoring-device 100 is installed in may be brought into the POS software 1715 automatically. Without the automated direct interface, to accomplish the necessary data exchange of necessary data/information would require this data to be manually entered by typing, voice prompting/interfacing, scanning a QR Code, or proximity via NFC/RFID, by the property manager 405 or other property personnel who is responsible for setting up and/or maintaining the monitoring service in the property 345 of controlled spaces 101. There are various methods that use the inventory management system and/or method to permit, highly effective and efficient relationships in setting up the monitoring of a space 101, including but not limited to, setting up a subscription for monitoring services. Various system and/or methods, as shown and described herein, may be used to set-up inventory of monitoring-devices 100 for spaces 101 that in turn may be used for activating monitoring services on demand, modifying monitoring services, suspending monitoring services, or ending monitoring services for a space 101 whereby the initial activation may be done using a pre-assigned/pre-installed approach or the on-the-fly approach.

For example, and without limiting the scope of the present invention, in some embodiments, with respect to FIG. 17A and/or FIG. 17B, there may be three (3) types of assignment, namely, "device driven assignment," "space description/space type driven assignment," and/or "service charge driven assignment." In some embodiments, various forms of automation triggers with respect to third-party software, such as, but not limited to, the POS software (or those which use intermediary information found in the POS software) are being imported to the NINCE 367 to directly manage on-demand monitoring services. These three assignment driven examples are just that examples, in other embodiments, other signal drivers/triggers may be used for automation.

With respect to the first assignment approach, the "device driven assignment," tenant 401 at the time of POS moves into the space 101 which already has a monitoring-device

100 installed and associated therein, then the associated tenant 401 subscriber information received via API communications from the POS software 1715 utilized to complete the subscription to establish the service automatically creating the relationship from the tenant 401 subscriber to the controlled space 101 to the monitoring-device 100. This thereby turns on the monitoring services as the assignment (association) of the tenant 401 subscriber is made with a controlled space 101 and the space already has a monitoring-device 100 in it.

With respect to the second assignment approach, the “space description/space type driven assignment,” tenant 401 at POS moves into space 101 and the monitoring software (NINCE 367) recognize designators within the API communications from the POS software 1715, such as a “monitored space,” “monitored unit,” “premium space,” “premium unit,” “monitored space,” space 101 ID, space 101 descriptor, facility ID, facility information, and/or the like or other pre-determined API identifying attribute thereby permitting completion of the association with the tenant 401 subscriber turn to on the monitoring service because the monitoring software (NINCE 367) knows, understands, learned, and/or is programed to recognize these API supplied designators to make the association between the given disclosed space 101 that already has one or more monitoring-devices 100 installed and associated. Now if the same controlled space 101 does not have a monitoring-device 100 assigned and/or physically located in that space 101 (perhaps mistakenly), a proper automated communication with/to property management 405 personnel and/or the tenant 401 subscriber may then be taken to ensure a monitoring-device 100 is correctly placed in a timely fashion via an on-the-fly approach and associated to the space 101 and the tenant 401. An important point here is that the intent to monitor this space 101 was pre-known (by the monitoring software (NINCE 367)) so whether by intent or an error appropriate automated action may be taken. Thus, the monitoring software (NINCE 367) has a logical communication flow within the inventory process to properly reconcile this workflow suitable to the tenant 401 subscriber and in support of the property 345 operations personnel.

In some embodiments, a given facility 345 might define all their spaces 101 at a specific property to be monitored spaces 101, so each such space 101 may have at least one monitoring-device 100 to monitor that space 101. In some such scenarios, the facility’s 345 specific info and/or ID, e.g., from the API (or from a fully integrated NINCE 367 to POS software) may be configured to turn on monitoring services for all or all new tenant 401 subscribers as a default.

With respect to the third assignment approach, the “service charge driven assignment,” it is alternatively possible that the POS software 1715 applies a service charge or fee associated in part with monitoring services of the space 101. In this case similar to the “space description/space type driven assignment” scenario, an intent for this space 101, whether pre-installed (fore known), or on-the-fly (learned at time of POS), the POS software 1715 sends via an API communication of a service charge or fee for monitoring and tenant 401 information, and/or the monitoring software (NINCE 367) calls the POS software 1715 in order to receive this respective information. When confirmation of a tenant 401 opting for the monitoring service is received at the monitoring software (NINCE 367), the monitoring service subscription may be completed by utilizing this tenant 401 subscriber information supplied by the POS software 1715. Assuming there is a monitoring-device 100 already pre-associated or pre-installed, the monitoring service is turned on. If not, similar to the treatment in the “space description/space type driven assignment” scenario, the intent of this space 101 to have a monitoring service turned on is known, and automated action requests may be communicated through to the facility property manager 405, or associated personnel, tenant 401 subscriber and/or end user (s) including guiding the necessary steps to identifying available in inventory (but unassigned) monitoring-device (s) 100, efficiently select and assign space 101 provided through the API supplied info and/or directions for the appropriate end-user (such as, but not limited to, the property 345 space 101 personnel or tenant 401 subscriber) to access the given space 101 to install the monitoring-device 100. Note, the “service charge driven assignment” is a very powerful method and/or system when combined with on-the-fly approach or with the pre-installed approach as it is a novel services-focused approach that leverages as a complementary element of the ad hoc wireless monitoring network connection set up approach for a given facility 345.

Please also note, in the completion of association of tenant 401 subscriber to space 101 to monitoring-device 100, information may optionally be pulled into the monitoring software (NINCE 367) from the POS software 1715, such as the tenant 401 subscriber (and/or alternate contact’s) first name, last name, email address, mobile phone number, space 101 rented, space 101 rental price paid, space 101 features, space 101 features desired, duration of subscription (for space rental and/or for monitoring services), service or fees charged (for rental and/or for monitoring services), payments made (for rental and/or for monitoring services), payment types (for rental and/or for monitoring services), current payment status (for rental and/or for monitoring services), property/facility 345 information, property/facility 345 location information, property/facility 345 access code(s), a portion thereof, combinations thereof, and/or the like.

In some embodiments, when automating (such as, but not limited to, use of APIs) NINCE 367 may be pulling information across numerous (two or more) facilities 345 locations. Referencing this as one of attribute may be important because this is not only automation at one site specific location but coordinates across multiple locations as an aggregator in NINCE 367.

FIG. 17A may show at least one means, system, and/or method for how data, details, particulars, and/or information that may be displayed in the overall displayable user-interface (GUI), such as, but not limited to, user-interface-inventory-page 1400, user-interface-monitored-spaces-page 1500, user-interface-subscribers-page 1600, a portion thereof, combinations thereof, and/or the like, may be at least automatically populated without direct user manual input into NINCE 367, database 1303, usable by NINCE 367, and/or usable by software running on monitoring-devices 100. In some embodiments, the NINCE 367 software and/or the software running on the monitoring-devices 100 may be referred to as the monitoring software. FIG. 17A may be a block diagram showing at least some possible communication pathways between tenant subscribers 401, various user interface means 1701, point-of-sale (POS) software 1715, NINCE 367, monitoring-devices 100, and APIs (application program interfaces). For example, and without limiting the scope of the present invention, when a given prospective tenant subscriber 401 may be interested in renting (leasing) one or more space(s) 101, that prospective tenant subscriber 401 may accomplish that goal by one or more of the following user-interface-means 1701: through direct face-to-face communication with personnel 1703

(e.g., at a counter, kiosk, in an office, and/or the like), via a mobile-app 1705, via a web-page 1707 (web-portal or the like), via interact with a call center 1709, via interaction with a chatbot 1711, via a wallet-pass/NFC/RFID/QR-code type 1713 interaction, tenant device 303, facility operator device 305, provider device 309, third-party device 311, user device 1203, a portion thereof, combinations thereof, and/or the like. Then, whichever user-interface-means 1701 that the prospective tenant subscriber 401 engaged with, may then pass on the prospective tenant subscriber 401 supplied data, details, particular, and/or information to point-of-sale (POS) software 1715, via one or more of: personnel manual input, API (application program interface), and/or because the point-of-sale (POS) software 1715 is (directly) integrated with the given user-interface-means 1701. In some embodiments, point-of-sale (POS) software 1715 and NINCE 367 or point-of-sale (POS) software 1715 and software running on the monitoring-device(s) 100, may communicate with each other via one or more APIs, to (automatically) populate at least some of the data, details, particulars, and/or information that may be displayed in the overall displayable user-interface (GUI), such as, but not limited to, user-interface-inventory-page 1400, user-interface-monitored-spaces-page 1500, user-interface-subscribers-page 1600, a portion thereof, combinations thereof, and/or the like. In some embodiments, information 1717 passed (sent and/or communicated) from point-of-sale (POS) software 1715 to NINCE 367 or software running on the monitoring-device(s) 100, via one or more APIs, may comprise at least one of: tenant subscribe 401 specific info (e.g., name, contact info, payment info, and/or the like); desired, selected, and/or picked available space(s) 101; desired, selected, and/or picked available space(s) 101 type(s), qualities, feature(s), location(s), property 345 information, property 345 location information, and/or size(s); whether space(s) 101 are smart; quantity and/or configuration of desired space(s) 101 monitoring; (monitoring) subscription start date; (monitoring) subscription end date; space(s) 101 rental start date; space(s) 101 rental start date; month-to-month agreement; annual agreement; tenant subscriber 401 defined duration agreement; a portion thereof; combinations thereof; and/or the like. In some embodiments, information 1719 passed (sent and/or communicated) from NINCE 367 or software running on the monitoring-device(s) 100 to point-of-sale (POS) software 1715, via one or more APIs, may comprise at least one of: confirmation(s) of info requested in information 1717; facility 345 specific info; location info; monitoring-device(s) 100 info; tenant 401 activity data; monitoring-device(s) 100 status and/or telematics info; combinations thereof; and/or the like.

FIG. 17B may be similar to FIG. 17A, except in FIG. 17B, one or more APIs 1721 (application program interfaces) may interface directly between the user-interface-means 1701 and the NINCE 367; or directly between the user-interface-means 1701 and the software running on the monitoring-devices 100. Thus, in FIG. 17B, NINCE 367 and/or the software running on the monitoring-devices 100, may or may not directly interface with the point-of-sale (POS) software 1715. FIG. 17B may show one means, system, and/or method for how data, details, particulars, and/or information that may be displayed in the overall displayable user-interface (GUI), such as, but not limited to, user-interface-inventory-page 1400, user-interface-monitored-spaces-page 1500, user-interface-subscribers-page 1600, a portion thereof, combinations thereof, and/or the like, may be at least automatically populated without direct user manual input into NINCE 367, database 1303, usable by NINCE 367, and/or usable by software running on monitoring-devices 100. FIG. 17B may be block diagram showing at least some possible communication pathways between tenant subscribers 401, various user interface means 1701, point-of-sale (POS) software 1715, NINCE 367, monitoring-devices 100, and APIs 1721.

With respect to FIG. 17C, when there is not a direct software connection (e.g., API connection) between the monitoring software (NINCE 367) and the POS software 1715, this may require alternate methods and/or systems of collecting (and/or updating and/or maintaining) the necessary tenant 401 and/or space 101 information. In this scenario, tenant 401 information may be collected (and/or updated and/or maintained) and entered manually by an end-user (e.g., tenant 401) via a website, a mobile app, chatbot, call center, automated phone systems, wallet pass, or by a property 345 space 101 operator manager 405 or personnel directly into the monitoring software (NINCE 367) via a website portal, a mobile app, chatbot interface, combinations thereof, and/or the like, which may be referenced generally by user-interface-means 1701. In short, the monitoring software (NINCE 367) may need the tenant's 401 contact information, such as but not limited to, their as well as other intended end-users, first name, last name, email address, and/or mobile phone number for communication purposes. With this information obtained by the monitoring software (NINCE 367) (e.g., obtained from API communications with user-interface-means 1701), and a connection to the unit/space name made in the monitoring software (NINCE 367), the desired (necessary) relationship is complete and monitoring service may be turned on consistent with treatment similarly to the three (3) different assignments scenarios as discussed above for FIG. 17A and/or FIG. 17B.

In some embodiments, other UI communication specific information such as wallet pass authentication, mobile app/web app notification authenticating information may be other, alternative, and/or additional means of setting up communication UI lines.

FIG. 17C may be similar to FIG. 17B, except in FIG. 17C, one or more APIs 1721 (application program interfaces) may interface directly between the user-interface-means 1701 and the NINCE 367; or directly between the user-interface-means 1701 and the software running on the monitoring-devices 100; and NINCE 367 and/or the software running on the monitoring-devices 100 is not directly interfaced with the point-of-sale (POS) software 1715. In FIG. 17C, point-of-sale (POS) software 1715 may be absent as far as NINCE 367 and/or the software running on the monitoring-devices 100 may be concerned. FIG. 17C may show means, a system, and/or a method for how data, details, particulars, and/or information that may be displayed in the overall displayable user-interface (GUI), such as, but not limited to, user-interface-inventory-page 1400, user-interface-monitored-spaces-page 1500, user-interface-subscribers-page 1600, a portion thereof, combinations thereof, and/or the like, may be at least automatically populated without direct user manual input into NINCE 367, database 1303, usable by NINCE 367, and/or usable by software running on monitoring-devices 100. FIG. 17C may be a block diagram showing at least some possible communication pathways between tenant subscribers 401, various user interface means 1701, NINCE 367, monitoring-devices 100, and APIs 1721.

With respect to FIG. 17D, in this scenario, the POS software 1715 and the monitoring software (NINCE 367) are combined into one integral and comprehensive software system, therefore not requiring API commands/communications therebetween such software modules, whether distinct (or external to each other). This is not to say, API commands/communications between integral software modules or functions within the same comprehensive software system will never be used, but rather this negates the need for API communication between external software systems. External APIs facilitate interoperability between (wholly) different software systems, often adhering to industry standards and emphasizing security, authentication, and the like. Whereas, internal APIs within the same software often enable modular code organization, internal communication, and prioritize efficiency and flexibility without the constraints of external standards. So, in some embodiments, the FIG. 17D scenario does not necessarily eliminate use of APIs, but mainly the added layer of coordination of externally interfacing APIs. With such a fully integrated and integral comprehensive software system, it is possible to directly include monitoring-device 100 inventory assignment to a controlled space 101, whether a pre-installed vacant space 101 scenario before a new tenant 401 subscription or for the on-the-fly approach as part of new tenant 401 space 101 rental flow or upgrading of existing tenants 401 who desire to upgrade their controlled space(s) 101 with monitoring (as they might not presently have monitoring turned on from a monitoring services subscription point of view).

Currently there has been no previous implementation of bringing these distinct software solutions of the POS rental software and monitoring services software together into one fully integrated and integral software solution. Traditionally, the POS rental software focuses on space rental and not on monitoring services. Traditional (prior art) POS rental software and traditional (prior art) monitoring services software are not implemented as a fully integrated and integral software solution with a "services first" architecture. In contrast, the FIG. 17D fully integrated and integral approach that combines the POS software 1715 and the monitoring software (NINCE 367) is such a "services first" architecture that is more cost effective, more robust, and also novel.

It is worth noting, pre-installed monitoring-devices 100 in controlled spaces 101 that pervasively monitor the space 101 via monitoring approaches in an always on approach and primarily for the benefit of the property 345 owner and/or operator 405 are being distinguished. In this case, the user of the space 101 affectively remains the property 345 owner or operator 405, where as in this description of invention, the primary focus has been on the use of inventory methods/systems, assignments, and monitoring service activation for tenant 401 subscribers (or other end users) of controlled use transitory spaces 101.

FIG. 17D may be similar to FIG. 17C, except in FIG. 17D the user-interface software, the point-of-sale (POS) software, and the monitoring software may all be directly integrated with each other, such that (external) APIs (application program interfaces) are not necessary. In some embodiments, the user-interface software, the point-of-sale (POS) software, and the monitoring software may all be mere modules of a single software. In some embodiments, fully directly integrated communication pathway 1723 may indicate fully integrated and/or direct communications between the user-interface software module and the monitoring software module or between the point-of-sale (POS) software module and the monitoring software module. FIG. 17D may show means, a system, and/or a method for how data, details, particulars, and/or information that may be displayed in the overall displayable user-interface (GUI), such as, but not limited to, user-interface-inventory-page 1400, user-interface-monitored-spaces-page 1500, user-interface-subscribers-page 1600, a portion thereof, combinations thereof, and/or the like, may be at least automatically populated without direct user manual input into NINCE 367, database 1303, usable by NINCE 367, and/or usable by software running on monitoring-devices 100. FIG. 17D may be a block diagram showing at least some possible communication pathways between tenant subscribers 401, various user interface means 1701 software modules, NINCE 367 software module, and monitoring-devices 100 software modules.

Figure 18A:
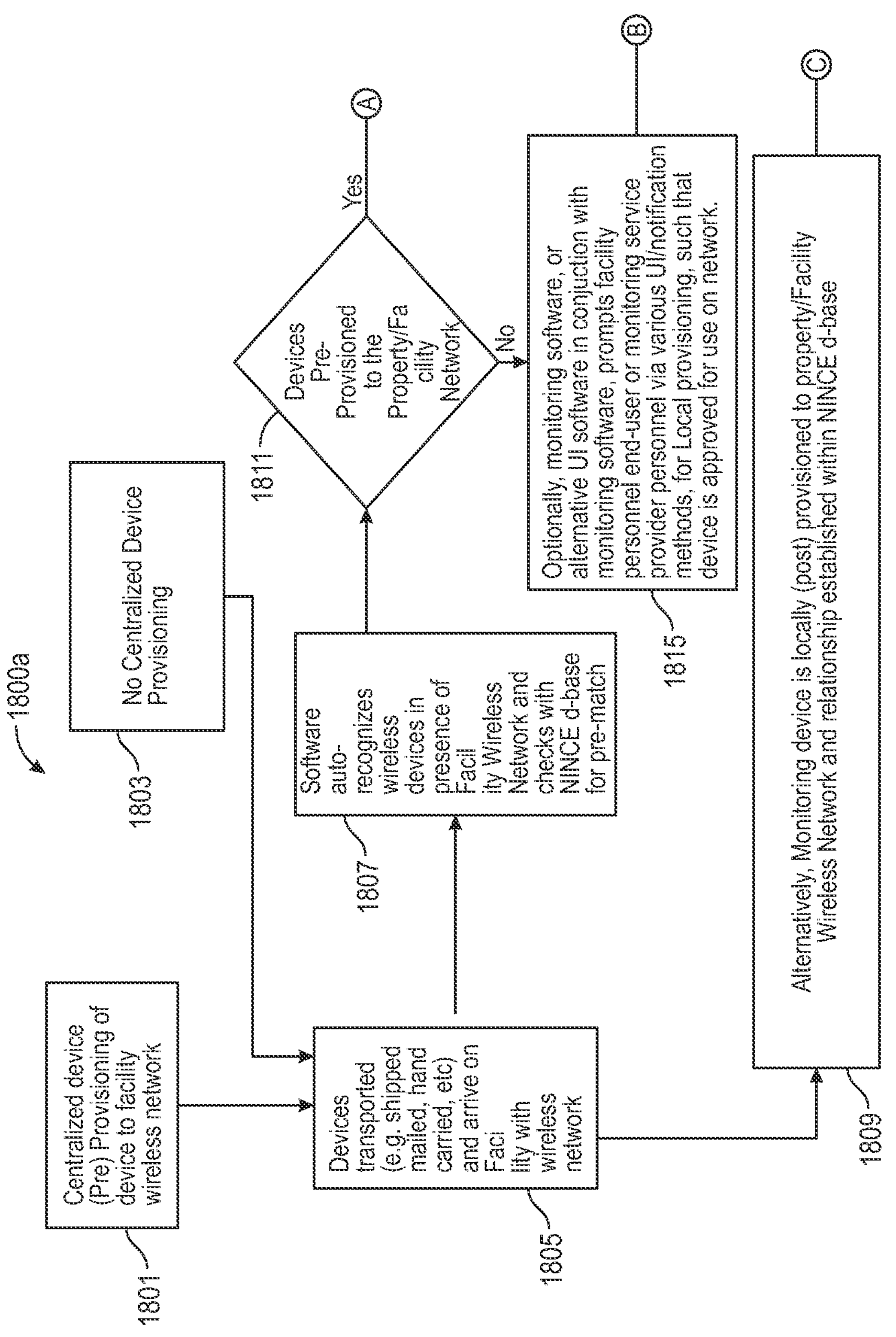
FIG. 18A may show at least some steps in a method of automated tenant and/or subscriber setup with monitored space(s) with monitoring service from monitoring-device(s).
Figure 18A:
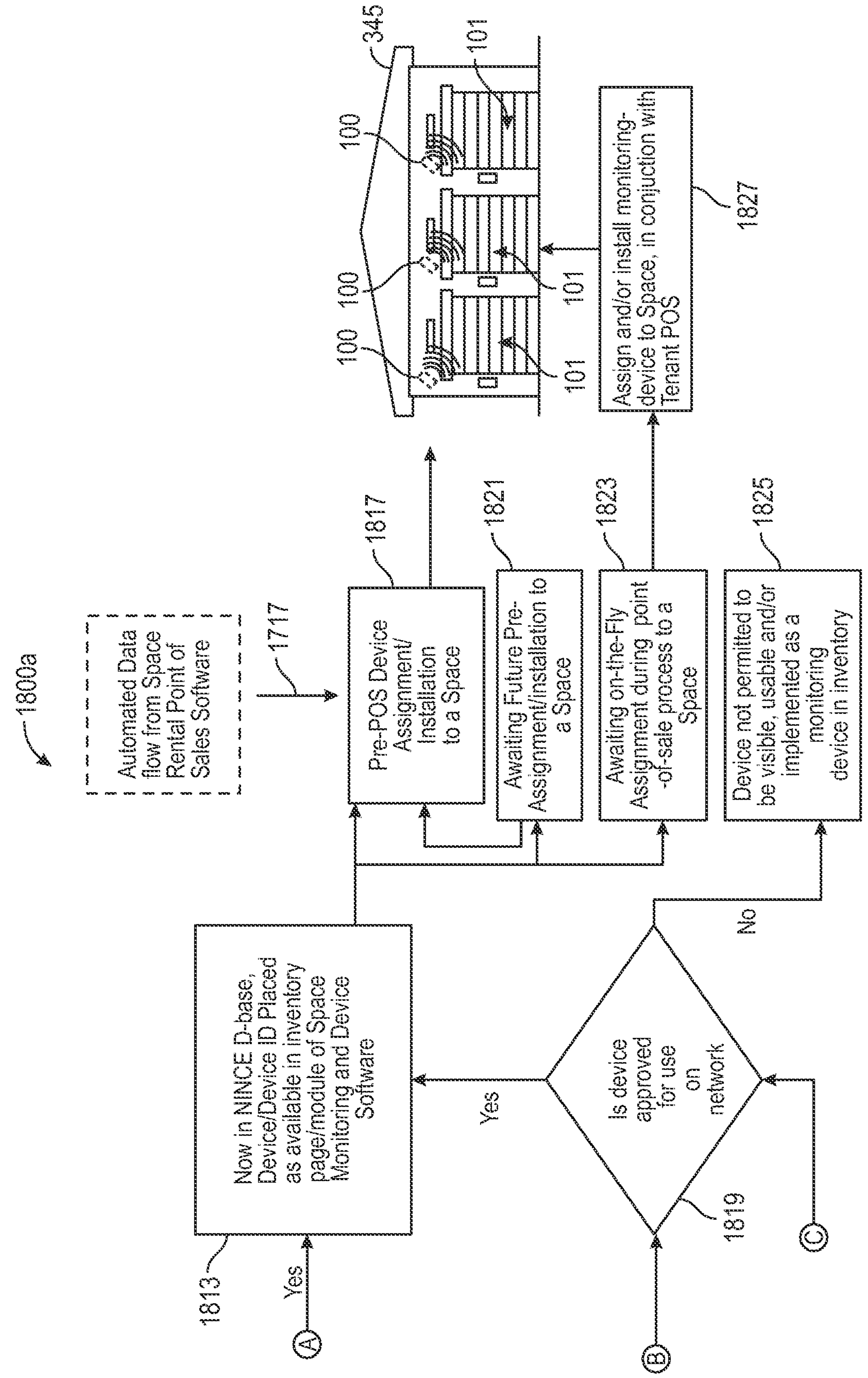

FIG. 18A may show at least some steps in a method 1800*a* of automated tenant 401 setup with monitored space(s) 101 with monitoring from monitoring-device(s) 100. In some embodiments, method 1800*a* may support, enable, and/or facilitate the communications of FIG. 17A and/or FIG. 17B. In some embodiments, method 1800*a* may comprise one or more of the following steps: step 1801, step 1803, step 1805, step 1807, step 1809, step 1811, step 1813, step 1815, step 1817, step 1819, step 1821, step 1823, step (state/status) 1825, and/or step 1827. In some embodiments, one or more of these steps may be executed out of numeral order with respect to the step reference numerals. In some embodiments, one or more of these steps may be optional, skipped, and/or omitted.

Continuing discussing FIG. 18A, in some embodiments, step 1801 may be a step of pre-provisioning one or more monitoring-devices 100 for recognition, integration, and/or functionality with a given (particular) facility 345's monitoring (ad hoc) network, before these one or more monitoring-devices 100 have come into radio communication with the given (particular) facility 345 monitoring (ad hoc) network (e.g., before these one or more monitoring-devices 100 have even been delivered to the given facility 345); or via cellular communications from the one or more monitoring-devices 100 with NINCE 367 and via GPS (or the like) of the one or more monitoring-devices 100, such that NINCE 367 knows when the one or more monitoring-devices 100 have arrived where they should be (e.g., at a given facility 345). Recall, in some embodiments, a given monitoring-device 100 may comprise antenna(s) and/or radio hardware configured for local radio communications and/or configured for longer range cellular communications; and/or may comprise a GPS chipset, module, and/or software for positional determination of the given monitoring-device 100. In some embodiments, pre-provisioning in this context may mean, once a given monitoring-device 100 has been "pre-provisioned" to a particular monitoring network of a given facility 345, once that monitoring-device 100 comes into radio communication with that particular monitoring network (e.g., by being delivered to that given facility 345), that particular monitoring network and/or that monitoring-device 100 may recognize each other and operationally communicate with each other. Recall, that particular monitoring network of a given facility 345, may be in at least intermittent communication with NINCE 367. Thus, once that monitoring-device 100 is recognized by the particular monitoring network, then that monitoring-device 100 may also be operational communication with NINCE 367. Pre-provisioning may be accomplished by programming software of one or more monitoring-devices 100 with an identifier and/or a code of the particular monitoring network of the given facility 345; and/or by programming software that operates the particular monitoring network with identifiers of the one or more monitoring-devices 100; so that once the one or more monitoring-devices 100 and the particular monitoring network come into radio communication with each other, appropriate wireless handshakes may transpire for authentication and network access. In some embodiments, pre-provisioning may occur at location of the provider that provides the one or more monitoring-devices 100 and/or that provides, operates, and/or manages NINCE 367. In some embodiments, execution of step 1801 may progress method 1800*a* to step 1805.

Continuing discussing FIG. 18A, in some embodiments, step 1803 may be a step of no pre-provisioning of monitoring-devices 100 for recognition, integration, and/or functionality with a given (particular) facility 345's monitoring (ad hoc) network. In some embodiments, execution of step 1803 may progress method 1800*a* to step 1805.

Continuing discussing FIG. 18A, in some embodiments, step 1805 may be a step of transporting and/or delivering the monitoring-devices 100, from the step 1801 and/or from the step 1803, to the given facility 345. Such, transportation and/or delivery may utilize any preexisting shipping, transportation, mail, and/or delivery means, system, and/or method. For example, and without limiting the scope of the present invention, such shipping, transportation, mail, and/or delivery may utilize vehicles, motor vehicles, self-driving vehicles, cars, trucks, boats, sips, planes, trains, trolleys, wheeled vehicles, rolling vehicles, track vehicles, walking vehicles, flying vehicles, drones, robots, couriers, people, hand carried, hand delivered, animals, boxes, carts, bags, baskets, combinations thereof, and/or the like. Mail, shipping, parcel delivery, and/or courier services may be used. In some embodiments, execution of step 1805 may progress method 1800*a* to step 1807 (for the one or more monitoring-devices 100 from step 1801) and/or to step 1809 (for the monitoring-devices 100 from step 1803).

Continuing discussing FIG. 18A, in some embodiments, step 1807 may be a step of the particular monitoring network, of the given facility 345, (auto) recognizing the delivered one or more monitoring-devices 100 (if from the step 1801 and were pre-provisioned) and/or that particular monitoring network checking with NINCE 367 if the delivered one or more monitoring-devices 100 are authorized for intended monitoring use on that particular monitoring network. In some embodiments, this (auto) recognition may occur via radio (wireless) communications between the delivered one or more monitoring-devices 100 and that particular monitoring network of the given facility 345; and/or via cellular communications from the one or more monitoring-devices 100 with NINCE 367 and via GPS (or the like) of the one or more monitoring-devices 100, such that NINCE 367 knows when the one or more monitoring-devices 100 have arrived where they should be (e.g., at a given facility 345). In some embodiments, a given monitoring-device 100 with cellular communications means may also be configured for NFC and/or RFID communication means, to enable auto recognition of such a delivered monitoring-device 100 at the given facility 345. Further, in some embodiments a shipper's delivery confirmation and/or delivery acceptance of a given package of delivered monitoring-device(s) 100 may be used as a means to auto recognize when those delivered monitoring-device(s) 100 have arrived at a given facility 345 (e.g., by API linkage between NINCE 367 and software of the shipper). For example, and without limiting the scope of the present invention, a shipper may be selected: FedEx, UPS, USPS, DHL, and/or the like. Note, once NINCE 367 recognizes delivery of monitoring-device(s) 100 to a given facility 345, those correctly delivered monitoring-device(s) 100 may automatically appear in inventory for that given facility 345 (per software rule(s), code, and/or instruction(s) of NINCE 367). In some embodiments, the wireless approved monitoring network of a given facility 345, that may be in communication with NINCE 367, may be the primary ad hoc network setup at that facility 345 for use with monitoring-device(s) 100 (e.g., that may use gateway(s) and/or hub(s) 341/361); and/or could be another networking means such as using a secondary NFC and/or RFID network at the facility 345 office (or workshop or the like); whereas, a secondary (monitoring) network of the facility 345 might not provide network coverage over the entire facility 345. In some embodiments, the monitoring network(s) of a given facility 345 may be at least in part established by the radios (antennas) of the facility's present monitoring-devices 100 with respect to the broadcasting, transmission, and/or receiving coverage provided by those radios (antennas), and/or local networking access by provided by gateway(s) and/or hub(s) 341/361]. Recall, in some embodiments, a given monitoring-device 100 may comprise at least one radio (antenna) and could have two different radios (antennas). In some embodiments, the secondary network radio (or in some cases the primary radio) may be a radio that will not cover the entire facility 345 campus and may thus be more oriented toward closer distance/near-field type range and use for picking up the monitoring-devices 100 for identification and/or local provisioning. As another example, in some embodiments, as a monitoring-device(s) 100 receiving process of a given facility 345, a presence identifier 1211 (at the given facility 345), using RFID, NFC, QR codes, UPCs, and/or the like may be used to recognize arrived monitoring-device(s) 100. In some embodiments, if facility 345 delivered monitoring-devices 100 were from step 1803, then see step 1809. In some embodiments, execution of step 1807 may progress method 1800*a* to step 1811.

Continuing discussing FIG. 18A, in some embodiments, step 1809 may be a step of post-provisioning the delivered monitoring-devices 100, from the step 1803, to the particular monitoring network of the given facility 345. In some embodiments, this may be done locally onsite at/on the given facility 345. In some embodiments, this may be done, at least in part, by authorized personnel, such as, but not limited to, facility operator 405, approved third-party installer, maintenance personnel, tenant subscriber 401, user approved by tenant subscriber 401, user approved by facility operator 405, combinations thereof, and/or the like. In some embodiments, execution of step 1809 may progress method 1800*a* to step 1819.

Continuing discussing FIG. 18A, in some embodiments, step 1811 may be a step of checking (determining) if the pre-provisioning of the delivered and recognized one or more monitoring-devices 100 was successful. In some embodiments, the one or more monitoring-devices 100 and/or the particular monitoring network of the given facility 345 may communicate with NINCE 367, and NINCE 367 may make this check (determination). In some embodiments, NINCE 367 may make this check (determination) by comparing what identifiers and/or codes these delivered one or more monitoring-devices 100 are (currently) reporting to NINCE 367 as compared to what identifiers and/or codes had been previously non-transitorily stored in NINCE 367's storage and/or database 1303 (e.g., done in the step 1801 pre-provisioning step). That is, may be done via a look up table comparison performed by NINCE 367. In some embodiments, execution of step 1811 may progress method 1800*a* to step 1813 (e.g., if step 1811 check was successful) or to step 1815 (e.g., if step 1811 check was unsuccessful).

Continuing discussing FIG. 18A, in some embodiments, step 1813 may be a step of designating delivered (arrived) provisioned one or more monitoring-devices 100 as "in inventory" for that particular facility 345. In some embodiments, once step 1811 successfully executes, then in step 1813 such monitoring-devices 100 that have been confirmed for intended use on that particular monitoring network of that given facility 345, may automatically populate and show up "in inventory," being displayed in the user-interface-inventory-page 1400 for that given facility 345. Note, in some embodiments, prior to monitoring-device(s) 100 being designated as "in inventory" for a given facility 345, those monitoring-device(s) 100 may be still be visible and/or in communication with NINCE 367; and/or may have other status designations, such as, but not limited to: not usable status, ready to be provisioned, provisioned by not yet shipped, awaiting shipping, awaiting shipper pickup, in shipment, in transit, being delivered, out for delivery, awaiting arrival, some other disposition status, combinations thereof, and/or the like. In some embodiments, execution of step 1813 may progress method 1800*a* to step 1817, to step/state 1821, and/or to step/state 1823.

Continuing discussing FIG. 18A, in some embodiments, step 1815 may be a step of local-provisioning the delivered monitoring-devices 100, from the step 1801 but that failed in the step 1811 check. Note in some embodiments, it may be intentional to not pass the step 1811 check because it may be intended to execute local provisioning. In some embodiments, this may be done locally onsite at/on the given facility 345. In some embodiments, this may be done, at least in part, by authorized personnel, such as, but not limited to, facility operator 405, approved third-party installer, maintenance personnel, tenant subscriber 401, user approved by tenant subscriber 401, user approved by facility operator 405, combinations thereof, and/or the like. In some embodiments, such local-provisioning may be done by the authorized personnel interfacing with a user-device, wherein the software running on the user-device may be interfaced with NINCE 367. In some embodiments, execution of step 1815 may progress method 1800*a* to step 1819.

Continuing discussing FIG. 18A, in some embodiments, step 1817 may be a step of physically installing and/or of assigning (associating) the monitoring-device(s) 100 to a given space 101 of that given facility 345. In some embodiments, if the assigning (associating) of the monitoring-device(s) 100 to the given space 101 occurs prior to that space 101 being rented (leased), then this may be done in user-interface-inventory-page 1400. In some embodiments, if the assigning (associating) of the monitoring-device(s) 100 to the given space 101 occurs prior to that space 101 being rented (leased), then this may correspond to (result in) a monitoring-device 100 in inventory, but in a pre-installed state.

Continuing discussing FIG. 18A, in some embodiments, step 1819 may be a step of checking (determining) if the locally/post-provisioned monitoring-devices 100 (e.g., from step 1809 and/or step 1815) was successful or not. In some embodiments, these local- and/or post-provisioned monitoring-devices 100 and/or the particular monitoring network of the given facility 345 may communicate with NINCE 367, and NINCE 367 may make this check (determination). In some embodiments, NINCE 367 may make this check (determination) by comparing what identifiers and/or codes these local- and/or post-provisioned monitoring-devices 100 are (currently) reporting to NINCE 367 as compared to what identifiers and/or codes had been previously non-transitorily stored in NINCE 367's storage and/or database 1303 (e.g., done in the step 1809 and/or in step 1815 post- and/or local-provisioning step(s)). That is, may be done via a look up table comparison performed by NINCE 367. In some embodiments, execution of step 1819 may progress method 1800*a* to step 1813 (e.g., if step 1819 check was successful) or to step 1825 (e.g., if step 1819 check was unsuccessful).

Continuing discussing FIG. 18A, in some embodiments, step 1821 may be a step of NINCE 367, that particular monitoring network of the given facility 345, and those in inventory monitoring-devices 100 at that facility 345 (e.g., clearing step 1813 and/or step 1817), all being ready to accept future assignment and/or physical installment of those monitoring-devices 100 to spaces 101 at that facility 345. If the space(s) 101 have not yet been rented (leased) (e.g., are vacant), then use of user-interface-inventory-page 1400 may be used for step 1821. If the space(s) 101 have been rented (leased), then use of user-interface-monitored-spaces-page 1500 may be used for step 1821 and see step 1823. In some embodiments, execution of step 1821 may progress method 1800*a* to step 1817.

Continuing discussing FIG. 18A, in some embodiments, step 1823 may be a step of NINCE 367, that particular monitoring network of the given facility 345, and those in inventory monitoring-devices 100 at that facility 345 (e.g., clearing step 1813 and/or step 1817), all being ready to accept future assignment and/or physical installment of those monitoring-devices 100 to spaces 101, at that facility 345, that are rented or that are concurrently being rented by the POS software. Here, the space(s) 101 have been rented (leased) or are in the active process of being rented (lease) and as such then use of user-interface-monitored-spaces-page 1500 may be used for step 1823. In some embodiments, execution of step 1823 may progress method 1800*a* to step 1827.

Continuing discussing FIG. 18A, in some embodiments, step 1823 may be a step of assigning and/or physically installing 100 to the particular space 101, in conjunction (concurrently) with the tenant's 401 POS (point-of-sale) where there is an on-demand request for a monitoring service in the particular space 101 that did not have monitoring service pre-installed and pre-assigned, but where a new tenant 401 may desire such a monitoring service thereof or an existing tenant 401 of that particular space 101 desires their formerly non-monitored space 101 to be upgraded to a monitored space 101.

In some embodiments, once method 1800*a* has completed step 1813; and/or is in step 1817 and/or step 1827; and/or has completed step 1817 and/or step 1827, then information 1717 and/or 1719 flows, including those facilitated by use of APIs (application program interfaces) may be facilitated (see e.g., FIG. 18A, FIG. 17A and/or FIG. 17B).

Continuing discussing FIG. 18A, in some embodiments, state 1825 may be a state (status) where monitoring-device(s) 100 delivered to that facility 345 are not ready for intended use in the particular monitoring network of that facility 345. In some embodiments, any such monitoring-device(s) 100, in the user-interface-inventory-page 1400 may show up in an unavailable inventory list. In some embodiments, any such monitoring-device(s) 100 may be shipped back to the provider or their agent (e.g., for replacement or refurbishment).

Figure 18B:
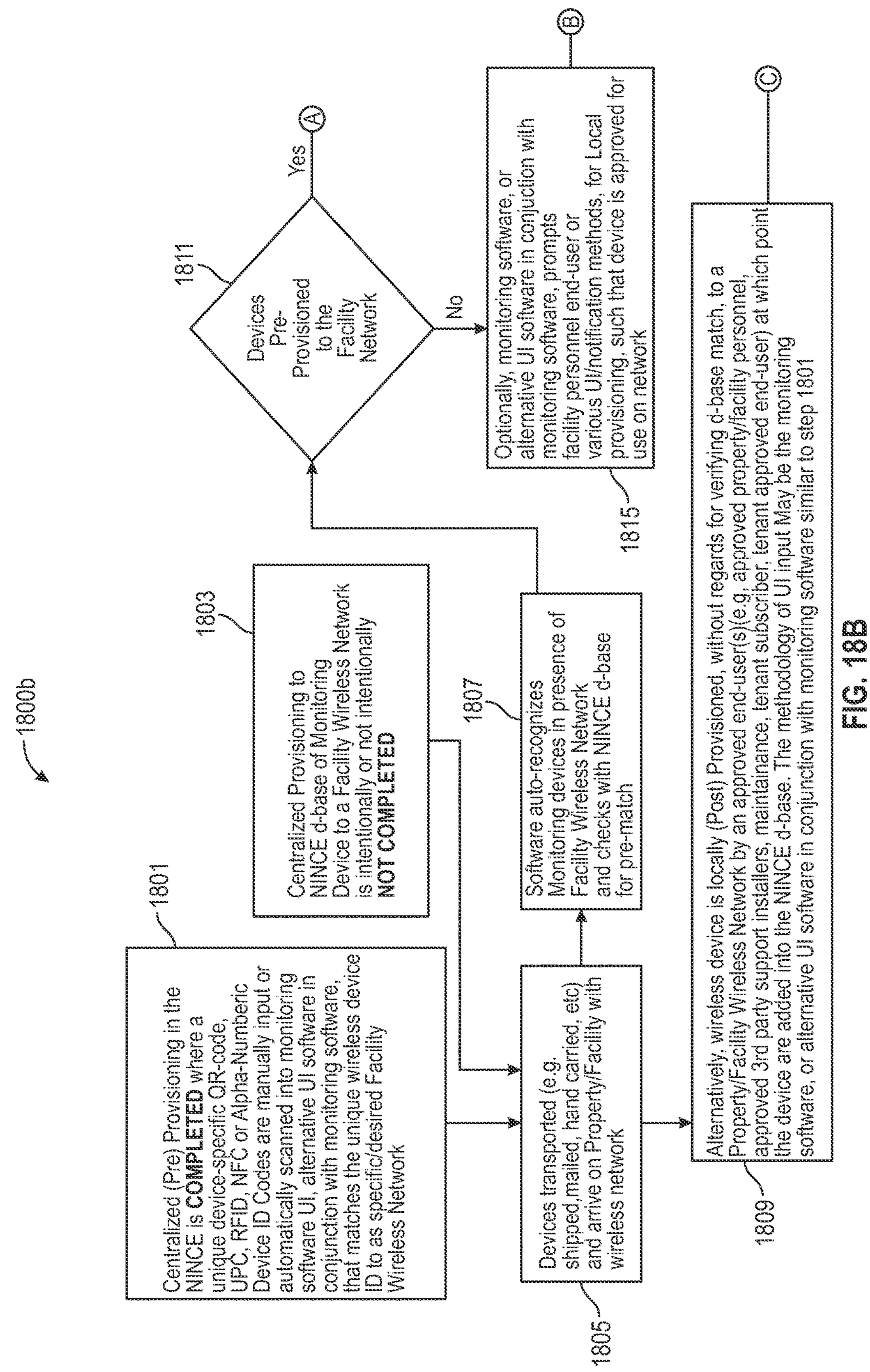
FIG. 18B may show at least some steps in a method of automated tenant and/or subscriber setup with monitored space(s) with monitoring service from monitoring-device(s).
Figure 18B:
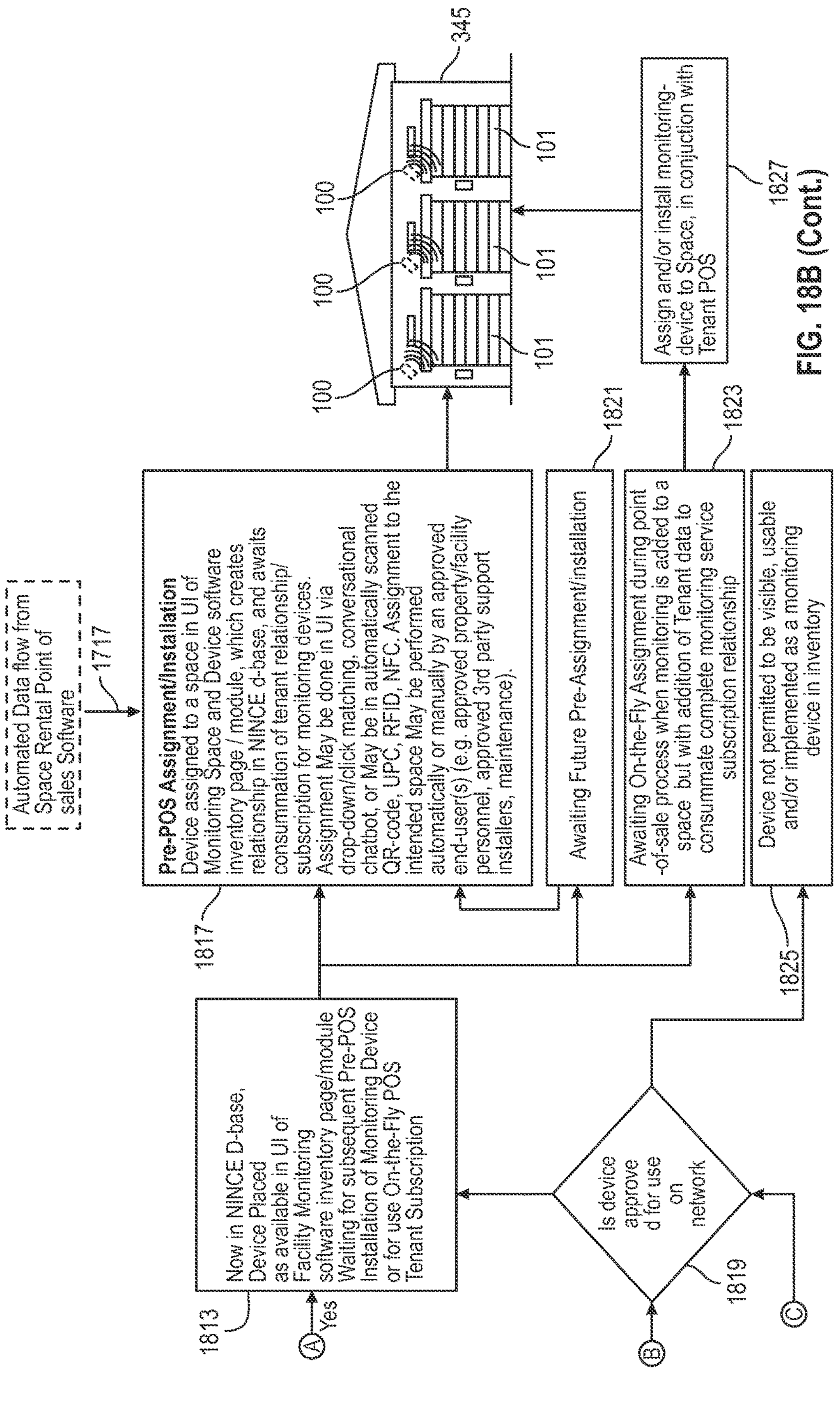

FIG. 18B may show at least some steps in a method 1800*b* of automated tenant and/or subscriber 401 setup with monitored space(s) 101 with monitoring from monitoring-device(s) 100. In some embodiments, method 1800*b* may support, enable, and/or facilitate the communications of FIG. 17A and/or FIG. 17B. In some embodiments, method 1800*b* may comprise one or more of the following steps: step 1801, step 1803, step 1805, step 1807, step 1809, step 1811, step 1813, step 1815, step 1817, step 1819, step 1821, step 1823, step (state/status) 1825, and/or step 1827. In some embodiments, one or more of these steps may be executed out of numeral order with respect to the step reference numerals. In some embodiments, one or more of these steps may be optional, skipped, and/or omitted. In some embodiments, method 1800*b* may be substantially similar to method 1800*a*, except method 1800*b* may show and/or include some additional details. In some embodiments, method 1800*a* may be a more general (broader) case as compared to method 1800*b*, which may be more specific example oriented. Thus, the prior discussion of method 1800*a* steps may be applied to the steps of method 1800*b*; and the discussion of such steps below for method 1800*b* may merely discuss some additional details for the given step.

Continuing discussing FIG. 18B, in some embodiments, in the step 1801 pre-provisioning, associating (assigning) the one or more monitoring-devices 100 to be assigned (associated) with a given facility 345 (and that particular monitoring network at that given facility 345) may be done by associating (assigning) identifiers (and/or codes) of the one or more monitoring-devices 100 with that given facility 345 in NINCE 367. In some embodiments, the identifiers (and/or codes) of the one or more monitoring-devices 100 may be inputted into NINCE 367 by: scanning QR codes on the one or more monitoring-devices 100 using a provider user-device (with appropriate camera(s)) that is in communication with NINCE 367; the provider user-device (with appropriate RFID and/or NFC antenna(s)) that is in communication with NINCE 367 scanning, reading, and/or interrogating RFID and/or NFC tags of the one or more monitoring-devices 100; scanning bar codes on the one or more monitoring-devices 100 using a provider user-device (with appropriate camera(s)) that is in communication with NINCE 367; scanning visual codes on the one or more monitoring-devices 100 using a provider user-device (with appropriate camera(s)) that is in communication with NINCE 367; the user manually entering identifiers and/or codes on the one or more monitoring-devices 100 using a provider user-device that is in communication with NINCE 367; combinations thereof; and/or the like. In some embodiments pre-provisioning may be done by the monitoring provider company, the monitoring service company, a software company, a value-added installer, corporate operations of the facility 345, combinations thereof, and/or the like.

Continuing discussing FIG. 18B, in some embodiments, in the step 1803 no pre-provisioning may be intentional or accidental.

Continuing discussing FIG. 18B, in some embodiments, with respect to execution and/or completion of step 1813 the newly appearing "in inventory" monitoring-devices 100 may not yet be assigned (associated) with a given space 101. That is, these "in inventory" monitoring-devices 100 may not be the "pre-installed" designation. For example, and without limiting the scope of the present invention, in the user-interface-inventory-page 1400 example shown in FIG. 14A, these "in inventory" (loose) monitoring-devices 100 corresponding to completion of step 1813 may be monitoring-device(s) 100 ID "AV00187" and/or "AW00494, since neither of those monitoring-devices 100 are currently assigned (associated) with a given space 101.

Continuing discussing FIG. 18B, in some embodiments, with respect to step 1817 the monitoring-device 100 assignment (association) (via its unique identifier) to a given space 101 in NINCE 367, may be a relationship in NINCE 367 database 1303 (between that monitoring-device 100 and that space 101) (and may be displayed in user-interface-inventory-page 1400); at which point NINCE 367 may await consummation of tenant 401 relationship/subscription for monitoring services of their rented space(s) 101 (if not yet completed). In some embodiments, this assignment (association) may be done in the UI (user interface, e.g., user-interface-inventory-page 1400) via drop-down/click matching, conversational chatbot, or may be automatically by scanned QR-code, UPC, RFID, NFC, or may be automated by monitoring-device 100 positional discovery means (e.g., by network interactions and/or by GPS), combinations thereof, and/or the like. In some embodiments, this assignment (association) to the intended space 101 may be performed automatically or manually by an approved end-user (such as, but not limited to, approved property/facility personnel 405, approved third-party support installers, facility operator 405 maintenance, combinations thereof, and/or the like). In some embodiments, in conjunction with the monitoring-device 100 assignment to the space 100 (whether before, during, after or simultaneously), the same personnel or different personnel who are permitted access to the space 101, may physically install the monitoring-device 100 for monitoring of that particular space 101.

Continuing discussing FIG. 18B, in some embodiments, with respect to step 1823 the awaiting of the on-the-fly assignment (association) between a monitoring-device 100 and a space 101, during point-of-sale (POS) process, monitoring service is added to that now rented space 101 using the assignment (association) and/or physical installment process equivalent to step 1817, but now with the addition of tenant subscriber 401 data (e.g., via API information flow 1717 or 1721) to consummate complete monitoring service subscription relationship.

Figure 19A:
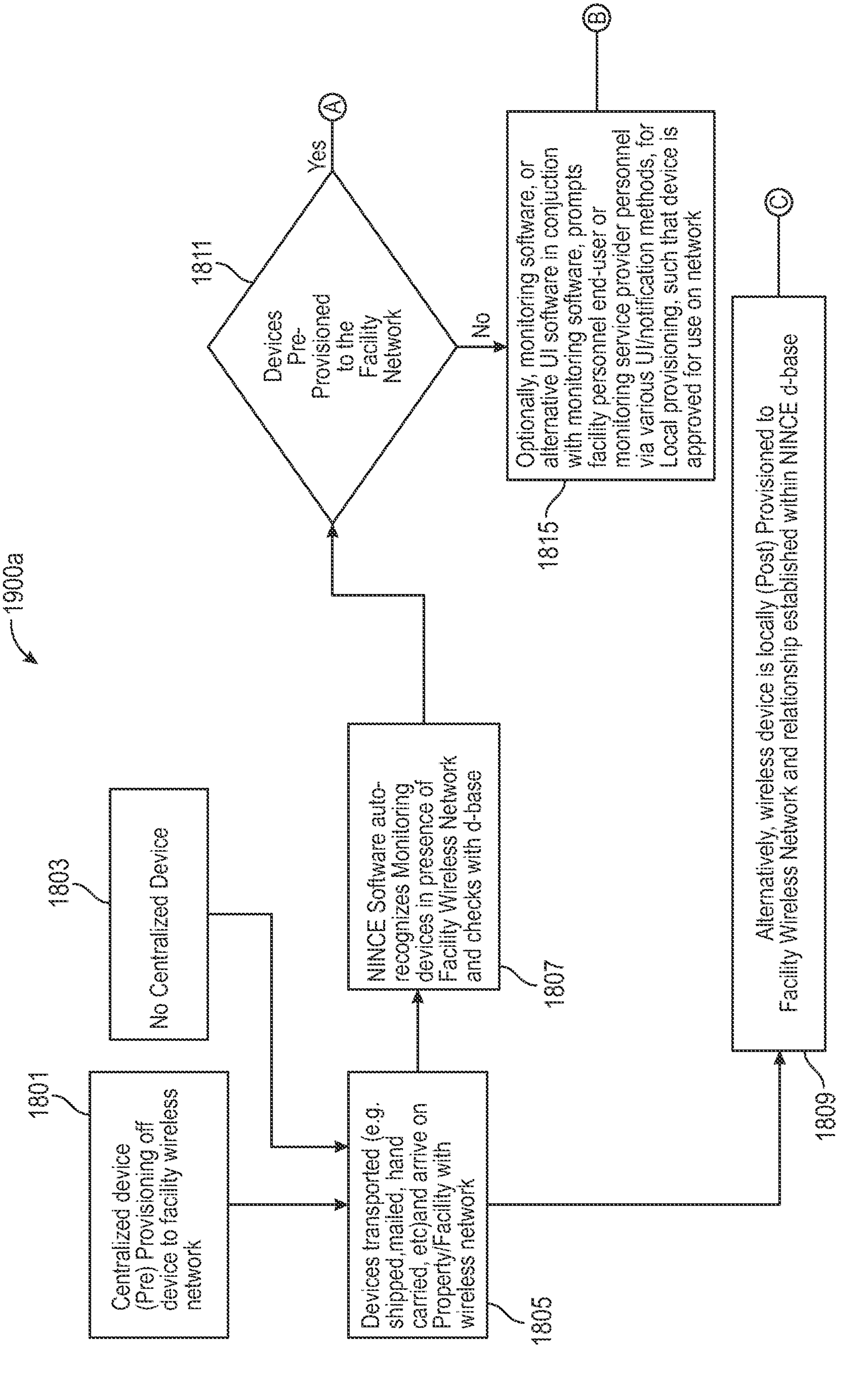
FIG. 19A may show at least some steps in a method of automated tenant and/or subscriber setup with monitored space(s) with monitoring service from monitoring-device(s).
Figure 19A:
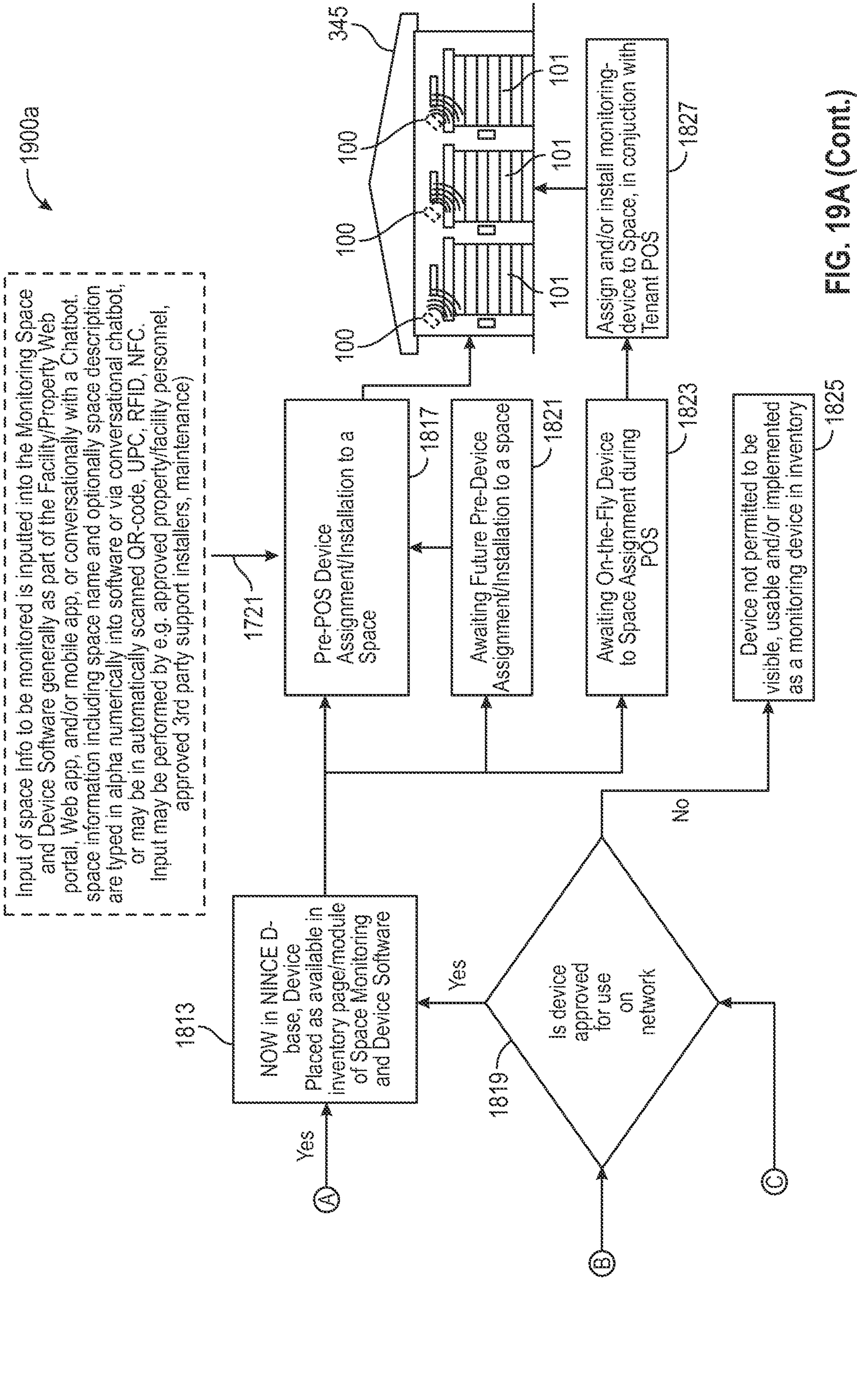

FIG. 19A may show at least some steps in a method 1900*a* of automated tenant and/or subscriber 401 setup with monitored space(s) 101 with monitoring from monitoring-device(s) 100. In some embodiments, method 1900*a* may support, enable, and/or facilitate the communications of FIG. 17C. In some embodiments, method 1900*a* may comprise one or more of the following steps: step 1801, step 1803, step 1805, step 1807, step 1809, step 1811, step 1813, step 1815, step 1817, step 1819, step 1821, step 1823, step (state/status) 1825, and/or step 1827. In some embodiments, one or more of these steps may be executed out of numeral order with respect to the step reference numerals. In some embodiments, one or more of these steps may be optional, skipped, and/or omitted. In some embodiments, method 1900*a* may be substantially similar to method 1800*a*, except in method 1900*a* information flow 1721 may replace information API flow 1717 of method 1800*a*. In some embodiments, input of space(s) 101 info into NINCE 367, database 1303, and/or the overall displayable user-interface (GUI), may be indicated by informational flow 1721 in method 1900*a* and/or in FIG. 19A. In some embodiments, input of space(s) 101 info into NINCE 367, database 1303, and/or the overall displayable user-interface (GUI), may be done by facility 345 web portal, web app, and/or mobile app, conversationally with a chatbot, combinations thereof, and/or the like. In some embodiments, space information, such as, but not limited to, space name (identifier) and optionally space description, may be inputted into NINCE 367, database 1303, and/or the overall displayable user-interface (GUI) by manual user input, via conversational chatbot, and/or may be automatically scanned using QR-codes, UPCs, RFIDs, NFCs, combinations thereof, and/or the like.

In some embodiments, such input 1721 may be performed by approved facility 345 personnel 405, approved third-party support installers, facility operator 405 maintenance, combinations thereof, and/or the like.

Figure 19B:
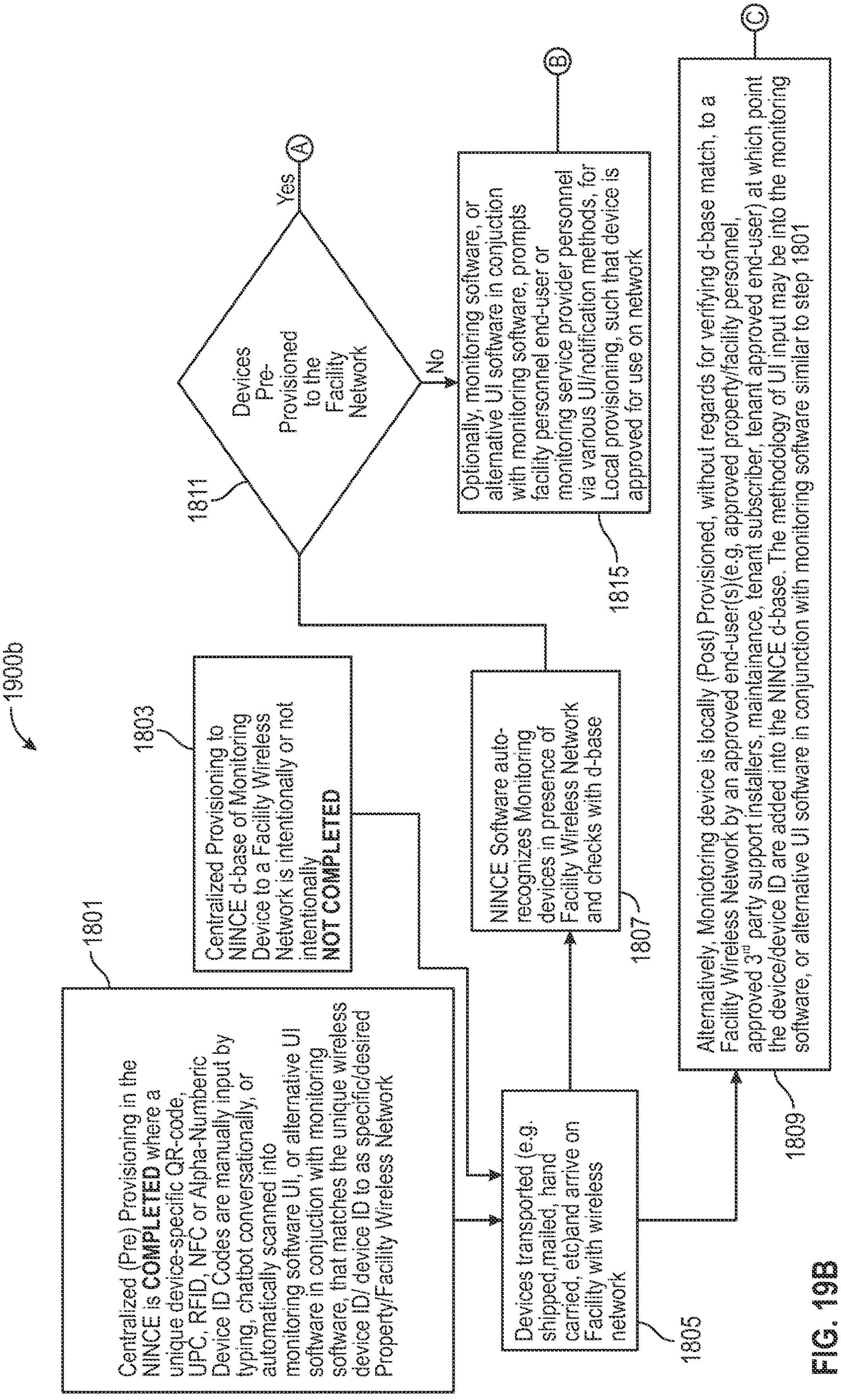
FIG. 19B may show at least some steps in a method of automated tenant and/or subscriber setup with monitored space(s) with monitoring service from monitoring-device(s).
Figure 19B:
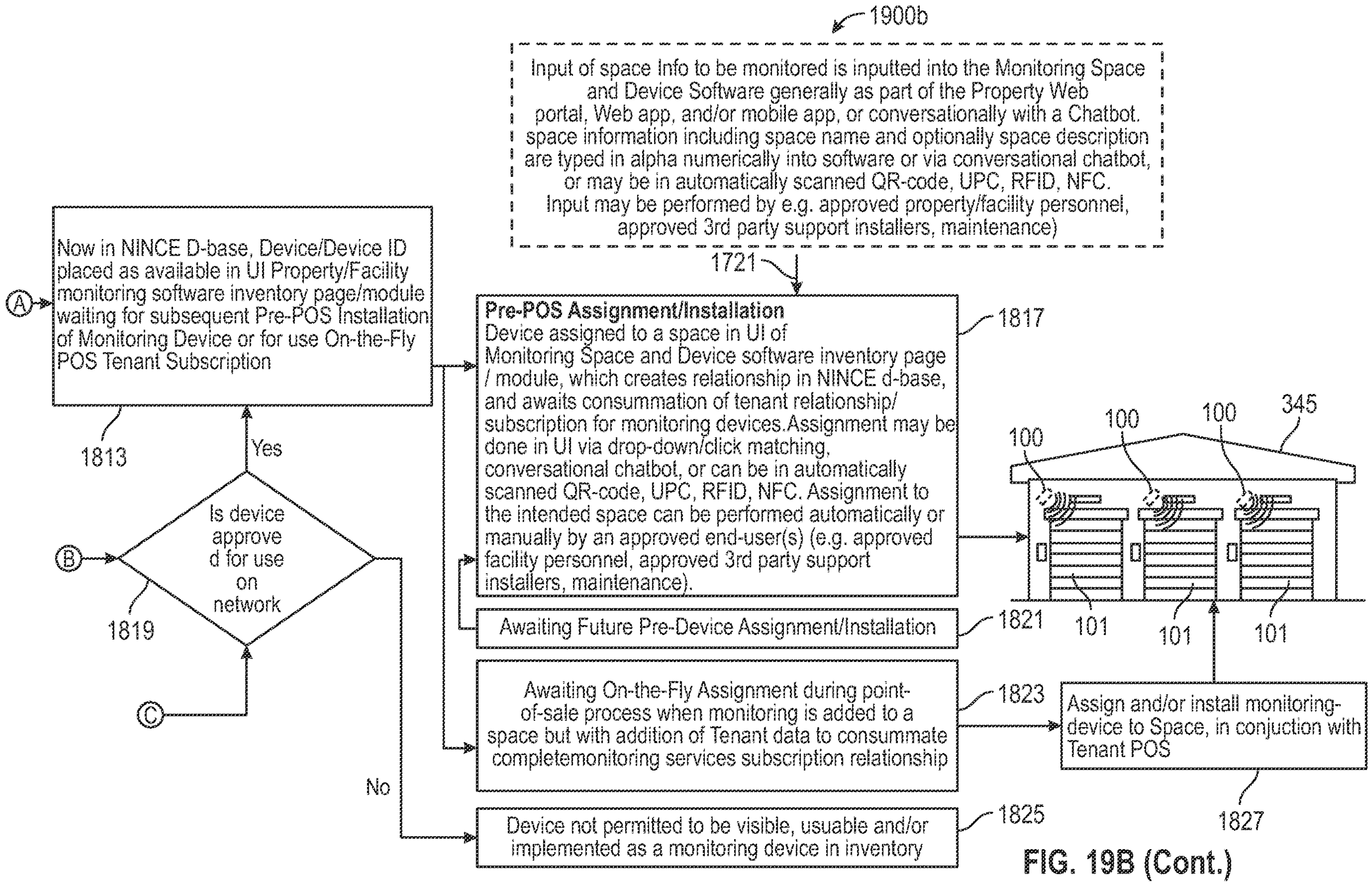

FIG. 19B may show at least some steps in a method 1900*b* of automated tenant and/or subscriber 401 setup with monitored space(s) 101 with monitoring from monitoring-device(s) 100. In some embodiments, method 1900*b* may support, enable, and/or facilitate the communications of FIG. 17C. In some embodiments, method 1900*b* may comprise one or more of the following steps: step 1801, step 1803, step 1805, step 1807, step 1809, step 1811, step 1813, step 1815, step 1817, step 1819, step 1821, step 1823, step (state/status) 1825, and/or step 1827. In some embodiments, one or more of these steps may be executed out of numeral order with respect to the step reference numerals. In some embodiments, one or more of these steps may be optional, skipped, and/or omitted. In some embodiments, method 1900*b* may be substantially similar to method 1900*a*, except method 1900*b* may show and/or include some additional details. In some embodiments, method 1900*a* may be a more general (broader) case as compared to method 1900*b*, which may be more specific example oriented. Thus, mechanics of method 1900*a* steps may be applied to the steps of method 1900*b*; and the discussion of such steps for method 1900*b* may merely discuss some additional details for the given step. For these additional details of method 1900*b*, see the above discussion of method 1800*b* and/or of FIG. 18B. In some embodiments, method 1900*b* may be substantially similar to method 1800*b*, except in method 1900*b* information flow 1721 may replace information API flow 1717 of method 1800*b*.

Figure 20A:
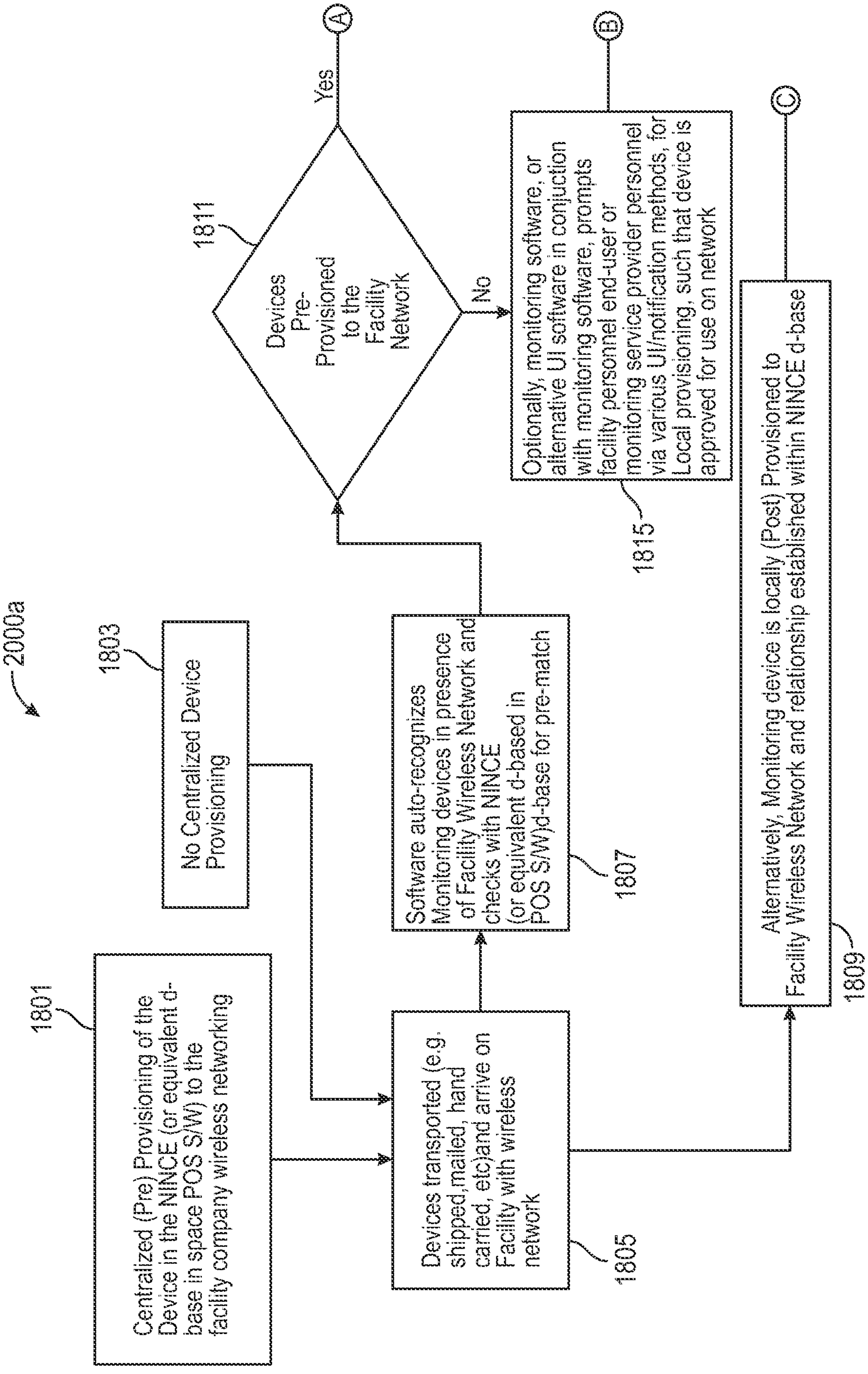
FIG. 20A may show at least some steps in a method of automated tenant and/or subscriber setup with monitored space(s) with monitoring service from monitoring-device(s).
Figure 20A:
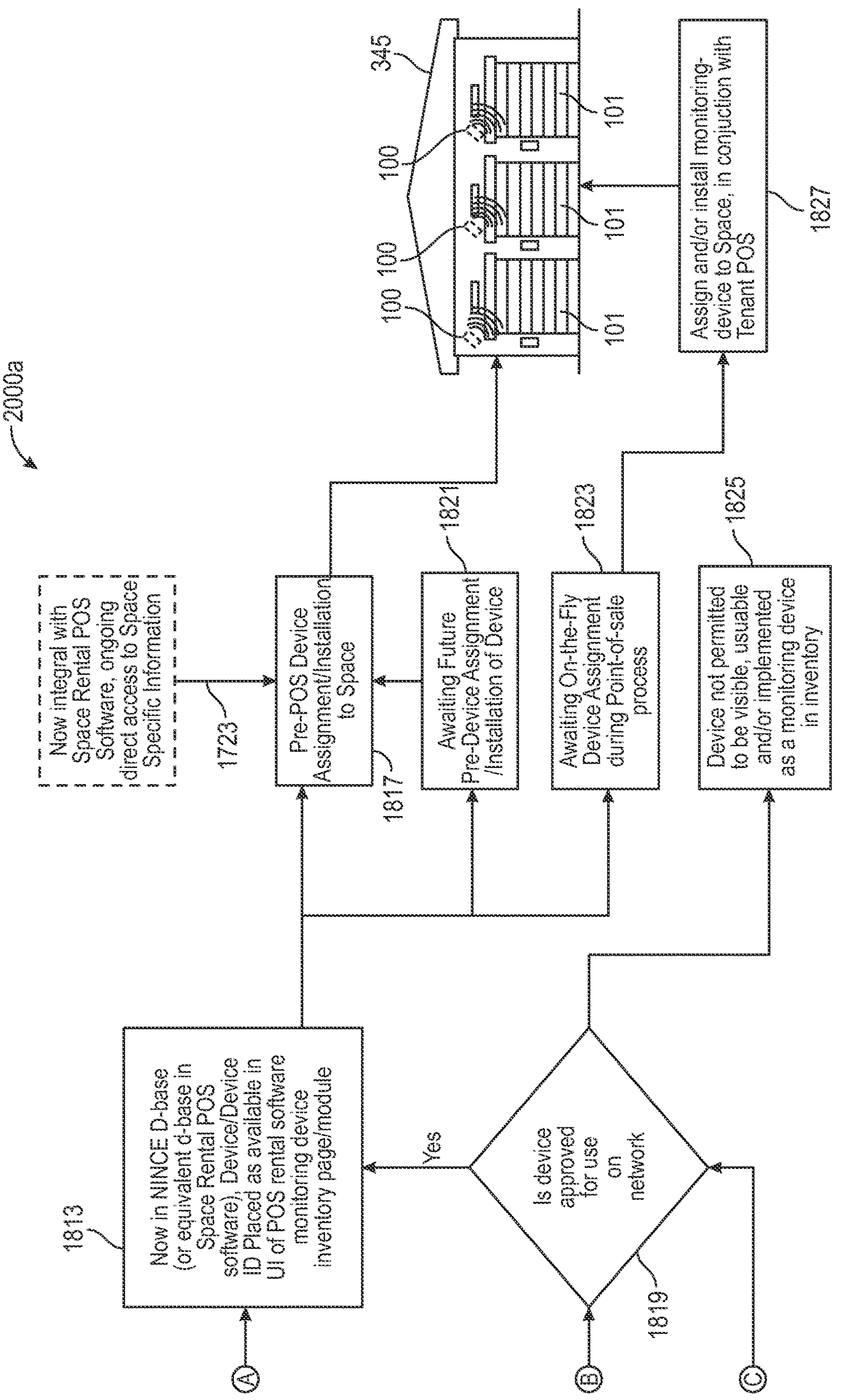

FIG. 20A may show at least some steps in a method 2000*a* of automated tenant and/or subscriber 401 setup with monitored space(s) 101 with monitoring from monitoring-device (s) 100. In some embodiments, method 2000*a* may support, enable, and/or facilitate the communications of FIG. 17D. In some embodiments, method 2000*a* may comprise one or more of the following steps: step 1801, step 1803, step 1805, step 1807, step 1809, step 1811, step 1813, step 1815, step 1817, step 1819, step 1821, step 1823, step (state/status) 1825, and/or step 1827. In some embodiments, one or more of these steps may be executed out of numeral order with respect to the step reference numerals. In some embodiments, one or more of these steps may be optional, skipped, and/or omitted. In some embodiments, method 2000*a* may be substantially similar to method 1800*a*, except in method 2000*a* information flow 1723 may replace information API flow 1717 of method 1800*a*.

Figure 20B:
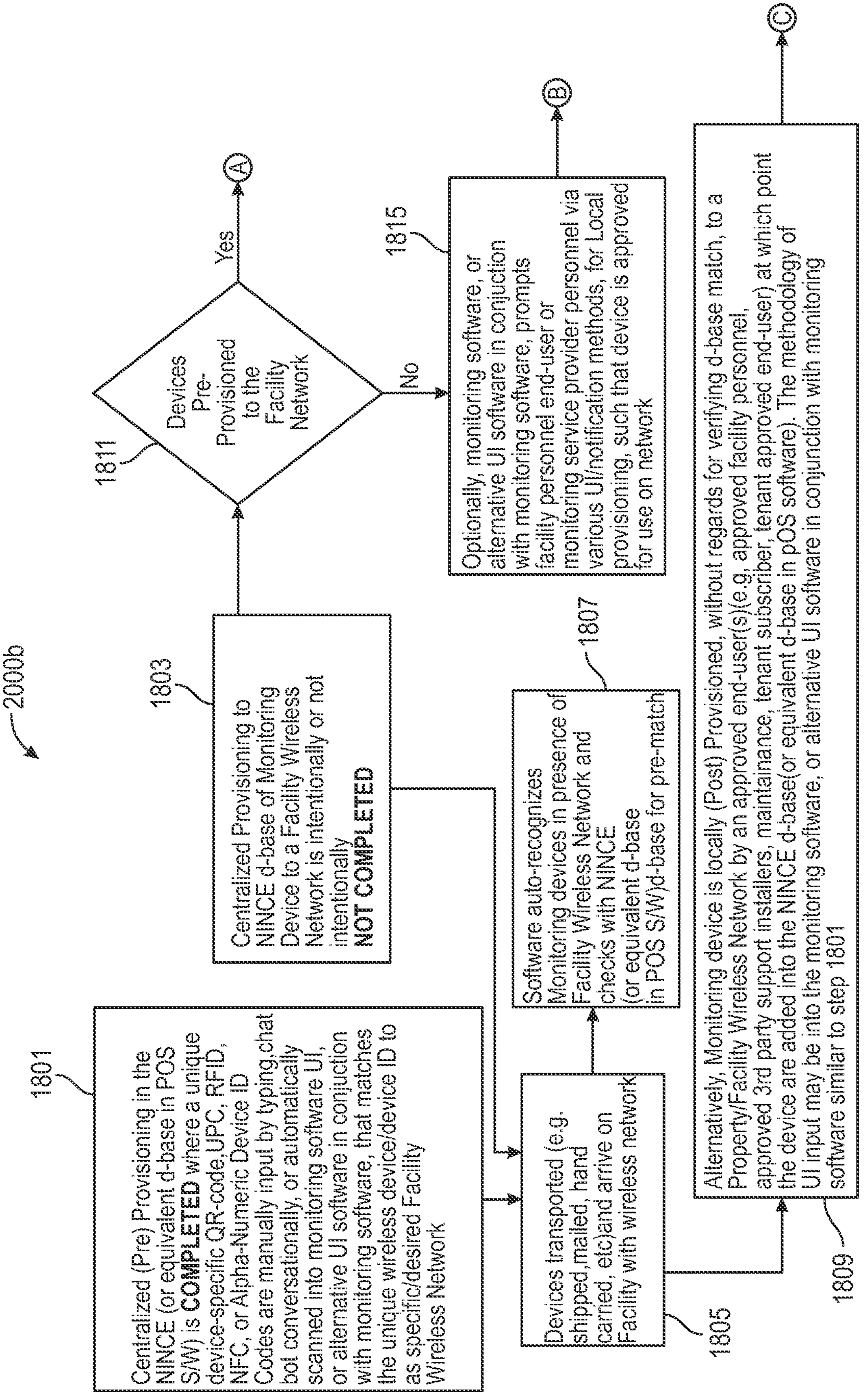
FIG. 20B may show at least some steps in a method of automated tenant and/or subscriber setup with monitored space(s) with monitoring service from monitoring-device(s).
Figure 20B:
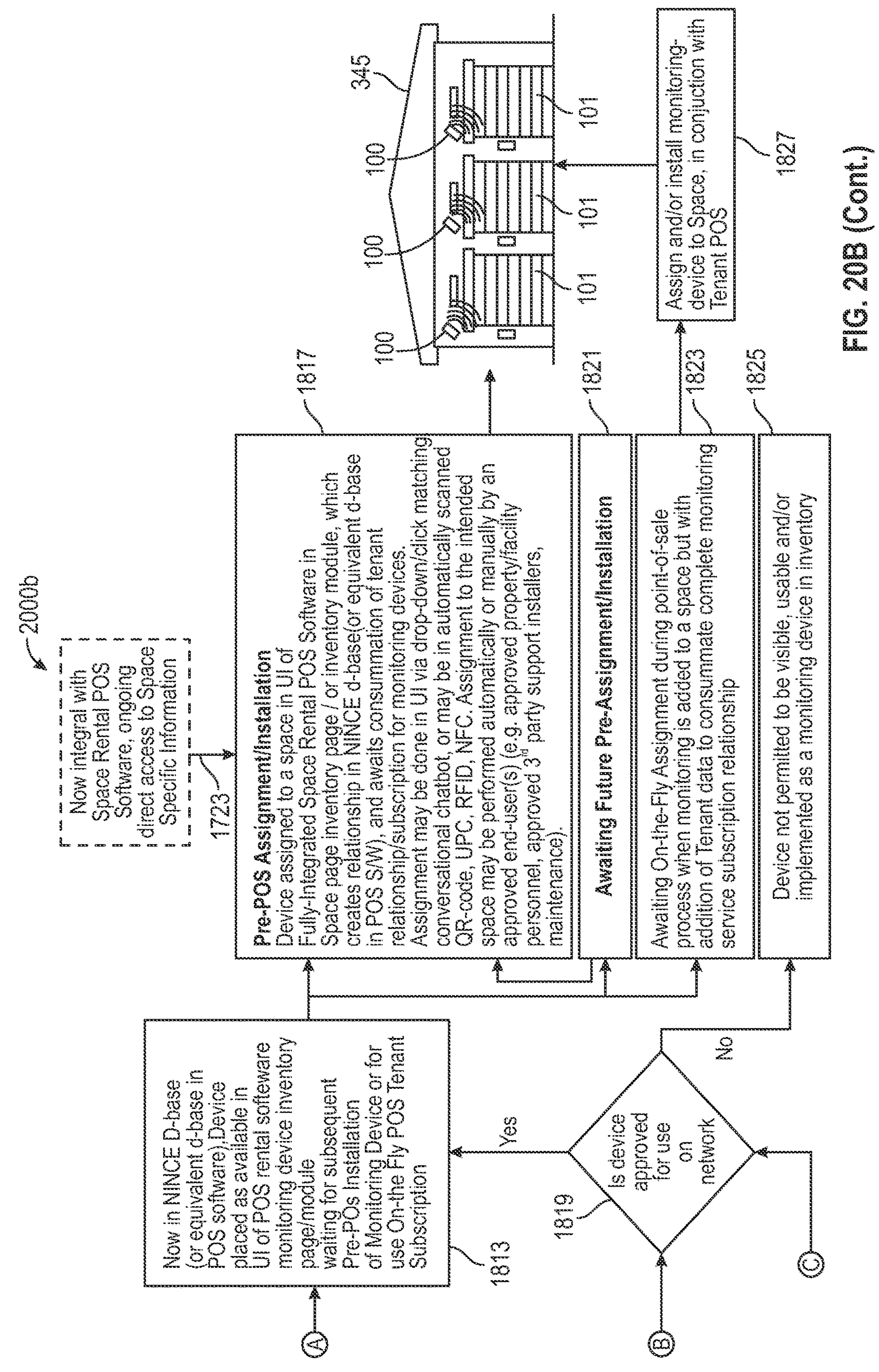

FIG. 20B may show at least some steps in a method 2000*b* of automated tenant and/or subscriber 401 setup with monitored space(s) 101 with monitoring from monitoring-device(s) 100. In some embodiments, method 2000*b* may support, enable, and/or facilitate the communications of FIG. 17C. In some embodiments, method 2000*b* may comprise one or more of the following steps: step 1801, step 1803, step 1805, step 1807, step 1809, step 1811, step 1813, step 1815, step 1817, step 1819, step 1821, step 1823, step (state/status) 1825, and/or step 1827. In some embodiments, one or more of these steps may be executed out of numeral order with respect to the step reference numerals. In some embodiments, one or more of these steps may be optional, skipped, and/or omitted. In some embodiments, method 2000*b* may be substantially similar to method 2000*a*, except method 2000*b* may show and/or include some additional details. In some embodiments, method 2000*a* may be a more general (broader) case as compared to method 2000*b*, which may be more specific example oriented. Thus, the mechanics of method 2000*a* steps may be applied to the steps of method 2000*b*; and the discussion of such steps for method 2000*b* may merely discuss some additional details for the given step. For these additional details of method 2000*b*, see the above discussion of method 1800*b* and/or of FIG. 18B. In some embodiments, method 2000*b* may be substantially similar to method 1800*b*, except in method 2000*b* information flow 1723 may replace information API flow 1717 of method 1800*b*.

Figure 21:
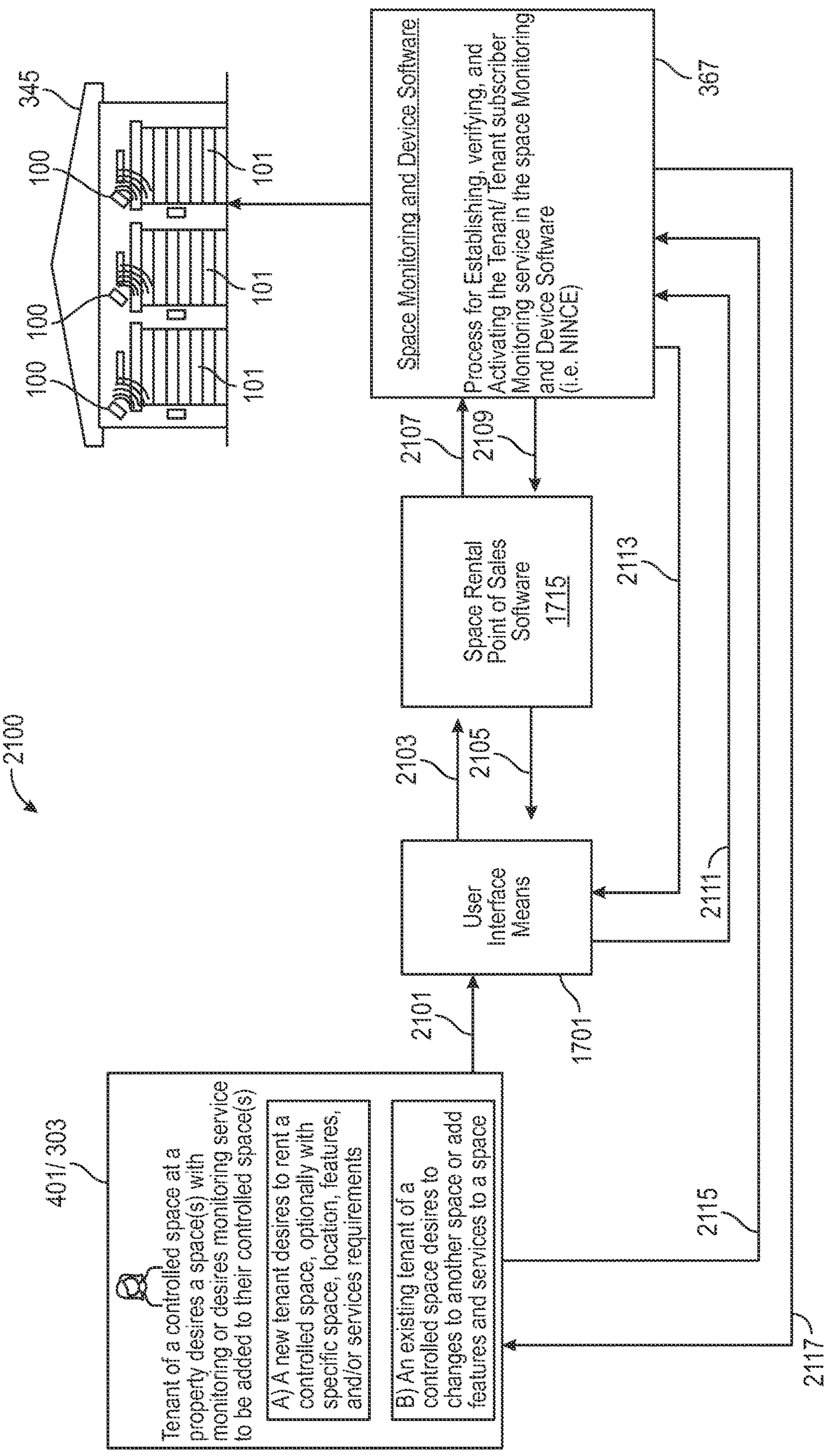
FIG. 21 is a block diagram showing a system for setting up and/or activating monitoring services of monitored space (s) for a given tenant and/or a subscriber.

FIG. 21 is a block diagram showing a system 2100 for setting up and/or activating monitoring services of space(s) 101 for a given tenant and/or subscriber 401. In some embodiments, FIG. 21 may compliment FIG. 17A, FIG. 17B, FIG. 18A, and/or FIG. 18B. With respect to FIG. 21, in some embodiments, a prospective tenant subscriber 401 wants to rent space(s) 101 at a given facility 345 and include monitoring services of those rented space(s) 101; or a current tenant 401 that is already renting space(s) 101 at that facility 345 wants to add monitoring-services to those space(s) 101. Note, in that second scenario, the current tenant 401 could be renting space(s) 101 without any current monitoring from monitoring-device(s) 100 or those currently rented space(s) could have some level of monitoring from monitoring-device(s) 100 and that tenant 401 wants to add additional (increased) monitoring by adding additional monitoring-device(s) 100 to those already rented space(s) 101. In some embodiments, to consummate either scenario, that (prospective or current) tenant 401 via interaction pathway 2101 will engage with one or more user-interface-means 1701. In some embodiments, in interaction pathway 2101, that (prospective or current) tenant 401 may interface (engage) with one or more user-interface-means 1701 to rent a monitored space 101 (e.g., a vacant space 101 with pre-installed monitoring-device(s) 100 or selecting a vacant space 101 without pre-installed monitoring-device(s) 100 and thus, will need installment of monitoring-device(s) 100) and/or to initiate adding monitoring to an already rented space 101. As similarly shown in FIG. 17A and/or FIG. 17B, the various tenant 401 supplied data and/or info entered into (provided to) the user-interface-means 1701 may then be fed and/or passed into the point-of-sale (POS) software 1715 via communication pathway 2103 in FIG. 21. Also, note in some situations one or more of the user-interface-means 1701 may actually be integrated into the POS software 1715, in which case, blocks 1701 and 1715 in the attached figures may merge together. Depending upon the nature (type) of the user-interface-means 1701 used and its relationship to the point-of-sale (POS) software 1715, this various tenant 401 supplied data and/or info in communication pathway 2103 may be manually provided or automatically provided to the point-of-sale (POS) software 1715. For example, and without limiting the scope of the present invention, when the user-interface-means 1701 may be interfaced with the point-of-sale (POS) software 1715, either by API or by direct interface, then tenant 401 supplied data and/or info of communication pathway 2103 may be automatically passed to the point-of-sale (POS) software 1715; whereas, when user-interface-means 1701 may be a person 1703/1711, then tenant 401 provides their info/data to the person 1703/1711, and then this person 1703/1711 may enter this tenant 401 supplied info/data into a computer that is running the point-of-sale (POS) software 1715 or that is interfaced with the point-of-sale (POS) software 1715. As to the contents nature of the tenant 401 supplied info/data of communication pathway 2103, this could include, but is not limited to: any of the info that may be possibly displayed in user-interface-subscribers-page 1600, user-interface-subscriber-details-page 1620, user-interface-monitored-spaces-page 1500, and/or user-interface-monitored-space-details-page 1530; tenant subscriber 401 data/info; space(s) 101 specific info; space(s) 101 ID (identification); space(s) 101 name; space(s) 101 number; space(s) 101 data; space(s) 101 size; space(s) 101 feature(s); space(s) 101 service(s); facility 345 information; optionally, monitoring-device(s) 100 info from inventory maybe included here (e.g., on-the-fly); combinations thereof; and/or the like. Similarly, data/info from the point-of-sale (POS) software 1715 may flow back to the user-interface-means 1701 via communication pathway 2105. In some embodiments, communication pathway 2105 may be implemented as one or more APIs or via a direct integration communication means. (FIG. 21 may be referenced with respect to this paragraph.)

Continuing discussing FIG. 21, in some embodiments, any info passed to the point-of-sale (POS) software 1715 and/or generated by the point-of-sale (POS) software 1715 may then be passed to NINCE 367 via communication pathway 2107. In some embodiments, communication pathway 2107 may be one or more APIs (application program interfaces). In some embodiments, communication pathway 2107 may include payment info for tenant subscriber 401 (that may be absent in communication pathway 2103). In some embodiments, communication pathway 2107 may include, but may not be limited to: payment info for tenant subscriber 401 (that may be absent in communication pathway 2103); tenant subscriber 401 data/info; space(s) 101 specific info; space(s) 101 ID (identification); space(s) 101 name; space(s) 101 number; space(s) 101 data; space(s) 101 size; space(s) 101 feature(s); space(s) 101 service(s); facility 345 information; optionally, monitoring-device(s) 100 info from inventory maybe included here (e.g., on-the-fly); combinations thereof; and/or the like. Similarly, data/info from NINCE 367 may flow back to the point-of-sale (POS) software 1715 via communication pathway 2109. In some embodiments, communication pathway 2109 may be one or more APIs (application program interfaces). In some embodiments, the API(s) of communication pathway 2107 and of communication pathway 2109 may be the same or different API(s). And has been previously discussed, NINCE 367 may be in communication with a given facility's 345 monitoring network and/or the monitoring-device(s) 100 installed at that given facility 345.

Continuing discussing FIG. 21, and as similarly indicated in FIG. 17B, in some embodiments, NINCE 367 and at least some of the user-interface-means 1701 may be in direct communication via one or more API(s), which may bypass communications with point-of-sale (POS) software 1715. In FIG. 17B this was indicated by API communication pathways 1721. Here in FIG. 21 this may be indicated by communication pathway/API 2111 and/or by communication pathway/API 2113. In some embodiments, communication pathway/API 2111 may take outputs from user-interface-means 1701 and feed these as inputs to NINCE 367. In some embodiments, communication pathway/API 2113 may take outputs from NINCE 367 and feed these as inputs to user-interface-means 1701. In some embodiments, the API(s) of communication pathway/API 2111 and of communication pathway/API 2113 may be the same or different API(s).

Continuing discussing FIG. 21, and as discussed elsewhere, in some embodiments, NINCE 367 and tenant subscribers 401, via their tenant devices 303, may be in bidirectional communication with each other. From the tenant subscribers 401 perspective, such communication may be in a conversational format in a human natural language, such as, but not limited to, English. In some embodiments, this communication may take the form of: text messages, SMS messages, emails, DMs, chatbot conversations, phone calls, voicemails, in app messages, pop up messages, in web portal messages, phone notifications, spoken messages, speaker emitted (broadcast) audible messages, combinations thereof, and/or the like. In some embodiments, communication pathway 2115 may indicate communications from tenant subscriber 401 (and/or from tenant device 303) to NINCE 367. In some embodiments, communication pathway 2117 may indicate communications from NINCE 367 to tenant subscriber 401 (and/or to tenant device 303).

Figure 22A:
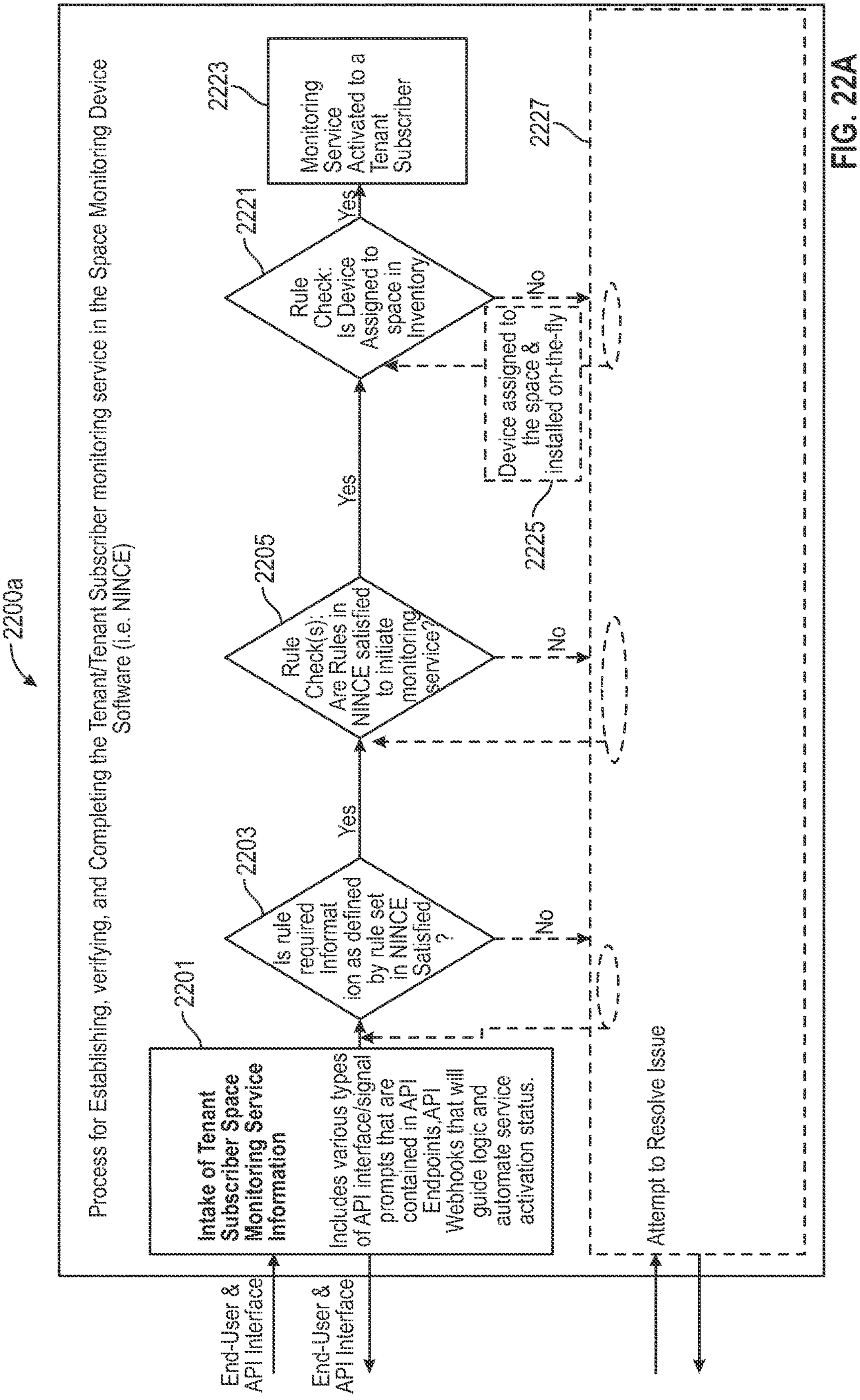
FIG. 22A is a flow diagram of a method for setting up and/or activating space(s) monitoring service for a given tenant and/or a subscriber when the point-of-sale (POS) software may API(s) interfaced with the NINCE software.

FIG. 22A is a flow diagram of a method 2200*a* for setting up and/or activating space(s) 101 monitoring for a given tenant subscriber 401 when the point-of-sale (POS) software 1715 may API(s) interfaced with NINCE 367. In some embodiments, method 2200*a* may support, enable, and/or facilitate at least some of the communications of FIG. 17A, FIG. 17B, and/or FIG. 21. In some embodiments, method 2200*a* may comprise one or more of the following steps: step 2201, step 2203, step 2205, step 2221, step 2223, step 2225, and/or step 2227. In some embodiments, one or more of these steps may be executed out of numeral order with respect to the step reference numerals. In some embodiments, one or more of these steps may be optional, skipped, and/or omitted. In some embodiments, the steps of method 2200*a* may be carried out in and/or by NINCE 367. In some embodiments, at least most of the steps of method 2200*a* may be carried out in and/or by NINCE 367.

Continuing discussing FIG. 22A, in some embodiments, step 2201 may be a step of NINCE 367 receiving inputs from the point-of-sale (POS) software 1715, from the user-interface-means 1701, via API(s) 2107/2111, from tenant 401, and/or from tenant device 303, via communication pathway 2115. In some embodiments, these inputs may be outputs from API endpoints, API webhooks, or the like. As to the contents nature of these step 2201 inputs, this could include, but is not limited to: any of the info that may be possibly displayed in user-interface-subscribers-page 1600, user-interface-subscriber-details-page 1620, user-interface-monitored-spaces-page 1500, and/or user-interface-monitored-space-details-page 1530; tenant subscriber 401 data/info; space(s) 101 specific info; space(s) 101 ID (identification); space(s) 101 name; space(s) 101 number; space(s) 101 data; space(s) 101 size; space(s) 101 feature(s); space(s) 101 service(s); facility 345 information; space(s) 101 rental billing/charges including service fee amount name or equivalent; space(s) 101 rental billing status (e.g., paid for service period or not paid); space(s) 101 monitoring services billing/charges including service fee amount name or equivalent; space(s) 101 monitoring services billing status (e.g., paid for service period or not paid); optionally, monitoring-device(s) 100 info from inventory maybe included here (e.g., on-the-fly); combinations thereof; and/or the like. In some embodiments, execution of step 2201 may advance method 2200*a* to step 2203.

Continuing discussing FIG. 22A, in some embodiments, step 2203 may be a step of checking if the information and/or data received by NINCE 367 in the step 2201 satisfies a rule (a first rule) of NINCE 367. In some embodiments, this rule (first rule) of NINCE 367 may be checking if the received inputs from the step 2201 are sufficient by comparing (evaluating) against a completeness checklist. In some embodiments, received inputs of information may be checked against an established or defined set of rule(s) in NINCE 367. This might for example look at completeness of tenant 401 and/or subscriber received information. In some embodiments, at a minimum, completeness of tenant 401 and/or subscriber received information may be complete if NINCE 367 has access to at least some form of contact information for the given tenant 401 and/or subscriber. In some embodiments, at a minimum, completeness of tenant 401 and/or subscriber 401 received information may be complete if NINCE 367 has access to at least some form of contact information for the given tenant 401 and/or subscriber and has access to at least one name or the like for the given tenant 401 and/or subscriber. In some embodiments, if this rule of NINCE 367 is satisfied, then method 2200*a* may progress to step 2205; whereas, if this rule of NINCE 367 is not satisfied, then method 2200*a* may progress to step 2227.

Continuing discussing FIG. 22A, in some embodiments, step 2205 may be a step of checking if another (different) rule (second rule) of NINCE 367 is satisfied to initiate monitoring services. In some embodiments, this rule (second rule) of NINCE 367 may be checking if: space(s) 101 to be rented or already rented info (such as, but not limited to, space(s) 101 IDs) is available to NINCE 367; if monitoring-device(s) 100 have been assigned (associated) to those space(s) 101; and/or whether or not the tenant's 401 payment info for those space(s) 101 rental and/or for monitoring services of those space(s) 101 is available to NINCE 367; combinations thereof; and/or the like. Note, in FIG. 22B of method 2200*b*, step 2205 of method 2200*a* (FIG. 22A) may be replaced and/or elaborated upon by: step 2207, list 2209, step 2211, step 2213, step 2215, step 2217, and/or step 2219. In some embodiments, if this rule of NINCE 367 is satisfied, then method 2200*a* may progress to step 2221; whereas, if this rule of NINCE 367 is not satisfied, then method 2200*a* may progress to step 2227.

Continuing discussing FIG. 22A, in some embodiments, step 2221 may be a step of checking if one or more monitoring-device(s) 100, where that quantity may be determined by the tenant subscriber's 401 order, monitoring service requirements, and/or subscription agreement (if any), are assigned (associated) to space(s) 101. In some embodiments, step 2221 may be a step of checking if one or more monitoring-device(s) 100, in inventory, are assigned (associated) to space(s) 101 (which if so, would make those one or more monitoring-device(s) 100 pre-installed). In some embodiments, this check may be accomplished by NINCE 367 checking its database 1303 records to see if the assignment (association) record exists. In some embodiments, if this check is satisfied, then method 2200*a* may progress to step 2223; whereas, if this check is not satisfied, then method 2200*a* may progress to step 2225 and/or to 2227.

Continuing discussing FIG. 22A, in some embodiments, step 2223 may be a step of activating (live) monitoring services for a given tenant subscriber 401 with respect to certain space(s) 101 and with respect to certain monitoring-device(s) 100 associated with those particular space(s) 101. In some embodiments, upon monitoring services activation, now detected events and/or incidents and/or sensor(s) 505 outputs may be reported and/or communicated to tenant subscriber(s) 401, via their tenant device 303, if and when certain rule set(s) operating on the associated monitoring-device(s) 100 and/or on NINCE 367 are satisfied (or not satisfied) as has been previously noted herein. In some embodiments, monitoring services may be activated as long as rules of engagement are met, such as, but not limited to: the rented space(s) 101 are currently paid for, the monitoring service is currently paid for, check(s) of step 2203 remains satisfied (compliant), check(s) for step 2221 remain satisfied (compliant), tenant 401 and/or subscriber information is sufficiently complete, a proper quantity of monitoring-device(s) 100 are assigned to the rented space(s) 101 with (active) monitoring services, combinations thereof, and/or the like.

Continuing discussing FIG. 22A, in some embodiments, step 2225 may be a step of on-the-fly (on demand) physically installing in inventory, but not pre-installed, monitoring-device(s) 100 into the rented space(s) 101 as well as assigning (associating) those now physically installed monitoring-device(s) 100 with those rented space(s) 101 in the NINCE 367 (to enable display in user-interface-monitored-spaces-page 1500 of this assignment once step 2223 is executed). In some embodiments, step 2225 may be executed, at least in part, by authorized personnel, such as, but not limited to, facility operator 405, approved third-party installer, facility operator 405 maintenance personnel, tenant subscriber 401, user approved by tenant subscriber 401, user approved by facility operator 405, combinations thereof, and/or the like. In some embodiments, execution of step 2225 may advance method 2200*a* to step 2221.

Continuing discussing FIG. 22A, in some embodiments, step 2227 may be a step of attempting to resolve unsatisfied check(s), such as failed checks from step 2203, step 2205, and/or step 2221. In some embodiments, in step 2227 NINCE 367 may initiate communications with point-of-sale (POS) software 1715, user-interface-means 1701, tenant device 303, tenant subscriber 401, combinations thereof, seeking additional information, data, and/or instructions to resolve a failed check. Issues may be communicated and/or displayed such that corrective actions may be taken to resolve lack of compliance and/or deficient information that resulted in a rule violation and/or check violation. In some embodiments, such communication(s) may be automatically made with the appropriate end-user through various property/facility 345 UI communications including but not limited to: space monitoring facility 345 property web portal notifications, web app notifications, mobile app notification, SMS text message, mobile app alerts, web portal alerts, chatbot notifications, disposition changes in facility 345 web or app portal, through API(s) to external UI to secure complete info and take appropriate actions such as call center, direct tenant interface, robo call, third party website, and remedial actions and/or notifications communicated via API interface to point-of-sale (POS) software 1715, combinations thereof, and/or the like. In some embodiments, execution of step 2227 may advance method 2200*a* to step 2203, step 2205, step 2221, and/or step 2225.

Figure 22B:
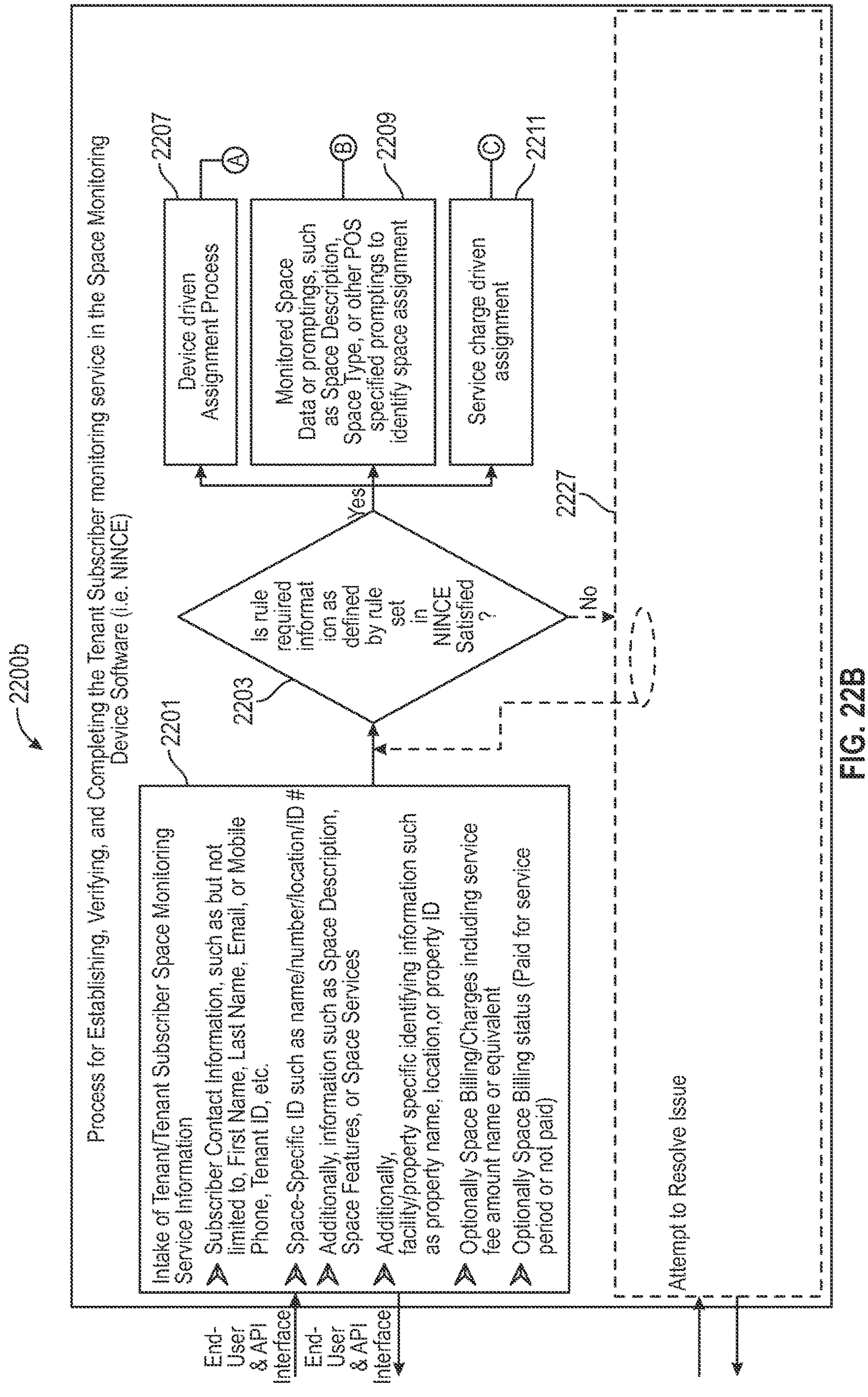
FIG. 22B is a flow diagram of a method for setting up and/or activating space(s) monitoring service for a given tenant and/or a subscriber when the point-of-sale (POS) software may API(s) interfaced with the NINCE software.
Figure 22B:
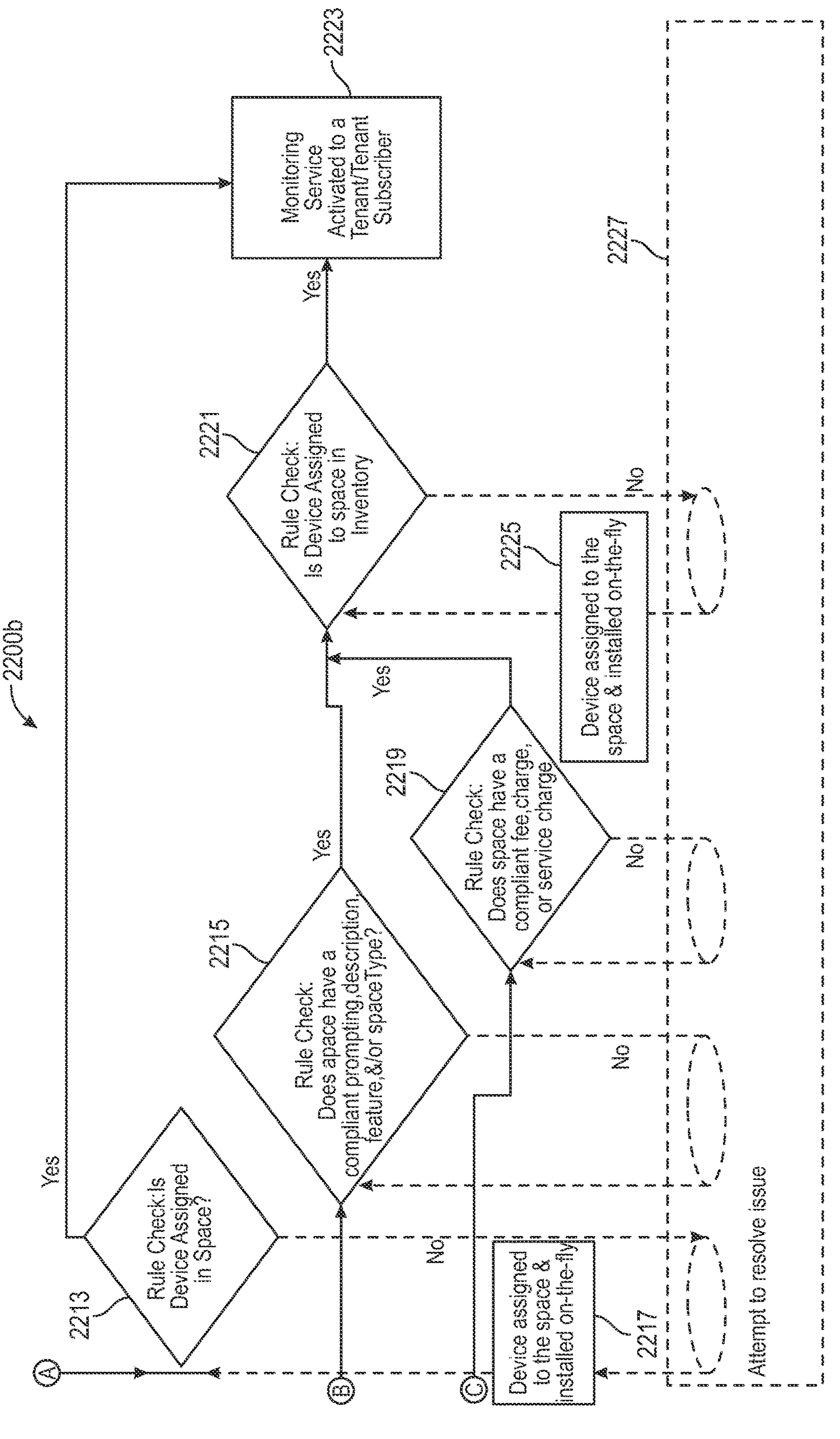

FIG. 22B is a flow diagram of a method 2200*b* for setting up and/or activating space(s) 101 monitoring for a given tenant subscriber 401 when the point-of-sale (POS) software 1715 may API(s) interfaced with NINCE 367. In some embodiments, method 2200*b* may support, enable, and/or facilitate at least some of the communications of FIG. 17A, FIG. 17B, and/or FIG. 21. In some embodiments, method 2200*a* may comprise one or more of the following steps: step 2201, step 2203, step 2207, list 2209, list 2211, step 2213, step 2215, step 2217, step 2219, step 2221, step 2223, step 2225, and/or step 2227. In some embodiments, one or more of these steps may be executed out of numeral order with respect to the step reference numerals. In some embodiments, one or more of these steps may be optional, skipped, and/or omitted. In some embodiments, the steps of method 2200*b* may be carried out in and/or by NINCE 367. In some embodiments, at least most of the steps of method 2200*b* may be carried out in and/or by NINCE 367. In some embodiments, method 2200*b* may be substantially similar to method 2200*a*, except method 2200*b* may show and/or include some additional details. In some embodiments, method 2200*a* may be a more general (broader) case as compared to method 2200*b*, which may be more specific example oriented. Note, in FIG. 22B of method 2200*b*, step 2205 of method 2200*a* (FIG. 22A) may be replaced and/or elaborated upon by: step 2207, list 2209, step 2211, step 2213, step 2215, step 2217, and/or step 2219.

Continuing discussing FIG. 22B, in some embodiments, a satisfied rule check in step 2203 may progress method 2200*b* to step 2207, list (step) 2209, and/or to list (step) 2211. In some embodiments, step 2207 may be a step of NINCE 367 and/or of facility operator 405 making in inventory monitoring-device(s) 100 assignment(s) (association[s]) to space (s) 101. In some embodiments, if there are already sufficient pre-installed 100 in inventory, then step 2207 may be skipped, omitted, and/or optional (e.g., as compared against demands/needs identified in a given tenant subscriber 401 order/subscription agreement). In some embodiments, execution of step 2207 may progress method 2200*b* to step 2213. In some embodiments, step 2207 may be preparatory for the check of step 2213.

Continuing discussing FIG. 22B, in some embodiments, list (step) 2209 may identify, note, and/or list the type of information and/or data that the step 2215 check may be checking for. In some embodiments, step 2209 may be a step of parsing or organizing input data (e.g., from step 2201) into a useable data structure. In some embodiments, list (step) 2209 may comprise information and/or data of and/or related to particular space(s) 101, such as, but not limited to: facility 345 name and/or identifier that has those space(s) 101, that facility's 345 address, space(s) 101 ID(s) (identifier[s]) to be rented or already rented, those space(s) 101 sizes, those space(s) 101 descriptions, those space(s) 101 types, those space(s) 101 features, other point-of-sale (POS) software 1715 specified promptings to identify space(s) 101 assignment, combinations thereof, and/or the like. In some embodiments, this data and/or information may come from and/or be derived from an API endpoint, API webhook, or other equivalent communication line; i.e., there may be various promptings and/or signals that come from the API connection to the POS software that are used as identifiers to satisfy a given rule (or not). Note, in some embodiments, not all of these types of space(s) 101 data and/or information may be necessary for the step 2215 check to be successful. In some embodiments, the minimum info to satisfy the step 2215 check may be the facility 345 name and/or identifier and the space(s) 101 ID(s) (identifier[s]) to be rented or already rented. In some embodiments, the minimum info to satisfy the step 2215 check may be the space(s) 101 ID(s) (identifier[s]) to be rented or already rented. In some embodiments, a given facility 345 may default to all of its spaces 101 being monitored space(s) 101 (e.g., via deployed monitoring-devices 100). In some embodiments, a given facility 345 may have a facility default that all new rented spaces 101 are monitored spaces 101 regardless of space specific information. In some embodiments, a successful check of step 2203 may progress method 2200*b* to step 2215.

Continuing discussing FIG. 22B, in some embodiments, list (step) 2211 may identify, note, and/or list the type of information and/or data that the step 2219 check may be checking for. In some embodiments, list (step) 2211 may comprise information and/or data of and/or related to fees, charges, services charges and/or costs that have been marketed to, advertised to, displayed to, and/or disclosed to the given tenant subscriber 401 for monitoring services and/or for space(s) 101 and/or service charges and/or fees and/or costs that the given tenant subscriber 401 has agreed to pay for monitoring services and/or for space(s) 101. In some embodiments, list 2211 may comprise information and/or data of and/or related to payment amount, payment method, payment means, info for setting up periodic recurring billing/charging (such as, but not limited to, credit card info and/or checking account info), whether a payment is due or current, current payment status, payment history, duration of recurring billing period, combinations thereof, and/or the like. In some embodiments, a successful check of step 2203 may progress method 2200*b* to step 2219.

Continuing discussing FIG. 22B, in some embodiments, step 2213 may be a step of checking if the intended to rented space(s) 101 or the already rented space(s) 101 have assigned (and installed) monitoring-device(s) 100 associated with those particular space(s) 101. In some embodiments, this check may be accomplished by NINCE 367 checking its database 1303 records to see if the assignment (association) record exists. In some embodiments, execution of step 2213 may progress method 2200*b* to step 2223 if this step 2213 check is successful or to step 2227 if this step 2213 check is unsuccessful.

Continuing discussing FIG. 22B, in some embodiments, step 2215 may be a step of checking if NINCE 367 has a minimum amount of information of the space(s) 101 to be rented and/or of the space(s) 101 that are already rented in its database 1303, such as, but limited to, any of the information in list 2209. In some embodiments, the minimum info to satisfy the step 2215 check may be the facility 345 name and/or identifier and the space(s) 101 ID(s) (identifier[s]) to be rented or already rented. In some embodiments, the minimum info to satisfy the step 2215 check may be the space(s) 101 ID(s) (identifier[s]) to be rented or already rented. In some embodiments, given that a software (e.g., NINCE 367) might already know the particular facility 345 that may be relevant or that a given facility 345 might have all its new spaces 101 rentals being monitored spaces 101, the minimum info to satisfy the step 2215 check may be the facility 345 name and/or identifier and/or the space(s) 101 ID(s) (identifier[s]) to be rented or already rented; or just the space(s) 101 ID(s) (identifier[s]) to be rented or already rented. In some embodiments, execution of step 2215 may progress method 2200*b* to step 2221 if the step 2215 check is successful or to step 2227 if the step 2215 check is unsuccessful.

Continuing discussing FIG. 22B, in some embodiments, step 2217 may be a step of on-the-fly (on demand) physically installing in inventory, but not pre-installed, monitoring-device(s) 100 into the rented space(s) 101 as well as assigning (associating) those now physically installed monitoring-device(s) 100 with those rented space(s) 101 in the NINCE 367 (to enable display in user-interface-monitored-spaces-page 1500 of this assignment once step 2223 is executed). In some embodiments, step 2217 may be executed, at least in part, by authorized personnel, such as, but not limited to, facility operator 405, approved third-party installer, facility operator 405 maintenance personnel, tenant subscriber 401, user approved by tenant subscriber 401, user approved by facility operator 405, combinations thereof, and/or the like. In some embodiments, execution of step 2217 may progress method 2200*b* to step 2213.

Continuing discussing FIG. 22B, in some embodiments, step 2219 may be a step of checking at a minimum if the space(s) 101 rental(s) have been paid for (at the time and date of the check 2219) and if the monitoring services for those space(s) 101 with selected monitoring services have been paid for (at the time and date of the check 2219). In some embodiments, this step 2219 check may not only check if a fee has been appropriately and/or timely paid. In some embodiments, this step 2219 check may check if a fee description or service charge is present as a standalone agreement or if there is a service fee or charge on the overall renter/tenant lease (or agreement) in from the POS system. The distinction here is whether the tenant 401 pays current or not, that may or may not be the applicable rule being applied per this this step 2219 check. In some embodiments, the method 2200*a* and/or 2200*b* may decouple payment status of the service charge and/or space 101 or link them together, but a key here may be that NINCE 367 sees (is aware of) an intended charge by name and/or alphanumeric descriptor and/or by other identifiers such that NINCE 367 knows the tenant 401 desire is to set up the monitoring service. In some embodiments, there might be another embedded rule that the service fee must be paid current or the like to initiate monitoring service or to maintain monitoring service, but before payment, a basic rule (in some embodiments) is the charge itself is present with or without payment being made. In some embodiments, this may require NINCE 367 receiving such info from point-of-sale (POS) software 1715; which in turn in some embodiments, may be facilitated by API(s) between the point-of-sale (POS) software 1715 and NINCE 367. In some embodiments, execution of step 2219 may progress method 2200*b* to step 2221 if this step 2219 check is successful or to step 2227 if this step 2219 check is unsuccessful.

Figure 23:
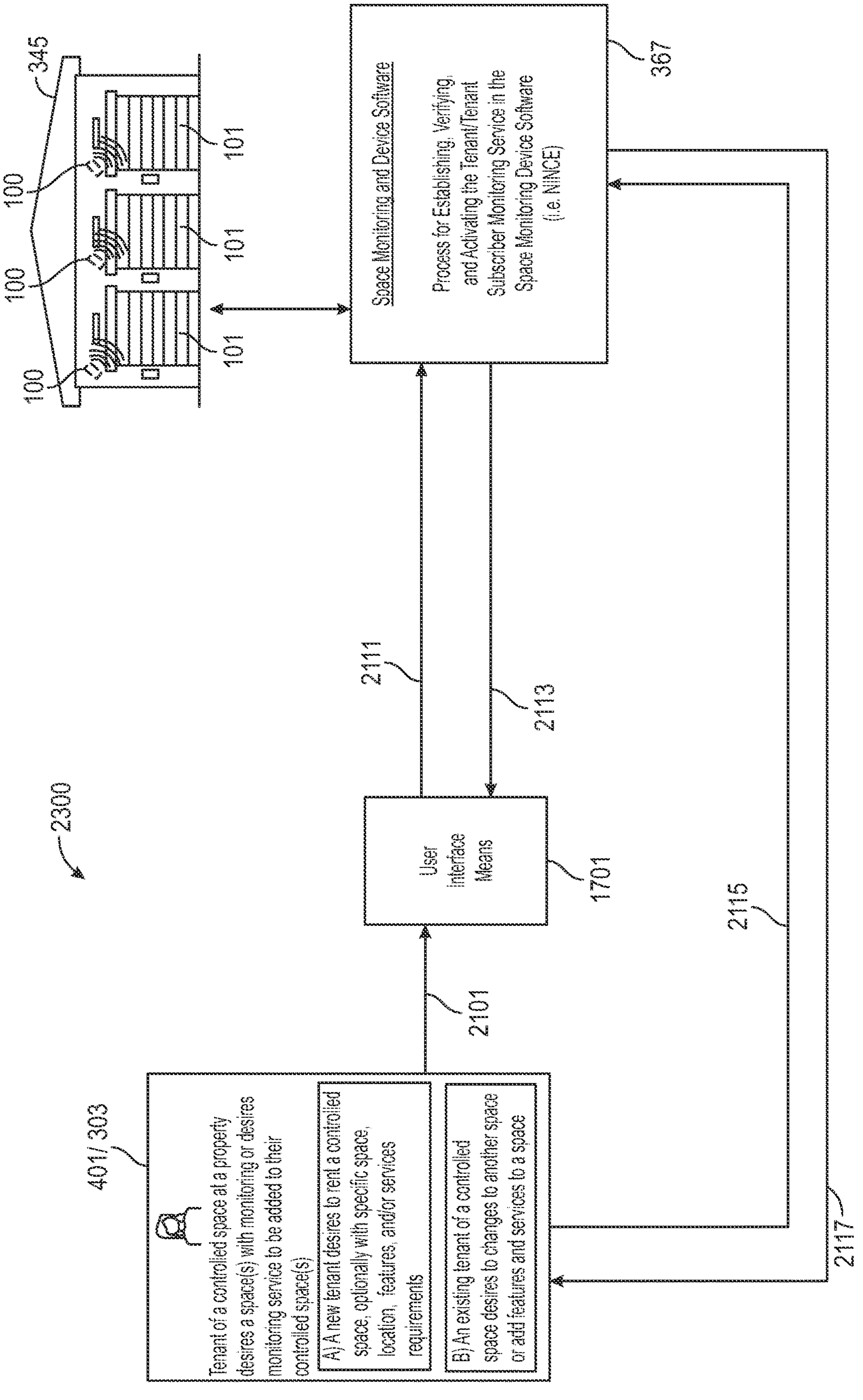
FIG. 23 is a block diagram showing a system for setting up and/or activating monitoring services of monitored space (s) for a given tenant and/or a subscriber.

FIG. 23 is a block diagram showing a system 2300 for setting up and/or activating monitoring services of space(s) 101 for a given tenant and/or subscriber 401. In some embodiments, FIG. 23 may compliment FIG. 17C, FIG. 19A, and/or FIG. 19B. Note, in FIG. 23 there may be no (direct) integration and/or no (direct) automation between NINCE 367 and the point-of-sale (POS) software 1715 (as such POS software 1715 is omitted in FIG. 23). With respect to FIG. 23, in some embodiments, a prospective tenant subscriber 401 wants to rent space(s) 101 at a given facility 345 and include monitoring services of those rented space(s) 101; or a current tenant 401 that is already renting space(s) 101 at that facility 345 wants to add monitoring-services to those space(s) 101. Note, in that second scenario, the current tenant 401 could be renting space(s) 101 without any current monitoring from monitoring-device(s) 100 at all or those currently rented space(s) could have some level of monitoring from monitoring-device(s) 100 and that tenant 401 wants to add additional (increased) monitoring by adding additional monitoring-device(s) 100 to those already rented space(s) 101. In some embodiments, to consummate either scenario, that (prospective or current) tenant 401 via interaction pathway 2101 will engage with one or more user-interface-means 1701. In some embodiments, in interaction pathway 2101, that (prospective or current) tenant 401 may interface (engage) with one or more user-interface-means 1701 to rent a monitored space 101 (e.g., a vacant space 101 with pre-installed monitoring-device(s) 100 or selecting a vacant space 101 without pre-installed monitoring-device(s) 100 and thus, will need installment of monitoring-device(s) 100) and/or to initiate adding monitoring to an already rented space 101. As similarly shown in FIG. 17C, the various tenant 401 supplied data and/or info entered into (provided to) the user-interface-means 1701 may then be fed and/or passed into NINCE 367 via communication pathway/API 2111 in FIG. 23 (or via API communication pathway 1721 in FIG. 17C). As to the contents nature of the tenant 401 supplied info/data of communication pathway/API 2111, this could include, but is not limited to: any of the info that may be possibly displayed in user-interface-subscribers-page 1600, user-interface-subscriber-details-page 1620, user-interface-monitored-spaces-page 1500, and/or user-interface-monitored-space-details-page 1530; tenant subscriber 401 data/info; space(s) 101 specific info; space(s) 101 ID (identification); space(s) 101 name; space(s) 101 number; space(s) 101 data; space(s) 101 size; space(s) 101 feature(s); space(s) 101 service(s); facility 345 information; optionally, monitoring-device(s) 100 info from inventory maybe included here (e.g., on-the-fly); combinations thereof; and/or the like. (FIG. 23 may be referenced with respect to this paragraph.)

Continuing discussing FIG. 23, in some embodiments, any info passed to the user-interface-means 1701 and/or generated by the user-interface-means 1701 may be passed to NINCE 367 via communication pathway/API 2111. In some embodiments, communication pathway/API 2111 may be one or more APIs (application program interfaces). In some embodiments, communication pathway/API 2111 may include payment info for tenant subscriber 401. Similarly, data/info from NINCE 367 may flow back to the user-interface-means 1701 via communication pathway/API 2113. In some embodiments, communication pathway/API 2113 may be one or more APIs (application program interfaces). In some embodiments, the API(s) of communication pathway/API 2111 and of communication pathway/API 2113 may be the same or different API(s). And has been previously discussed, NINCE 367 may be in communication with a given facility's 345 monitoring network and/or the monitoring-device(s) 100 installed at that given facility 345.

Continuing discussing FIG. 23, and as discussed elsewhere, in some embodiments, NINCE 367 and tenant subscribers 401, via their tenant devices 303, may be in bidirectional communication with each other. From the tenant subscribers 401 perspective, such communication may be in a conversational format in a human natural language, such as, but not limited to, English. In some embodiments, this communication may take the form of: text messages, SMS messages, emails, DMs, chatbot conversations, phone calls, voicemails, in app messages, pop up messages, in web portal messages, phone notifications, spoken messages, speaker emitted (broadcast) audible messages, combinations thereof, and/or the like. In some embodiments, communication pathway 2115 may indicate communications from tenant subscriber 401 (and/or from tenant device 303) to NINCE 367. In some embodiments, communication pathway 2117 may indicate communications from NINCE 367 to tenant subscriber 401 (and/or to tenant device 303).

Figure 24:
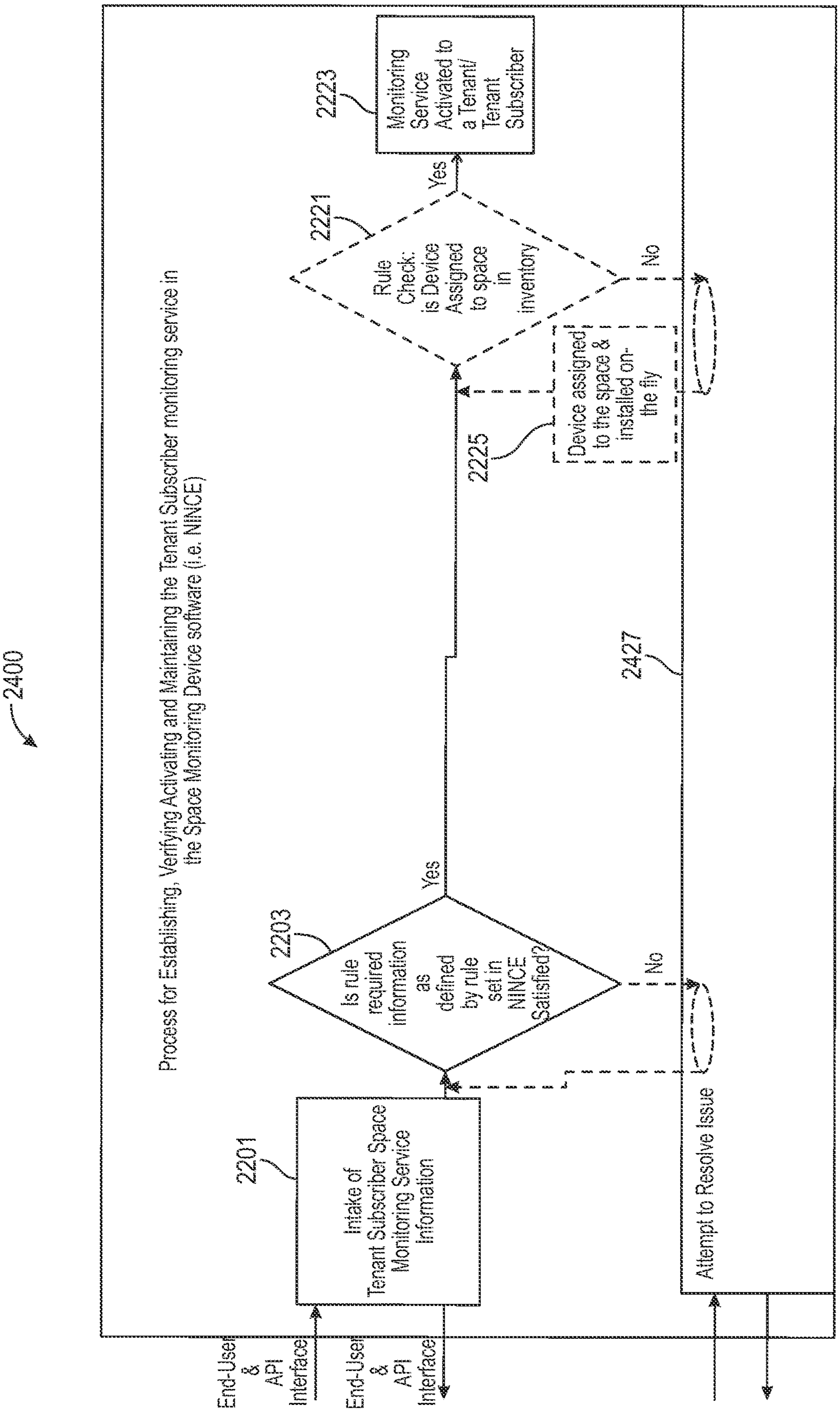
FIG. 24 is a flow diagram of a method for setting up and/or activating space(s) for monitoring service for a given tenant and/or a subscriber when the POS software may not be interfaced nor automated with/to the NINCE software.

FIG. 24 is a flow diagram of a method 2400 for setting up and/or activating space(s) 101 monitoring service for a given tenant 401 and/or subscriber when the point-of-sale (POS) software 1715 may not be (directly) interfaced nor (directly) automated with/to NINCE 367. In some embodiments, method 2400 may support, enable, and/or facilitate at least some of the communications of FIG. 17C, FIG. 19A, FIG. 19B, and/or FIG. 23. In some embodiments, method 2400 may comprise one or more of the following steps: step 2201, step 2203, step 2221, step 2223, step 2225, and/or step 2427. In some embodiments, one or more of these steps may be executed out of numeral order with respect to the step reference numerals. In some embodiments, one or more of these steps may be optional, skipped, and/or omitted. In some embodiments, the steps of method 2400 may be carried out in and/or by NINCE 367. In some embodiments, at least most of the steps of method 2400 may be carried out in and/or by NINCE 367.

Continuing discussing FIG. 24, in some embodiments, step 2201 may be a step of NINCE 367 receiving inputs from the user-interface-means 1701, via API(s) 2111 (1721). In some embodiments, these inputs may be outputs from API endpoints, API webhooks, or the like. As to the contents nature of these step 2201 inputs, this could include, but is not limited to: any of the info that may be possibly displayed in user-interface-subscribers-page 1600, user-interface-subscriber-details-page 1620, user-interface-monitored-spaces-page 1500, and/or user-interface-monitored-space-details-page 1530; tenant subscriber 401 data/info; space(s) 101 specific info; space(s) 101 ID (identification); space(s) 101 name; space(s) 101 number; space(s) 101 data; space(s) 101 size; space(s) 101 feature(s); space(s) 101 service(s); facility 345 information; space(s) 101 rental billing/charges including service fee amount name or equivalent; space(s) 101 rental billing status (e.g., paid for service period or not paid); space(s) 101 monitoring services billing/charges including service fee amount name or equivalent; space(s) 101 monitoring services billing status (e.g., paid for service period or not paid); optionally, monitoring-device(s) 100 info from inventory maybe included here (e.g., on-the-fly); combinations thereof; and/or the like. In some embodiments, execution of step 2201 may advance method 2400 to step 2203.

Continuing discussing FIG. 24, in some embodiments, step 2203 may be a step of checking if the information and/or data received by NINCE 367 in the step 2201 satisfies a rule (requirement) of NINCE 367. In some embodiments, this rule (requirement) of NINCE 367 may be checking if: space(s) 101 to be rented or already rented info (such as, but not limited to, space(s) 101 IDs) is available to NINCE 367; if monitoring-device(s) 100 have been assigned (associated) to those space(s) 101; if tenant 401 and/or subscriber information is complete, and/or whether or not the tenant's 401 payment info for those space(s) 101 rental and/or for monitoring services of those space(s) 101 is available to NINCE 367; combinations thereof; and/or the like. In some embodiments, if this rule of NINCE 367 is satisfied, then method 2400 may progress to step 2221; whereas, if this rule of NINCE 367 is not satisfied, then method 2400 may progress to step 2427.

Continuing discussing FIG. 24, in some embodiments, step 2221 may be a step of checking if one or more monitoring-device(s) 100, where that quantity may be determined by the tenant subscriber's 401 order, service request for monitoring services, a space 101 specified to have pre-assigned/integral monitored monitoring-device 100 for on-demand monitoring services, and/or subscription agreement (if any), are assigned (associated) to space(s) 101. In some embodiments, step 2221 may be a step of checking if one or more monitoring-device(s) 100, in inventory, are assigned (associated) to space(s) 101 (which if so, would make those one or more monitoring-device(s) 100 pre-installed). In some embodiments, this check may be accomplished by NINCE 367 checking its database 1303 records to see if the assignment (association) record exists. In some embodiments, if this check is satisfied, then method 2400 may progress to step 2223; whereas, if this check is not satisfied, then method 2400 may progress to step 2225 and/or to 2427.

Continuing discussing FIG. 24, in some embodiments, step 2223 may be a step of activating (live) monitoring services for a given tenant subscriber 401 with respect to certain (rented) space(s) 101 and with respect to certain monitoring-device(s) 100 associated with those particular space(s) 101. In some embodiments, upon monitoring services activation, now detected events and/or incidents and/or sensor(s) 505 outputs (of the associated monitoring-device(s) 100) may be reported and/or communicated to tenant subscriber(s) 401, via their tenant device 303, if and when certain rule set(s) operating on the associated monitoring-device(s) 100 and/or on NINCE 367 are satisfied (or not satisfied) as has been previously noted herein. In some embodiments, monitoring services may be activated as long as rules of engagement are met, such as, but not limited to: the rented space(s) 101 are currently paid for, the monitoring service is currently paid for, check(s) of step 2203 remains satisfied (compliant), check(s) for step 2221 remain satisfied (compliant), tenant 401 and/or subscriber information is sufficiently complete, a proper quantity of monitoring-device(s) 100 are assigned to the rented space(s) 101 with (active) monitoring services, combinations thereof, and/or the like.

Continuing discussing FIG. 24, in some embodiments, step 2225 may be a step of on-the-fly (on demand) physically installing in inventory, but not pre-installed, monitoring-device(s) 100 into the rented space(s) 101 as well as assigning (associating) those now physically installed monitoring-device(s) 100 with those rented space(s) 101 in the NINCE 367 (to enable display in user-interface-monitored-spaces-page 1500 of this assignment once step 2223 is executed). In some embodiments, step 2225 may be executed, at least in part, by authorized personnel, such as, but not limited to, facility operator 405, approved third-party installer, facility operator 405 maintenance personnel, tenant subscriber 401, user approved by tenant subscriber 401, user approved by facility operator 405, combinations thereof, and/or the like. In some embodiments, execution of step 2225 may advance method 2400 to step 2221.

Continuing discussing FIG. 24, in some embodiments, step 2427 may be a step of attempting to resolve unsatisfied check(s), such as failed checks from step 2203 and/or step 2221. In some embodiments, in step 2427 NINCE 367 may initiate communications with user-interface-means 1701, tenant device 303, tenant subscriber 401, combinations thereof, seeking additional information, data, and/or instructions to resolve a failed check. Issues may be communicated and/or displayed such that corrective actions may be taken to resolve lack of compliance and/or deficient information that resulted in a rule violation and/or check violation. In some embodiments, such communication(s) may be automatically made with the appropriate end-user through various property/facility 345 UI communications including but not limited to: space monitoring facility 345 property web portal notifications, web app notifications, mobile app notification, SMS text message, mobile app alerts, web portal alerts, chatbot notifications, disposition changes in facility 345 web or app portal, through API(s) to external UI to secure complete info and take appropriate actions such as call center, direct tenant interface, robo call, third party website, combinations thereof, and/or the like. In some embodiments, execution of step 2427 may advance method 2400 to step 2203, step 2221, and/or step 2225.

Figure 25:
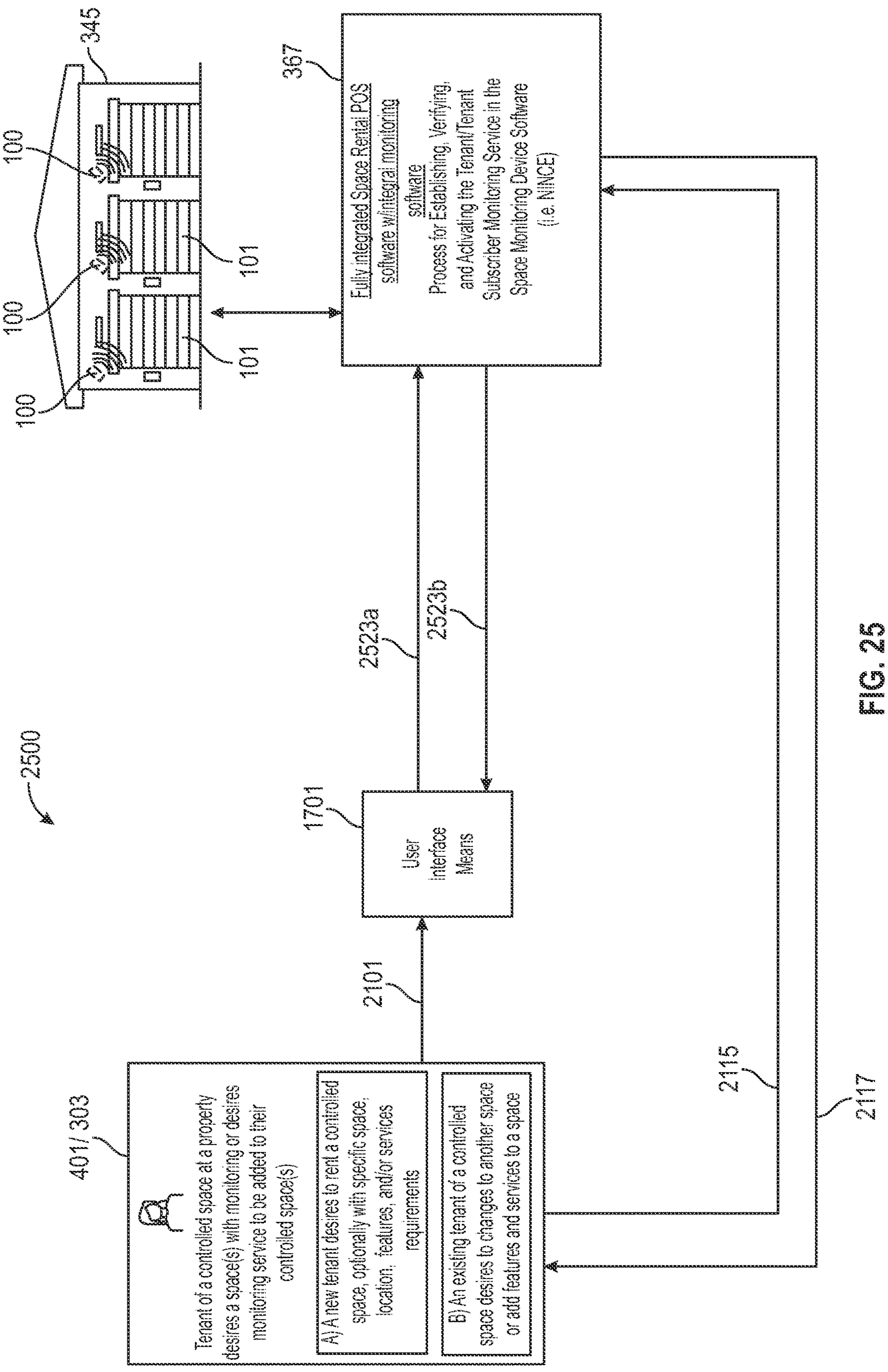
FIG. 25 is a block diagram showing a system for setting up and/or activating monitoring services of monitored space (s) for a given tenant and/or a subscriber.

FIG. 25 is a block diagram showing a system 2500 for setting up and/or activating monitoring services of space(s) 101 for a given tenant and/or subscriber 401. In some embodiments, FIG. 25 may compliment FIG. 17D, FIG. 20A, and/or FIG. 20B. Note, in FIG. 25 there may be full (complete) integration and/or automation between NINCE 367 and the point-of-sale (POS) software 1715 (as such POS software 1715 is omitted in FIG. 25 because its functions are integrated with NINCE 367). With respect to FIG. 25, in some embodiments, a prospective tenant subscriber 401 wants to rent space(s) 101 at a given facility 345 and include monitoring services of those rented space(s) 101; or a current tenant 401 that is already renting space(s) 101 at that facility 345 wants to add monitoring-services to those space (s) 101. Note, in that second scenario, the current tenant 401 could be renting space(s) 101 without any current monitoring from monitoring-device(s) 100 at all or those currently rented space(s) could have some level of monitoring from monitoring-device(s) 100 and that tenant 401 wants to add additional (increased) monitoring by adding additional monitoring-device(s) 100 to those already rented space(s) 101. In some embodiments, to consummate either scenario, that (prospective or current) tenant 401 via interaction pathway 2101 will engage with one or more user-interface-means 1701. In some embodiments, in interaction pathway 2101, that (prospective or current) tenant 401 may interface (engage) with one or more user-interface-means 1701 to rent a monitored space 101 (e.g., a vacant space 101 with pre-installed monitoring-device(s) 100 or selecting a vacant space 101 without pre-installed monitoring-device(s) 100 and thus, will need installment of monitoring-device(s) 100) and/or to initiate adding monitoring to an already rented space 101. As similarly shown in FIG. 17D, the various tenant 401 supplied data and/or info entered into (provided to) the user-interface-means 1701 may then be fed and/or passed into NINCE 367 via fully directly integrated communication pathway 2523 in FIG. 25 (or via fully directly integrated communication pathway 1723 in FIG. 17D). As to the contents nature of the tenant 401 supplied info/data of fully directly integrated communication pathway 2523*a*, this could include, but is not limited to: any of the info that may be possibly displayed in user-interface-subscribers-page 1600, user-interface-subscriber-details-page 1620, user-interface-monitored-spaces-page 1500, and/or user-interface-monitored-space-details-page 1530; tenant subscriber 401 data/info; space(s) 101 specific info; space(s) 101 ID (identification); space(s) 101 name; space(s) 101 number; space(s) 101 data; space(s) 101 size; space(s) 101 feature(s); space(s) 101 service(s); facility 345 information; optionally, monitoring-device(s) 100 info from inventory maybe included here (e.g., on-the-fly); combinations thereof; and/or the like. (FIG. 25 may be referenced with respect to this paragraph.)

Continuing discussing FIG. 25, in some embodiments, any info passed to the user-interface-means 1701 and/or generated by the user-interface-means 1701 may be passed to NINCE 367 via fully directly integrated communication pathway 2523*a*. In some embodiments, fully directly integrated communication pathway 2523*a* may not be an (external) API (application program interface) between two different pieces of software. In FIG. 25 there is no longer any necessity for external APIs; however, in some embodiments there may be use of internal APIs between software modules, but not necessarily. However, having said this, in some embodiments, the user-interface-means 1701 may still interface to the fully integrated NINCE 367 software of FIG. 25 by (external) API, but again not necessarily, merely an option. And lastly, as noted earlier, any or all of the user-interface-means 1701 pieces could actually be integrated into the POS software, including the integrated NINCE 367 version. Also, note in some situations one or more of the user-interface-means 1701 may actually be integrated into the integrated NINCE 367 (with POS functionality), in which case, blocks 1701 and 367 in the attached figures may merge together. In some embodiments, fully directly integrated communication pathway 2523*a* may include payment info for tenant subscriber 401. In some embodiments, fully directly integrated communication pathway 2523*a* may include, but may not be limited to: payment info for tenant subscriber 401 (that may be absent in communication pathway 2103); tenant subscriber 401 data/info; space(s) 101 specific info; space(s) 101 ID (identification); space(s) 101 name; space(s) 101 number; space(s) 101 data; space(s) 101 size; space(s) 101 feature(s); space(s) 101 service(s); facility 345 information; optionally, monitoring-device(s) 100 info from inventory maybe included here (e.g., on-the-fly); combinations thereof; and/or the like.

Similarly, data/info from NINCE 367 may flow back to the user-interface-means 1701 via fully directly integrated communication pathway 2523*b*. In some embodiments, fully directly integrated communication pathway 2523*b* may not be an API between two different pieces software. In some embodiments, fully directly integrated communication pathway 2523*a* and fully directly integrated communication pathway 2523*a* may be the same or different communication pathways. And has been previously discussed, NINCE 367 may be in communication with a given facility's 345 monitoring network and/or the monitoring-device(s) 100 installed at that given facility 345.

Continuing discussing FIG. 25, and as discussed elsewhere, in some embodiments, NINCE 367 and tenant subscribers 401, via their tenant devices 303, may be in bidirectional communication with each other. From the tenant subscribers 401 perspective, such communication may be in a conversational format in a human natural language, such as, but not limited to, English. In some embodiments, this communication may take the form of: text messages, SMS messages, emails, DMs, chatbot conversations, phone calls, voicemails, in app messages, pop up messages, in web portal messages, phone notifications, spoken messages, speaker emitted (broadcast) audible messages, combinations thereof, and/or the like. In some embodiments, communication pathway 2115 may indicate communications from tenant subscriber 401 (and/or from tenant device 303) to NINCE 367. In some embodiments, communication pathway 2117 may indicate communications from NINCE 367 to tenant subscriber 401 (and/or to tenant device 303).

Figure 26A:
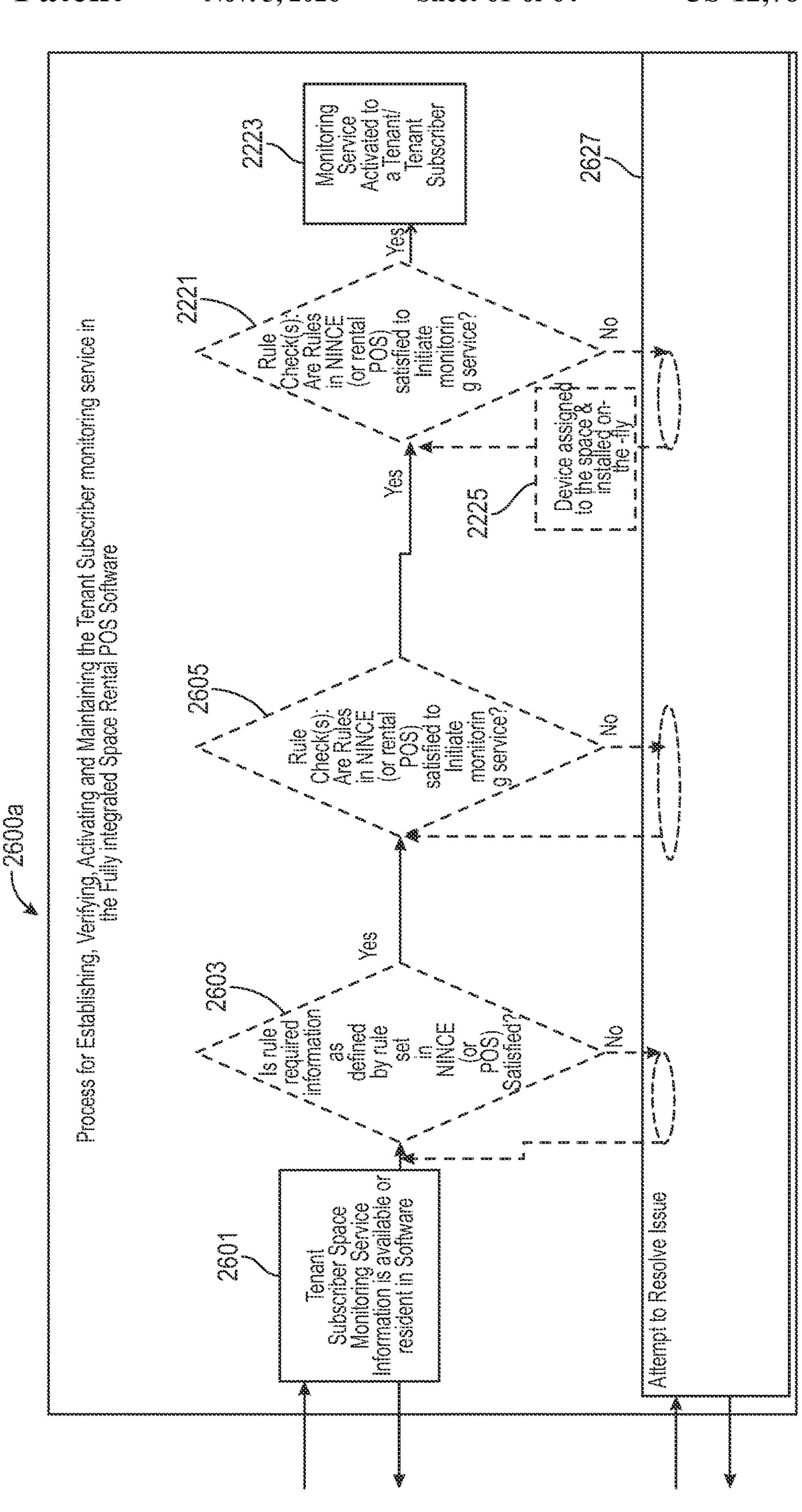
FIG. 26A is a flow diagram of a method for setting up and/or activating space(s) for monitoring service for a given tenant and/or a subscriber when the POS software may be fully and/or completely integrated with the NINCE software.

FIG. 26A is a flow diagram of a method 2600*a* for setting up and/or activating space(s) 101 monitoring for a given tenant 401 and/or subscriber when the point-of-sale (POS) software 1715 may be fully and/or completely integrated (and internally interfaced) with NINCE 367. In some embodiments, method 2600*a* may support, enable, and/or facilitate at least some of the communications of FIG. 17D, FIG. 20A, FIG. 20B, and/or FIG. 25. In some embodiments, method 2600*a* may comprise one or more of the following steps: step 2601, step 2603, step 2605, step 2221, step 2223, step 2225, and/or step 2627. In some embodiments, one or more of these steps may be executed out of numeral order with respect to the step reference numerals. In some embodiments, one or more of these steps may be optional, skipped, and/or omitted. In some embodiments, the steps of method 2600*a* may be carried out in and/or by NINCE 367. In some embodiments, at least most of the steps of method 2600*a* may be carried out in and/or by NINCE 367.

Continuing discussing FIG. 26A, in some embodiments, step 2601 may be a step of NINCE 367 receiving inputs from the user-interface-means 1701, via fully directly integrated communication pathway 2523*a* (fully directly integrated communication pathway 1723); and/or from tenant 401, and/or from tenant device 303, via communication pathway 2115. As to the contents nature of these step 2601 inputs, this could include, but is not limited to: any of the info that may be possibly displayed in user-interface-subscribers-page 1600, user-interface-subscriber-details-page

1620, user-interface-monitored-spaces-page 1500, and/or user-interface-monitored-space-details-page 1530; tenant subscriber 401 data/info; space(s) 101 specific info; space(s) 101 ID (identification); space(s) 101 name; space(s) 101 number; space(s) 101 data; space(s) 101 size; space(s) 101 feature(s); space(s) 101 service(s); facility 345 information; space(s) 101 rental billing/charges including service fee amount and/or name and/or equivalent; space(s) 101 rental billing status (e.g., paid for service period or not paid); space(s) 101 monitoring services billing/charges including service fee amount and/or name or equivalent; space(s) 101 monitoring services billing status (e.g., paid for service period or not paid); optionally, monitoring-device(s) 100 info from inventory maybe included here (e.g., on-the-fly); combinations thereof; and/or the like. In some embodiments, execution of step 2601 may advance method 2600*a* to step 2603.

Continuing discussing FIG. 26A, in some embodiments, step 2603 may be a step of checking if the information and/or data received by NINCE 367 in (from) the step 2601 satisfies a rule (a first rule) of NINCE 367. In some embodiments, this rule (first rule) of NINCE 367 may be checking if the received inputs from the step 2601 are sufficient by comparing (evaluating) against a completeness checklist. In some embodiments, received inputs of information may be checked against an established or defined set of rule(s) in NINCE 367. This might for example look at completeness of tenant 401 and/or subscriber received information. In some embodiments, at a minimum, completeness of tenant 401 and/or subscriber received information may be complete if NINCE 367 has access to at least some form of contact information for the given tenant 401 and/or subscriber. In some embodiments, at a minimum, completeness of tenant 401 and/or subscriber 401 received information may be complete if NINCE 367 has access to at least some form of contact information for the given tenant 401 and/or subscriber and has access to at least one name or the like for the given tenant 401 and/or subscriber. In some embodiments, if this rule of NINCE 367 is satisfied, then method 2600*a* may progress to step 2605; whereas, if this rule of NINCE 367 is not satisfied, then method 2600*a* may progress to step 2627.

Continuing discussing FIG. 26A, in some embodiments, step 2605 may be a step of checking if another (different) rule (second rule) of NINCE 367 is satisfied to initiate monitoring services. In some embodiments, this rule (second rule) of NINCE 367 may be checking if: space(s) 101 to be rented or already rented info (such as, but not limited to, space(s) 101 IDs) is available to NINCE 367; if monitoring-device(s) 100 have been assigned (associated) to those space(s) 101; and/or whether or not the tenant's 401 payment info for those space(s) 101 rental and/or for monitoring services of those space(s) 101 is available to NINCE 367; combinations thereof; and/or the like. Note, in FIG. 26B of method 2600*b*, step 2605 of method 2600*a* (FIG. 26A) may be replaced and/or elaborated upon by: step 2607, list 2609, step 2611, step 2613, step 2615, step 2217, and/or step 2619. In some embodiments, if this rule of NINCE 367 is satisfied, then method 2600*a* may progress to step 2221; whereas, if this rule of NINCE 367 is not satisfied, then method 2600*a* may progress to step 2627.

Continuing discussing FIG. 26A, in some embodiments, step 2221 may be a step of checking if one or more monitoring-device(s) 100, where that quantity may be determined by the tenant subscriber's 401 order, monitoring service requirements, and/or subscription agreement, are assigned (associated) to space(s) 101. In some embodiments, step 2221 may be a step of checking if one or more monitoring-device(s) 100, in inventory, are assigned (associated) to space(s) 101 (which if so, would make those one or more monitoring-device(s) 100 pre-installed). In some embodiments, this check may be accomplished by NINCE 367 checking its database 1303 records to see if the assignment (association) record exists. In some embodiments, if this check is satisfied, then method 2600*a* may progress to step 2223; whereas, if this check is not satisfied, then method 2600*a* may progress to step 2225 and/or to 2627.

Continuing discussing FIG. 26A, in some embodiments, step 2223 may be a step of activating (live) monitoring services for a given tenant subscriber 401 with respect to certain space(s) 101 and with respect to certain monitoring-device(s) 100 associated with those particular space(s) 101. In some embodiments, upon monitoring services activation, now detected events and/or incidents and/or sensor(s) 505 outputs (from the associated and paid for monitoring-device(s) 100) may be reported and/or communicated to tenant subscriber(s) 401, via their tenant device 303, if and when certain rule set(s) operating on the associated monitoring-device(s) 100 and/or on NINCE 367 are satisfied (or not satisfied) as has been previously noted herein. In some embodiments, monitoring services may be activated as long as rules of engagement are met, such as, but not limited to, the rented space(s) 101 are currently paid for, the monitoring service is currently paid for, tenant 401 information is sufficiently complete, a proper quantity of monitoring-device(s) 100 are assigned to the rented space(s) 101 with monitoring services, combinations thereof, and/or the like.

Continuing discussing FIG. 26A, in some embodiments, step 2225 may be a step of on-the-fly (on demand) physically installing in inventory, but not pre-installed, monitoring-device(s) 100 into the rented space(s) 101 as well as assigning (associating) those now physically installed monitoring-device(s) 100 with those rented space(s) 101 in the NINCE 367 (to enable display in user-interface-monitored-spaces-page 1500 of this assignment once step 2223 is executed). In some embodiments, execution of step 2225 may advance method 2600*a* to step 2221.

Continuing discussing FIG. 26A, in some embodiments, step 2627 may be a step of attempting to resolve unsatisfied check(s), such as failed checks from step 2603, step 2605, and/or step 2221. In some embodiments, in step 2627 NINCE 367 may initiate communications with user-interface-means 1701, tenant device 303, tenant subscriber 401, combinations thereof, seeking additional information, data, and/or instructions to resolve a failed check. Issues may be communicated and/or displayed such that corrective actions may be taken to resolve lack of compliance and/or deficient information that resulted in a rule violation and/or check violation. In some embodiments, such communication(s) may be automatically made with the appropriate end-user through various property/facility 345 UI communications including but not limited to: space monitoring facility 345 property web portal notifications, web app notifications, mobile app notification, SMS text message, mobile app alerts, web portal alerts, chatbot notifications, disposition changes in facility 345 web or app portal, through API(s) to external UI to secure complete info and take appropriate actions such as call center, direct tenant interface, robo call, third party website, combinations thereof, and/or the like. In some embodiments, execution of step 2627 may advance method 2600*a* to step 2603, step 2605, step 2221, and/or step 2225.

Figure 26B:
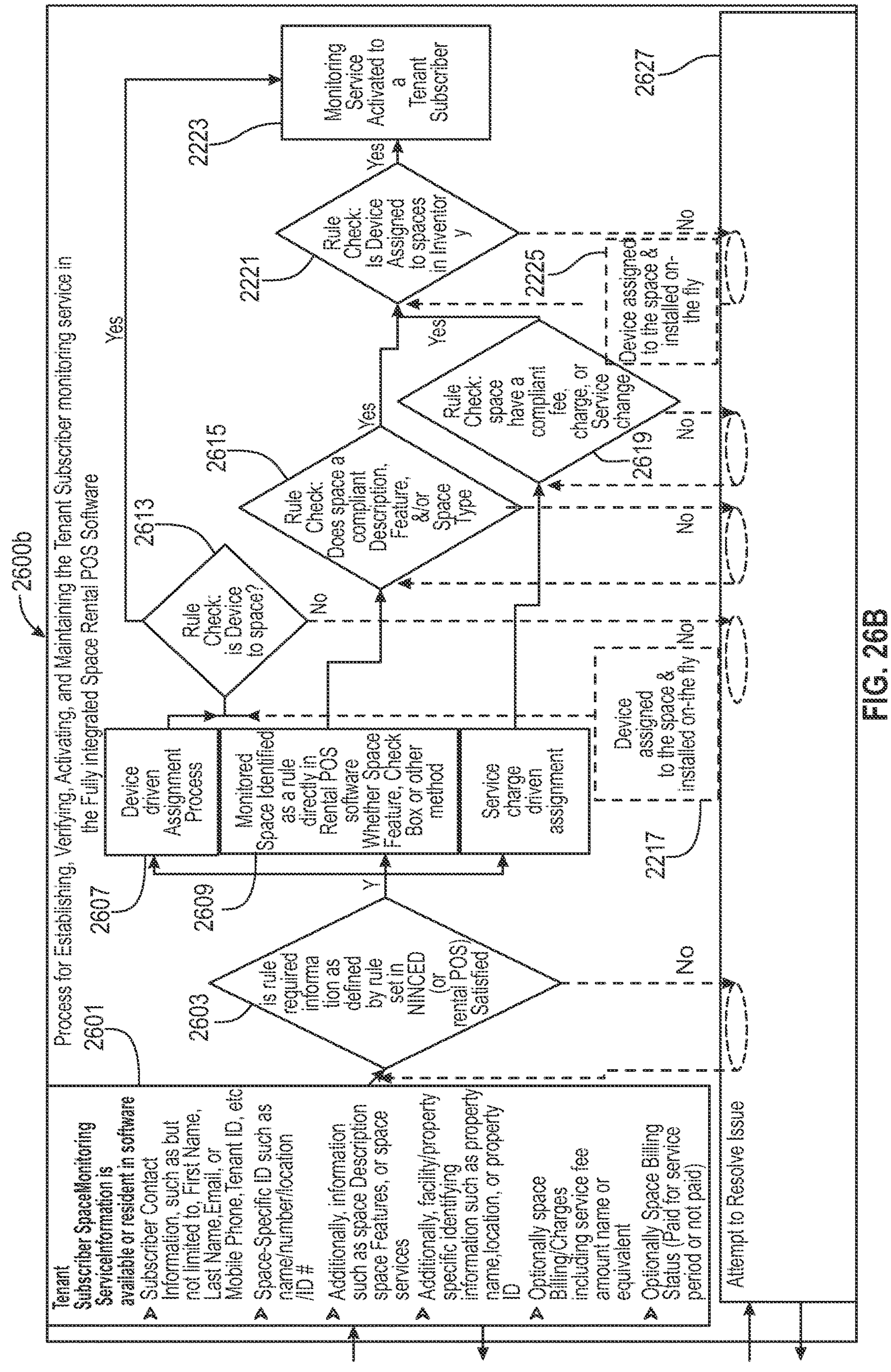
FIG. 26B is a flow diagram of a method for setting up and/or activating space(s) for monitoring service for a given tenant and/or a subscriber when the POS software may be fully and/or completely integrated with the NINCE software.

FIG. 26B is a flow diagram of a method 2600*b* for setting up and/or activating space(s) 101 monitoring for a given tenant 401 and/or subscriber when the point-of-sale (POS)

software 1715 may be interfaced and/or fully (completely) integrated (and internally interfaced) with NINCE 367. In some embodiments, method 2600*b* may support, enable, and/or facilitate at least some of the communications of FIG. 17D, FIG. 20A, FIG. 20B, and/or FIG. 25. In some embodiments, method 2600*a* may comprise one or more of the following steps: step 2601, step 2603, step 2607, list (step) 2609, list (step) 2611, step 2613, step 2615, step 2217, step 2619, step 2221, step 2223, step 2225, and/or step 2627. In some embodiments, one or more of these steps may be executed out of numeral order with respect to the step reference numerals. In some embodiments, one or more of these steps may be optional, skipped, and/or omitted. In some embodiments, the steps of method 2600*b* may be carried out in and/or by NINCE 367. In some embodiments, at least most of the steps of method 2600*b* may be carried out in and/or by NINCE 367. In some embodiments, method 2600*b* may be substantially similar to method 2600*a*, except method 2600*b* may show and/or include some additional details. In some embodiments, method 2600*a* may be a more general (broader) case as compared to method 2600*b*, which may be more specific example oriented. Note, in FIG. 26B of method 2600*b*, step 2605 of method 2600*a* (FIG. 26A) may be replaced and/or elaborated upon by: step 2607, list (step) 2609, list (step) 2611, step 2613, step 2615, step 2217, and/or step 2619.

Continuing discussing FIG. 26B, in some embodiments, a satisfied rule check in step 2603 may progress method 2600*b* to step 2607, list 2609, and/or to step 2611. In some embodiments, step 2607 may be a step of NINCE 367 and/or of facility operator 405 making in inventory monitoring-device(s) 100 assignment(s) (association[s]) to space(s) 101. In some embodiments, if there are already sufficient pre-installed 100 in inventory, then step 2607 may be skipped, omitted, and/or optional (e.g., as compared against demands/needs identified in a given tenant subscriber 401 order/subscription agreement). In some embodiments, execution of step 2607 may progress method 2600*b* to step 2613.

Continuing discussing FIG. 26B, in some embodiments, list (step) 2609 may identify, note, and/or list the type of information and/or data that the step 2615 check may be checking for. In some embodiments, step 2609 may be a step of parsing or organizing input data (e.g., from step 2601) into a useable data structure. In some embodiments, list (step) 2609 may comprise information and/or data of and/or related to particular space(s) 101, such as, but not limited to: facility 345 name and/or identifier that has those space(s) 101, that facility's 345 address, space(s) 101 ID(s) (identifier[s]) to be rented or already rented, those space(s) 101 sizes, those space(s) 101 descriptions, those space(s) 101 types, those space(s) 101 features, other point-of-sale (POS) software 1715 specified promptings to identify space(s) 101 assignment, combinations thereof, and/or the like. Note, in some embodiments, not all of these types of space(s) 101 data and/or information may be necessary for the step 2615 check to be successful. In some embodiments, the minimum info to satisfy the step 2615 check may be the facility 345 name and/or identifier and the space(s) 101 ID(s) (identifier[s]) to be rented or already rented. In some embodiments, a successful check of step 2603 may progress method 2600*b* to step 2615.

Continuing discussing FIG. 26B, in some embodiments, list 2611 may identify, note, and/or list the type of information and/or data that the step 2619 check may be checking for. In some embodiments, list 2611 may comprise information and/or data of and/or related to fees and/or costs that have been marketed to, advertised to, displayed to, and/or disclosed to the given tenant subscriber 401 for monitoring services and/or for space(s) 101 and/or fees and/or costs that the given tenant subscriber 401 has agreed to pay for monitoring services and/or for space(s) 101. In some embodiments, list 2611 may comprise information and/or data of and/or related to payment amount, payment method, payment means, info for setting up periodic recurring billing/charging (such as, but not limited to, credit card info and/or checking account info), whether a payment is due or current, current payment status, payment history, duration of recurring billing period, combinations thereof, and/or the like. In some embodiments, a successful check of step 2603 may progress method 2600*b* to step 2619.

Continuing discussing FIG. 26B, in some embodiments, step 2613 may be a step of checking if the intended to rented space(s) 101 or the already rented space(s) 101 have assigned (and installed) monitoring-device(s) 100 associated with those particular space(s) 101. In some embodiments, this check may be accomplished by NINCE 367 checking its database 1303 records to see if the assignment (association) record exists. In some embodiments, execution of step 2613 may progress method 2600*b* to step 2223 if this step 2613 check is successful or to step 2627 if this step 2613 check is unsuccessful.

Continuing discussing FIG. 26B, in some embodiments, step 2615 may be a step of checking if NINCE 367 has a minimum amount of information of the space(s) 101 to be rented and/or of the space(s) 101 that are already rented in its database 1303, such as, but limited to, any of the information in list 2609. In some embodiments, the minimum info to satisfy the step 2615 check may be the facility 345 name and/or identifier and the space(s) 101 ID(s) (identifier[s]) to be rented or already rented. In some embodiments, the minimum info to satisfy the step 2615 check may be the space(s) 101 ID(s) (identifier[s]) to be rented or already rented. In some embodiments, execution of step 2615 may progress method 2600*b* to step 2221 if the step 2615 check is successful or to step 2627 if the step 2615 check is unsuccessful.

Continuing discussing FIG. 26B, in some embodiments, step 2217 may be a step of on-the-fly (on demand) physically installing in inventory, but not pre-installed, monitoring-device(s) 100 into the rented space(s) 101 as well as assigning (associating) those now physically installed monitoring-device(s) 100 with those rented space(s) 101 in the NINCE 367 (to enable display in user-interface-monitored-spaces-page 1500 of this assignment once step 2223 is executed). In some embodiments, execution of step 2217 may progress method 2600*b* to step 2613.

Continuing discussing FIG. 26B, in some embodiments, step 2619 may be a step of checking at a minimum if the space(s) 101 rental(s) have been paid for (at the time and date of the check 2619) and if the monitoring services for those space(s) 101 with selected monitoring services have been paid for (at the time and date of the check 2619). In some embodiments, this step 2619 check may not only check if a fee has been appropriately and/or timely paid. In some embodiments, this step 2619 check may check if a fee description or service charge is present as a standalone agreement or if there is a service fee or charge on the overall renter/tenant lease (or agreement) in from the POS system. The distinction here is whether the tenant 401 pays current or not, that may or may not be the applicable rule being applied per this this step 2619 check. In some embodiments, the method 2600*a* and/or 2600*b* may decouple payment status of the service charge and/or space 101 or link them together, but a key here may be that NINCE 367 sees (is aware of) an intended charge by name and/or alphanumeric descriptor and/or by other identifiers such that NINCE 367 knows the tenant 401 desire is to set up the monitoring service. In some embodiments, there might be another embedded rule that the service fee must be paid current or the like to initiate monitoring service or to maintain monitoring service, but before payment, a basic rule (in some embodiments) is the charge itself is present with or without payment being made. In some embodiments, execution of step 2619 may progress method 2600*b* to step 2221 if the step 2619 check is successful or to step 2627 if the step 2619 check is unsuccessful.

Figure 27:
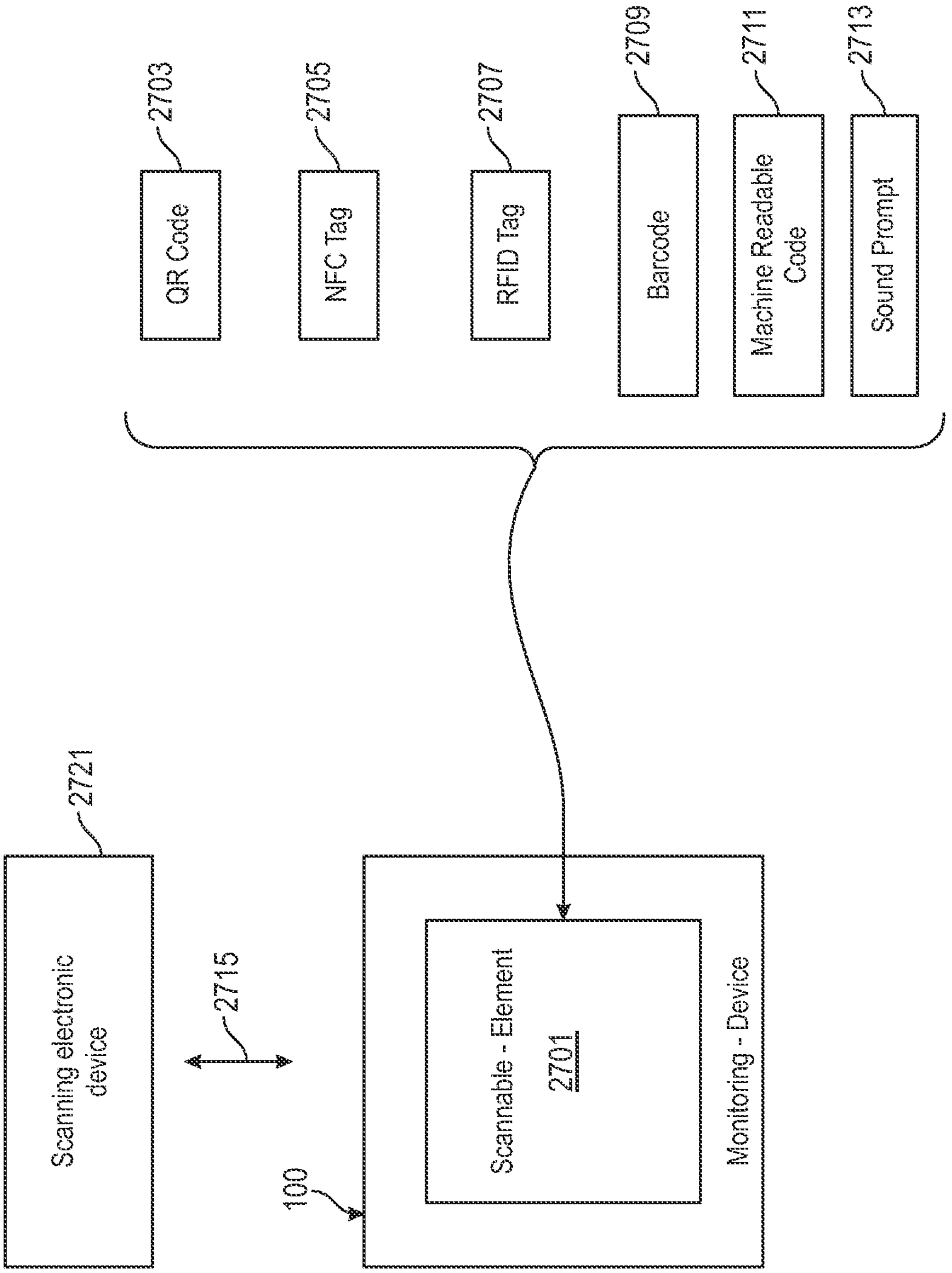

In some embodiments, a given monitoring-device 100 may be provisioned to recognize a monitoring-network of a given facility 345, such that the monitoring-network and the monitoring-device 100 recognize each other; and/or NINCE 367 may recognize, know, and/or be aware of when a given monitoring-device 100 is spatially located at a proper facility 345 to be considered as in inventory for that facility 345 if not already assigned (associated) with a tenant 401 and/or subscriber. As noted above, such provisioning may be done before or after the given monitoring-device 100 has arrived at the given facility 345. In some embodiments, such provisioning may be done by scanning (and/or the like) 2715 at least one scannable-element 2701 of monitoring-device 100, with an electronic-device 2721 that is in communication with the monitoring-services-software (NINCE 367). In some embodiments, electronic-device 2721 may be a user device, such as, but not limited to, a user computing device (such as, but not limited to, facility operator device 305 and/or tenant device 303, provider device 309, and/or third-party device 311). In some embodiments, the scannable-element 2701 may be selected from at least one of: a QR code 2703, a NFC tag 2705, a RFID tag 2707, a barcode (UPC) 2709, or a machine readable code 2711, an emitted sound prompt 2713 (e.g., from a speaker of monitoring-device 100 or spoken from a user), combinations thereof, and/or the like. See e.g., FIG. 27. FIG. 27 shows a block diagram of a monitoring-device 100, with its scannable-element 2701 and being scanned by electronic-device 2721. In some embodiments, scannable-element 2701 may be on an exterior of the given monitoring-device 100; and/or scannable-element 2701 may be located within the monitoring-device 100; and/or portions of the scannable-element 2701 may be located within the monitoring-device 100 and other portions of the scannable-element 2701 may be located on an exterior of the given monitoring-device 100. In some embodiments, electronic device 2721 may be configured to implement and/or execute the scanning, reading, interrogation, hearing, and/or sound picking up interaction 2715. In some embodiments, electronic device 2721 may comprise one or more input means, such as but not limited to, a camera, antenna, radio, reader, scanner, microphone, speaker, combinations thereof, and/or the like.

Figure 28:
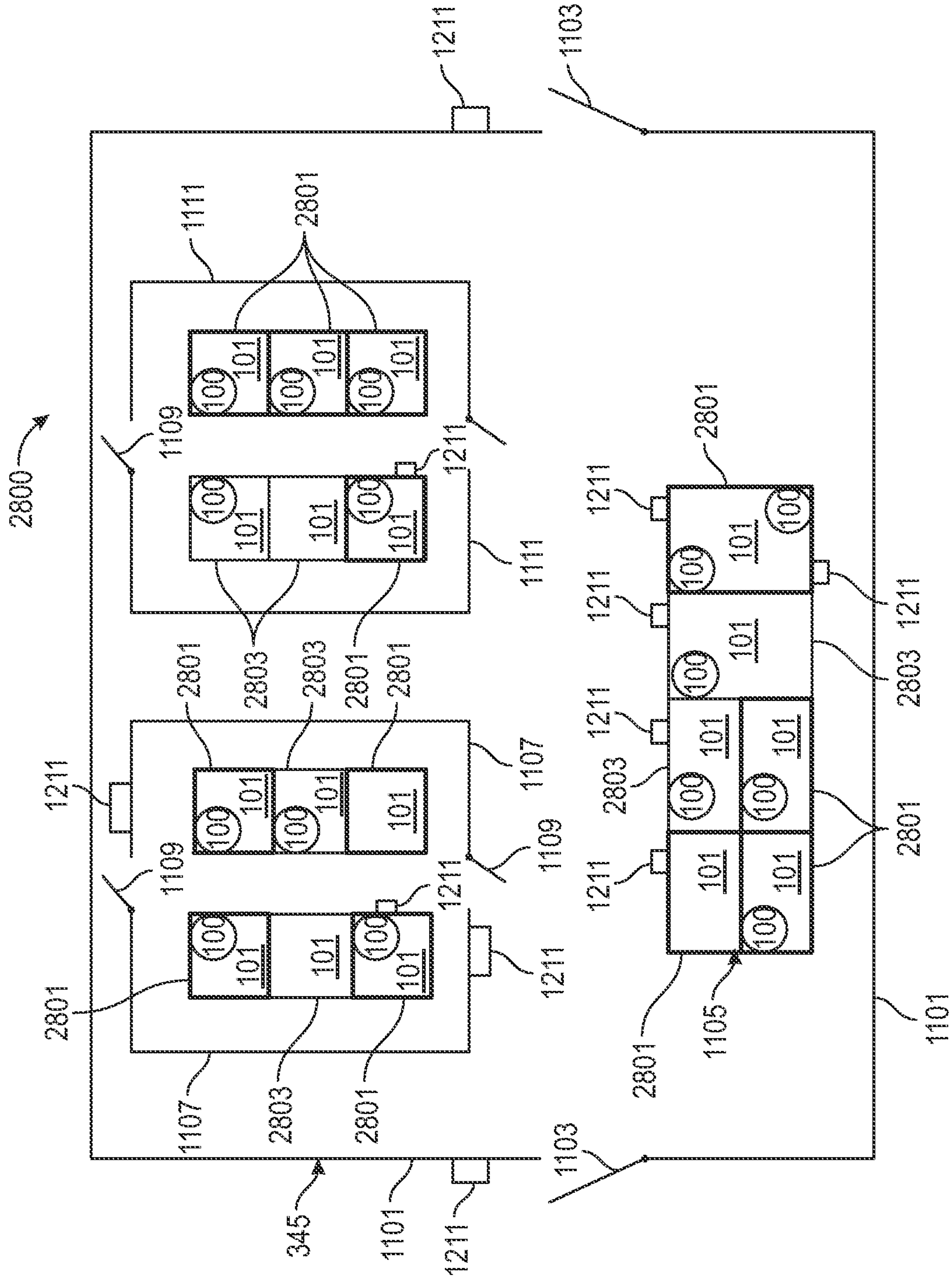
FIG. 28 shows an example of a facility-map where at least some of the transitory use spaces of the given facility may be overlaid in the facility map with some installed monitoring-devices and some of the facility's transitory use spaces may currently be without monitoring-devices; additionally, some of the facility's transitory use spaces may be vacant (not rented) or rented (leased).

FIG. 28 shows an example of a facility-map 2800 where at least some of the transitory use spaces 101 are overlaid with some installed monitoring-devices 100, which could indicate rented or pre-installed configurations. Facility-map 2800 may also show some other transitory use spaces 101 on the facility-map 2800 without installed and/or assigned monitoring-devices 100 to indicate the non-pre-installed configurations. In some embodiments, facility-map 2800 may be displayed in and/or as a part of the overall displayable user-interface (GUI). In some embodiments, when NINCE 367 updates a facility's 345 inventory, assignments, user-interface-inventory-page 1400, combinations thereof, and/or the like, the facility-map 2800 may automatically be updated as well (e.g., by NINCE 367). In some embodiments, reference numeral "2801" may denote space(s) 101 that may be tenant 401 occupied (e.g., rented and/or leased). The spaces 101 shown in FIG. 28 with a heavier outline line are associated with reference numeral "2801" for tenant-occupied-spaces 2801. In some embodiments, with respect to tenant-occupied-space(s) 2801, if at least one monitoring-device 100 is associated therewith, then monitoring services may be active (on) (from the tenant's 401 perspective) per at least one of the systems and/or methods discussed earlier (see e.g., step 2223). In some embodiments, with respect to tenant-occupied-space(s) 2801, if at least one monitoring-device 100 is not associated therewith, then monitoring services may be not active (on) from the tenant's 401 perspective (e.g., because tenant 401 opted to not have such monitoring service); however, such a tenant-occupied-space(s) 2801, may be a candidate for a future upgrade to monitoring service, via the on-the-fly route.

Continuing discussing FIG. 28, in some embodiments, reference numeral "2803" may denote space(s) 101 that are not currently tenant 401 occupied (e.g., not currently rented and/or leased), i.e., vacant space(s) 101. The spaces 101 shown in FIG. 28 with a non-heavier (normal weighted) outline line are associated with reference numeral "2803" for non-tenant-occupied-spaces 2803. In some embodiments, with respect to non-tenant-occupied-space(s) 2803, if at least one monitoring-device 100 is associated therewith, then that non-tenant-occupied-space(s) 2803 may be a pre-assigned (and pre-installed) space 101 that may be ready for contactless monitoring service activation. In some embodiments, with respect to non-tenant-occupied-space(s) 2803, if at least one monitoring-device 100 is not currently associated therewith, then that non-tenant-occupied-space(s) 2803 may not be intended to be monitored (e.g., by the facility operator 405) or may be a candidate space 101 that is appropriate for on-the-fly (on demand) upgrade to monitoring services.

In some embodiments, the checks of step 2203, step 2205, step 2213, step 2215, step 2219, step 2221, step 2603, step 2605, step 2613, step 2615, step 2619, combinations thereof, and/or the like may be characterized by one or more of the following checks: (a) checking if monitoring-services-software (NINCE 367) has access to sufficient user-information of the user (such as, but not limited to, tenant 401 or a prospective tenant 401); (b) checking if the monitoring-services-software (NINCE 367) has access to sufficient space-information of the space 101; (c) checking if the monitoring-services-software (NINCE 367) has access to a record (data linkage) of at least one monitoring-device 100, that is located at a facility 345, being assigned and installed to the space 101, wherein the space 101 is part of the facility 345; (d) checking if the monitoring-services-software (NINCE 367) has access to a record (data linkage) of at least one monitoring-device 100 being assigned and installed to a mobile space 101; and/or (e) checking if the monitoring-services-software (NINCE 367) has access to sufficient payment-information. In some embodiments, if checks (a) and (b) and (c) or (d) are executed successfully, then the monitoring services may be activated for the user (tenant 401) with respect to the space 101 and with respect to using the at least one monitoring-device 100 to monitor that space 101. In some embodiments, successful execution of check (e) may or may not be required to activate the monitoring service for the user (tenant 401).

In some embodiments, if the step (a) check is not successful, then the monitoring-services-software (NINCE 367) communicates with at least one user-interface-means 1701 requesting that the user-information be provided to the monitoring-services-software (NINCE 367).

In some embodiments, if the step (b) check is not successful, then the monitoring-services-software (NINCE 367) communicates with point-of-sale-rental-software 1715 or with the at least one user-interface-means 1701, requesting that the space-information be provided to the monitoring-services-software (NINCE 367).

In some embodiments, if the step (c) check is not successful, then the monitoring-services-software (NINCE 367) communicates with the point-of-sale-rental-software 1715, with the at least one user-interface-means 1701, requesting that the at least one monitoring-device 100 be installed to the space 101; and the monitoring-services-software (NINCE 367) forms (creates and/or generates) the assignment between the at least one monitoring-device 100 and the space 101 (e.g., in the form of a record/data linkage).

In some embodiments, if the step (d) check is not successful, then the monitoring-services-software (NINCE 367) communicates with the point-of-sale-rental-software 1715, with the at least one user-interface-means 1701, requesting that the at least one monitoring-device 100 be installed to the space 101; and the monitoring-services-software (NINCE 367) forms (creates and/or generates) the assignment between the at least one monitoring-device 100 and the space 101 (e.g., in the form of a record/data linkage). Note, the check (c) and (d) are for two different use cases, one where the space 101 is fixed and one where the space 101 is mobile.

In some embodiments, if the step (e) check is not successful, then the monitoring-services-software (NINCE 367) communicates with the point-of-sale-rental-software 1715 or with the at least one user-interface-means 1701, requesting that the payment-information be provided to the monitoring-services-software (NINCE 367).

Note, in cases where the monitoring-services-software (NINCE 367) has been fully integrated with the point-of-sale-rental-software 1715, then NINCE 367 may just be communicating with itself, i.e., communications between different software modules, between a monitoring-services module and a POS rental module.

In some embodiments, the user-information, the space-information, and/or the payment-information may be received at a computer (e.g., at least one computer-server 309) that is executing the monitoring-services-software (NINCE 367).

In some embodiments, the monitoring-services-software (NINCE 367) may be non-transitorily stored in storage and/or in memory of at least one computer (e.g., at least one computer-server 309), wherein the monitoring-services-software (NINCE 367) executes via at least one processor of the at least one computer.

In some embodiments, the user-information may be selected from at least one of: a name of the user, a first name of the user, a last name of the user, an email address of the user, a mobile or smart phone number of the user, a physical address of the user, a mailing address of the user, a combination thereof, and/or the like. In some embodiments, the user may be a tenant 401 (or a prospective tenant 401). In some embodiments, the sufficient user-information may be a name of the user and at least one contact means of the user. In some embodiments, the at least one contact means of the user may be mobile phone number (of the user) or a smart phone number (of the user). In some embodiments, the sufficient user-information may be a name of the user and a mobile number (of the user) or smart phone number (of the user).

In some embodiments, the space-information may be selected from at least one of: an identifier of the facility 345, an identifier for the space 101, a description of the space 101, a type of the space 101, a feature of the space 101, a location of space 101, combinations thereof, and/or the like. In some embodiments, the sufficient space-information may be an identifier of the space 101.

In some embodiments, the record (data linkage), when the record exists, may be non-transitorily stored in a database 1303 that is communication with the monitoring-services-software (NINCE 367); and/or in some embodiments, the record (data linkage), when the record exists, may be non-transitorily stored in storage of at least one computer (e.g., a computer-server 309) that is configured to execute the monitoring-services-software (NINCE 367), wherein the monitoring-services-software (NINCE 367) is in communication with the storage.

In some embodiments, the payment-information may be selected from at least one of: information to enable consummation of a payment without the user being physically present at the facility; a payment price for monitoring services of the controlled space for transitory use; a payment price for rental of the controlled space for transitory use; a payment schedule for when to charge for monitoring services of the controlled space for transitory use; a payment schedule for when to charge for rental of the controlled space for transitory use; current payment status for monitoring services of the controlled space for transitory use; current payment status for rental of the controlled space for transitory use; payment history with respect to monitoring services of the controlled space for transitory use; or payment history with respect to rental of the controlled space for transitory use, a particular fee, a particular service fee, a particular charge, a particular service charge, a name for any of the foregoing, an identifier for any of the foregoing, a descriptor of any of the foregoing, combinations thereof, and/or the like.

In some embodiments, the sufficient payment-information may be the presence (receipt) of at least one of the immediately above identified possible payment-information options. In some embodiments, receival of the payment-information for purposes of satisfying check (e) may not be concerned with the contents and/or actual nature of patent related information, but may be concerned simply with receiving at least some sort of identifier, name, and/or descriptor that the monitoring-services-software (NINCE 367) may base it decision off of.

In some embodiments, the sufficient payment-information may be selected from at least one of: information to enable consummation of a payment without the user being physically present at the facility; and a payment price for monitoring services of the controlled space for transitory use.

In some embodiments, the at least one user-interface-means 1701 may be selected from at least one of: a mobile app, a web page, a web portal, a call center, a chatbot, a computer of the facility 345, personnel of the facility 345, a computer of personnel of the facility 345, wallet-pass software executing on a user-computing-device, a NFC interaction, a RFID interaction, a QR code interaction, a UPC barcode interaction, a barcode interaction, combinations thereof, and/or the like.

In some embodiments, the monitoring-services-software (NINCE 367) communicates with the at least one user-interface-means 1701 via at least one application-program-interface (API) between the monitoring-services-software (NINCE 367) and the at least one user-interface-means 1701. In some embodiments, when the at least one user-interface-means 1701 is capable of being communicated with by an API, then the monitoring-services-software (NINCE 367) communicates with such a user-interface-means 1701 via at least one API between the monitoring-services-software (NINCE 367) and that user-interface-means 1701.

In some embodiments, the monitoring-services-software (NINCE 367) communicates with the point-of-sale-rental-software 1715 via at least one API between the monitoring-services-software (NINCE 367) and the point-of-sale-rental-software 1715. In some embodiments, when the point-of-sale-rental-software 1715 is capable of being communicated with by an API, then the monitoring-services-software (NINCE 367) communicates with such a point-of-sale-rental-software 1715 via at least one API between the monitoring-services-software (NINCE 367) and that point-of-sale-rental-software 1715.

In some embodiments, the monitoring-service-software (NINCE 367) activates, suspends, or terminates monitoring service of a space 101, with an assigned (associated) and installed at least one monitoring-device 100, through automated information retrieval and communication via at least one API with the at least one user-interface-means 1701.

In some embodiments, the monitoring-service-software (NINCE 367) activates, suspends, or terminates monitoring service of a space 101, with an assigned (associated) and installed at least one monitoring-device 100, through automated information retrieval and communication via at least one API with the point-of-sale-rental-software 1715.

In some embodiments, the monitoring-service-software (NINCE 367) may be standalone software, a software module that part of a larger piece of software, or an "intermediary software." Intermediary software is explained further below.

In some embodiments, the monitoring-services-software (NINCE 367) and the point-of-sale-rental-software may be fully integrated together as a single piece of software, such that the monitoring-services-software (NINCE 367) is a first module of the single piece of software and the point-of-sale-rental-software is a second module of the single piece of software, wherein the first module and the second module may be in communication with each other. In some embodiments, such internal communication may be done with at least one internal API (e.g., communicating between the first module and the second module). In some embodiments, the single piece of software (comprising at least the first module and the second module) may communicate with the at least one user-interface-means 1701 via at least one API between the single piece of software and the at least one user-interface-means 1701.

In some embodiments, monitoring-device(s) 100 may be centrally and/or remotely for use a given facility 345. In some embodiments, prior to the at least one monitoring-device 100 arriving at the facility 345, the at least one monitoring-device 100 may be provisioned to recognize a monitoring-network of the facility 345, such that when the at least one monitoring-device 100 arrives at the facility 345 and is within radio communication range with the monitoring-network, the monitoring-network and the at least one monitoring-device 100 recognize each other. In some embodiments, this may be referred to as pre-provisioning. In some embodiments, with respect to provisioning, a given monitoring-device 100 not necessarily need be recognized by the monitoring-network (primary network) of the given facility 345. In some embodiments, monitoring-device 100 could use its secondary antenna 507*b* (e.g., configured for cellular communications) and/or use NFC, RFID, or QR code interaction(s) to recognize the given facility 345. Pre-provisioning may also be done centrally and may for example register on the property 345 when the box (package and/or parcel) of monitoring-device(s) 100 were registered as received at destination as a box (package and/or parcel) shipped to property receipt (which may be obtained via API with the shipper's software).

In some embodiments, upon a monitoring-network of the facility 345 and the at least one monitoring-device 100 recognizing each other (because the at least one monitoring-device 100 has been provisioned to recognize the monitoring-network of that facility 345), the at least one monitoring-device 345 or the monitoring-network communicates this recognition to the monitoring-services-software (NINCE 367), and then the monitoring-services-software (NINCE 367) automatically places that the at least one monitoring-device 100 into an "in inventory" status designation for that facility 345. In some embodiments, regardless of monitoring-device(s) 100 locations, which may change, the monitoring-services-software (NINCE 367) may be know and/or be aware of such location(s) and may determine and/or set different status designation for the monitoring-device(s) 100 based on such different locations, wherein the "in inventory" status designation may be only one such status designation selected from a plurality of status designations. For example, and without limiting the scope of the present invention, the plurality of status designations may progress from "not-provisioned," to "shipping" (in transit or the like), to "in inventory," to assigned and/or to installed, to association with a given tenant 401, combinations thereof, and/or the like. In some embodiments, the "in inventory" status designation (disposition) may mean that the monitoring-device(s) 100 have arrived at the given facility 345, are recognized by the monitoring-services-software (NINCE 367) and/or by the monitoring-network of the given facility 345, and/or may be ready for assignment and/or installation with respect to a given space 101 (of the given facility 345). At least one such different status designation (and/or disposition) may be made available by the monitoring-services-software (NINCE 367) to a given user (e.g., in a graphical-user-interface [GUI] that the user may be able to access).

In some embodiments, information of monitoring-devices 100 of the facility 345 with an "in inventory" status designation may be displayable in a graphical user interface (GUI), namely, a user-interface-inventory-page or the like.

In some embodiments, the in inventory status designation may mean these monitoring-devices 100 are at the facility 345 and are ready for monitoring, wherein these monitoring-devices 100 are either assigned to a (vacant) space 101 of the facility 345 or are not yet assigned, wherein either or both assignment scenarios is displayable in the user-interface-inventory-page or the like.

In some embodiments, assignments of the monitoring-devices 100 between different spaces 101 or to no space 101 assignment at all, may be changed by an (approved) operator of the user-interface-inventory-page or the like.

In some embodiments, after the at least one monitoring-device 100 has arrived at the facility 345, the at least one monitoring-device 100 may be provisioned to recognize a monitoring-network of the facility 345, such that the monitoring-network and the at least one monitoring-device 100 recognize each other. In some embodiments, such provisioning may be done by scanning a scannable-element 2701 of the at least one monitoring-device 100, with an electronic-device 2721 that is in communication with the monitoring-services-software (NINCE 367). In some embodiments, the scannable-element 2701 may be selected from at least one of: a QR code 2703, a NFC tag 2705, a RFID tag 2707, a barcode 2709, or a machine readable code 2711, sound prompt 2713, combinations thereof, and/or the like. In some embodiments, the electronic-device 2721 may have a microphone to pick up (hear) the audible sound prompt 2713 and that electronic-device 2721 may then pass this recorded sound prompt 2713 to the monitoring-services-software (NINCE 367).

In some embodiments, after the at least one monitoring-device 100 has arrived at the facility 345, the at least one monitoring-device 100 may be provisioned to operate as intended at that facility 345 by the monitoring-services-software (NINCE 367) determining and/or knowing that the at least one monitoring-device 100 is at a proper (correct) location with respect to that facility 345 (e.g., because the at least one monitoring-device 100 may be in cellular communication with the monitoring-services-software [NINCE 367] and the at least one monitoring-device 100 may have a GPS module or the like).

In some embodiments, prior to the user paying for monitoring service of the space 101 or prior to the user paying for rental of the space 101 (e.g., when inclusion of monitoring service may be built into the space 101 rental price), the at least one monitoring-device 100 may be installed in a manner to monitor the space 101 and the at least one monitoring-device 100 may also be assigned (associated) to the space 101 in the record (data linkage) by the monitoring-services-software (NINCE 367). In some embodiments, the installment may trigger auto assignment (e.g., by the monitoring-services-software [NINCE 367] being aware of location of the at least one monitoring-device 100 in relation to the space 101; i.e., auto assignment may occur when the proximity is sufficiently close). In some embodiments, assignment (e.g., creation of the record [data linkage]) may trigger the monitoring-services-software (NINCE 367) to send out a notification (message) to an appropriate user and/or their user-device that the at least one monitoring-device 100 needs to be installed if the at least one monitoring-device 100 has not yet been installed (because the monitoring-services-software [NINCE 367] based on its locational awareness of the at least one monitoring-device 100 in relation to the space 101 may know when installment has not occurred because the at least one monitoring-device 100 and the space 101 are too far away from each other).

In some embodiments, after the user has paid for monitoring service of the space 101 or after the user has paid for rental of the space 101 (e.g., when inclusion of monitoring service may be built into the space 101 rental price), but before activation of the monitoring service for the user, the at least one monitoring-device 100 is installed to monitor the space 101 and the at least one monitoring-device 100 is assigned to the space 101 in the record (data linkage) by the monitoring-services-software (NINCE 367). In some embodiments, the installment may trigger auto assignment (e.g., by the monitoring-services-software [NINCE 367] being aware of location of the at least one monitoring-device 100 in relation to the space 101; i.e., auto assignment may occur when the proximity is sufficiently close). In some embodiments, assignment (e.g., creation of the record [data linkage]) may trigger the monitoring-services-software (NINCE 367) to send out a notification (message) to an appropriate user and/or their user-device that the at least one monitoring-device 100 needs to be installed if the at least one monitoring-device 100 has not yet been installed (because the monitoring-services-software [NINCE 367] based on its locational awareness of the at least one monitoring-device 100 in relation to the space 101 may know when installment has not occurred because the at least one monitoring-device 100 and the space 101 are too far away from each other).

At least some embodiments of the present invention may be at least one system, characterized as at least one system, and/or implemented as at least one system. In some embodiments, the system may be for managing, controlling, and/or automating: at least one monitoring-device 100, one or more monitoring-devices 100, or a plurality of monitoring-devices 100, with respect to one or more of: inventory management; pre-provisioning; local (post) provisioning; monitoring-device(s) 100 status designations; monitoring-device(s) 100 assignments to space(s) 101; physical installations of monitoring-device(s) 100 auto triggering assignment(s) to space(s) 101; in inventory pre-assigned and/or pre-installed monitoring-device(s) 100; pre-assigned and/or pre-installed monitoring-device(s) 100 triggering need to physically install notifications (messaging); in inventory loose monitoring-device(s) 100; on demand monitoring service activation; on-the-fly monitoring service activation; activation of monitoring service; suspension of monitoring service; termination of monitoring service; user-interface(s) thereof; graphical user-interface(s) (GUI(s)) thereof; partial automations thereof; automations thereof; combinations thereof; and/or the like. In some embodiments, a system may comprise at least one monitoring-device 100 and NINCE 367. In some embodiments, a system may comprise one or more monitoring-devices 100 and NINCE 367. In some embodiments, a system may comprise a plurality of monitoring-devices 100 and NINCE 367. In some embodiments, a system may comprise at least one monitoring-device 100, NINCE 367, and the overall displayable user-interface (GUI) (or a portion thereof). In some embodiments, the system may further comprise a graphical-user-interface, which may be the overall displayable user-interface (GUI) (or a portion thereof). In some embodiments, a system may comprise at least one monitoring-device 100, NINCE 367, and the Inventory Management software (e.g., the overall displayable user-interface (GUI), e.g., with the user-interface-inventory-page 1400). Note, in some embodiments, the Inventory Management software may be a module or portion of NINCE 367. In some embodiments, a system may combine at least one monitoring-device 100, NINCE 367, and the Inventory Management software. In some embodiments, NINCE 367 may be software, code, and/or programming. In some embodiments, NINCE 367 may be a set of instructions that is non-transitorily stored in memory (and/or storage) of at least one computer-server 309 and that is executable by at least one server-processor (i.e., a processor) of the at least one computer-server 309. In some embodiments, the set of instructions may be configured to instruct at least one processor 501 of the monitoring-device 100 in how to operate and/or function. In some embodiments, the Inventory Management software (e.g., the overall displayable user-interface (GUI), e.g., with the user-interface-inventory-page 1400) may be a portion and/or an aspect (e.g., software module) of NINCE 367. In some embodiments, a monitoring-device 100, selected from a plurality of the monitoring-devices 100, may comprise: at least one sensor 505; at least one radio 507; and at least one processor 501. In some embodiments, the at least one sensor 505 is configured for sensing condition(s) of a space 101, selected from a plurality of spaces 101. In some embodiments, a space 101 selected from the plurality of spaces 101 is a controlled space is for transitory use 101. In some embodiments, the at least one radio 507 is configured for two-way (bidirectional) wireless communications with the at least one computer-server 309

(where info and/or data may be passed from one to the other and vice-versa, including but not limited to, device configurations). In some embodiments, the at least one processor 501 controls the at least one sensor 505 and controls the at least one radio 507. In some embodiments, the at least one processor 501 is operatively linked to the at least one sensor 505 and also operatively linked to the at least one radio 507. In some embodiments, the plurality of the monitoring-devices 100 and the set of instructions (NINCE 367) are in at least intermittent communications with each other (e.g., when each has power and a minimum level of connectivity to each other).

In some embodiments, such a system may be a novel, on-demand service system for end-users of controlled use spaces 101. In some embodiments, such a system may automatically activate on-demand monitoring of the space 101; automatically pause on-demand monitoring of the space 101; automatically suspend on-demand monitoring of the space 101; automatically terminate on-demand monitoring of the space 101; automatically cancel on-demand monitoring of the space 101; permitting on-the-fly of service activation; permitting pre-associated (pre-assignment) activation of service activation; permitting transferring of monitoring-devices 100 between spaces 101 for the purpose for purpose of: ease-of-use, optimization of monitoring-devices 100 inventory to meet on-demand requirements on-the-fly or for pre-planning, intentionally optimizing inventory preparation for future demand for moving from one slower mover space(s) 101 to higher demand space(s) 101; combinations thereof; and/or the like.

In some embodiments, the entire overall displayable user-interface (GUI) or a portion thereof may be configured for use by a given end-user, such as, but not limited to, the facility operator 405; e.g., displayable, viewable, and/or engageable on that user's user device (e.g., facility operator device 305).

In some embodiments, the entire overall displayable user-interface (GUI) or a portion thereof may be configured for use by a given end-user other than the facility operator 405, such as, but not limited to, a tenant 401; e.g., displayable, viewable, and/or engageable on that user's user device (e.g., tenant device 303).

In some embodiments, at least one such system may be configured to execute and/or implement any method and/or any step disclosed, noted, and/or discussed herein.

With respect to a system, in some embodiments, at least some of the plurality of the monitoring-devices 100 may be pre-provisioned for intended use at a facility 345 before the at least some of the plurality of the monitoring-devices 100 arrives at the facility 345, such that when the at least some of the plurality of the monitoring-devices 100 do arrive at the facility 345, the at least some of the plurality of the monitoring-devices 100 work as intended without any additional setup or configuration. In some embodiments, this pre-provisioning may be done by the set of instructions (NINCE 367) linking identifiers of the at least some of the plurality of the monitoring-devices 100 with an identifier of the facility 345 and/or with an identifier of a monitoring-network of the facility 345.

With respect to a system, in some embodiments, when at least some of the plurality of the monitoring-devices 100 arrive at a facility 345 and that have not been pre-provisioned, the set of instructions (NINCE 367) checks if the at least some of the plurality of the monitoring-devices 100 are at an intended location (e.g., at the correct/intended facility 345) and if so, locally provisions the at least some of the plurality of the monitoring-devices 100 for intended use on a monitoring-network of the facility 345. In some embodiments, the monitoring-device 100, selected from the plurality of the monitoring-devices 100, may comprise a GPS-module that is in communication with the at least one processor 501. In some embodiments, the GPS-module is configured to determine a positional location of the monitoring-device 100. In some embodiments, positional location information from the GPS-module is communicated to the set of instructions (NINCE 367).

With respect to a system, in some embodiments, when at least some of the plurality of the monitoring-devices 100 arrive at a facility 345, the set of instructions (NINCE 367) checks if the at least some of the plurality of the monitoring-devices 100 are at an intended location (e.g., at the correct facility 345) and if so, changes a status designation of the at least some of the plurality of the monitoring-devices 100 to "in inventory" for that particular facility 345. In some embodiments, this may be enabled by pre-provisioning. In some embodiments, at least some of the set of instructions (NINCE 367) enables and/or causes display of a graphical user interface (GUI) (e.g., the overall displayable user-interface (GUI) or a portion thereof) for use upon/with user-computing-devices (such as, but not limited to, facility operator device 305). In some embodiments, this graphical-user-interface (GUI) for the facility 345 may display information of the at least some of the plurality of the monitoring-devices 100 that have the status designation of "in inventory." Note, the actual language of "in inventory" may or may not be used in such a GUI.

With respect to a system, in some embodiments, the set of instructions (NINCE 367) causes a data linkage (linkage record) between at least one monitoring-device 100, selected from the plurality of the monitoring-devices 100, to at least one space 101, selected from the plurality of spaces 101, by associating an identifier of the at least one monitoring-device 100 to an identifier of the at least one space 100. In some embodiments, once such a data linkage has been created (and remains relevant) it may be non-transitorily maintained (stored) in memory and/or storage of the at least one computer-server 309 and/or in a database, such as, but not limited to, database 1303.

In some embodiments, the set of instructions (NINCE 367) checks to verify if a location of the at least one monitoring-device 100 is correct with respect to monitoring of the at least one space 101 (e.g., the location of the 100 matches the location of space 101). In some embodiments, if this check fails, then the set of instructions (NINCE 367) causes a notification (message) to be sent to a user or to a user-device asking that the at least one monitoring-device 100 be physically installed to monitor the at least one space 101. In some embodiments, if this check passes, then the set of instructions (NINCE 367) may have a rule that assumes that the at least one monitoring-device 100 is correctly installed with respect to that particular at least one space 101.

In some embodiments, when the data linkage is created before the at least one space 101 is rented to a tenant 401, then the at least one space 101 may be configured for contactless activation of monitoring service when the at least one space 101 is rented, wherein commencement of the contactless monitoring service does not require any human intervention at the at least one space 101. This may be at least one advantage of the pre-install/pre-assignment configuration. In some embodiments, the at least one space 101 that has the pre-install/pre-assignment configuration, may be designated as being ready for (immediate and/or contactless) monitoring service within a graphical user interface (GUI)

that the set of instructions (NINCE 367) codes for. In some embodiments, when the data linkage is created before the at least one space 101 is rented to a tenant 401, and wherein the at least one space 101 is two or more such pre-installed/pre-assigned configured spaces 101, then information of those two or more spaces 101 may be displayable in a graphical user interface (GUI) that the set of instructions (NINCE 367) codes for, wherein the graphical user interface (GUI) may be configured to permit the tenant 401 to select from among those two or more spaces 101. In some embodiments, when the tenant 401 does selects from among those two or more spaces 101, then monitoring services may be automatically activated by the set of instructions (NINCE 367) with respect to the tenant's 401 selection and without any need for facility operator 405 personnel intervention.

In some embodiments, as an alternative to the pre-install/pre-assignment configuration, may be the on demand on-the-fly configuration, wherein on demand monitoring service may be enabled when the data linkage is created during or after the at least one space 101 is rented to a tenant 401. In some embodiments, (on demand and/or on-the-fly) monitoring service of the at least space 101 may be automatically activated when the data linkage is created during or after an act of renting the at least one space 101 to a tenant 401. In some embodiments, "after" in this context may be within one month of a rental period starting.

With respect to a system, in some embodiments, when the set of instructions (NINCE 367) may determine that at least one monitoring-device 101, selected from the plurality of the monitoring-devices 100, is in correct proximity to at least one space 101, selected from the plurality of spaces 101, that is intended to be monitored by the at least one monitoring-device 100, then the set of instructions (NINCE 367) causes a data linkage between the at least one monitoring-device 100 and the at least one space 100, by associating an identifier of the at least one monitoring-device 100 to an identifier of the at least one space 101, if the data linkage does not already exist. In some embodiments, "correct proximity" (or sufficient proximity or enabling proximity or the like) in this context may mean that the at least one monitoring-device 100 and its at least one space 101 are sufficiently close for that at least one monitoring-device 100 to monitor that at least one space 101; which in some embodiments may mean that the at least one monitoring-device 100 is physically within the at least one space 101, is attached to the at least one space 101, is within line of sight of the at least one space 101 as determined by an optical sensor 505 of the at least one monitoring-device 100, combinations thereof, and/or the like. In some embodiments, when a prospective tenant 401 of the at least one space 101 requests monitoring service of the at least one space 101 from a point-of-sale (POS) rental software system, the set of instructions (NINCE 367), being in communication with the point-of-sale rental software system, checks proximity of the at least one monitoring-device 100 to the at least one space 101. In some embodiments, if the proximity is insufficient, then the set of instructions (NINCE 367) causes the data linkage to be formed (created and/or generated) and the set of instructions (NINCE 367) causes a notification to be sent to a user or to a user-device asking that the at least one monitoring-device 100 be physically installed to monitor the at least one space 101.

With respect to a system, in some embodiments, the set of instructions (NINCE 367) causes a data linkage between at least one monitoring-device 100, selected from the plurality of the monitoring-devices 100, to at least one space 101, selected from the plurality of spaces 101, by associating an identifier of the at least one monitoring-device 100 to an identifier of the at least one space 101. If the timing of this data linkage formation is before a tenant 401 rents the at least one space 101, then this may be the pre-assignment/pre-install configuration/scenario.

With respect to a system, in some embodiments, the set of instructions (NINCE 367) performs at least one check before activating monitoring service for a tenant 401, wherein the monitoring service for the tenant 401 is enabled by at least one monitoring-device 100, selected from the plurality of the monitoring-devices 100, monitoring at least one space 101, selected from the plurality of spaces 101.

With respect to a system, in some embodiments, the set of instructions (NINCE 367) performs at least one check before suspending monitoring service for a tenant 401, wherein the monitoring service for the tenant 401 is enabled by at least one monitoring-device 100, selected from the plurality of the monitoring-devices 100, monitoring at least one space 101, selected from the plurality of spaces 101. In some embodiments, failure of this at least one check may result in tenant 401 being suspended from the monitoring service. In some embodiments, if or when the monitoring service for the tenant 401 is suspended, the monitoring service for a facility operator 405 is optionally (may be) still active; wherein the facility operator 405 operates or manages a facility 345 where the at least one space 101 is located.

With respect to a system, in some embodiments, when the set of instructions (NINCE 367) performs at least one check before terminating monitoring service for a tenant 401, wherein the monitoring service for the tenant is enabled by at least one monitoring-device 100, selected from the plurality of the monitoring-devices 100, monitoring at least one space 101, selected from the plurality of spaces 101. In some embodiments, failure of this at least one check may result in tenant 401 being terminated from the monitoring service. In some embodiments, if the monitoring service for the tenant 401 is terminated, the monitoring service for a facility operator 405 is optionally (may be) still active; wherein the facility operator 405 operates or manages a facility 345 where the at least one space 101 is located.

Note in some use cases assignment (between a given monitoring-device 100 and a given space 101) may occur before physical installment (of that monitoring-device 100 so it may actually monitor that given space 101); whereas, in other cases the physical installment may occur before the assignment. Whichever comes first, may then trigger the other to occur, if the other has not yet occurred. This may be empowered and/or automated by NINCE 367 knowing, determining, and/or having access to positional location information for: monitoring-devices 100 (e.g., via GPS module and/or via network interactions) and for space(s) 101 (e.g., via presence identifiers 1211 associated with spaces 101 and/or facility-map 2800) of/at a given facility 345.

Note, in some embodiments, an API for any arrow interacting with NINCE 367 in the attached drawings may be implemented as third party software or may be software that built and/o owned by the same entity that built and/or owns NINCE 367, or may be software that is integrated, in whole or in part, with NINCE 367.

In some embodiments, NINCE 367 may be a standalone piece of software, e.g., with portions operating on computer-server(s) 309, on monitoring-device(s) 100, and/or generating GUIs. In some embodiments, a core functionality of NINCE 367 is its monitoring-software. However, in some embodiments, NINCE 367 may be fully integrated with the POS rental software, such that the resulting software, the single piece of software, retains the full functionally of the non-integrated NINCE 367 and the non-integrated POS rental software—but in the applicable figures (e.g., FIG. 17D and FIG. 25), the integrated NINCE 367 may be referenced using reference numeral "367." In some embodiments, NINCE 367, with its core monitoring functionality, may be defined more widely as a functional element that may be included in POS rental software and/or in/as fully integrated POS rental software with inherent comprehensive monitoring capability included. If the NINCE 367 core monitoring functionality gets absorbed by integrating into other software, that resulting software still retains that core monitoring functionality.

Note, any QR (quick response) code, NFC (near field communication), RFID (radio frequency ID and/or radio frequency identification), and/or the like communications and/or interactions discussed herein may be implemented and/or executed in and/or with a wallet pass configuration (embodiment).

Note, any QR code communications and/or interactions discussed herein may be replaced with other types of codes, such as, but not limited to, bar code(s), UPC (universal product code) code(s), 2D code(s) (two-dimensional code (s)), 3D code(s) (three-dimensional code(s)), optical code(s), combinations thereof, and/or the like.

QR code(s), NFC, and RFID are all terms of art in the computing, communications, and/or high-tech industries, where industry accepted definitions and usages are incorporated by reference herein.

In some embodiments, facility 345 may be selected from one or more of: a parcel of real estate, an area of real estate, a house, a condominium (a condo), a hotel, a motel, an inn, a boarding house, a dormitory (a dorm), a building, a building structure, a walled structure, a walled area, a fenced area, a gated area, a campus, grounds, a mobile space, a shipping container, a room thereof, a space thereof, a portion thereof, combinations thereof, and/or the like; and whether for residential, commercial, business, retail, wholesale, combinations thereof, and/or the like use(s). The metes and boundaries of any such facility 345 space may be as defined in a legal document (e.g., a deed, a title, an assignment, a survey, a registration, and/or the like), by a street address, as shown in a map, combinations thereof, and/or the like.

Note, while some of the above has been described, discussed, and/or explained in the context of subscription agreements, such as for space(s) 101 monitoring and/or rental (leasing); it should be noted that the systems and/or the methods relating to activating, setting up, and/or instituting monitoring services such may also be applied and/or used in non-subscription models and/or use cases.

In some embodiments, the automation discussed herein is not limited to communications between the POS software and the monitoring software (e.g., NINCE 367) and/or between the user-interface-means 1701 software and the monitoring software (e.g., NINCE 367). In some embodiments, the automations discussed herein may be implemented via "intermediary software" that may be in communication with the POS software and/or with the user-interface-means 1701 software, and then aggregates this data for subsequent feeding to the monitoring software (e.g., NINCE 367). That is, in some embodiments, such intermediary software may be in communication with: the POS software, with the user-interface-means 1701 software, and/or with the monitoring software (e.g., NINCE 367).

For example, and without limiting the scope of the present invention, such intermediary software may be selected from at least one of: access control software, call center software, website software, revenue management software, chatbot software, software which pulls data from the space rental POS software, combinations thereof, and/or the like.

In some embodiments, the monitoring software (e.g., NINCE 367) may be integrated with software other than the space rental POS software; or in addition to the space rental POS software.

In some embodiments, the space rental POS software may bring in any or all of the above-mentioned software types or that the space rental POS software may feed the information directly or in parallel to any of the above-mentioned software types, such that the information routed into the monitoring software (e.g., NINCE 367) may be routed through the intermediary software.

Similarly, the monitoring software (e.g., NINCE 367) may also be made part of other software (such as, but not limited to, any of the above-mentioned software types), such that the integral data is already resident in the software which in turn has integrated to the POS rental software separately. In this case, the functional blocks are the same and it is key to acknowledge the core data for automation is coming from the POS rental software (and/or from the user-interface-means 1701 software) as a source whether directly or through any other intermediary interface that establishes the monitoring service relationship.

Monitoring-devices, systems for monitoring at least one controlled space for transitory uses, and methods for monitoring at least one controlled space are described. The foregoing description of the various embodiments of the invention has been presented for the purposes of illustration and disclosure. It is not intended to be exhaustive nor to limit the invention to the precise form disclosed. Many modifications and variations are possible in light of the above teaching without departing from the spirit or scope of the invention.

While the invention has been described in connection with what is presently considered to be the most practical embodiments, it is to be understood that the invention is not to be limited to the disclosed embodiments, but on the contrary, is intended to cover various modifications and equivalent arrangements included within the spirit and scope of the appended claims.

What is claimed is:

1. A system for managing a plurality of monitoring-devices that are configured for monitoring a plurality of spaces, wherein the system comprises:

the plurality of the monitoring-devices, wherein a monitoring-device, selected from the plurality of the monitoring-devices, comprises:

at least one sensor that is configured for sensing conditions of a space selected from the plurality of spaces;

at least one radio that is configured for two-way wireless communications with at least one computer-server; and at least one processor that controls the at least one sensor and that controls the at least one radio, wherein the at least one processor is operatively linked to the at least one sensor and also operatively linked to the at least one radio;

a set of instructions non-transitorily stored in memory of the at least one computer-server and that is executable by at least one server-processor of the at least one computer-server; wherein the set of instructions are configured to instruct the at least one processor of the monitoring-device in how to operate;

wherein the plurality of the monitoring-devices and the set of instructions are in at least intermittent communications with each other;

wherein when at least some of the plurality of the monitoring-devices arrive at a facility, the set of instructions checks if the at least some of the plurality of the monitoring-devices are at an intended location and if so, provisions the at least some of the plurality of the monitoring-devices for intended use on a monitoring-network of the facility.

2. The system according to claim 1, wherein the monitoring-device, selected from the plurality of the monitoring-devices, comprises a GPS-module that is in communication with the at least one processor, wherein the GPS-module is configured to determine a positional location of the monitoring-device, wherein positional location information from the GPS-module is communicated to the set of instructions.

3. The system according to claim 1, wherein when at least some of the plurality of the monitoring-devices arrive at a facility, the set of instructions checks if the at least some of the plurality of the monitoring-devices are at an intended location and if so, changes a status designation of the at least some of the plurality of the monitoring-devices to in inventory for the facility.

4. The system according to claim 1, wherein the set of instructions causes a data linkage between at least one monitoring-device, selected from the plurality of the monitoring-devices, to at least one space, selected from the plurality of spaces, by associating an identifier of the at least one monitoring-device to an identifier of the at least one space.

5. The system according to claim 4, wherein the set of instructions checks to verify if a location of the at least one monitoring-device is correct with respect to monitoring of the at least one space, wherein if this check fails the set of instructions causes a notification to be sent to a user or to a user-device asking that the at least one monitoring-device be physically installed to monitor the at least one space.

6. The system according to claim 4, wherein when the data linkage is created before the at least one space is rented to a tenant the at least one space is configured for contactless activation of monitoring service when the at least one space is rented, wherein commencement of the contactless monitoring service does not require any human intervention at the at least one space.

7. The system according to claim 6, wherein the at least one space is designated as being ready for monitoring service within a graphical user interface that the set of instructions codes for.

8. The system according to claim 4, wherein the data linkage is created before the at least one space is rented to a tenant, wherein the at least one space is two or more spaces, wherein information of the two or more spaces is displayable in a graphical user interface that the set of instructions codes for, wherein the graphical user interface is configured to permit the tenant to select from among the two or more spaces.

9. The system according to claim 8, wherein when the tenant to selects from among the two or more spaces, monitoring services is automatically activated by the set of instructions with respect to the selection without any need for facility operator personnel intervention.

10. The system according to claim 4, wherein on demand monitoring service is enabled when the data linkage is created during or after the at least one space is rented to a tenant.

11. The system according to claim 4, wherein monitoring service of the at least space is automatically activated when the data linkage is created during or after an act of renting the at least one space to a tenant.

12. The system according to claim 1, wherein when the set of instructions determines that at least one monitoring-device, selected from the plurality of the monitoring-devices, is in correct proximity to at least one space, selected from the plurality of spaces, that is intended to be monitored by the at least one monitoring-device, the set of instructions causes a data linkage between the at least one monitoring-device and the at least one space, by associating an identifier of the at least one monitoring-device to an identifier of the at least one space, if the data linkage does not already exist.

13. The system according to claim 1, wherein the set of instructions performs at least one check before activating monitoring service for a tenant, wherein the monitoring service for the tenant is enabled by at least one monitoring-device, selected from the plurality of the monitoring-devices, monitoring at least one space, selected from the plurality of spaces.

14. The system according to claim 1, wherein the set of instructions performs at least one check before suspending monitoring service for a tenant, wherein the monitoring service for the tenant is enabled by at least one monitoring-device, selected from the plurality of the monitoring-devices, monitoring at least one space, selected from the plurality of spaces.

15. The system according to claim 1, wherein if the monitoring service for a tenant is suspended, then the monitoring service for a facility operator is optionally still active; wherein the facility operator operates or manages a facility where the at least one space is located.

16. The system according to claim 1, wherein the set of instructions performs at least one check before terminating monitoring service for a tenant, wherein the monitoring service for the tenant is enabled by at least one monitoring-device, selected from the plurality of the monitoring-devices, monitoring at least one space, selected from the plurality of spaces.

17. The system according to claim 1, wherein if the monitoring service for a tenant is terminated, then the monitoring service for a facility operator is optionally still active; wherein the facility operator operates or manages a facility where the at least one space is located.

18. The system according to claim 1, wherein the space selected from the plurality of spaces is a controlled space is for transitory use.

19. The system according to claim 1, wherein the system further comprises a graphical user interface that the set of instructions codes for.

20. A system for managing a plurality of monitoring-devices that are configured for monitoring a plurality of spaces, wherein the system comprises:

the plurality of the monitoring-devices, wherein a monitoring-device, selected from the plurality of the monitoring-devices, comprises:

at least one sensor that is configured for sensing conditions of a space selected from the plurality of spaces;

at least one radio that is configured for two-way wireless communications with at least one computer-server; and at least one processor that controls the at least one sensor and that controls the at least one radio, wherein the at least one processor is operatively linked to the at least one sensor and also operatively linked to the at least one radio;

a set of instructions non-transitorily stored in memory of the at least one computer-server and that is executable by at least one server-processor of the at least one computer-server; wherein the set of instructions are configured to instruct the at least one processor of the monitoring-device in how to operate;

wherein the plurality of the monitoring-devices and the set of instructions are in at least intermittent communications with each other;

wherein when at least some of the plurality of the monitoring-devices arrive at a facility, the set of instructions checks if the at least some of the plurality of the monitoring-devices are at an intended location and if so, changes a status designation of the at least some of the plurality of the monitoring-devices to in inventory for the facility.

21. The system according to claim 20, wherein at least some of the plurality of the monitoring-devices are pre-provisioned for intended use at a facility before the at least some of the plurality of the monitoring-devices arrives at the facility such that when the at least some of the plurality of the monitoring-devices do arrive at the facility the at least some of the plurality of the monitoring-devices work as intended without any additional setup or configuration.

22. The system according to claim 21, wherein the pre-provisioning is done by the set of instructions linking identifiers of the at least some of the plurality of the monitoring-devices with an identifier of the facility or with an identifier of a monitoring-network of the facility.

23. The system according to claim 20, wherein at least some of the set of instructions enables display of a graphical user interface upon user-computing-devices, wherein the graphical-user-interface for the facility displays information of the at least some of the plurality of the monitoring-devices that have the status designation of in inventory.

24. A system for managing a plurality of monitoring-devices that are configured for monitoring a plurality of spaces, wherein the system comprises:

the plurality of the monitoring-devices, wherein a monitoring-device, selected from the plurality of the monitoring-devices, comprises:

at least one sensor that is configured for sensing conditions of a space selected from the plurality of spaces;

at least one radio that is configured for two-way wireless communications with at least one computer-server; and at least one processor that controls the at least one sensor and that controls the at least one radio, wherein the at least one processor is operatively linked to the at least one sensor and also operatively linked to the at least one radio;

a set of instructions non-transitorily stored in memory of the at least one computer-server and that is executable by at least one server-processor of the at least one computer-server; wherein the set of instructions are configured to instruct the at least one processor of the monitoring-device in how to operate;

wherein the plurality of the monitoring-devices and the set of instructions are in at least intermittent communications with each other;

wherein when the set of instructions determines that at least one monitoring-device, selected from the plurality of the monitoring-devices, is in correct proximity to at least one space, selected from the plurality of spaces, that is intended to be monitored by the at least one monitoring-device, the set of instructions causes a data linkage between the at least one monitoring-device and the at least one space, by associating an identifier of the at least one monitoring-device to an identifier of the at least one space, if the data linkage does not already exist.

25. The system according to claim 24, wherein when a prospective tenant of the at least one space requests monitoring service of the at least one space from a point-of-sale rental software system, the set of instructions, being in communication with the point-of-sale rental software system, checks proximity of the at least one monitoring-device to the at least one space.

26. The system according to claim 25, wherein if the proximity is insufficient, then the set of instructions causes the data linkage and the set of instructions causes a notification to be sent to a user or to a user-device asking that the at least one monitoring-device be physically installed to monitor the at least one space.

* * * * *